Jan. 8, 1963    E. C. GREANIAS ETAL    3,072,886
APPARATUS FOR ANALYZING INTELLIGENCE MANIFESTATIONS
Filed April 2, 1956    65 Sheets-Sheet 1
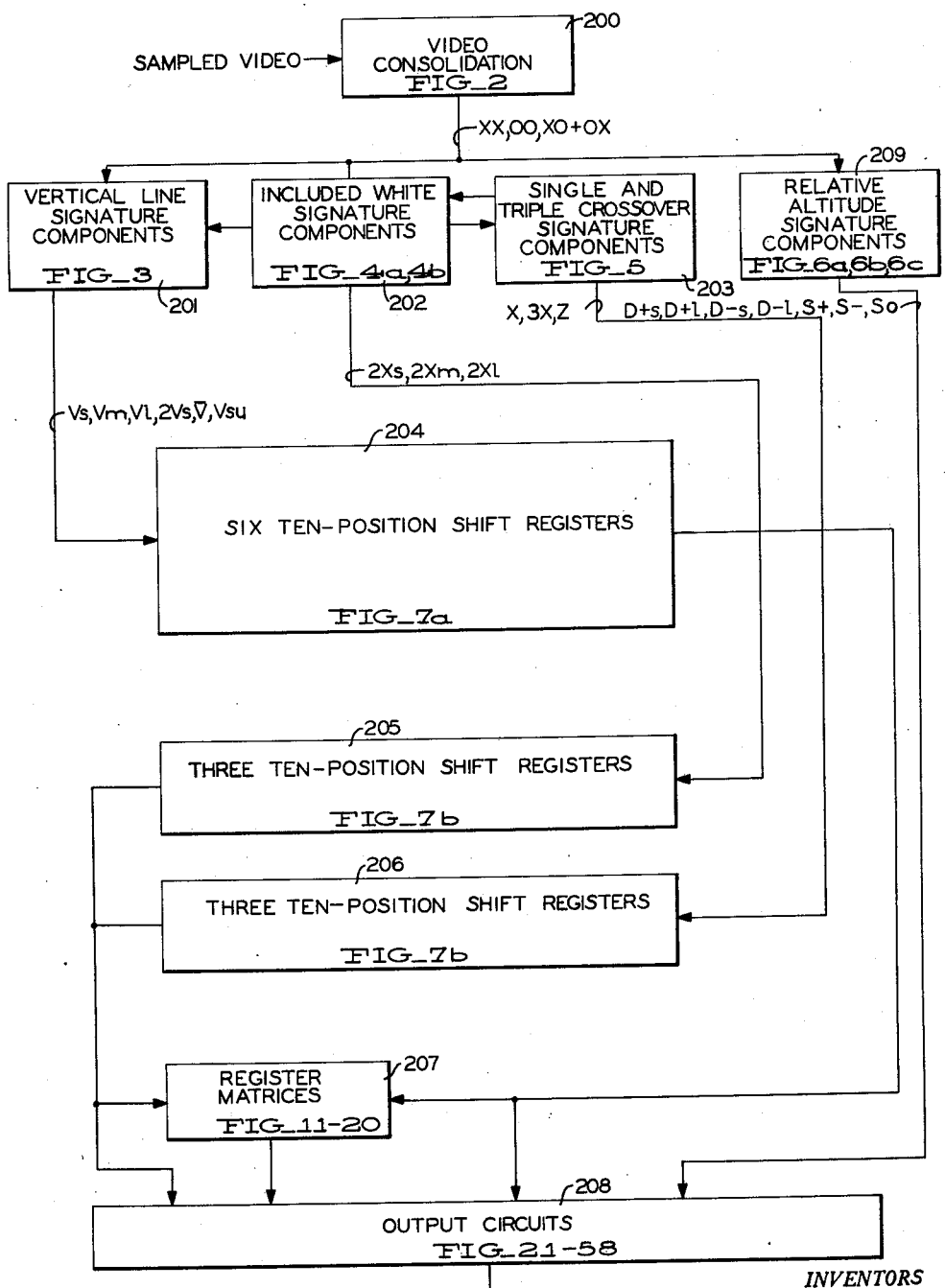
FIG_1
INVENTORS
EVON C. GREANIAS
ARTHUR HAMBURGEN
BY
Dewey J. Cunningham
ATTORNEY

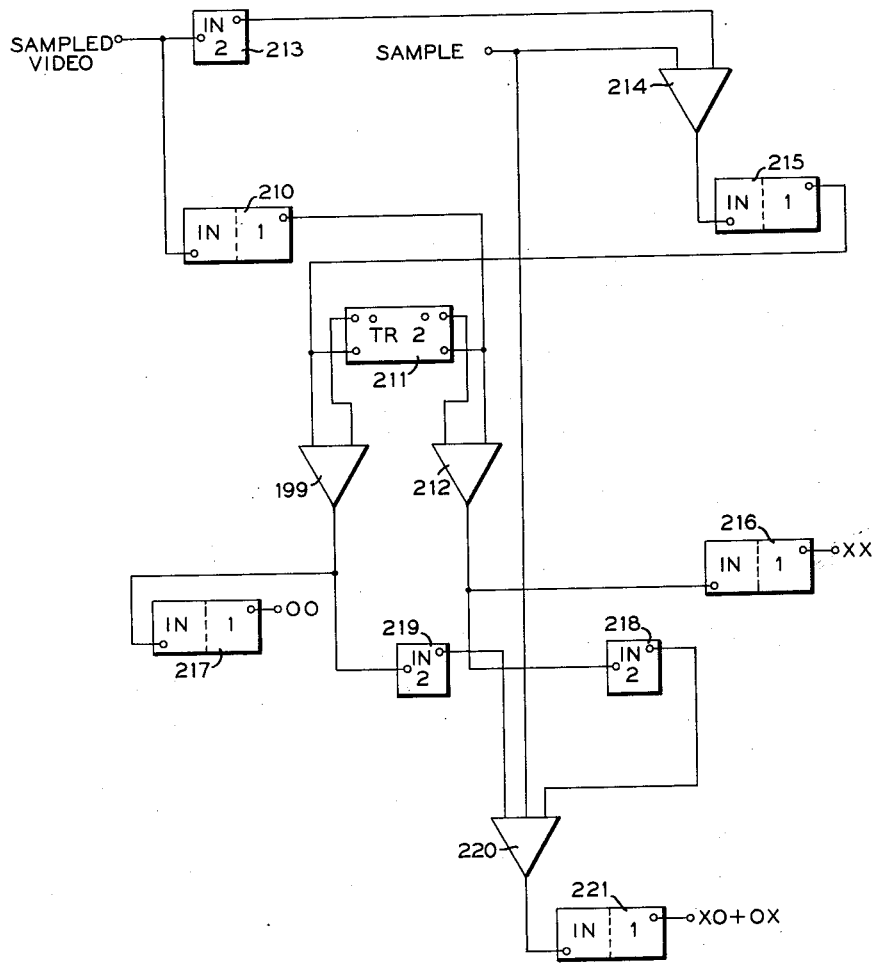
FIG_2

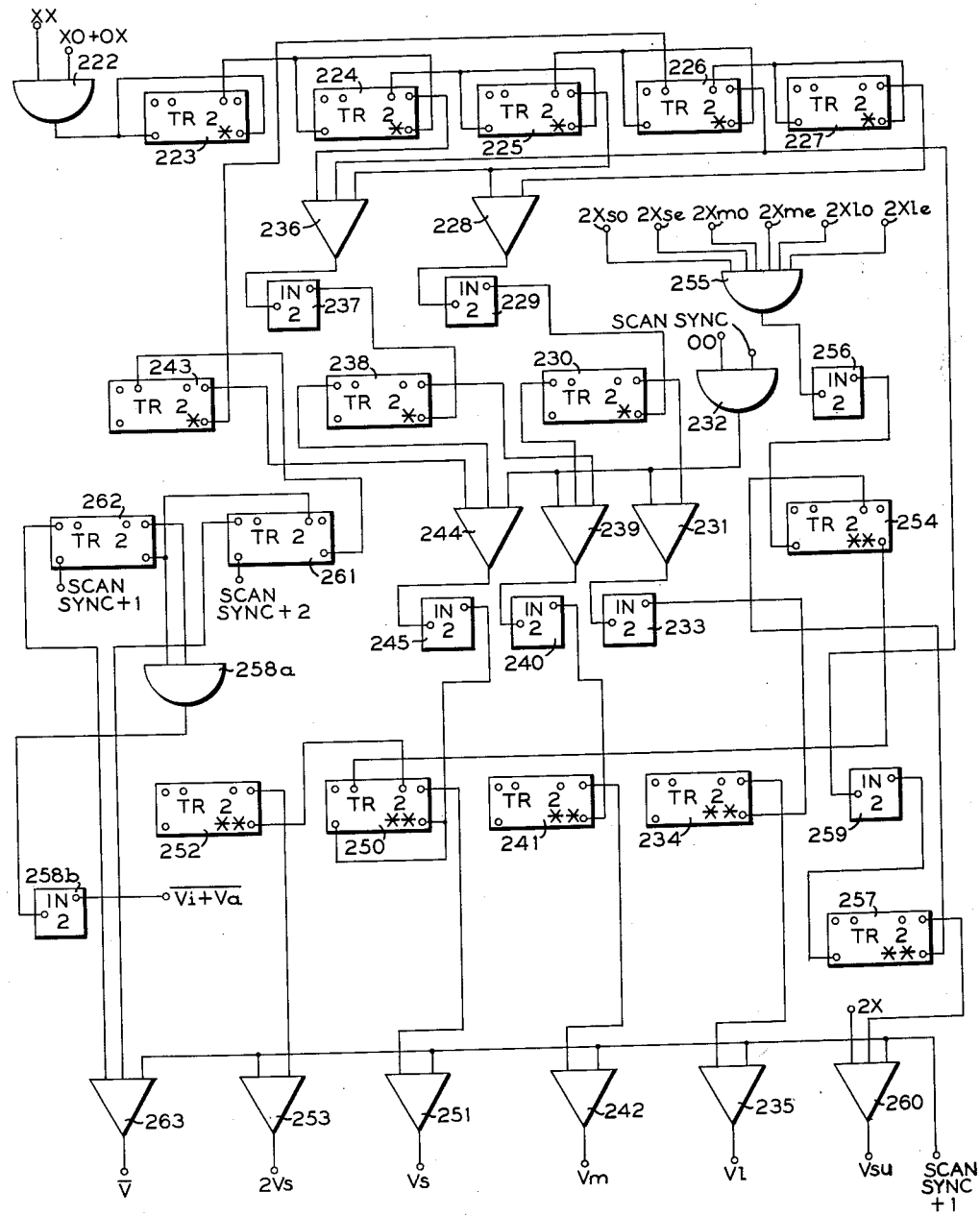
FIG_3

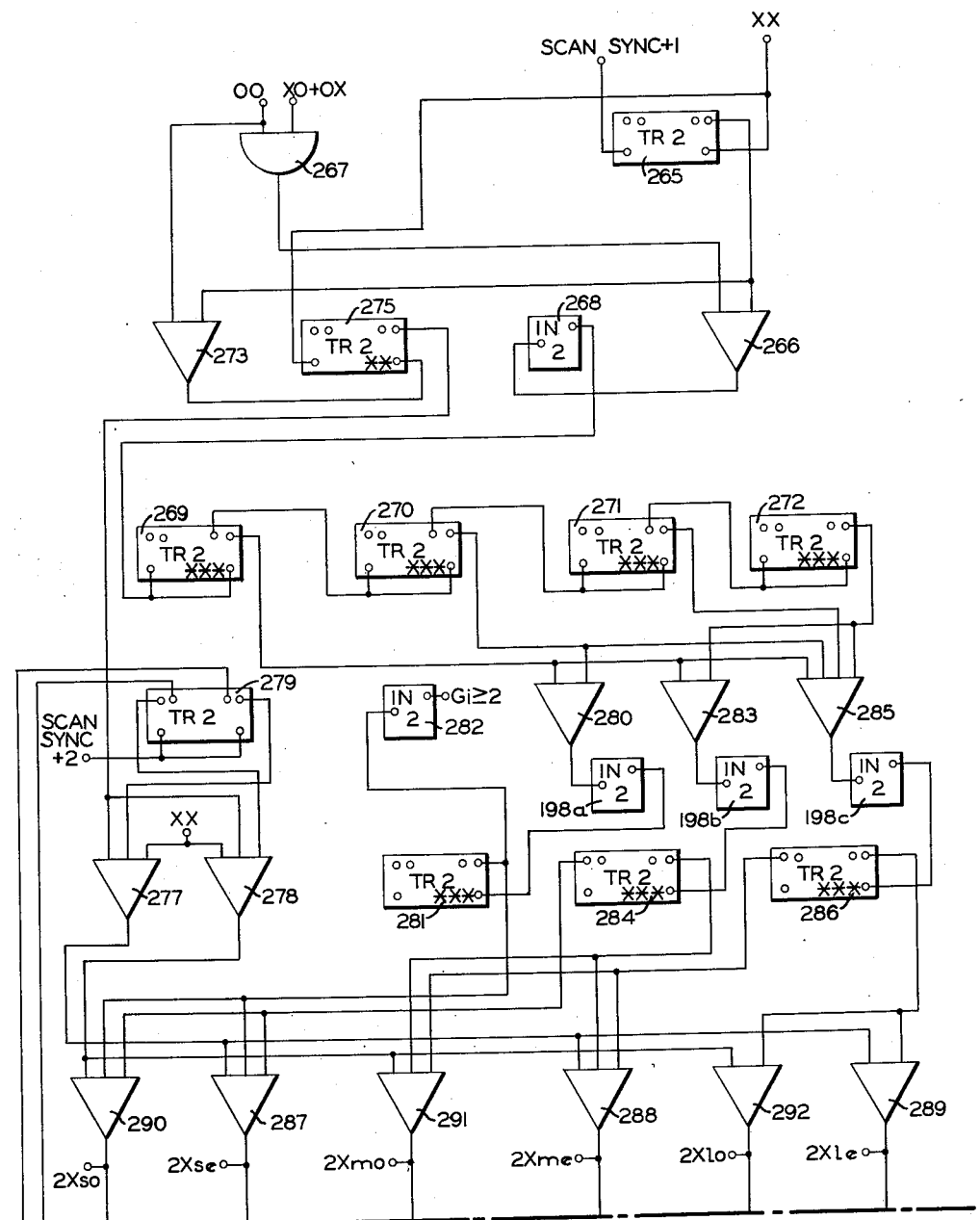
FIG_4a
\*\*\* RESET BY SCAN SYNC+2 OR XX
\*\* RESET BY SCAN SYNC+2

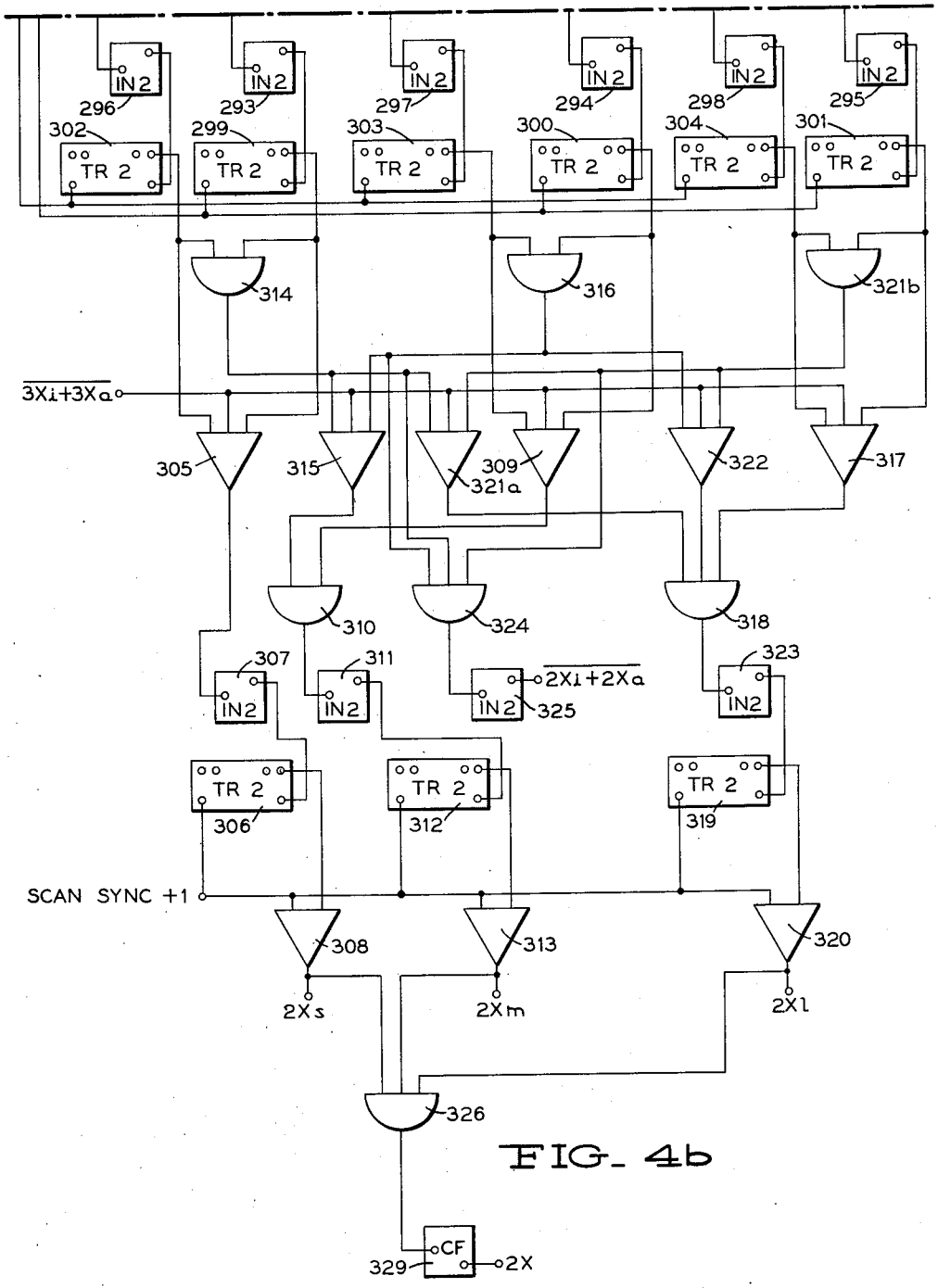

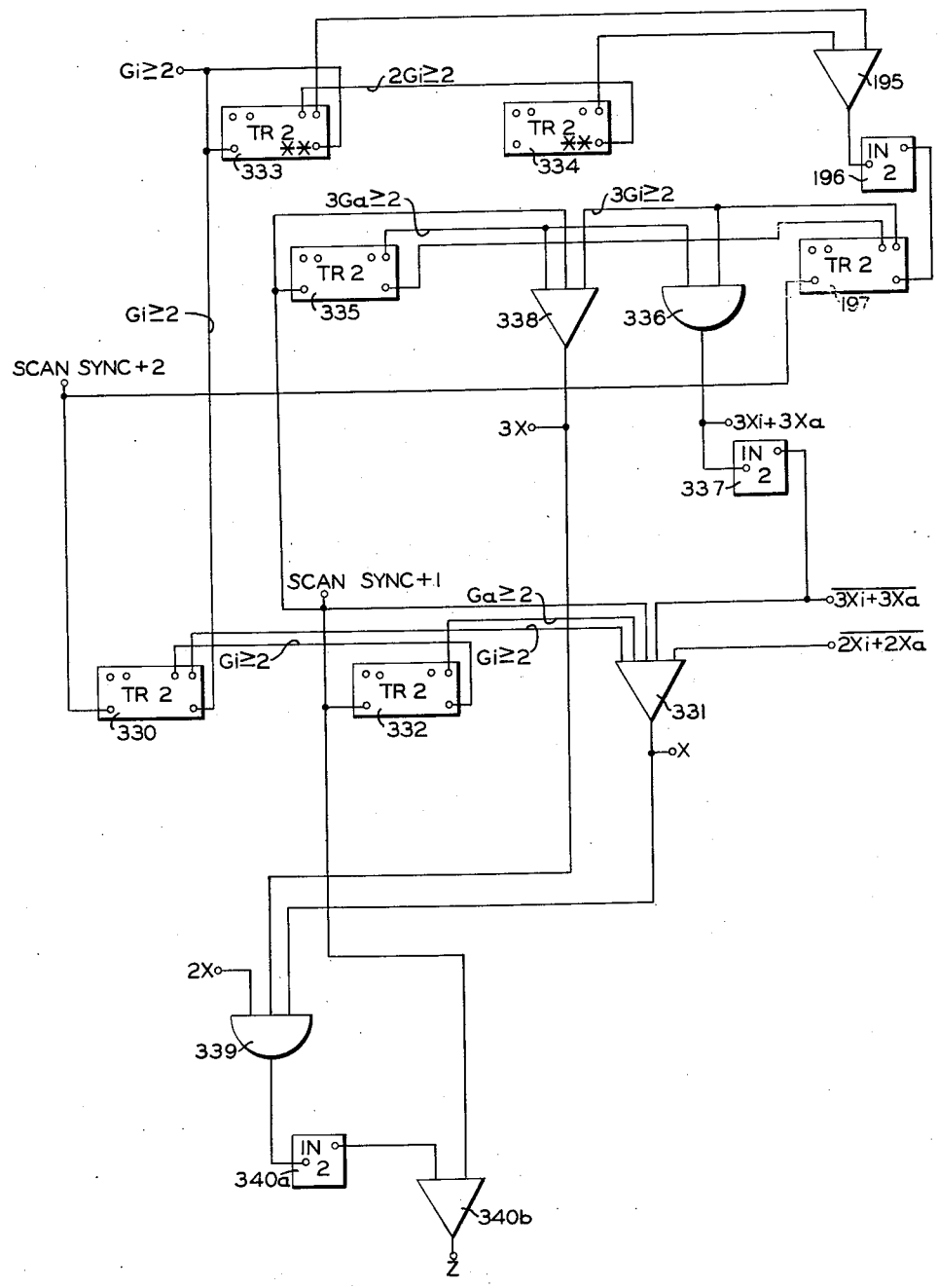
FIG_5
** RESET BY SCAN SYNC +2

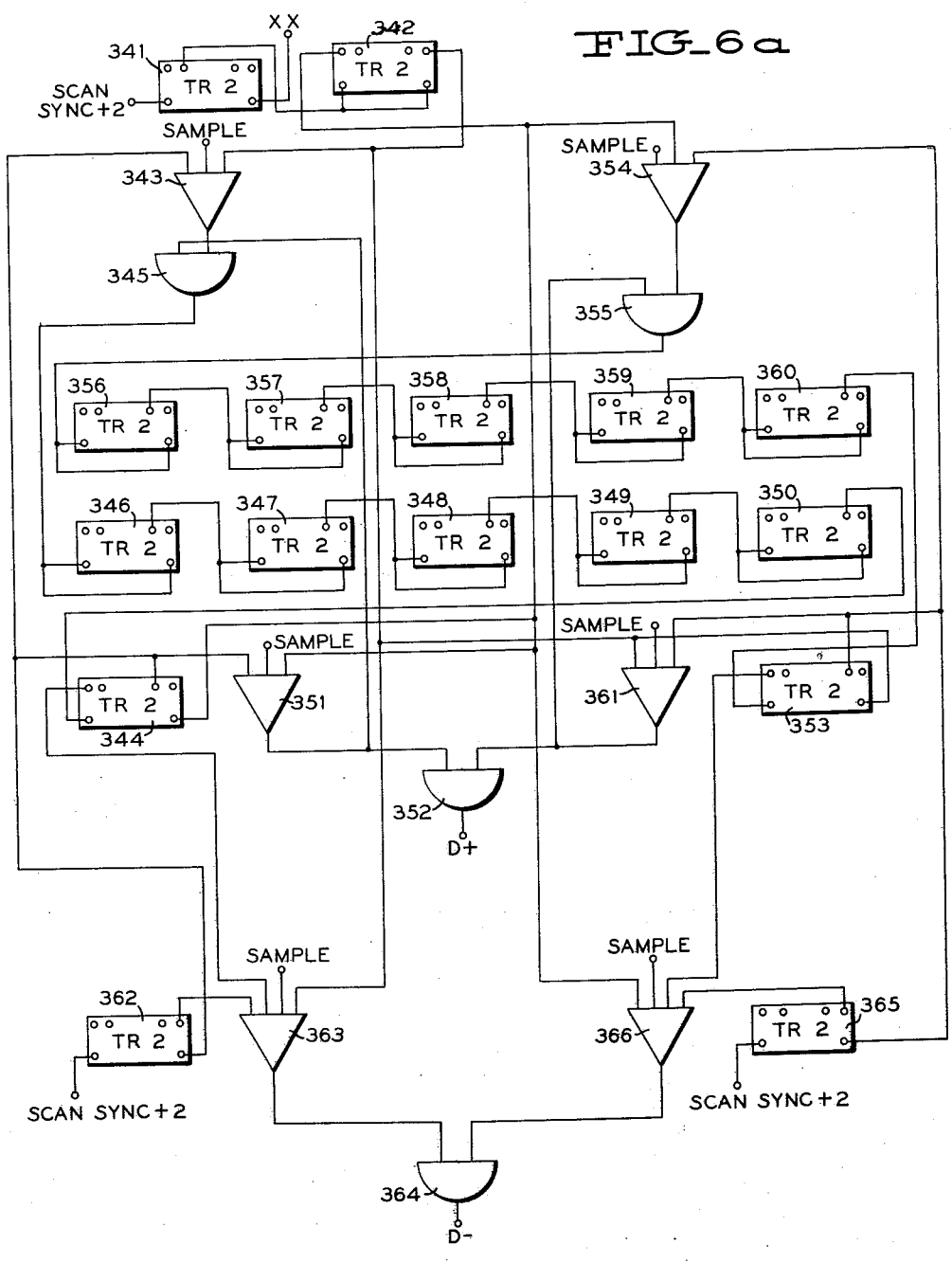
FIG_6a

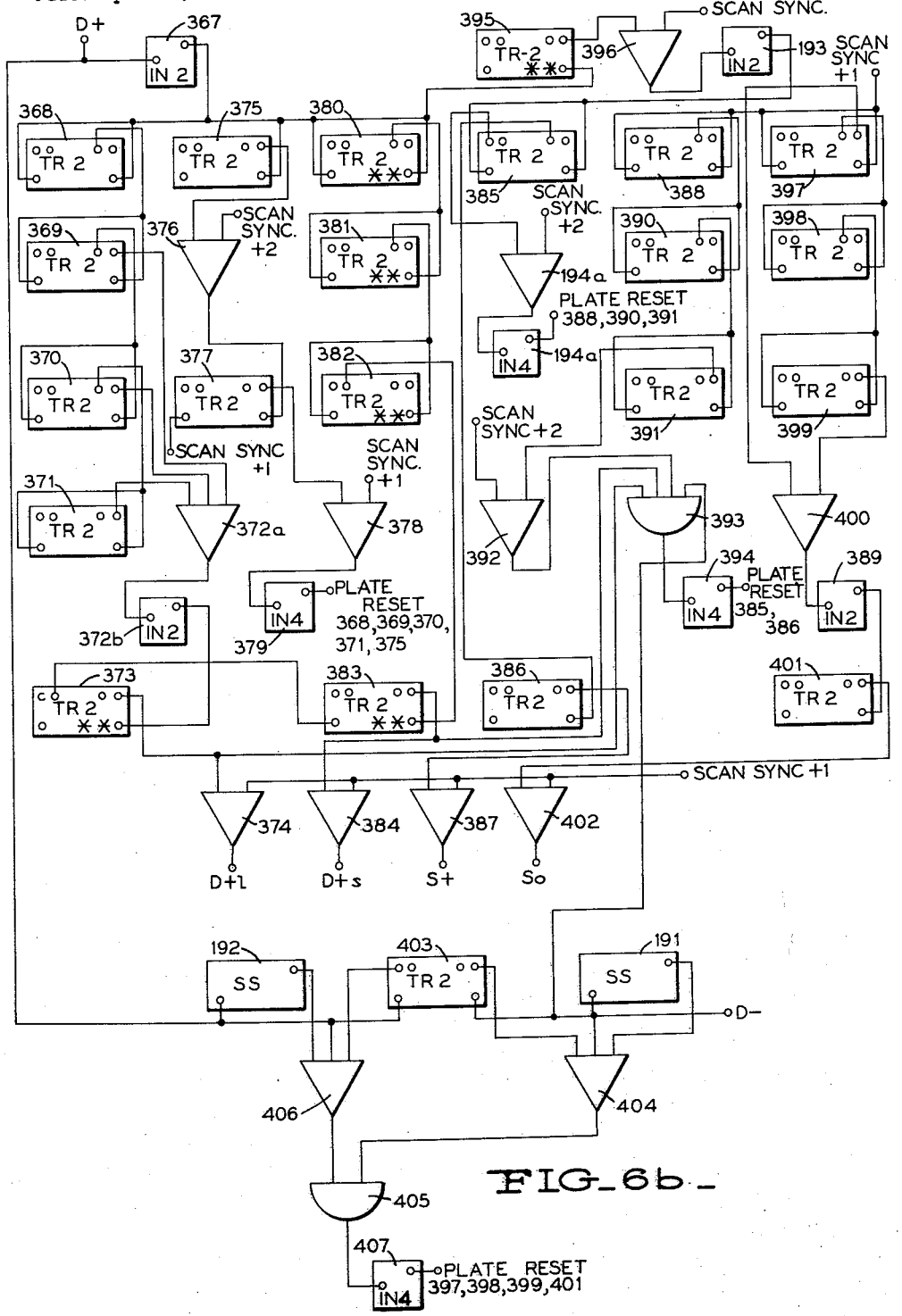

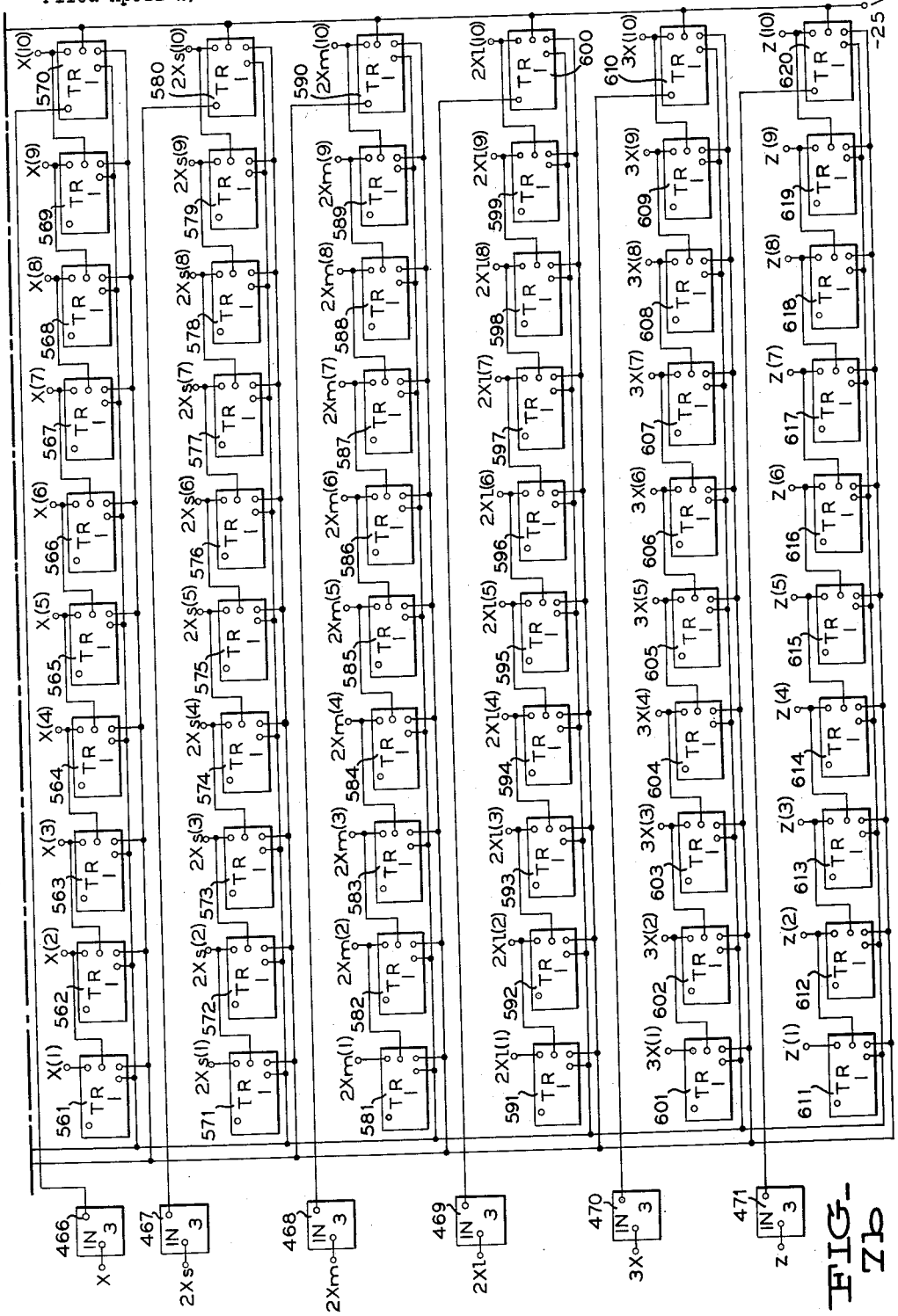

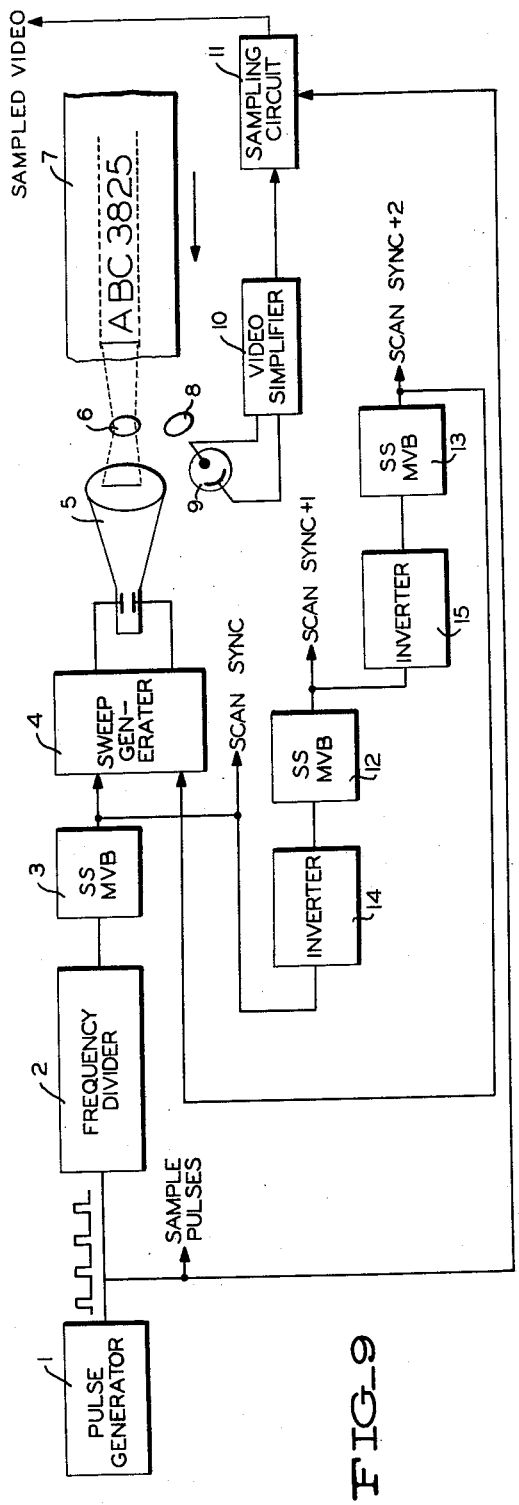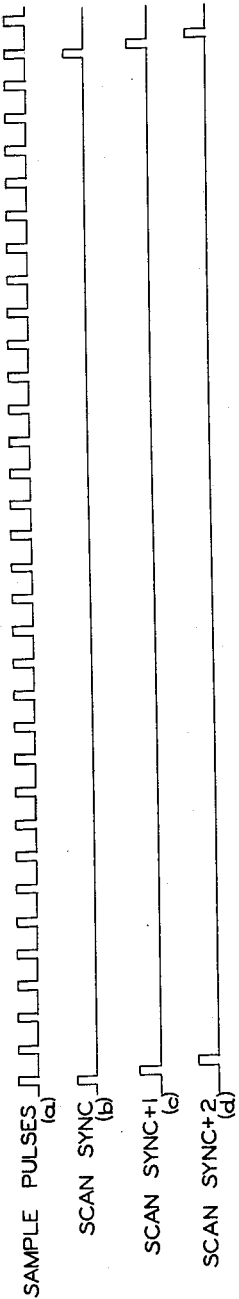

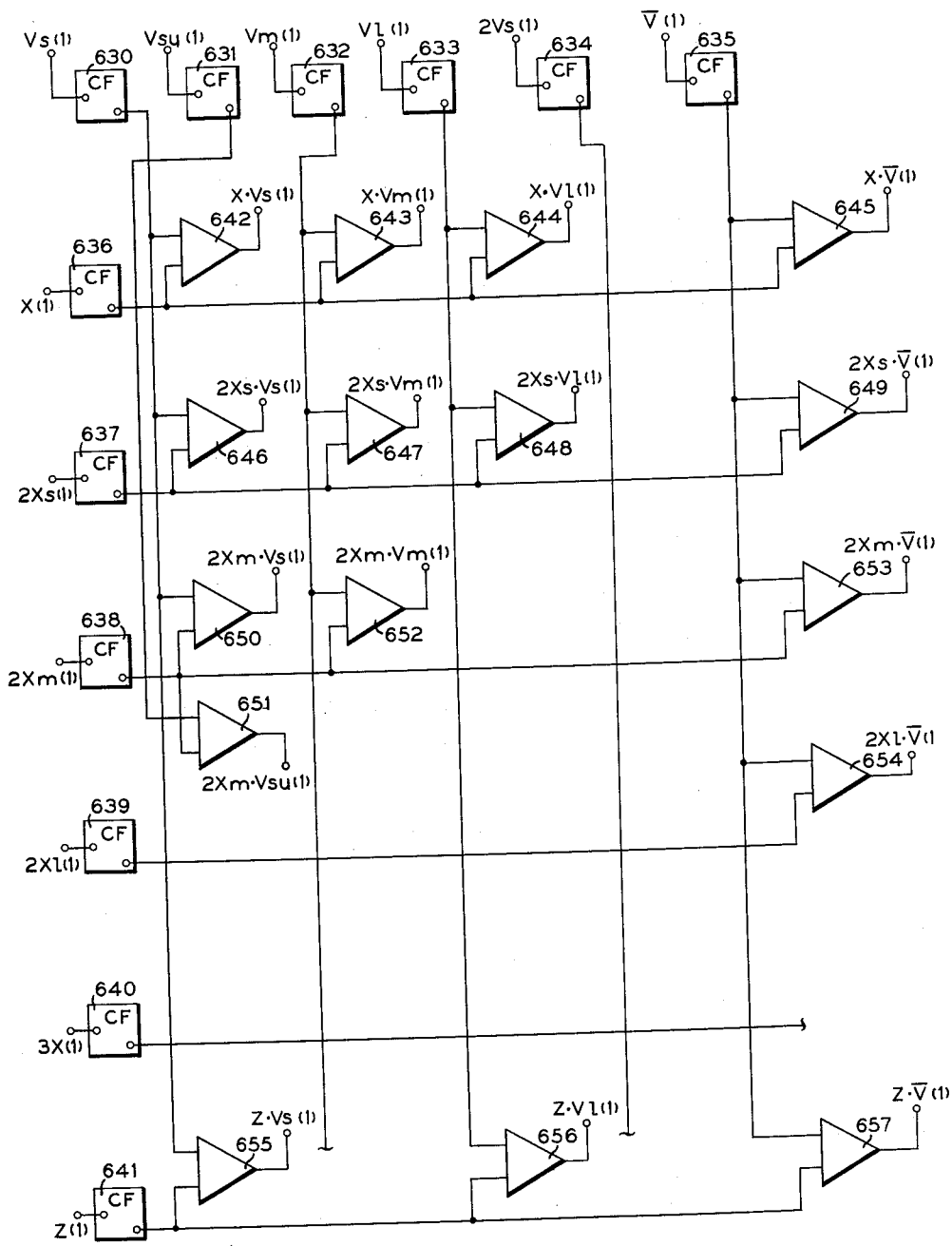
FIG_11

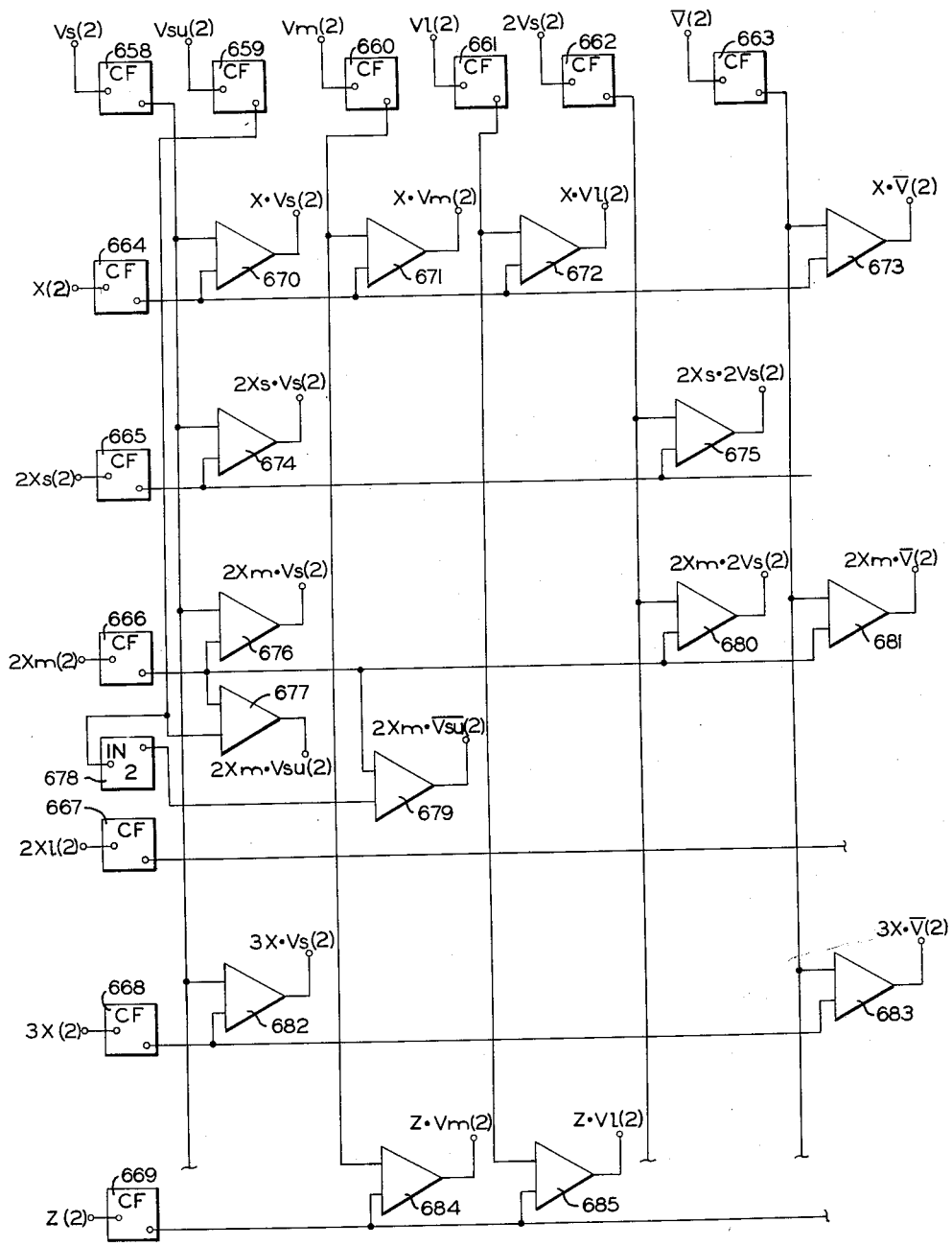
FIG_12

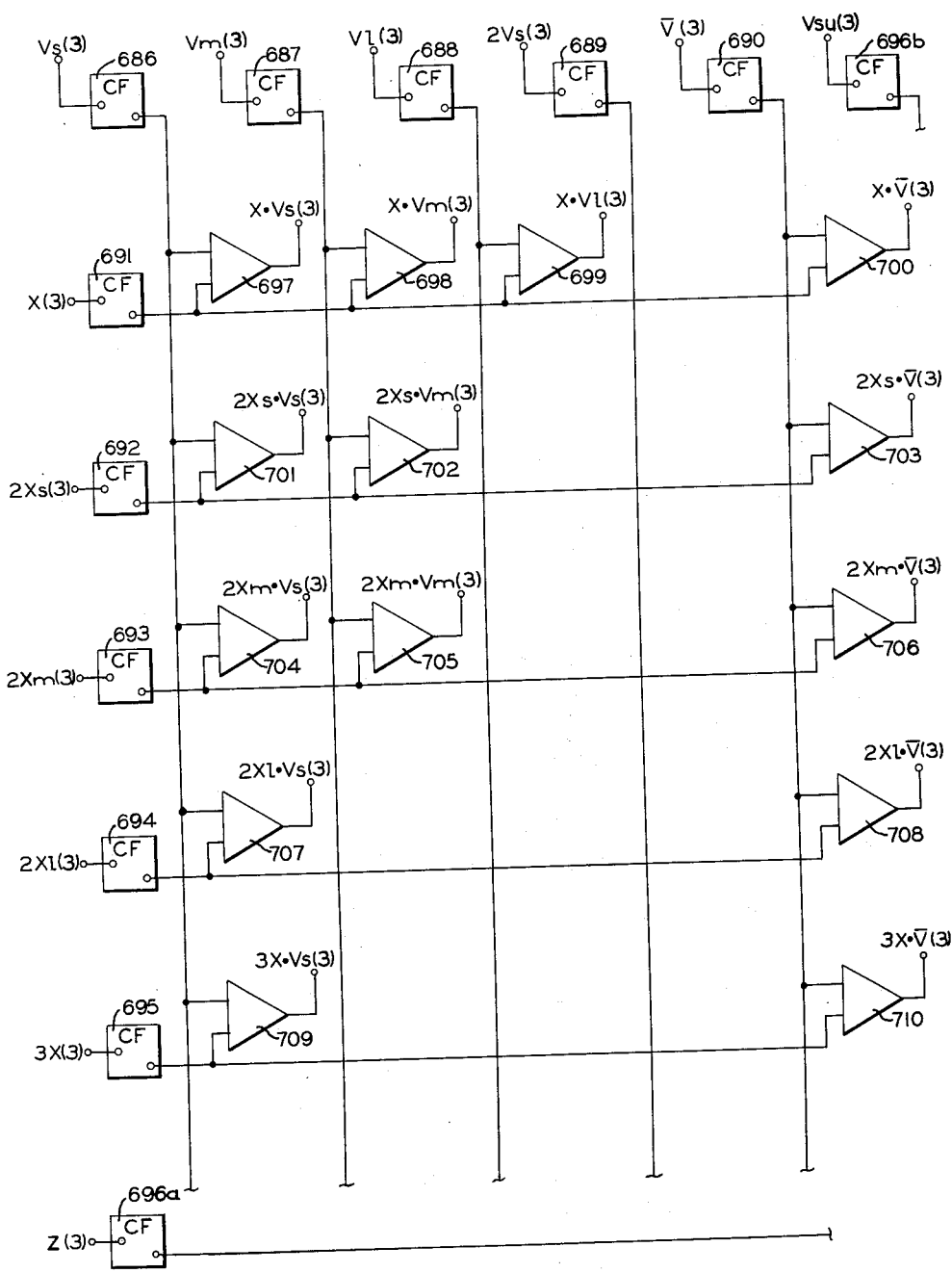
FIG_13

FIG_15

FIG_16

FIG_18

FIG_19

FIG_20

Jan. 8, 1963   E. C. GREANIAS ETAL   3,072,886
APPARATUS FOR ANALYZING INTELLIGENCE MANIFESTATIONS
Filed April 2, 1956   65 Sheets-Sheet 25

FIG_23

FIG_26

FIG_27

FIG_31

FIG_32

FIG_33

FIG_39

FIG_43

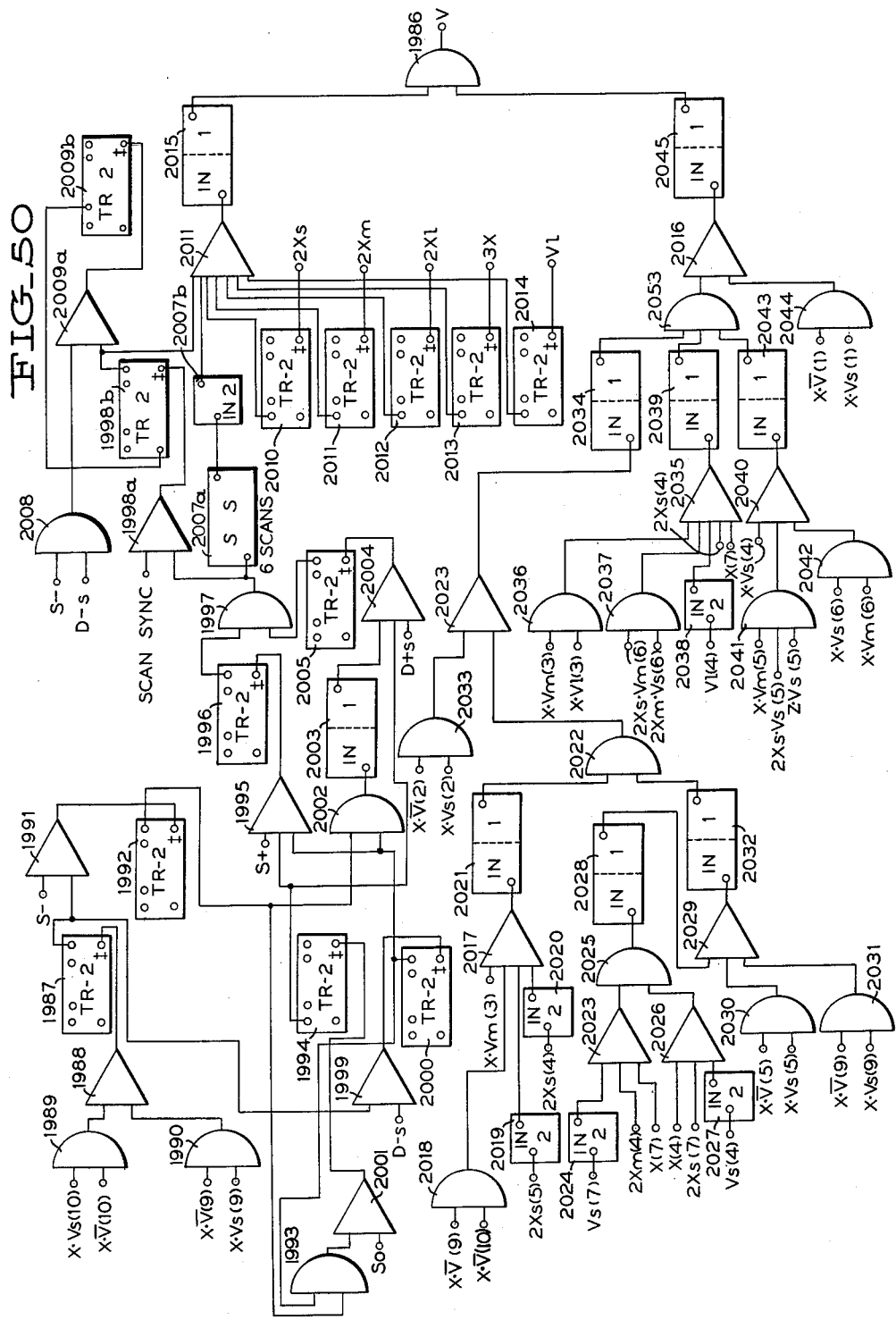

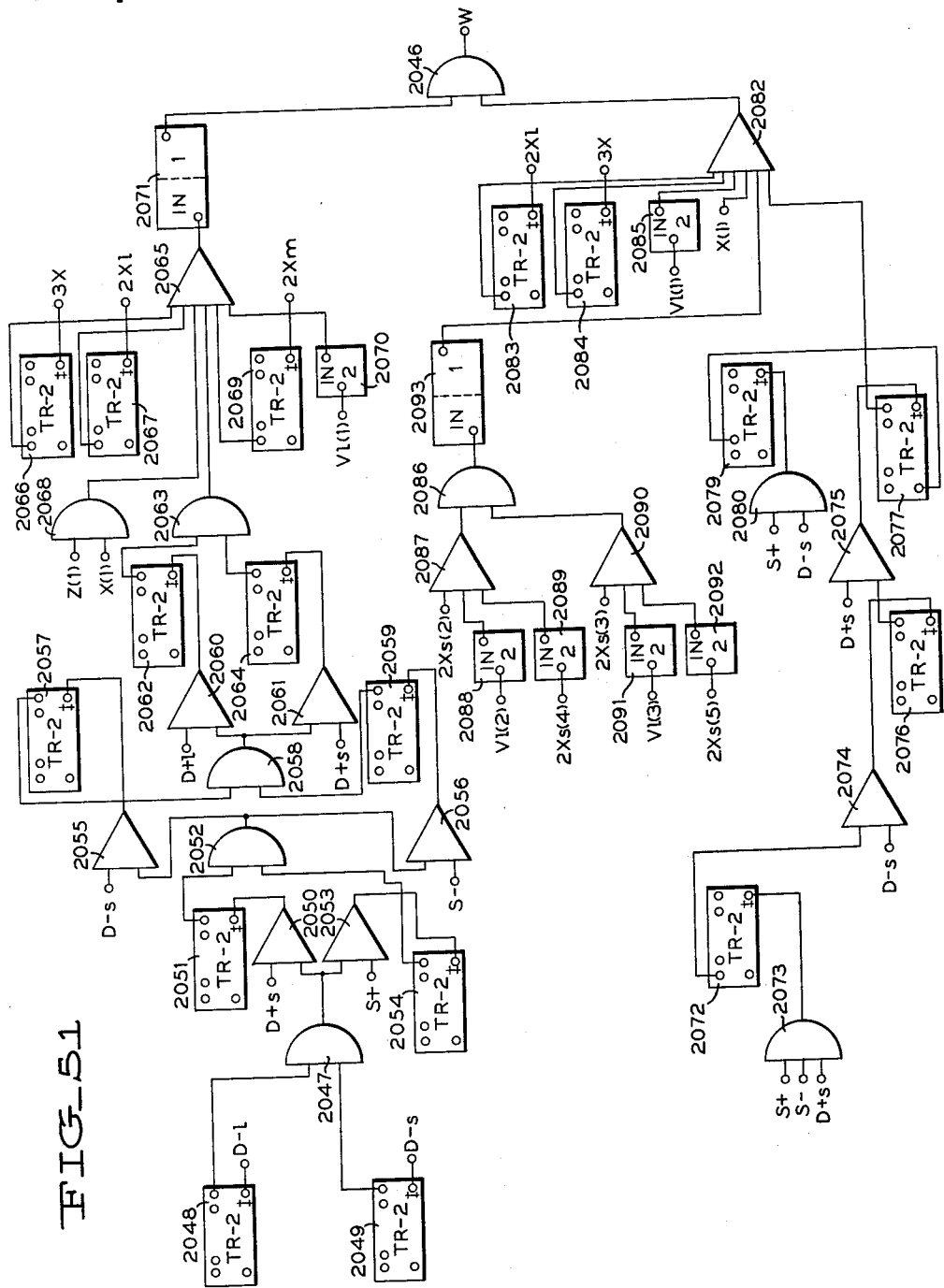
FIG_51

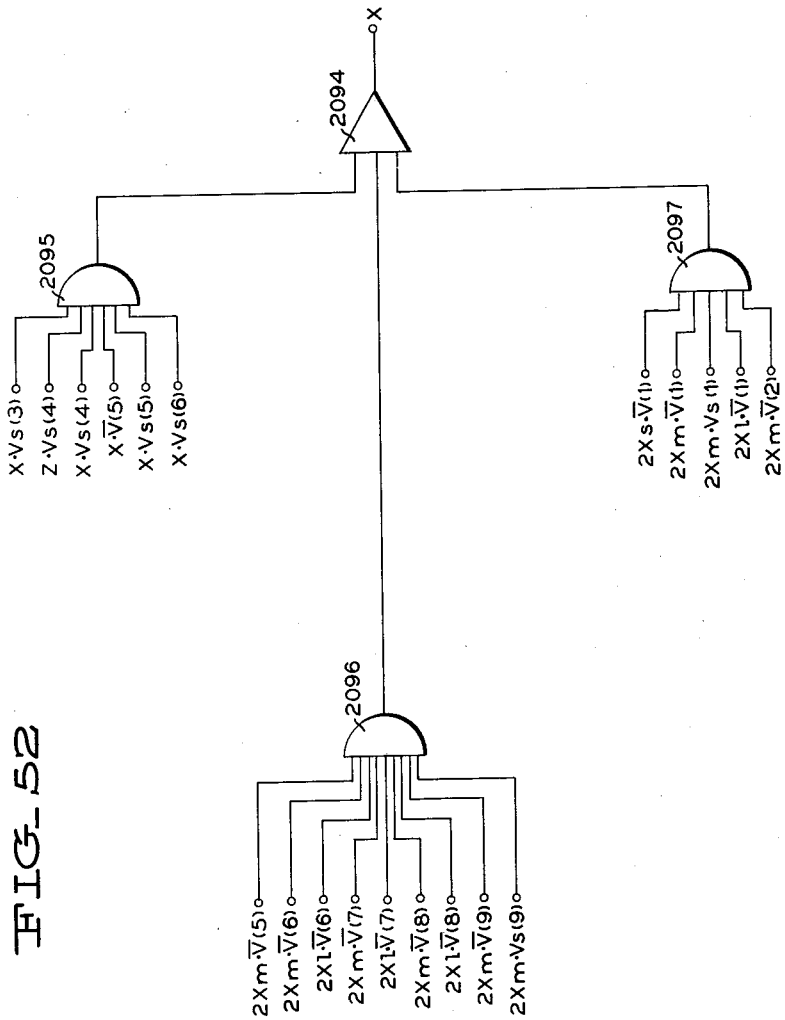

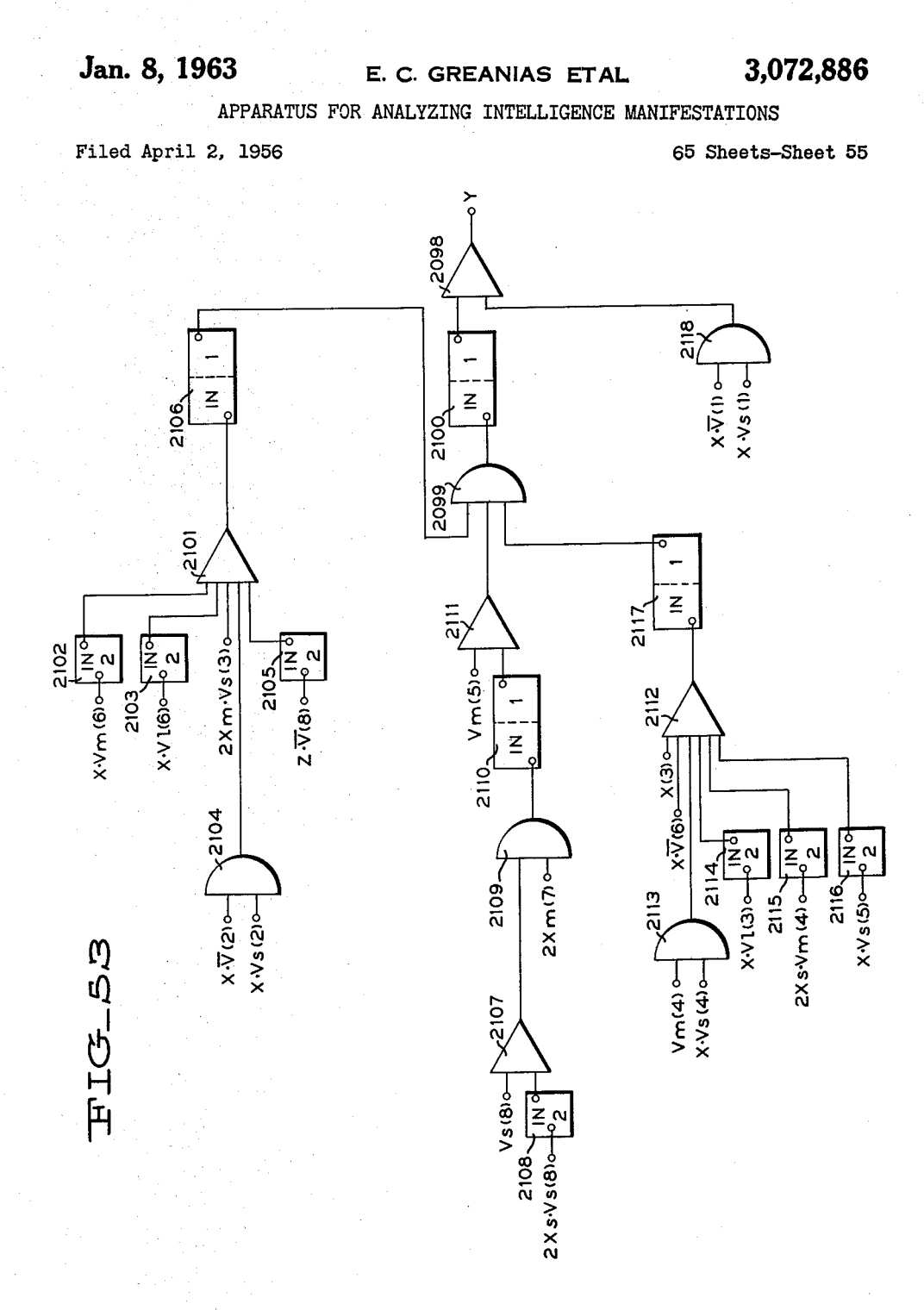

FIG_53

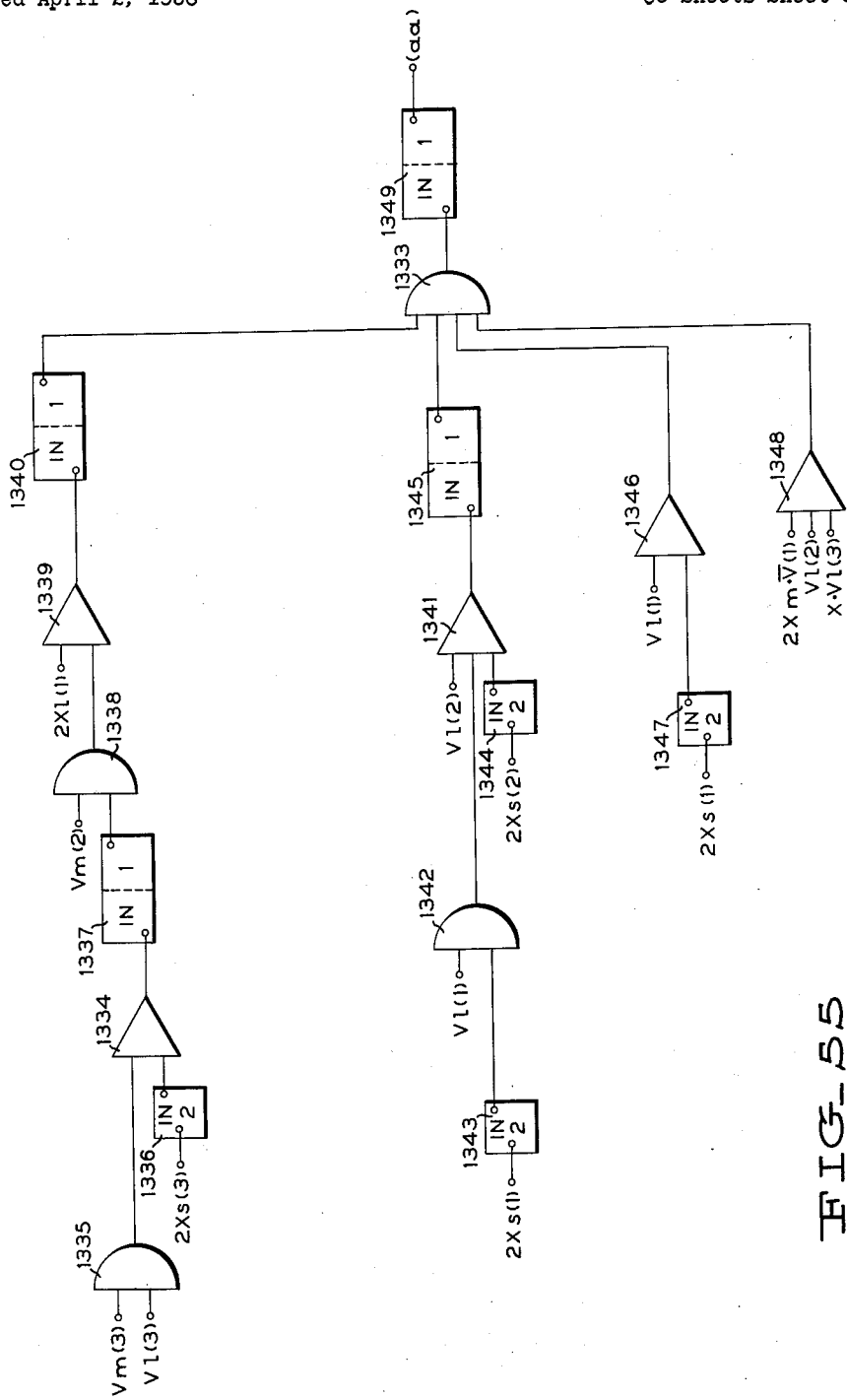
FIG_55

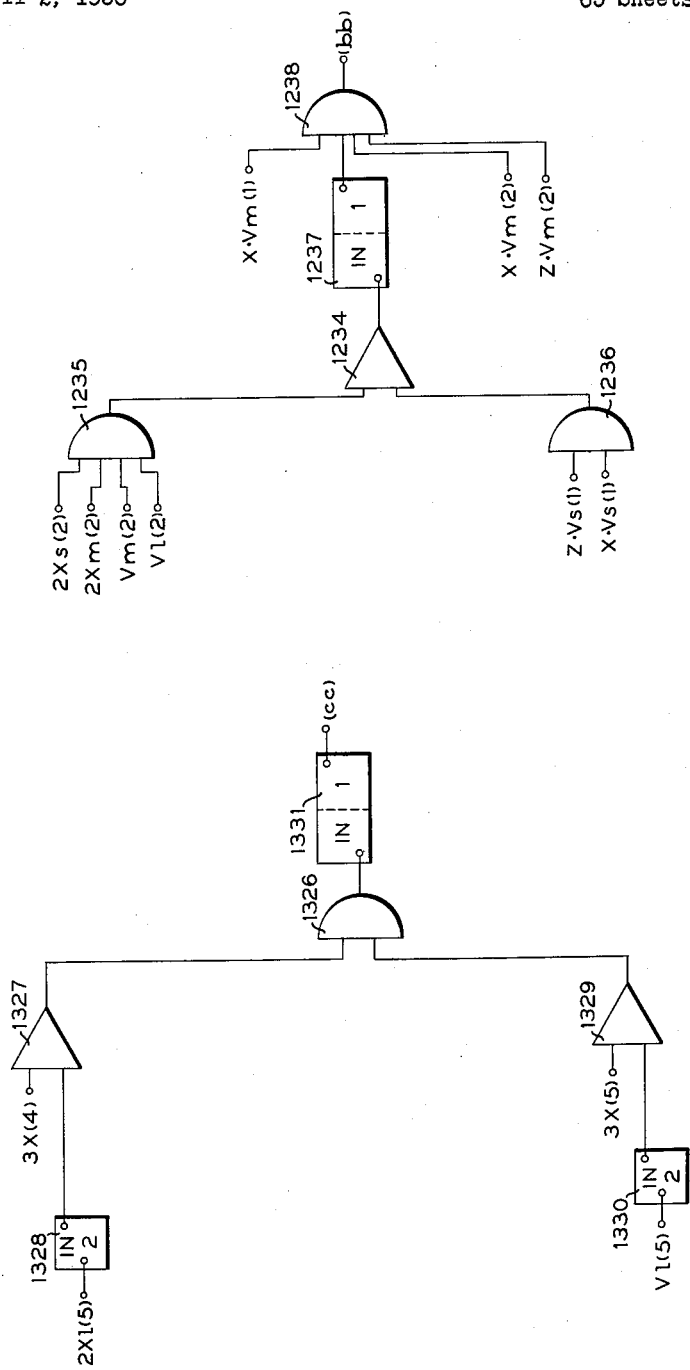
Jan. 8, 1963     E. C. GREANIAS ETAL     3,072,886
APPARATUS FOR ANALYZING INTELLIGENCE MANIFESTATIONS
Filed April 2, 1956     65 Sheets—Sheet 58

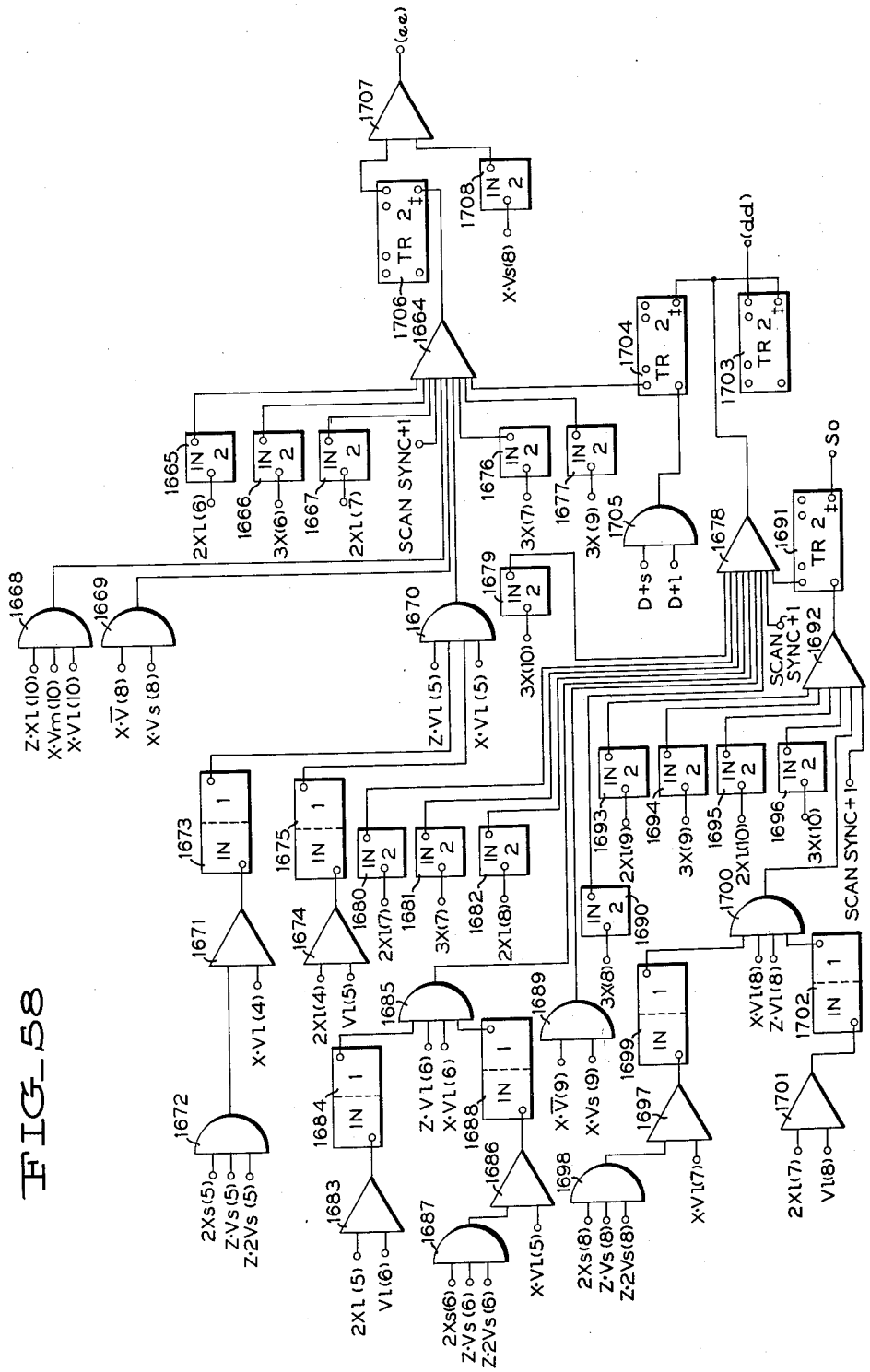
FIG_58

Jan. 8, 1963     E. C. GREANIAS ETAL     3,072,886
APPARATUS FOR ANALYZING INTELLIGENCE MANIFESTATIONS
Filed April 2, 1956                 65 Sheets-Sheet 60

Jan. 8, 1963   E. C. GREANIAS ETAL   3,072,886
APPARATUS FOR ANALYZING INTELLIGENCE MANIFESTATIONS
Filed April 2, 1956   65 Sheets-Sheet 61

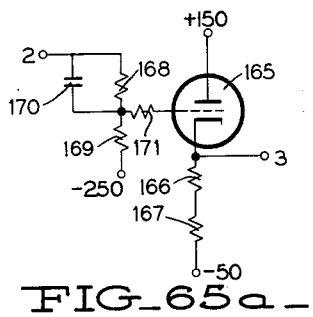
FIG_65a_
FIG_65b_
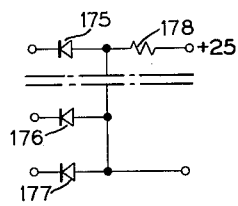
FIG_66a_
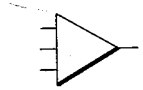
FIG_66b_
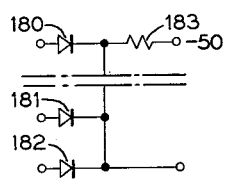
FIG_67a_
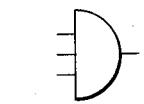
FIG_67b_
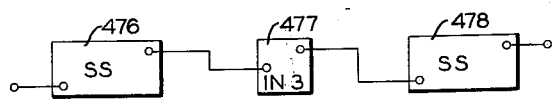
FIG_8_

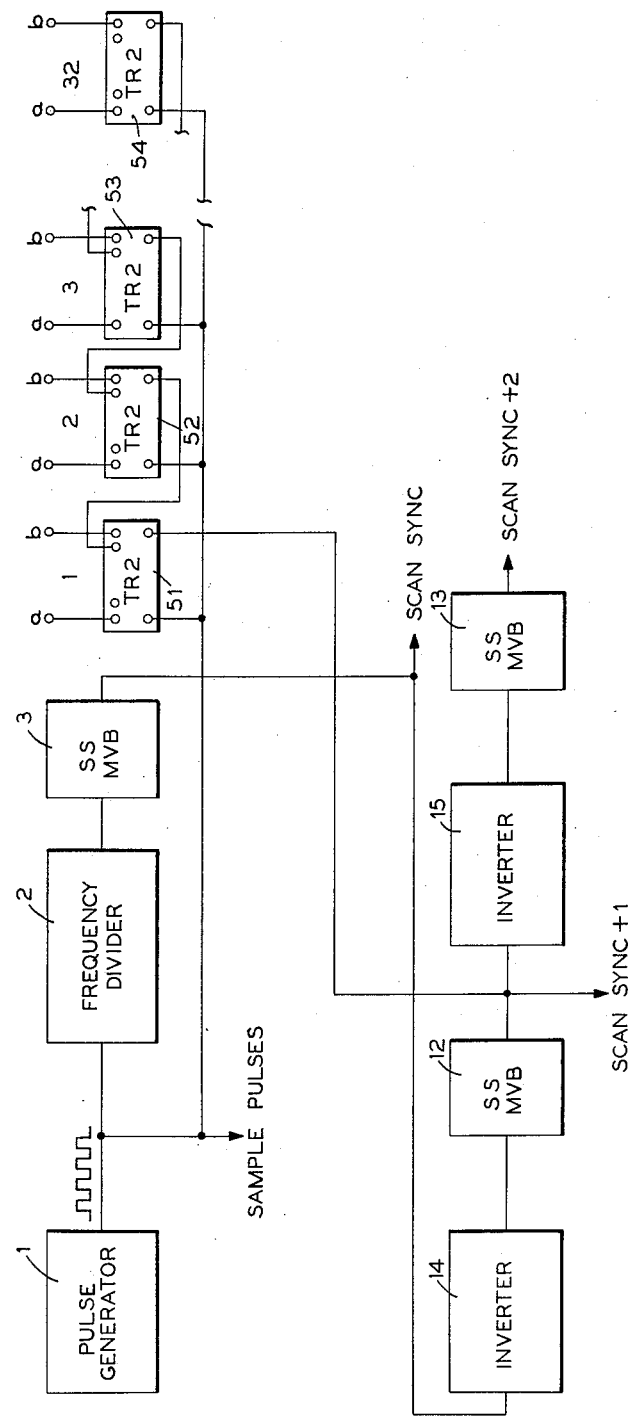

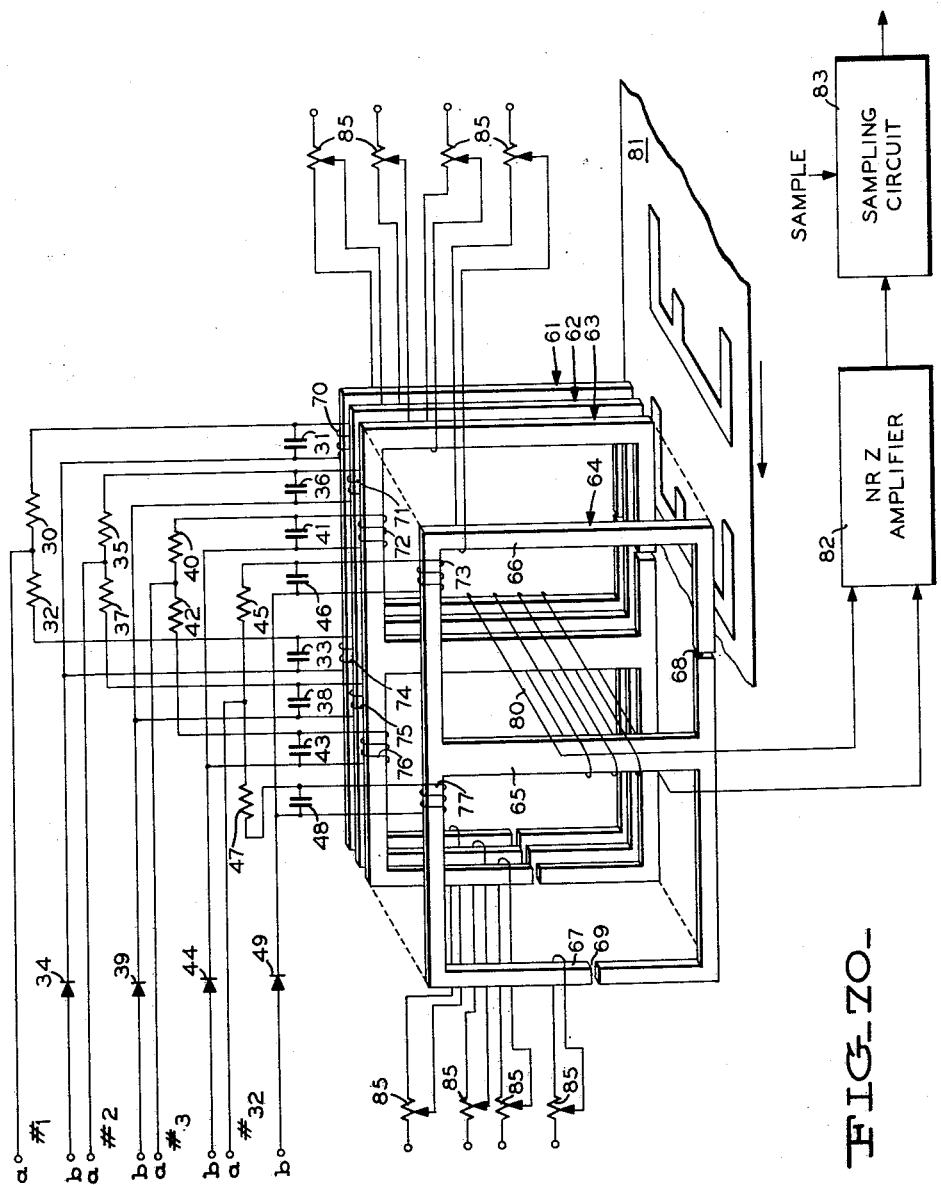

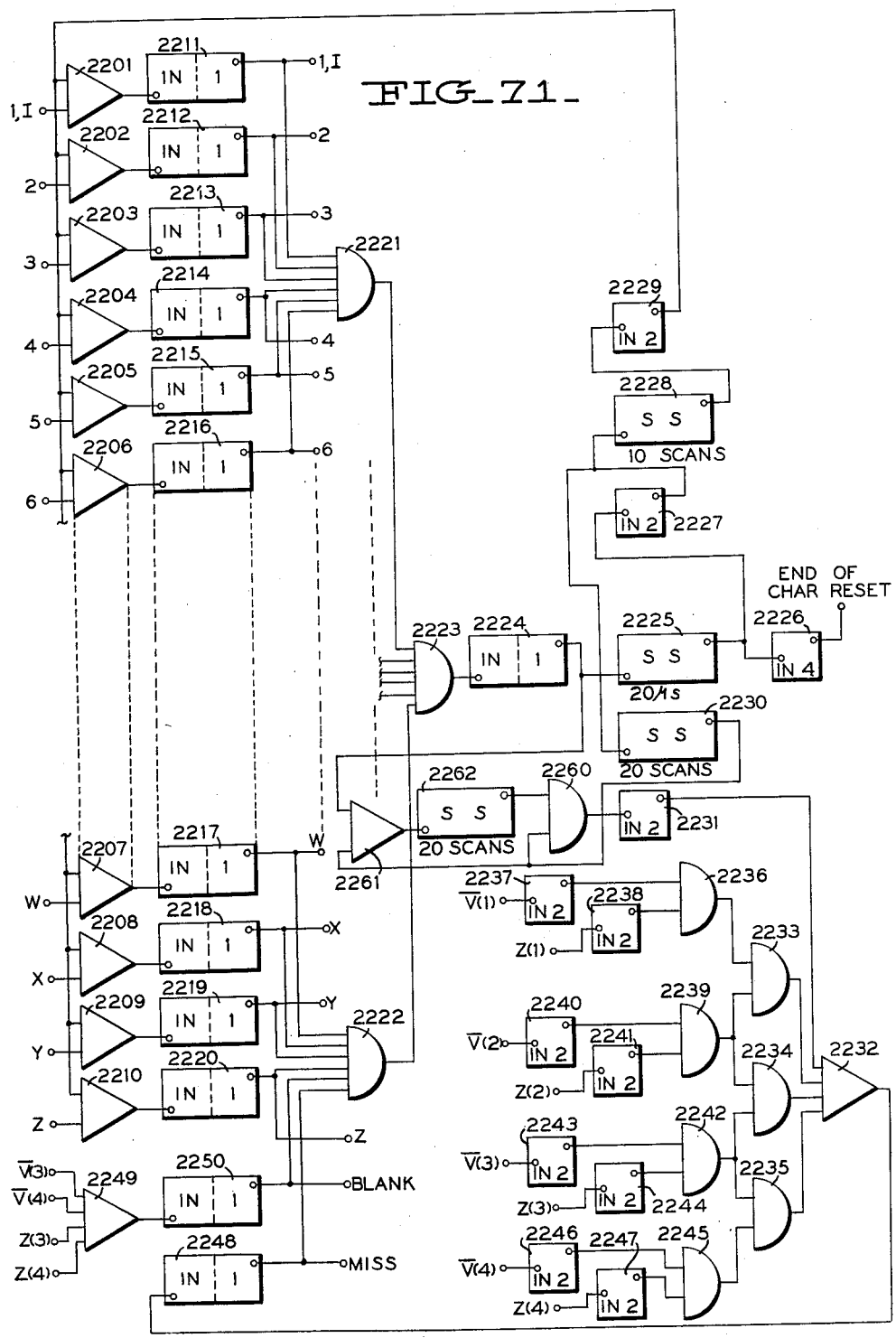
FIG_71_

United States Patent Office 3,072,886
Patented Jan. 8, 1963

3,072,886
APPARATUS FOR ANALYZING INTELLIGENCE MANIFESTATIONS
Evon C. Greanias, Vestal, and Arthur Hamburgen, Endicott, N.Y., assignors to International Business Machines Corporation, New York, N.Y., a corporation of New York
Filed Apr. 2, 1956, Ser. No. 575,425
13 Claims. (Cl. 340—146.3)

The present invention relates to apparatus for analyzing intelligence manifestations and recognizing patterns or sequences therein to produce identification signals, and particularly to such an apparatus suitable for use in identifying character manifestations which may appear on a document.

The primary object of this invention is to provide an improved information analyzing system.

One of the most basic sources of information in the business and scientific fields is a printed document. The information in this document is normally transcribed manually into some media, such as punched cards or tape, so as to be suitable for machine use. In the present invention the information on the document in the form of character manifestations is scanned by suitable apparatus to produce signal patterns which are analyzed to identify the character manifestations scanned.

Many attempts have been made in the past to produce apparatus for sensing indicia manifestations such as printed or otherwise formed characters. These characters may be alphabetic letters, numerals or various special symbols. Early attempts in sensing characters involved the use of a beam of light which progressively traversed the character and caused the characteristics of the area traversed to control the operation of a light sensitive device. The logic used to identify the character was generally dependent on the times which certain unique portions of the character were sensed by the scanning beam. Such system were relatively slow and were limited to the sensing of characters properly positioned in relation to the scanning beam and many times such characters had to be specially formed. Other attempts were made along similar lines on characters which were specially formed with code marks either above or below the character. Although this provided a relatively simple means of identifying characters, little commercial use resulted due at least in part to the extensive conversion necessary in printing equipment to produce the specially formed characters. Then too, the document was not entirely suitable from an appearance standpoint to be used as a business document.

A later approach to sensing characters involved the so-called mask matching technique. In this approach, an opaque disc, having a plurality of openings therein in the form of character outlines, is disposed between an illuminated document, having printed characters thereon, and a photocell. When the photocell senses the fact that a match exists between a particular character outline on the disc and the character outline on the document, an output signal is produced indicative of the identity of the character.

In the present invention, vertical scans are made through a character. The scans progress successively across the character from one side of the other. In the embodiment illustrated, the successive scans progress from left to right. However, it will be appreciated that the design could just as well be such that the successive vertical scans progress from right to left. The length of each scan is approximately twice the height of the characters to allow some tolerance in vertical registration.

The characters scanned may appear in different forms. For example, they may be simply graphic in nature. In this event, the characters may be scanned with a beam of light, there being provided a photomultiplier which is responsive to the varying degrees of light reflected from the document during the scanning operation. Alternatively, suitable image dissecting apparatus could be used wherein successive portions of the character could be presented to the photomultiplier, the character itself being fully illuminated. This arrangement possesses the advantage that higher signal levels are obtainable since more light is available than with a very small light beam. The scanner resolution should be such that areas at least as small as .005" square can be viewed.

One of the disadvantages of scanning character manifestations which are simply graphic in nature is that often the documents scanned have been overprinted by other devices during processing, thereby leaving the characters themselves difficult to detect. Also smudging of the characters may occur, causing difficulties in distinguishing the smudged portion from the character portion. Where the above problems exist, it may be desired to print the characters with a special ink having particles therein which may be sensed either on the basis of variations in magnetic reluctance or on the basis of magnetized areas. Thus even though overprinting with ink may occur in processing, it is still possible to detect the characters because of the special nature of the ink. Of course, there are ways of forming the characters having magnetic characteristics other than by using an ink. For example, characters formed by the process known as ferromagnetography may also be processed.

In any event, some form of apparatus is used to scan the characters, however produced, to produce varying signal levels which distinguish the character portions from the background. During a scan, the signals produced by the scanning apparatus are adapted to be sampled a predetermined number of times. In the present embodiment, the information on each scan is sampled thirty-two times. The sampled data is supplied to a video consolidation circuit in pulse form. The presence of a pulse at a SAMPLE time indicates that a portion of the character was sensed, which may be termed an X signal, and the absence of a pulse at a SAMPLE time indicates that a part of the background was sensed. The output signals from the video consolidation circuit appear on three lines. One signal represents the fact that on two successive SAMPLE intervals, X pulses were supplied thereto. This signal may be termed the XX signal. Where no X pulses are supplied during two successive SAMPLE intervals, a signal is produced which is termed a OO signal. If an X pulse is supplied to the video consolidation circuit during one SAMPLE interval and an X pulse is not supplied during a following SAMPLE interval, a signal XO is obtained. Where an X pulse is not produced during one SAMPLE interval but an X pulse is supplied during the immediate following SAMPLE interval, a signal representing OX is produced. In the present embodiment, a pulse representing XX appears on one line, a pulse representing OO appears on another line, and a pulse representing XO or OX appears on the third line.

In the description to follow, various signal conditions are symbolically represented by using techniques developed to represent logical expressions. To represent the presence of a signal, a symbol alone is used. When it is desired to represent the absence of a particular signal, a bar is placed over the symbol. For example, if the letter V is used to represent the existence of a particular signal, the symbol $\overline{V}$ represents the absence of that particular signal. Normally the presence of a signal is represented as a positive pulse, and the absence of a signal is represented by a negative pulse. There are times, however, where it is necessary to use the presence of a condition to turn a trigger ON. Here the positive pulse may be inverted to produce a negative pulse to turn the trigger ON. However, the input to the trigger would represent the presence of the signal even though it is a negative pulse.

Where it is desired to represent the fact that two signals occur in coincidence, the standard multiplying sign, i.e. a dot, may be used. For example, if signals representing V and S occur in coincidence, this fact may be expressed as $V \cdot S$. If it is desired to represent the fact that signals representing V and S do not occur in coincidence, then the expression would be $(\overline{V \cdot S})$.

To represent the fact that V or S is present, a plus sign is used. Thus the expression $V+S$ indicates that either a signal representing V or a signal representing S is present. This expression, however, does not preclude the possibility of both V and S being present. If signals representing either V or S are not present, the expression $(\overline{V+S})$ would represent this fact.

The output signals representing XX, OO and $XO+OX$ are supplied to each of a plurality of signature component circuits. One of the signature component circuits is used to detect various sizes of vertical lines. This circuit detects the presence of a long vertical line during a scan. Such a vertical line is defined by presence of XX, XO, or OX signals for as many as twenty SAMPLE intervals, out of the thirty-two possible SAMPLE intervals, during a scan. If this condition is detected, a signal representing $Vl$ is produced. A medium sized vertical line is defined by the presence of as many as fourteen but not more than nineteen successive SAMPLE intervals during which XX, XO or OX signals occur. If this condition exists, then a signal representing $Vm$ is produced. A short vertical line is defined by the presence of as many as eight but not more than thirteen successive SAMPLE intervals during which XX, XO or OX signals occur. If this condition is present, then a signal representing $Vs$ is produced. If during a scan a short vertical line is detected which appears above a double crossover, which is defined below, then a signal $Vsu$, meaning a short vertical line above a double crossover, is produced. If two short vertical lines are produced during a scan, a signal representing $2Vs$ is produced. In the event that two successive vertical scans are made through a character and a short vertical line is not sensed on either scan, then a signal representing the absence of a vertical line, i.e. $\overline{V}$, is produced. Thus the signals representing $Vl$, $Vm$, $Vs$, $Vsu$, $2Vs$ and $\overline{V}$ are termed signature component signals.

Another signature component circuit is that used for detecting included white areas between two crossovers of a character. A crossover may be indicated by a single XX signal. After the first crossover is detected, a circuit is utilized to start sensing the number of OO, XO or OX pulses which occur before a second crossover is sensed. Where the gap detected between the first and second crossovers on each of two successive scans is greater or equal to fourteen SAMPLE intervals which is indicated by at least fifteen OO, XO or OX signals between the first and second crossovers, an output signal representing a long included white area $2Xl$ is indicated. The digit "2" in this symbol represents the fact that there are two crossovers on two successive scans and the term "1" indicates that the gap in each scan was long. Where the gap on two successive scans is greater or equal to eight SAMPLE intervals but not as great as fourteen SAMPLE intervals, then a medium sized included white area is indicated as being in existence. The medium sized included white area is expressed by the symbol $2Xm$. Where the gap separating the two crossovers on a scan is greater or equal to two SAMPLE intervals but not as great as eight SAMPLE intervals, a signal representing a short included white area, i.e. $2Xs$, is produced.

In the event that a long gap is detected on one scan and a short gap is detected on an adjacent scan, an output signal representing $2Xl$ is produced. Along the same line, if a medium sized gap is detected on one scan and a large gap is detected on an adjacent scan, a signal representing $2Xl$ is produced. If a short gap is detected on one scan and a medium sized gap is detected on an adjacent scan, a signal representing $2Xm$ is produced. Thus it is seen that where different sized gaps are detected on two adjacent scans, the larger gap determines the signature component. In providing the signals representing $2Xs$, $2Xm$ or $2Xl$, it is essential that three crossovers were not seen on either of the two scans. Where the letter "$i$" is used to represent the present or instant scan and the letter "$a$" is used to represent the immediate previous or antedated scan, it will be seen that the expression $(\overline{3Xi+3Xa})$ would be indicative of the fact that three crossovers were not seen on either the instant scan or the intedated scan.

Another signature component circuit is utilized to produce outputs indicating the presence of single crossovers, identified by the symbol X and triple crossovers represented by the symbol 3X. In order to produce a signal representing 3X, it is necessary that three crossovers, adjacent ones of which are separated by at least a gap greater or equal to two SAMPLE intervals, be produced on two successive scans. In order to detect the signature component X, it is necessary that a single crossover be detected on two adjacent scans and that a triple crossover or a double crossover must not be detected on either of the two scans used to produce the indication X.

One fourth group of signature components which are provided relates to the relative altitude between the first XX signal produced during one scan and the first XX signal produced during a second scan. It will be appreciated that this is a circuit which looks at the upper contour of the character. A circuit is provided that will measure the difference between the first XX signal on one scan and the first XX signal on the following scan in terms of a number of pulses. The difference may be either positive or negative. Therefore, if the difference is positive in nature, than a number of D+ pulses are produced. If the difference is negative in nature, than a number of D− pulses will be provided. If, for example, in scanning a horizontal line, there is no difference between the first XX signal on one scan and the first XX signal seen on the second scan, no output pulses, either D+ or D− are produced.

A second circuit is adapted to receive D+ pulses and to produce therefrom output signals representing a large difference between the first XX signal seen on one scan and the first XX signal seen on the second scan. This large difference in relative altitude is termed $D+l$ and is representative of the fact at least fourteen D+ pulses are produced during two successive scans. A small difference in relative altitude is indicated when at least four D+ pulses are produced during a single scan and $D+l$ is not present during that scan. This signature component may be represented by the symbol $D+s$.

Where there is a small change in slope which is less than that which produces the $D+s$ signal, an output signal representing S+ is provided. If there is no difference in relative altitude between the first XX signal seen on one scan and the first XX signal seen on an adjacent scan, a signal representing So is produced. The circuit is arranged such that in order to indicate an S+ signal, $D+l$, $D+s$ and D− must not have been produced, and in addition there must be at least two scans out of four in which at least a D+ signal is produced. In order to indicate the signal representing So, there must be little or no change in slope over a period of five scans. This is not to say that one D+ or one D− signal will not be tolerated during the five scans. Generally, these small differences will occur in scanning a horizontal line due to ink density variations along the line.

Another circuit is provided which detects the negative changes in relative altitude and these signals are D—*l*, D—*s* and S—.

All of the signature component signals representing the vertical lines, the included white areas and the single and triple crossover indications, are supplied to a group of shift registers. Each signature component is entered into one end of a shift register and is progressively advanced down the shift register from stage to stage on the basis of every other vertical scan through the character.

A plurality of register matrices is provided which looks at various combinations of conditions which may be in existence in particular stages of the shift register at any one time. Outputs are produced from the register matrices which represent these coincidences of conditions. These outputs are supplied to a plurality of output circuits, there being one output circuit for each character which is to be identified. In addition, the relative altitude signature components and certain of the inputs to the shift registers are also supplied to these output circuits. Within the output circuits a plurality of logical AND and OR switching circuits are provided which receive the designated inputs from the register matrices, various positions of the shift register, and the relative altitude signals, and produce output signals therefrom representative of the identity of the characters scanned.

In the present invention the recognition of a character may appear at different times during the scanning of the character. For example, the character may be only two-thirds scanned and yet sufficient information may be available to identify the character. In the event sufficient information is available to identify the character, an output signal representing the identity of the character is produced. By looking at the signature component information on this dynamic basis, it is possible to recognize characters that may be abutting one another. For example, the character "A" may be merged with the character "B." In this event, when sufficient information was available from scanning the character "A" to identify the character, an output signal representing the character "A" would be provided. Thereafter, the character "B" would be scanned and when sufficient information is available to identify the character, an output signal would be provided representing the identity of the character "B."

Another object of the present invention is to provide a character sensing system capable of recognizing a complete set of alphanumeric characters in a large number of different type fonts.

Another object of the invention is to furnish an improved apparatus for analyzing intelligence manifestations and recognizing patterns or sequences therein to produce identification signals.

Another object of this invention is to furnish a system for recognizing character manifestations, wherein the manifestations are progressively scanned in a plurality of scans to produce signals during the intervals that a portion of a character manifestation is sensed, said signals being analyzed to detect the occurrence of various sequences of said signals and in the event of a particular sequence to produce a signal representing the identity of the character scanned.

Still another object of the invention is to furnish apparatus for analyzing groups of input signals, wherein a single group of input signals is analyzed to produce output signals representing different sequences of said input signals and wherein adjacent groups of input signals are analyzed to produce output signals representing predetermined sequences of input signals in said adjacent groups.

Still another object of this invention is to provide an improved information analyzing system wherein input signals occurring in sequences which vary within limits are encoded into signature signals, the signature signals being logically combined to produce an identity signal for the input signals received.

A further object of the invention is to furnish a system for recognizing character manifestations wherein the characters are progressively scanned, the arrangement being such that an identification signal may be produced at any time during the scanning process that sufficient information has been obtained to satisfy the requirements for identifying the character.

A still further object of the invention is to provide a character sensing system capable of recognizing, within limits, characters which are merged together.

Another object of the invention is to furnish a character sensing system in which the characters are progressively scanned to produce a plurality of signature component signals representing various sizes of vertical lines sensed during a scan, as well as the sensing of more than one vertical line during a scan or the absence of a vertical line during two adjacent scans.

Another object of this invention is to furnish a character sensing system in which characters to be identified are progressively scanned and the signals produced during the scanning operation analyzed to detect changes in altitude of the upper contour of the character and produce output signals representative of different degrees of change.

Another object of the invention is to furnish a character sensing system in which the characters to be identified are progressively scanned to produce sets of signals representative of particular conditions sensed during the scan, these signals being stored in a manner such that they may be used by a particular logical circuit to produce an output signal representing the identity of the character scanned.

Another object of the present invention is to scan a character in a plurality of vertical scans which progress across the character from one side thereof to the other and to produce signals during the intervals that a portion of the character is being sensed, these signals being utilized to produce a group of signature component signals which represent different sizes of a particular characteristic, the ratio between the first and second sizes of said characteristic being approximately equal to the ratio between the second and third sizes of said characteristics.

Another object of this invention is to scan a character in a predetermined pattern and produce signals during the intervals in which a portion of the character is sensed, these signals being utilized to produce signature component signals which represent different sizes of a plurality of different characteristics of a character, there being an approximate proportional relationship between the degrees of sizes for one characteristic and the degrees of sizes for another characteristic, this relationship affording the recognition of different sizes of characters having the same geometric configuration.

A further object of the invention is to provide a character sensing system capable of recognizing alphanumeric character manifestations which possess magnetic or magnetic relutance characteristics.

Another object of this invention is to provide an improved system for sensing characters by relating the identity of each character to the relative size and position of a group of simple character elements, thereby affording the recognition of a complete set of alphanumeric characters in each of a plurality of different type fonts.

Another object of this invention is to identify characters by making a comparison during the scanning of a character of lengths of line segments, widths of openings or enclosures and combinations thereof, to produce sufficient information to identify the character scanned.

Another object of the invention is to furnish an improved character sensing system in which a signal is produced representing the identity of each of a plurality of characters, the arrangement being such that once an identity signal is produced for a character, additional character identity signals will be blocked for a predetermined period of time.

Another object of this invention is to provide a character sensing system for recognizing each of a series of characters, there being a circuit provided which is responsive to the fact that a blank space exists between adjacent characters, said blank space being other than the standard space provided between characters.

Another object of this invention is to scan a character in a plurality of vertical scans which progress one after the other across the character from one side thereof to the other and produce signals during the intervals that a portion of the character is being sensed, these signals being utilized to produce signature component signals which fall in different groups, the signature component signals within a group representing different sized categories of characteristics of the character detected in one or more scans, the ratio between a first size category in one group and a first size category in a second group being approximately equal to the ratio between a second size category in said one group and a second size category in said second group.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 1 shows an over-all block diagram of the present invention;

FIG. 2 is a detailed block diagram of the video consolidation circuit;

FIG. 3 is a detailed block diagram of the vertical line signature components circuit;

Figure 6C:
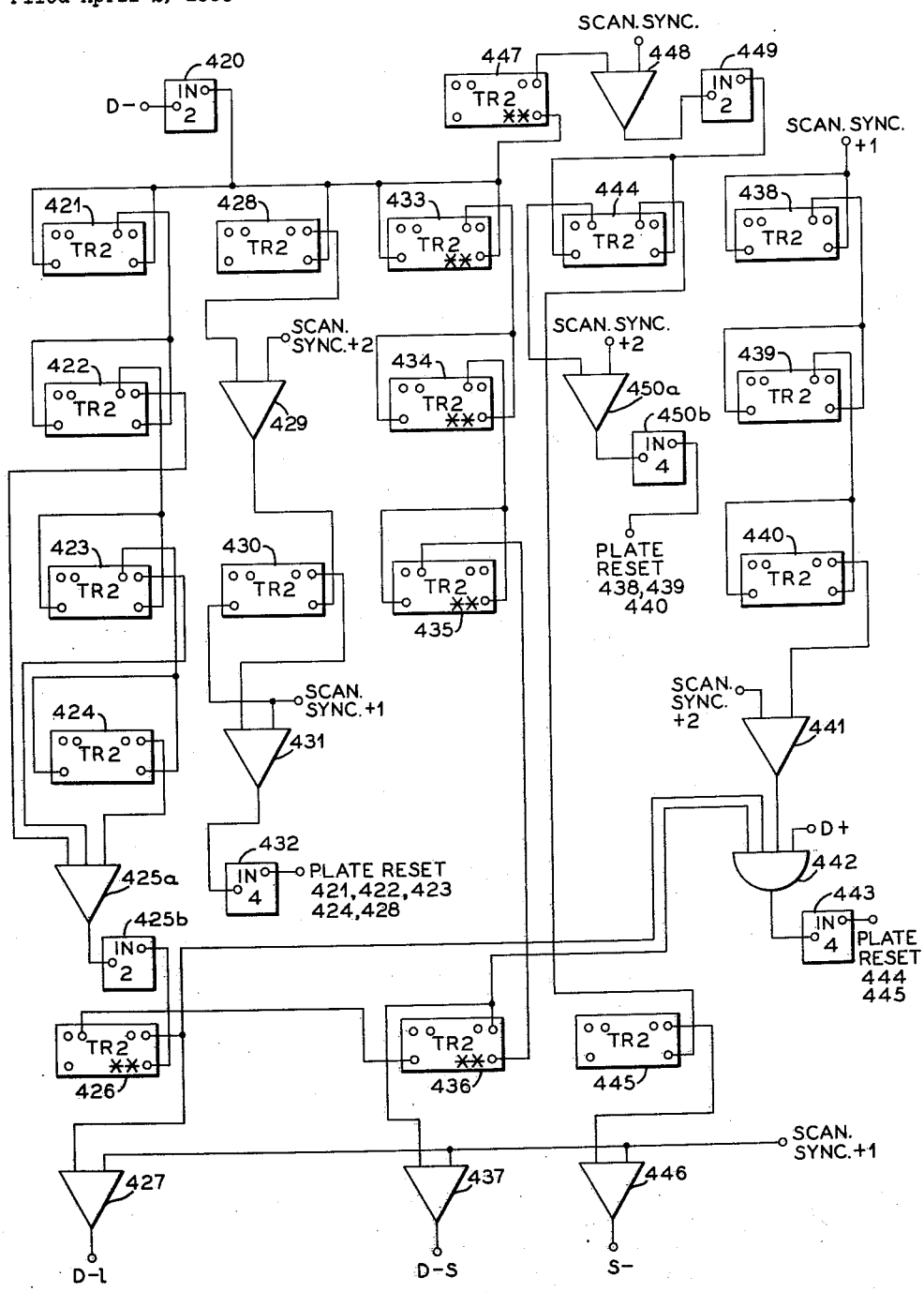
Figure 7A:
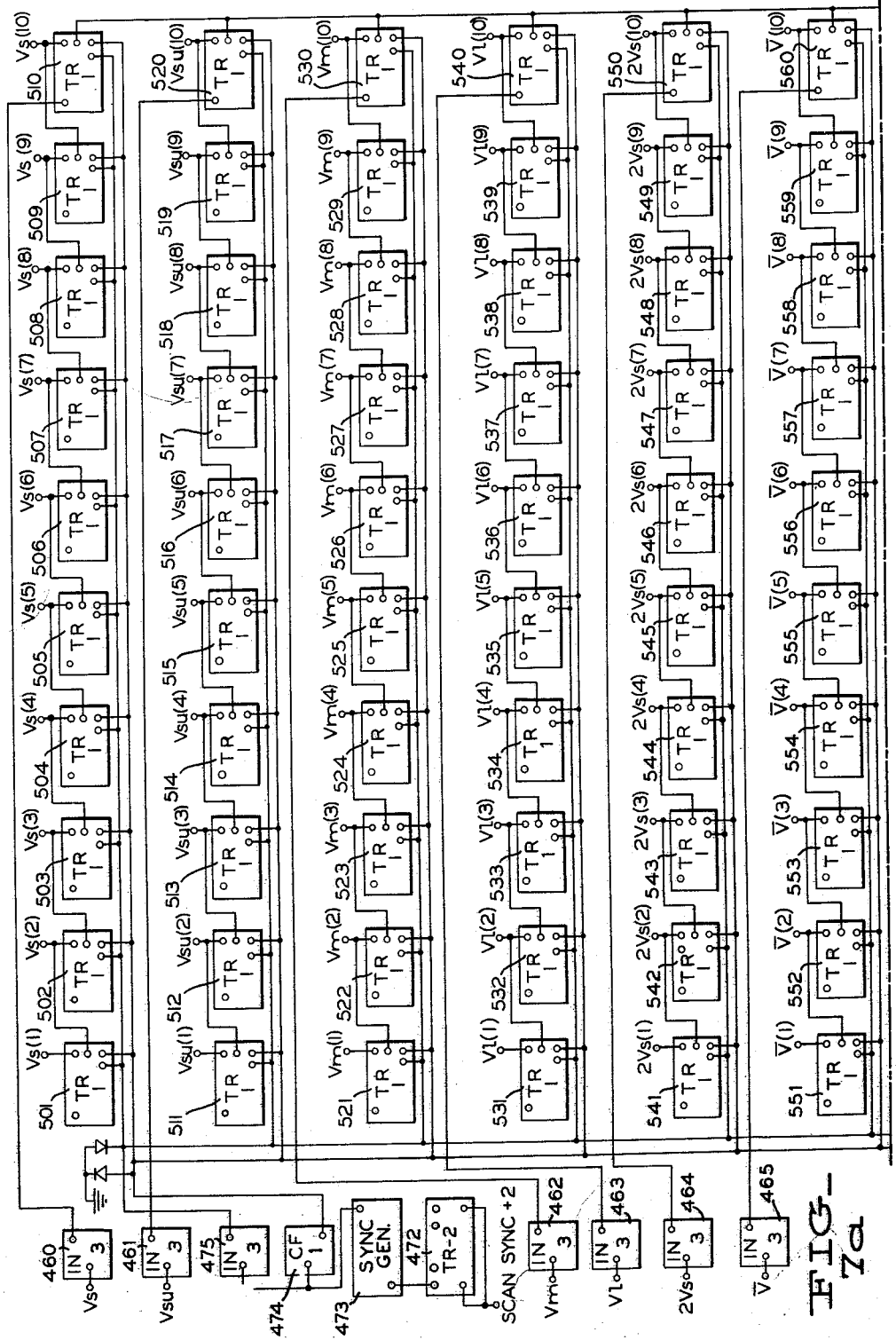

FIGS. 4a and 4b form a detailed block diagram of the included white signature components circuits;

FIG. 5 is a detailed block diagram of the single and triple crossover signature components circuit;

FIGS. 6a, 6b and 6c form a detailed block diagram of the relative altitude signature components circuit;

FIGS. 7a and 7b show the shift registers which are adapted to receive the signature component signals from FIGS. 3, 4a, 4b, 5, 6a, 6b and 6c;

FIG. 8 is a detailed block diagram of a sync generator utilized in generating sync signals for the shift registers shown in FIGS. 7a and 7b;

FIG. 9 is a block diagram of the scanner and associated circuits including the basic sync generator circuits;

FIG. 10 shows a timing diagram of the basic sync pulses used in the present invention;

FIGS. 11 through 20 illustrate a group of switching circuits which are adapted to be connected to positions 1 through 10, respectively, of the shift register shown in FIGS. 7a and 7b;

FIGS. 21 through 58 show a plurality of logical circuits which are utilized to receive output signals from the circuits shown in FIGS. 6a, 6b, 7a, 7b and 11 through 20 and to produce therefrom signals representative of the identity of a character which is scanned;

FIGS. 59a, 60a, 61a, 62a, 63a, 64a, 65a, 66a, 67a and 68a are detailed schematic diagrams of typical circuits which may be used in the present invention and which are illustrated in block form as shown in FIGS. 59b, 60b, 61b, 62b, 63b, 64b, 65b, 66b, 67b, and 68b, respectively;

FIG. 69 is a schematic block diagram of a circuit utilized to generate the various sync pulses used where characters having magnetic characteristics are sensed;

FIG. 70 is a view of a magnetic reluctance type sensing device for characters having magnetic characteristics; and FIG. 71 is a detailed block diagram of the final output circuit.

In the detailed circuits a number of positive sync pulses are utilized. One of these sync pulses is termed a SAMPLE pulse. There is furnished a circuit for generating thirty-two of these pulses for each vertical scan through the character. As a vertical scan is completed, there is provided a SCAN CYNC pulse. Thus there is one SCAN CYNC pulse for every thirty-two SAMPLE pulses. Immediately following each SCAN SYNC pulse there is furnished a SCAN SYNC+1 pulse which is normally used as a readout pulse for various circuits which may be set to a particular condition during a scan. Immediately following each SCAN SYNC+1 pulse, there is provided a SCAN SYNC+2 pulse which is used in a number of instances to reset various devices which have been set to a particular condition during a scan.

Throughout the drawings there will be found certain bi-stable devices such as triggers which are labeled with one or more asterisks. A single asterisk indicates that a trigger is adapted to be reset by either the SCAN SYNC+2 pulse or a OO signal. Two asterisks indicate that a trigger is adapted to be reset by the SCAN SYNC+2 pulse alone. Three asterisks indicate that a trigger is adapted to be reset by the SCAN SYNC+2 pulse or by an XX signal. A double dagger symbol, i.e. ‡, is used for certain of the triggers which are adapted to be reset at END OF CHARACTER time. That is, once a character is recognized, it is desirable to reset certain triggers in the logical output circuits so that they may await a new set of conditions for the next character. Where the asterisks and double dagger symbols are used, adjacent a trigger, they are positioned under the side of the trigger which is conducting when the trigger is in its reset condition.

The present invention is capable of being used with many different forms of scanning apparatus. One such form is illustrated in FIG. 9 where it is desired to scan graphic characters. Referring to FIG. 9, there is provided a pulse generator 1 which may be of any conventional design suitable to produce positive pulses of two microsecond duration at eight microsecond intervals. That is, there is a six microsecond period between successive two microsecond pulses. Thus the basic pulse frequency is one hundred and twenty-five kilocycles. These pulses are used as the SAMPLE pulses and may appear similar to those shown at (a) in FIG. 10.

The pulses from pulse generator 1 are fed to a conventional frequency divider 2 which produces a positive going voltage for every thirty-two input pulses. A number of devices may be used as the frequency divider. For example a conventional five stage binary counter could be used. The positive going voltage from the frequency divider is fed to a single-shot multivibrator which produces a positive pulse whose leading edge is in coincidence with the leading edge of the positive going voltage from the frequency divider. The positive pulse from the single-shot multivibrator 3 is of two microsecond duration and is used as the SCAN SYNC pulse.

It can be seen that the SCAN SYNC pulse is produced once for every thirty-two SAMPLE pulses. Thus if a single sweep is made through a character in response to each SCAN SYNC pulse, the information obtained during the scan can be sampled thirty-two times by the SAMPLE pulses. The SCAN SYNC pulses are shown at (b) in FIG. 10 and represent the completion of a scan through a character.

There are instances in the circuitry where it is desired to determine whether certain conditions existed during a scan. To obtain a readout pulse to sample various storage devices which may contain an indication of the existence of a particular condition, the SCAN SYNC pulses from single-shot multivibrator 3 are fed through an inverter 14 to a single-shot multivibrator 12 which generates a two microsecond positive pulse which begins at the trailing edge of the SCAN SYNC pulse. The output pulse from single-shot multivibrator 12 is termed the SCAN SYNC+1 pulse. It appears at (c) in FIG. 10.

The SCAN SYNC+1 pulses from single-shot multivibrator 12 are fed through an inverter 15 to a single-shot multivibrator which generates a two micro-second pulse that begins in coincidence with the trailing edge of the SCAN SYNC pulse. The output pulse from the single-shot multivibrator 13 is termed the SCAN SYNC+2 and is shown in FIG. 10.

Each of the SCAN SYNC+2 pulses from the single-shot multivibrator 13 is supplied to a conventional sweep generator 4 which initiates the production of a saw-tooth voltage from the sweep generator to the vertical deflection plates of a cathode ray tube 5. This, of course, causes a vertical trace on the face of the cathode ray tube. The SCAN SYNC pulses produced by the single-shot multivibrator 3 are each used to terminate the vertical trace. In other words, the SCAN SYNC pulses initiate the retrace so that by the time the next SCAN SYNC+2 pulse occurs, a new sweep can be generated.

The vertical traces generated on the face of the cathode ray tube are transmitted by way of an optical system, shown schematically at 6, to a document 7. Characters are shown on the document between spaced dotted lines which indicate the area that will be scanned by the vertical trace from cathode ray tube 5 as the document is moved in the direction of the arrow. The height of the vertical scan on the document is normally chosen to be twice the character height. Since the character height for typewritten characters is approximately one-tenth of an inch, the scan height is approximately two-tenths of an inch. The document is moved at a rate such that approximately twenty vertical scans will successively traverse the character from left to right.

A photomultiplier 9 is arranged to view the scanning operation by way of a lens system which is shown schematically at 8. Thus the varying degrees of light reflected from the document during the scanning operation produces varying voltage levels from the photomultiplier. The output voltage from the photomultiplier is supplied to a video amplifier 10 which amplifies and improves the photomultiplier signal in a conventional manner.

The video output from amplifier 10 is fed to a sampling circuit 11 which also receives the SAMPLE pulses from pulse generator 1. In the sampling circuit, if the video signal rises above some predetermined clipping level within the circuit at a time when a SAMPLE pulse is supplied, an output pulse is provided indicating the fact that a portion of the character has been sensed. This may be termed a black signal X.

The circuit and scanning apparatus shown in FIGS. 69 and 70 are adapted to be used for scanning characters whose outline contains a material having magnetic properties. Referring to FIG. 69, it is noted that certain elements shown therein may be identical with those shown in FIG. 9. With these elements it is possible to generate the SAMPLE pulses as well as the various sync pulses utilized in the present invention in the manner previously described. The output of the single-shot multivibrator 12 is supplied to the right side of the first of a group of thirty-two triggers which are connected to form an open ended ring circuit. The first, second and third triggers of the ring are provided with reference numerals 51, 52 and 53, respectively, and form the first, second and third positions, respectively, of the ring. The triggers forming positions four through thirty-one are not shown but it will be understood that such triggers are provided in the circuit. Position thirty-two of the ring is formed by trigger 54. It is noted that the output from the right side of one trigger is supplied as an input to the right side of the next trigger in the ring. The left side of each of the triggers is connected to receive the pulses from the pulse generator 1, these pulses serving as the sync pulses which cause the triggers in the ring to be turned ON in succession. That is, assuming all of the triggers in the ring to be turned OFF, the trailing edge of the input to trigger 51 from the single-shot multivibrator 12 will turn trigger 51 ON. This produces a relatively positive output from point $b$ of this trigger and a relatively negative output from point $a$. The trailing edge of the next sync pulse supplied from the pulse generator 1 turns trigger 51 OFF. As this trigger goes OFF, a negative going pulse is supplied from the right side thereof to turn trigger 52 ON. The trailing edge of the next sync pulse from the pulse generator 1 turns trigger 52 OFF, which, in going OFF, turns trigger 53 ON. This operation continues on through the ring. It will be seen that since the single-shot multivibrator 12 supplies one pulse for every thirty-two pulses from the pulse generator 1, trigger 51 will be turned ON again by an input from single-shot multivibrator 12 just after trigger 54 is turned OFF by the thirty-second pulse from pulse generator 1.

Referring to FIG. 70, there is illustrated cores 61, 62 and 63 which respectively form the first, second and third sensing means of a thirty-two position sensing device. Positions four through thirty-one are not illustrated for the sake of simplicity, but it will be understood that in the actual device a sensing means would be provided for each position. The sensing means for position thirty-two is provided with reference numeral 64.

Inasmuch as all of the sensing means are identical, only sensing means 64 will be described in detail. There is provided a core having a center leg 65, a first outer leg 66 and a second outer leg 67. The first outer leg 66 has an air gap therein which is shown at 68, while the second outer leg 67 has an air gap therein which is shown at 69. The air gaps 68 and 69 are normally of the same width for balancing purposes.

Separate windings are furnished on the first and second outer legs of each of the sensing means. In the drawings, windings 70, 71, 72 and 73 are illustrated as being provided on the first outer leg of sensing means 61, 62, 63 and 64, respectively. Windings 74, 75, 76 and 77 are illustrated as being provided on the second outer legs of sensing means 61, 62, 63 and 64, respectively.

The input windings 70 and 74 are connected to receive the outputs from point $a$ and $b$ of trigger 51, shown in FIG. 69, these outputs coming from the first position of the thirty-two position ring. If trigger 51 is ON, the potential at point $b$ will be positive in relation to the potential at point $a$, thereby causing current to flow through the diode 34, winding 70 and resistor 30 to point $a$. A capacitor 31 is arranged across winding 70 to control the rise of current in the winding. Current also flows from point $b$ through diode 34, winding 74 and resistor 32 to point $a$, there being a capacitor 33 across winding 74 to control the rise of current in the winding. When trigger 51 turns OFF, point $a$ is positive with respect to point $b$ and current flow through the windings is blocked by diode 34.

Points $a$ and $b$ for positions two, three and thirty-two of the trigger ring are shown in FIG. 70. If trigger 52 is ON, current flows from point $b$ through diode 39, winding 71 and resistor 35 to point $a$. At the same time current flows from point $b$ through diode 39, winding 75 and resistor 37 to point $a$. Capacitors 36 and 38 are arranged in shunt with windings 71 and 75, respectively.

If trigger 53 is ON, current flows from point $b$ thereof through diode 44, winding 72 and resistor 40 to point $a$. At the same time current flows from point $b$ through diode 44, winding 76 and resistor 42 to point $a$. Capacitors 41 and 43 are arranged in shunt with windings 72 and 76, respectively.

The current flow in the windings on the first and second outer legs of each of the sensing means is such that the flux created within the legs normally cancel out in the center leg. However, if the reluctance across the air gap in the first outer leg varies, the fluxes will not cancel each other out and will induce a voltage in the output winding 80 which encircles all of the center legs of the sensing means.

The manner in which the reluctance of the air gap in the first outer legs of a sensing means may vary will now be described. A document 81, which is moved in the direction indicated by the arrow, has characters thereon whose outline contains a material capable of affecting the reluctance across the air gaps of the various sensing means. Thus if a portion of a character is closely adjacent to the air gap 68, for example, during the interval current is flowing through windings 73 and 77, reluctance to the flux across air gap 68 will be much less than the reluctance to the flux across air gap 69. This prevents the flux cancellation within the center leg 65 and induces a voltage in the output winding 80.

A turn of wire is provided on each of the first and second outer legs of the sensing means 61, 62, 63 and 64. A variable resistor 85 is connected in series with each turn. This arrangement allows the equalization of flux in the cores during a no signal condition.

From the above description, it will be apparent that the characters on the document 81 are successively scanned. Each scan progresses from the top of the character to the bottom thereof with the document moving as indicated. The successive scans will progress from the left side of the character to the right side thereof. It will be appreciated that the document having the characters thereon is adapted to move in a path which is closely adjacent the air gap, illustrated at 68, and each of the sensing means. While the cores forming FIG. 70 are shown in spaced apart fashion, it should be understood that they actually form a compact unit. The scanning width is normally chosen to be twice the character height to allow for vertical registration.

The output signals from winding 80 are fed to a non-return-to zero type of amplifier 82 which is described as a read amplifier in application Serial No. 575,424, filed on April 2, 1956, now U.S. Patent No. 3,008,123, issued November 7, 1961, for William S. Rohland and Evon C. Greanias and entitled "Apparatus for Analyzing Intelligence Manifestations." This amplifier produces an output signal of a first level which represents the fact that a portion of a character was sensed, and a second level which represents the fact that a portion of the background was sensed. The output signals from the amplifier are fed to a sampling circuit which also receives the SAMPLE pulses generated by the pulse generator 1. Where there is a coincidence of a relatively positive input to the sampling circuit at a time when a SAMPLE pulse is received, an output signal which may be termed X is produced. The sampling circuit may be in the form of a simple diode switch such as that used in the circuits to follow.

Figure 59A:
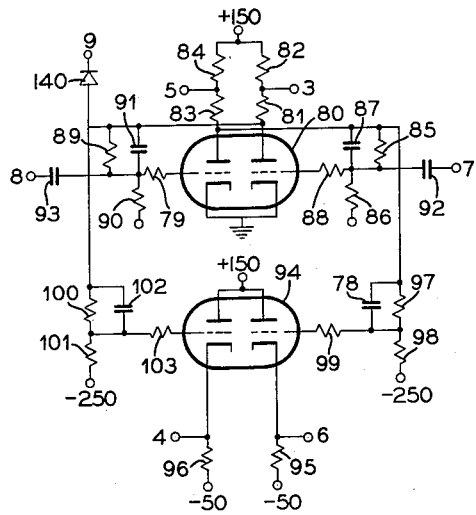
Figure 59B:
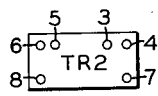

Before describing the detailed circuits of the present invention, a number of circuits will be described which are shown hereinafter in block form. Referring to FIG. 59a, there is disclosed the details of a circuit of the type TR2 which will hereinafter be illustrated as shown in FIG. 59b. This circuit is a trigger having a full plate output from the left and right sides thereof, which are supplied through cathode followers, and tap plate outputs from each side. There is provided a twin-triode 80 whose cathodes are commoned. The plate of the right half of the twin-triode is connected to a positive source of D.C. potential through resistors 81 and 82, and the plate of the left half of the twin-triode is connected to a positive source of D.C. potential through resistors 83 and 84. When the right half of the twin-triode 80 is conducting, the trigger is normally considered to be OFF. With the trigger OFF, current is drawn through resistors 81 and 82 and a relatively negative potential is supplied from the plate of the right half to the upper end of a voltage divider which is comprised of resistors 89 and 90, the lower end of the resistor 90 being connected to a negative source of D.C. potential. A by-pass capacitor 91 is provided in shunt with resistor 89. The output from the mid-point of the divider between the resistors 89 and 90 is supplied through a current limiting resistor 79 to the control grid of the left half of the twin-triode, thereby keeping the left half cut off.

When the trigger is OFF, a relatively positive potential is supplied from the plate of the left half of the twin-triode to the upper end of a voltage divider which is comprised of resistors 85 and 86, the lower end of resistor 86 being connected to a negative D.C. potential. A bypass capacitor 87 is arranged in shunt with the resistor 85. The output from the midpoint of the divider between resistors 85 and 86 is supplied through a current limiting resistor 88 to the control grid of the right half of the twin-triode. With the trigger OFF, a relatively negative potential will be supplied from pin 3 between resistors 81 and 82. This may be termed the tapped plate output from the right half of the trigger. At the same time the full plate output will be even more relatively negative and is connected to the upper end of a voltage divider comprising resistors 100 and 101, the lower end of resistor 101 being connected to a negative source of D.C. potential. A bypass capacitor 102 is arranged in shunt with resistor 100. The output from the mid-point of the divider between resistors 100 and 101 is supplied through a current limiting resistor 103 to the control grid of the left half of a twin-triode 94. The plates of this twin-triode are commoned and the cathode of the left half is connected through a resistor 96 to a negative source of D.C. potential. The output from the cathode of the left half of the twin-triode is taken at pin 4 and will be a relatively negative potential when the trigger is OFF.

At the same time a relatively positive potential is supplied from pin 5 which is connected to the tap point between resistors 83 and 84. The potential at the plate of the left half of the twin-triode 80 is connected to the upper end of a voltage divider comprising resistors 97 and 98, the lower end of resistor 98 being connected to a negative source of D.C. potential. A bypass capacitor 78 is arranged in shunt with the resistor 97. The output from the divider at the point between resistors 97 and 98 is connected through a current limiting resistor 99 to the control grid of the right half of the twin-triode 94. The cathode of the right half of this twin-triode is connected through a resistor 95 to a negative source of D.C. potential. An output may be taken from pin 6 which is connected to the cathode of the right half. Thus when the trigger is OFF, a relatively positive potential will be supplied from pin 6.

The trigger may be turned ON by the application of a negative going signal to pin 7 which is connected to one side of a capacitor 92. The other side of the capacitor 92 is connected to the mid-point of the voltage divider which is comprised of resistors 85 and 86. When a negative going potential is supplied to pin 7, the grid of the right half of the twin-triode 80 drops in potential and cuts the right half off. When this occurs, a positive going voltage will be supplied from the plate of the right half of the twin-triode to the control grid of the left half of the twin-triode. This causes the left half to go into conduction so that current is drawn through the resistors 83 and 84. This causes a negative going voltage to be supplied from the plate of the left half to the control grid of the right half, thereby preventing conduction in the right half of the twin-triode after the input signal has disappeared. The trigger may be turned OFF, after it has been turned ON, by the application of a negative going voltage to pin 8 which is connected by way of the capacitor 93 and resistor 79 to the control grid of the left half of the twin-triode 80.

Thus it is seen that the circuit shown in FIG. 59a provides a trigger in which the tapped plate outputs from both sides of the trigger are taken directly from the trigger and the full plate outputs are supplied through cathode followers. This means that the output at pins 4 and 6 are cathode follower outputs and the outputs at pins 3 and 5 are tapped plate outputs.

The trigger shown in FIG. 59a may also be reset, i.e.

turned OFF directly. For this purpose a diode 104 is provided. The plate of this diode is connected to the plate of the right half of twin-triode 80 and the cathode of this diode is connected to terminal 9. Thus a plate reset pulse, which is a negative pulse applied to terminal 9, is transmitted through diode 104 to the plate of the right side of twin-triode 80, thereby turning the trigger OFF if it was previously ON. If the trigger was previously OFF, a negative pulse transmitted by diode 104 will have no effect on the operation of the trigger. A relatively positive voltage applied to terminal 9 will have no effect on the operation of this trigger, no matter whether it is ON or OFF at the time, because diode 104 will not transmit positive pulses.

Figure 60A:
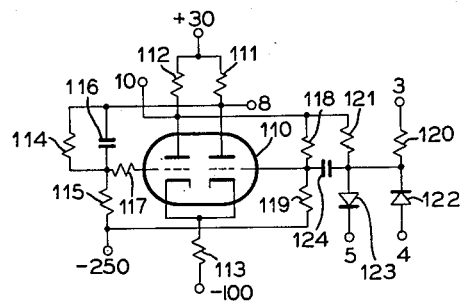
Figure 60B:
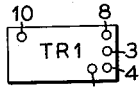

Referring to FIG. 60a, there is illustrated the schematic details of a trigger circuit of the type TR1 which will hereinafter be illustrated as shown in FIG. 60b. This trigger is utilized as a stage of a shift register. The trigger is comprised of a twin-triode 110 whose cathodes are commoned and connected through a resistor 113 to a negative source of D.C. potential. The plate of the right half of the twin-triode is connected through a resistor 111 to a positive source of D.C. potential and the plate of the left half of the twin-triode is connected through a resistor 112 to a positive source of D.C. potential. This trigger may be normally considered to be OFF when the right half is conducting. Under these circumstances, current will be drawn through the resistor 111 so that a relatively negative voltage will be supplied from the plate of the right half of the twin-triode to the upper side of the voltage divider which is comprised of resistors 114 and 115, the lower side of resistor 115 being connected to a negaitve source of D.C. potential. There is provided a by-pass capacitor 116 in shunt with the resistor 114. The output from the mid-point of the divider is supplied through a current limiting resistor 117 to the control grid of the left half of the triode and keeps the left half of the twin-triode cut off. This means that no current will be drawn through the resistor 112 and therefore a relatively positive potential will be supplied to the upper side of a voltage divider comprising resistors 118 and 119. The output from the mid-point of this divider is supplied to the control grid of the right half of the twin-triode to maintain the trigger OFF.

Several of the units shown in FIG. 60a are adapted to be interconnected to form a shift register. The interconnection between adjacent positions of the register is from pin 8 of the unit forming one position to pin 3 of the unit forming the next position. Thus pin 3 will receive a relatively negative D.C. potential from pin 8 of the preceding position if the preceding position is OFF, and a relatively positive D.C. potential if the preceding position is ON.

Referring to FIG. 60a, it is noted that pin 3 is connected through a resistor 120 to the cathode of a diode 122 and the plate of a diode 123. A resistor 121 connects these same elements to the plate of the left half of the twin-triode. A positive sync is adapted to be supplied to pin 4 which is connected to the plate of the diode 122, and a negative sync is adapted to be applied to pin 5 which is connected to the cathode of diode 123. The positive sync goes from a negative potential to ground and the negative sync goes from a positive potential to ground. If pin 3 is relatively negative and the plate of the left half is relatively positive, the potential at the junction of resistors 120 and 121 will be at ground. Thus, the sync pulses applied to pins 4 and 5 will have no effect on this potential. The same effect will be found if the potential at pin 3 is relatively positive and that at the plate of the left half is relatively negative. However, if both points are relatively negative, the positive sync will raise the junction between resistors 120 and 121 to ground, thereby supplying a positive going pulse through capacitor 124 to turn the trigger OFF. On the other hand, if both points are relatively positive, the negative sync will drop the afore-mentioned junction point to ground, thereby supplying a negative going pulse through capacitor 124 to turn the trigger ON.

Reference may be made to application Serial No. 469,895, which was filed on November 19, 1955, for G. L. Clapper, now U.S. Patent No. 2,988,701, issued June 13, 1961, for any further details regarding the use of several of the circuits shown in FIG. 60a as a shift register.

Figure 61A:
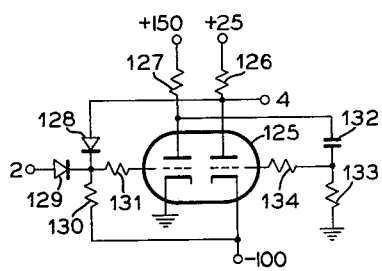
Figure 61B:
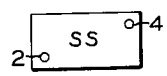

Reference is made to FIG. 61a which discloses the schematic details of a single-shot multivibrator which will hereinafter be shown as in FIG. 61b. The operation of this circuit is such that a positive going signal will turn the single-shot multivibrator ON and produce a relatively positive output voltage for a predetermined period of time. This circuit includes a twin-triode 125. The plate of the right half of this twin-triode is connected through a resistor 126 to a first positive D.C. potential and the plate of the left half of the twin-triode is connected through a resistor 127 to a second positive D.C. potential. In this circuit, the right half of the twin-triode is normally considered to be conducting so that the plate of the right half is supplying a relatively negative potential to the plate of a diode 128. However, it is noted that diodes 128 and 129, along with resistor 130, which is connected to a negative source of D.C. potential, form an OR circuit. Thus, if a positive going voltage is supplied to pin 2, the commoned junction of the diodes 128 and 129 will be raised so as to supply a positive going signal to the control grid of the left half of the twin-triode through the resistor 131. When this occurs, the plate of the left half of the twin-triode goes negative and charges a capacitor 132 negatively through a resistor 133. This causes the voltage at the upper side of the resistor 133 to drop. When this drop in potential is supplied through the resistor 134 to the control grid of the right half of the twin-triode 125, the plate of the right half goes relatively positive, thereby supplying a relatively positive output voltage from pin 4. Once the plate of the right half of the twin-triode is raised, it will supply a relatively positive potential to diode 128 of the OR circuit and will tend to hold the left half of the twin-triode in conduction. However, as soon as capacitor 132 discharges sufficiently to allow the upper end of resistor 133 to rise in potential to a point where the right half of the twin-triode can again conduct, the output of the plate of the right half will become relatively negative and cut the left half of the twin-triode OFF. The duration of the relatively positive output signal from pin 4 is determined by the RC time constant for capacitor 132 and resistor 133. Thus, by varying the value of the capacitor 132, it is possible to generate many different time durations of pulses from pin 4. The circuit shown in FIG. 61a will hereinafter be illustrated as in FIG. 61b.

Figure 62A:
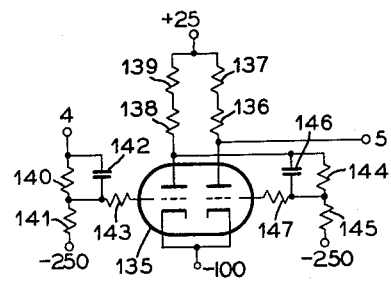
Figure 62B:
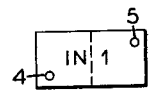

Reference is made to FIG. 62a which discloses the schematic details of a double inverter which will hereinafter be shown as illustrated in FIG. 62b. This circuit comprises a twin-triode 135 whose cathodes are commoned and connected to a negative source of D.C. potential. The plate of the right half is connected through resistors 136 and 137 to a positive source of D.C. potential, while the plate of the left half is connected to this same D.C. potential by way of resistors 138 and 139. An input is adapted to be supplied to pin 4 which is connected to the upper end of a voltage divider formed by resistors 140 and 141, the lower end of resistor 141 being connected to a negative source of D.C. potential. A bypass capacitor 142 is arranged in shunt with resistor 140. The potential at the mid-point of the divider is supplied through a current limiting resistor 143 to the control grid of the left half of the twin-triode. If the input signal to the control grid of the left half of the twin-triode is such that it will cause the left half to go into conduction, current will be drawn through resistors 138 and 139 so that the plate of the left half drops in potential.

This drop in potential is supplied to the upper end of a voltage divider which is comprised of resistors 144 and 145. A capacitor 146 is arranged in shunt with a resistor 144. The output from the mid-point of the divider is supplied through a resistor 147 to cut OFF the right half of the twin-triode. Thus, a relatively positive output signal may be obtained from pin 5. The function of this double inverter is merely to restore the voltage levels of the input signals thereto.

Figure 63A:
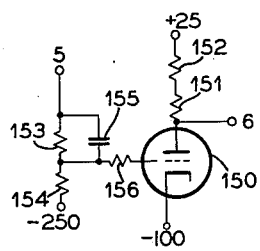
Figure 63B:

Reference is made to FIG. 63a which discloses the circuit details of a single stage inverter which will hereinafter be illustrated as shown in FIG. 63b. This inverter comprises a triode 150 whose cathode is connected to a negative source of D.C. potential and whose plate is connected through resistors 151 and 152 to a positive source of D.C. potential. An input signal is adapted to be supplied to pin 5 at the upper end of a voltage divider which is comprised of resistors 153 and 154, the lower end of this voltage divider being connected to a negative source of D.C. potential. A capacitor 155 is arranged in shunt with resistor 153. The potential appearing at the midpoint of the divider is supplied through resistor 156 to the control grid of the triode. The object of this inverter is to invert the input signals supplied thereto. That is, if a relatively positive input signal is supplied to the control grid of the inverter, then a relatively negative signal will be supplied from the output at pin 6. Thus, for example, if a positive going pulse is supplied to pin 5, a negative going pulse would be supplied from pin 6.

Figure 64A:
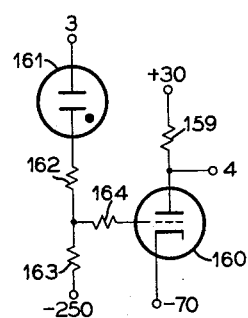
Figure 64B:

Reference is made to FIG. 64 which discloses another inverter which will hereinafter be illustrated as shown in FIG. 64b. This inverter comprises a triode 160 whose cathode is connected to a negative source of D.C. potential and whose plate is connected through a resistor 159 to a positive source of D.C. potential. An input is adapted to be supplied through pin 3 which is connected through a voltage regulator tube 161 to the upper end of a voltage divider comprised of resistors 162 and 163. The lower end of resistor 163 is connected to a negative source of D.C. potential. The potential appearing at the mid-point between resistors 162 and 163 is adapted to be supplied through a resistor 164 to the control grid of the triode. Thus, the object of this inverter is to invert the input signals supplied thereto.

Reference is made to FIG. 65a which discloses the schematic details of the cathode follower which will hereinafter be shown as illustrated in FIG. 65b. This cathode follower comprises a triode 165 whose plate is connected to a positive source of D.C. potential and whose cathode is connected through resistors 166 and 167 to a negative source of D.C. potential. A voltage divider input is provided between the input pin 2 and the control grid of the triode. This voltage divider comprises resistors 168 and 169 and includes a capacitor 170 in shunt with a resistor 168. The output from the mid-point of the divider is supplied through resistor 171 to the control grid of the triode. The action in this circuit is that of a conventional cathode follower and the output may be taken from pin 3.

There is illustrated in FIG. 66a the schematic details of a switch which will hereinafter be illustrated as shown in FIG. 66b. This circuit is sometimes termed a logical AND circuit and comprises diodes 175, 176 and 177 whose cathodes are adapted to receive individual inputs. The plates of the diodes are commoned and connected to one end of a resistor 178, the other end of the resistor being connected to a positive source of D.C. potential. Thus, if all of the inputs to the diodes 175, 176 and 177 are relatively positive in coincidence, an output voltage will be supplied from the commoned plates of the diodes which is relatively positive. While only three diodes have been illustrated, it should be appreciated that more or less diodes could be used where it is desired to receive more or less input signals, respectively.

Reference is made to FIG. 67a which discloses the details of an OR circuit which will hereinafter be illustrated as in FIG. 67b. This circuit comprises a plurality of diodes 180, 181 and 182 whose plates are adapted to receive individual inputs and whose cathodes are commoned and connected to one end of resistor 183. A negative source of D.C. potential is supplied to the other end of the resistor. If any one of the inputs to the diodes 180, 181 or 182 becomes relatively positive, there will be produced a relatively positive output on the line which is connected to the cathodes of the diodes. While there are illustrated only three diodes, it will be appreciated that more or less diodes can be utilized if more or less inputs, respectively, are desired to be received.

Figure 68A:
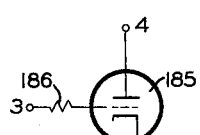
Figure 68B:

Reference is made to FIG. 68a which discloses the details of a plate reset inverter which will hereinafter be illustrated as in FIG. 68b. This circuit comprises a triode 185 whose cathode is connected to ground potential and a resistor 186 which is connected between terminal 3 and the control grid of triode 185. The plate of triode 185 is brought out as terminal 4 which is normally connected to one or more triggers, TR2, by way of terminal 9 shown in FIG. 59a. The diode 104, resistor 81, and resistor 82, which is returned to a relatively positive source of D.C. potential, will act as a load for the plate of triode 185 when a positive going pulse is applied to terminal 3 of FIG. 68a. Therefore, a relatively positive voltage at terminal 3 results in a voltage at terminal 4 which is sufficiently negative to reset all triggers whose terminal 9 is connected to terminal 4 of this plate reset inverter, IN4.

Referring now to FIG. 1, there is illustrated a functional block diagram of the present invention. The improved video data, which it will be remembered is in the form of a plurality of pulses representative of character data, are fed to the video consolidation circuit 200. This circuit is also arranged to receive the SAMPLE pulses which occur at the rate of thirty-two pulses per scan through a character. Outputs are produced from this information indicative of the occurrence of character data during two successive SAMPLE intervals, the lack of character data during two successive SAMPLE intervals, and the lack of character data during one SAMPLE interval followed by the presence of character data during the next SAMPLE interval or the presence of character data during a SAMPLE interval followed by the absence of character data during the next SAMPLE interval. Where character data exists on two successive SAMPLE times, an output is provided which is labeled XX. However, where on two successive SAMPLE times there is a lack of character data, i.e., there is background data, this output is labeled OO. Where there is character data during one SAMPLE time and a lack of character data on a following SAMPLE time, an output is provided labeled XO. Conversely, where there is an absence of character data during one SAMPLE time and a presence of character data during the following SAMPLE time, the output is labeled OX. The signals XO and OX are produced on a single line so that the outputs from the video consolidation circuit 200 exist on three output lines and represent XX, OO and $XO+OX$.

The outputs from the video consolidation circuit are fed to several signature component circuits, the first of which is given reference numeral 201 and identified as VERTICAL LINE SIGNATURE COMPONENTS.

In the present invention, there are three basic types of vertical lines which are identified. The first may be considered a short vertical line which is labeled Vs. In order for there to be a short vertical line, there must be at least eight but less than fourteen successive SAMPLE intervals during which either XX, XO or OX signals exist. That is, after the production of a first XX, XO or OX signal, at least seven more but less than thirteen more SAMPLE intervals must result before the signal OO exists. The reason for not insisting on successive XX signals only is that weak data often has small lighter areas therein which the scanning means may not indicate as character data. By allowing the OX and XO signals to be used, considerable tolerance is placed into the circuit.

The second type of vertical line signature component is a medium sized vertical line which is identified as $Vm$. This signature component is indicated when either XX, XO or OX signals are produced during each of at least fourteen successive SAMPLE intervals but not as many as twenty SAMPLE intervals.

Where there are twenty or more successive SAMPLE intervals during which XX, XO or OX signals occur, there is provided a signature component $Vl$ which indicates a long vertical line. There is further provided in the block 201 a circuit for indicating when there is a lack of a vertical line on the present and preceding, i.e. $\bar{V}$, two short vertical lines during a single scan, i.e. $2Vs$, and $Vsu$, the latter signature component indicating that there is a short vertical line above, but not below, a crossover in the lower portion of the scan.

The block illustrated by reference numeral 202 and labeled INCLUDED WHITE SIGNATURE COMPONENTS is adapted to receive outputs from the video consolidation circuit 200 and produce outputs indicative of the size of the included white areas between two crossovers on each of two successive scans. This circuit measures the space between the two crossovers on each scan and provides an indication as to whether it is a short, medium or long space. Included white area signature component signals are provided where on two successive scans there has been an indication of a short, medium or long space in each scan, as described above, and a further indication is received from block 203 that three or more crossovers did not exist on either scan. Where two long spaces are indicated on the two scans, an output signal indicating a long included white area $2Xl$ is produced. Where a long space is measured on one of the two scans and a medium space is measured on the other scan, an output signal indicating $2Xl$ is also produced. Further, where a long space is measured on one of the two scans and a short space is measured on the other scan, a signal representing $2Xl$ is still produced. A medium sized included white area signal $2Xm$ is produced when a medium sized space is found on each of two successive scans or when a short space and a medium sized space are found in two successive scans, and when a signal $2Xl$ is not produced. In other words, if $2Xl$ exists, then a signal $2Xm$ will not be produced. A short included white area signal $2Xs$ is produced when a short space is detected on each of two successive scans and there is not an indication of $2Xm$ or $2Xl$. As previously pointed out, no included white signature component circuits will be produced if there is an indication of three crossovers in either of the two scans.

The block illustrated by reference numeral 203 and labeled SINGLE AND TRIPLE CROSSOVER SIGNATURE COMPONENTS is adapted to receive the information from block 202 and to produce therefrom information relative to the number of crossovers which may exist. These signature components are no crossovers $Z$, a single crossover $X$, and a triple crossover $3X$.

The six outputs from the vertical line signature components block 201, the three outputs from the included white signature components block 202 and the three outputs from the crossover signature components block 203 are adapted to be fed to a group of shift registers, each of which is ten positions long. The six outputs from block 201 enter separate shift registers in block 204. The three outputs from each of blocks 202 and 203 are entered in separate shift registers in blocks 205 and 206, respectively.

As previously mentioned, each of the shift registers in blocks 204, 205 and 206 is ten positions long. Each of the registers is shifted on every other scan through a character. Therefore, an output from block 201, for example, will enter the first stage of a shift register during one scan and on the next scan no inputs will enter the register even if the same output is again supplied from block 201. However, on the following scan the first input will be shifted to the second position and a new input may enter the first position. Therefore, it is seen that the inputs to the shift registers are successively advanced toward the end of the register. Within the registers, a plurality of outputs are taken at various positions and entered into a plurality of register matrices, diagrammatically illustrated as existing in block 207. These register matrices comprise a plurality of logical AND circuits which are adapted to receive the afore-mentioned inputs from particular positions and produce outputs representing a coincidence of certain signature components in particular positions. These outputs, as well as certain of the outputs from blocks 201, 202 and 203 are adapted to be supplied to a block labeled OUTPUT CIRCUITS and identified by reference numeral 208.

An additional signature component block identified by reference numeral 209 and labeled RELATIVE ALTITUDE SIGNATURE COMPONENTS is adapted to receive the information from the video consolidation circuit and provide information regarding relative altitudes. That is, this signature component looks for changes in the upper contour of a character from one scan to another. The changes may be either positive or negative, or there may be an indication of no change. There are seven outputs from the block 209. The first output may be considered a small positive difference in altitude and is identified as $D+s$. Another output is representative of a large positive difference in altitude and is identified as $D+l$. Conversely, outputs may be provided indicating negative differences in altitude which are $D-s$ and $D-l$. Where there is an indication that there is a small positive slope, for example, a slight increase in altitude over a predetermined number of scans, an output may be provided which is identified as $S+$. Conversely, a small decrease in altitude may be identified as $S-$. Where the altitude remains relatively constant, an output is provided which is identified as $So$.

The block 208 which is labeled OUTPUT CIRCUITS is utilized to receive the outputs from blocks 204, 205, 206, 207 and 209 and certain of the outputs from blocks 201, 202, and 203 and to produce therefrom a signal indicative of the identity of the character scanned. The output circuits basically comprise a group of logical switching circuits, there being one logical circuit for each of the characters to be identified. Those inputs supplied to a particular circuit are looked at on a dynamic basis and any time a prescribed set of input signals exist, an output signal is produced representing the identity of the character. Inasmuch as the logical circuits are capable of identifying up to six or more different styles of typewritten characters, there are furnished several alternative paths in each logical circuit from which the identification of a character can be obtained.

It will be seen from FIG. 1 that each of the blocks labeled 200, 201, 202, 203, 204, 205, 206, 207, 208 and 209 have included therein a designation of one or more figures of the drawings. For example, block 200 has the legend FIG. 2 placed therein. This indicates that all of the circuitry within block 200 is found in FIG. 2. The circuitry within each of the remaining blocks is shown in the designated figures within the blocks.

Referring now to FIG. 2, the video consolidation circuit is utilized to take the sampled video data input and to produce outputs which are indications of the information contained at a present SAMPLE time and the immediate previous SAMPLE time. Where character data exists on two successive SAMPLE intervals, an output is provided which is labeled XX. On the other hand, where there is a lack of character data during two successive SAMPLE intervals an output is provided which is labeled OO. If during the immediately previous SAMPLE time character data existed and during the present SAMPLE time character data does not exist, an output signal XO is provided. For a OX signal, the indication is that during the last SAMPLE time there was a lack of character data and during the present SAMPLE time there is a presence of character data.

The sampled video data is supplied by way of a double inverter 210 to the right side of a trigger 211. A switch 212 is adapted to receive the output from inverter 210 as well as the output from the right side of trigger 211. Since positive pulses are supplied to inverter 210 during those sample intervals when character data exists, the trailing edge of a pulse from inverter 210 is used to turn trigger 211 ON. Therefore, it is seen that by the time trigger 211 goes ON and the right side thereof is raised to supply a relatively positive input to switch 212, the output from inverter 210 has gone relatively negative. Therefore, no output can be supplied from switch 212 at this time. However, if during the succeeding sample interval character data exists, trigger 211 will remain ON and the output from inverter 210 will go up so that an output is furnished from the switch 212 to a double inverter 216, the output therefrom representing XX.

It is also seen that the sampled video data supplied to FIG. 2 is adapted to be fed to an inverter 213 whose output is connected to a switch 214. This switch also receives the SAMPLE pulses. Therefore, when there is a lack of character data at the input to inverter 213 during a SAMPLE pulse, switch 214 will provide a relatively position output pulse which is supplied through a double inverter 215 to the left side of trigger 211. If trigger 211 is ON, the trailing edge of the output from the double inverter 215 will turn if OFF. When an output is supplied from switch 214 to turn trigger 211 OFF, it will be seen that switch 199, which receives the outputs from inverter 215 and the left side of trigger 211, is not allowed to provide an output since the left side of trigger 211 is relatively negative. However, if a second output is supplied from inverter 215, indicating that on two successive sample intervals there was a lack of character data, switch 199 will be allowed to produce an output which is fed through a double inverter 217 to indicate OO.

It will be seen that switches 212 and 199 will produce relatively negative outputs at any time there is a lack of succession of character data or a lack of succession of background data. Therefore, if these outputs are supplied through inverters 218 and 219, respectively, to a switch 220, an output will be produced from switch 220 at the sample time. The output from switch 220 is supplied through a double inverter 221 to produce a positive pulse which indicates the existence of XO or OX, i.e. $XO+OX$.

In FIG. 3 there is provided a five stage binary counter which comprises stages 223, 224, 225, 226 and 227. This counter operates in conventional fashion in that the first input to stage 223 from OR circuit 222 turns this stage ON. The second input turns stage 223 OFF, which in going OFF, turns stage 224 ON. The third input turns stage 223 ON. The fourth input turns stage 223 OFF, which in going OFF, turns stage 224 OFF, which in going OFF, turns stage 225 ON. In this manner, it is possible to count up to thirty-two with the five stages. It will be noted that each stage of this counter is adapted to be reset OFF by the SCAN SYNC+2 pulse or the occurrence of a OO signal. Switch 228 is adapted to receive the outputs from the right sides of stages 225 and 227. It will be apparent that when both of these stages are ON, the inputs to switch 228 will be relatively positive and will therefore provide an output through inverter 229 to turn trigger 230 ON. Thus the trigger is turned ON if a count of twenty is produced in the counter. This is an indication that a vertical line exists which is equal to or greater than nineteen SAMPLE pulses long. The reason for the indication of nineteen rather than the count of twenty in the counter is due to the fact that counting starts out with OX as the first input to stage 223 and winds up with XO as the last input to produce that twentieth input. Thus it will be seen that the actual vertical line would only be nineteen SAMPLE intervals in duration.

When trigger 230 turns ON, the right side thereof becomes relatively positive and supplies an input to a switch 231. This switch is adapted to receive another input from an OR circuit 232 whose inputs are either the OO inputs from the video consolidation circuit or the SCAN SYNC pulse, it being remembered that the SCAN SYNC pulse occurs at the end of the scan. If the counter has counted up to twenty and turned trigger 230 ON, the next OO signal will signify the end of the vertical line. Thus either the first OO signal to occur after a trigger 230 has been turned ON, or the SCAN SYNC pulse, will cause an output from switch 231. This output pulse is supplied to an inverter 233 to turn the trigger 234 ON. When this trigger is turned ON, the right side thereof becomes relatively positive and supplies an input to a switch 235, this switch also receiving the SCAN SYNC+1 pulse. Therefore, at SCAN SYNC+1 time, an output $Vl$, indicating a long vertical line, will be supplied from switch 235 providing trigger 234 has been turned ON.

In order to detect the occurrence of the medium sized vertical line signature component $Vm$, outputs are taken from the right sides of stages 224, 225 and 226, and supplied to a switch 236. The last-mentioned stages will each be ON when a count of fourteen arrives in the counter. At this time, an output is supplied from switch 236 through an inverter 237 to turn trigger 238 ON. When this trigger is turned ON, a relatively positive output is supplied from the right side thereof to a switch 239 which also receives the output from the left side of trigger 230 and an output from the OR circuit 232. The switch 239 will supply an output providing trigger 238 is ON and trigger 230 is OFF, and in coincidence therewith there exists an output from OR circuit 232. The reason for requiring that trigger 230 be OFF is that it is not desired to indicate the signature component $Vm$ if $Vl$ exists. The output from switch 239 is supplied through an inverter 240 to set a trigger 241, the right side of said trigger being connected to a switch 242. Switch 242 also receives the SCAN SYNC+1 pulse which will produce an output indicating $Vm$ providing trigger 241 is ON at the time the SCAN SYNC+1 pulse occurs.

To detect the signature component $Vs$, an output is taken from the left side of stage 226 of the binary counter and fed directly to a trigger 243. It will be seen that when a count of 8 arrives in the counter stage, 226 will be turned ON and supply a negative pulse to turn trigger 243 ON. When the latter trigger turns ON, a relatively positive output is supplied to a switch 244. This switch also receives inputs from the left side of trigger 238 and from the OR circuit 232. Thus if trigger 243 is ON and trigger 238 is not ON, indicating that there has been a vertical line which is greater or equal to seven sample intervals but not equal to thirteen sample intervals, an output will be furnished from switch 244 when either OO or the SCAN SYNC pulse occurs. The output from switch 244 is fed through an inverter 245 to each side of the trigger 250. Trigger 250 is adapted to be reset OFF by the SCAN SYNC+2 pulse. Therefore, the first input during a scan to trigger 250 turns the trigger ON. If trigger 250 is ON by the time the SCAN SYNC+1 pulse is provided, an output will be supplied from the switch 251 indicating the existence of a short vertical line $Vs$.

It is desired also to detect the ocurrence of two short vertical lines on a single scan, i.e. $2Vs$. In order to detect $2Vs$, the output from the right side of trigger 250 is used to turn trigger 252 ON when trigger 250 goes OFF. Therefore, if trigger 250 is turned ON by a first $Vs$ and then turned OFF by a second $Vs$ during the same scan, trigger 252 will be ON and trigger 250 will be OFF. The output of the right side of trigger 252 is connected to switch 253 which also receives the SCAN SYNC+1 pulse. Therefore, when trigger 252 is ON at the time of the SCAN SYNC+1 pulse, a positive pulse output will be supplied indicating 2Vs. It is seen that if a signal representing 2Vs is produced, a signal representing Vs will not be produced since trigger 250 will be OFF at the time of the SCAN SYNC+1 pulse.

A further condition to be determined is the occurrence of a short vertical line in the upper portion of the character, i.e. Vsu. To produce this signature component, the output from the left side of trigger 250 is used to turn trigger 254 ON. It will be seen that the first time trigger 250 is turned ON, a negative going output pulse will be supplied to turn trigger 254 ON. This trigger can be turned OFF by one of several inputs. As will be more apparent hereafter in regard to FIG. 4a, signals are produced representing the occurrence of two crossovers on a present scan. The present scan may be either an EVEN or an ODD scan and the crossovers separated by an included white area may be either 2Xs, which indicates two crossovers separated by a short included white area or 2Xm, which indicates two crossovers separated by a medium size included white area or 2Xl, which indicates two crossovers separated by a long included white area. Since these two crossovers on a present scan may exist on the ODD or EVEN lines, there may therefore exist 2Xso, 2Xse, 2Xmo, 2Xme, 2Xlo and 2Xle. These inputs, which are supplied from the FIG. 4a circuit, are connected through on OR circuit 255 and inverter 256 to the left side of trigger 254. If, on the present scan, any of the afore-mentioned inputs to OR circuit 255 occur, trigger 254 will be turned OFF, provided it has been turned ON by trigger 250 being turned ON. Of course, if trigger 254 has not been turned ON, the presence of an input to the left side thereof will have no effect thereon.

As long as trigger 254 is ON, the right side thereof will supply a relatively positive input to a trigger 257. However, if trigger 254 is turned ON by trigger 250 and thereafter is turned OFF by one of the outputs from OR circuit 255, trigger 257 will be turned ON as trigger 254 goes OFF. Trigger 257 can be turned OFF under two sets of circumstances. If two vertical lines are seen on a scan, then it is desired to not indicate Vsu. Thus the second time the counter counts up to eight, a positive going output signal is supplied from the right side of trigger 226 through an inverter 259 to turn trigger 257 OFF. If trigger 257 remains ON, a relatively positive voltage from the right side thereof will be supplied to a switch 260. This switch is also adapted to receive a signal representing 2X. The 2X signal, which is generated in FIG. 4b, is indicative of the fact that on two successive scans there have been two crossovers. Switch 260 will produce an output indicating Vsu if trigger 257 is ON and an input indicating 2X is received by the time the SCAN SYNC+1 pulse occurs.

One further signature component which it is desired to generate is the absence of a vertical line $\overline{V}$. In order to produce the signature component $\overline{V}$, there must not have been the indication of a vertical line of any kind on either the present scan or the immediate previous scan. This is generated in a manner now to be described.

If trigger 243 is turned ON by the occurrence of a vertical line equal to or greater than seven SAMPLE intervals, the output from the left side thereof will be a negative going pulse which will turn a triger 261 ON, this trigger having been turned OFF by the SCAN SYNC+2 pulse for the previous scan.

If trigger 261 is turned ON during a scan by finding a vertical line at least seven SAMPLE intervals long, the left side of the trigger will be relatively negative and prevent an output from a switch 263 at SCAN SYNC+1 time. At SCAN SYNC+2 time, a pulse is supplied to the left side of trigger 261 to turn it OFF. When trigger 261 is turned OFF by the trailing edge of the SCAN SYNC+2 pulse, a negative going pulse is supplied from the right side of trigger 261 to turn trigger 262 ON. Thus if trigger 262 is turned ON in this manner, it will remember during the second scan that a vertical line was seen on the scan just completed. If a vertical line is seen on the second scan, trigger 261 is again turned ON. When the SCAN SYNC+1 pulse is supplied to switch 263, no output will be produced therefrom since now relatively negative inputs are supplied to the switch from the left sides of each of triggers 261 and 262. At the trailing edge of the SCAN SYNC+1 pulse, trigger 262 is reset OFF. However, at the trailing edge of the SCAN SYNC+2 pulse, trigger 261 is turned OFF, which in going OFF turns trigger 262 back ON. Trigger 262 will remember for the third scan that a vertical line was seen during the second scan.

Now let it be assumed that a vertical line is not seen during the third scan. In this event, trigger 261 will not be turned ON. This means that the left side thereof will supply a relatively positive input to switch 263. However, during the SCAN SYNC+1 readout time from the switch, the left side of trigger 262 will still be relatively negative and will not allow an output to be supplied from switch 263.

The trailing edge of the SCAN SYNC+1 pulse turns trigger 262 OFF so that the left side thereof rises in potential. However, by this time the SCAN SYNC+1 readout pulse supplied to switch 263 has ended and still no output is produced from the switch. The trailing edge of the SCAN SYNC+2 pulse supplied to the left side of trigger 261 will have no effect on the trigger since it is already OFF. It will be apparent, however, that since trigger 261 is already OFF, the output from the right side thereof will have no effect on trigger 262. Thus trigger 262 remembers that no vertical line was seen during the third scan.

Let it be assumed that a vertical line is not seen during the fourth scan. In this event, triggers 261 and 262 will both be OFF so that their left side will supply relatively positive inputs to switch 263. This means that when the SCAN SYNC+1 pulse arrives at switch 263, an output signal $\overline{V}$ is produced. That is, this signal represents that a vertical line was not seen on the present scan or the immediate previous scan.

It is desirable to produce a signal representing the fact that a vertical line of any kind has not been seen on either the instant scan or the antedated scan, i.e. $\overline{Vi+Va}$. To produce this signal there is furnished an OR circuit 258a which is connected to the right sides of each of the triggers 261 and 262. Thus if both of the triggers are OFF, the output from the OR circuit will be relatively negative. When this output is inverted in the inverter 258b, there is produced a signal which is relatively positive and represents $\overline{Vi+Va}$.

Referring now to FIGS. 4a and 4b, there will be described the manner of detecting the included white areas. It will be remembered that an included white area is considered to be the case where at least one XX signal is followed by one or more predetermined numbers of white data, i.e. OO or XO or OX, but including at least one OO followed by at least one XX. In order to qualify as a true included white area these conditions must exist on two successive scans. There is provided a trigger 265 which is adapted to be reset OFF by the SCAN SYNC+1 pulse. The first time during the next scan that two successive black bits occur, i.e. XX, trigger 265 is turned ON so that its right side supplies a relatively positive voltage to a switch 266. The other input to the switch comes from an OR circuit 267 which receives OO and $XO+OX$. Therefore, after the occurrence of XX, the OO, XO or OX signals to occur are allowed to pass through switch 266 and an inverter 268 to turn ON the first stage of a four stage binary counter which is comprised of triggers 269, 270, 271 and 272. This binary counter operates in a conventional manner as in the counter previously described. Thus the binary counter will count the number of sample intervals from the last XX signal to the next XX signal. It will be noticed that triggers 269, 270, 271 and 272 are each provided with three asterisks, i.e. * * *. This indicates that each of these triggers is adapted to be reset by the SCAN SYNC+2 pulse or by an XX signal.

There is provided a switch 273 which is adapted to be connected to the right side of trigger 265 and in addition to receive signals representing OO. Thus once the first XX signal occurs, trigger 265 will be turned ON and will provide a relatively positive input to switch 273. As soon as the first OO signal occurs, switch 273 will produce an output to turn trigger 275 ON. This trigger can be turned OFF by the next XX to occur. In other words, trigger 275 is turned ON at the beginning of the first OO signal following the first XX in a scan and is turned OFF as soon as the second crossover is detected. Trigger 275 is turned OFF by taking the XX signal and supplying it to the left side of the trigger.

The output of the right side of the trigger 275 is supplied to each of two switches 277 and 278. In order to produce the signals indicating EVEN aund ODD scans, there is provided a trigger 279 which is adapted to be turned ON during one scan and OFF during the following scan. In other words, this trigger is a binary device. The manner of turning the device ON and OFF for successive scans is by connecting the SCAN SYNC+2 pulse to each side of the trigger. Therefore, the SCAN SYNC+2 pulse may turn the trigger ON for one scan, and for the next scan it will turn the trigger OFF. By connecting the right and left sides of trigger 279 to the switches 277 and 278, respectively, it is possible to give an effect of EVEN and ODD signals to these switches. A further input to these circiuts is a signal representing XX.

It will be remembered that the counter comprising stages 269, 270, 271 and 272 is counting the number of SAMPLE intervals during an included white area to provide a measure of the included white area. A switch 280 is provided and is adapted to receive the output from the right sides of triggers 269 and 270. Thus when a count of three arrives in the counter, an output will be supplied from switch 280 through an inverter 198a to turn a trigger 281 ON. The right side of trigger 281 becomes relatively positive when it is turned ON and supplies an output to an inverter 282 which produces a relatively negative signal indicating the existence of a gap greater or equal to two sample intervals. The output of trigger 281 is also connected to each of two switches 287 and 290.

A switch 283 is provided which is adapted to be connected to the right side of stages 269 and 272 of the binary counter. Thus as soon as a count of nine exists in the counter, an output will be provided from switch 283 through inverter 198b to turn the trigger 284 ON. The output from the right side of trigger 284 becomes relatively positive when the trigger is turned ON. This relatively positive signal is connected to each of switches 288 and 291. In addition, the relatively negative voltage on the left side of trigger 284, when the trigger is ON, is supplied to each of switches 287 and 290.

There is further provided a switch 285 which is adapted to be connected to the right sides of stages 269, 270, 271 and 272 so that at a count of fifteen an output will be supplied from the switch through inverter 198c to turn the trigger 286 ON. The output from the right side of trigger 286 becomes relatively positive when the trigger is turned ON. This relatively positive signal is connected to each of switches 289 and 292. In addition, the relatively negative voltage on the left side of trigger 286, when the trigger is ON, is supplied to each of switches 288 and 291.

It will be remembered that the output from switches 277 and 278, if they exist at all, exist on different scans. Let it be assumed, for example, that the output from switch 277, when it exists, exists on an EVEN scan and that from switch 278, when it exists, exists on an ODD scan. The output from switch 277 is adapted to be connected to each of the switches 287, 288 and 289 while the output from switch 278 is adapted to be connected to each of switches 290, 291 and 292.

It will be remembered that trigger 281 was turned ON at a count of three in the binary counter and that the output from the right side thereof was connected to each of the switches 287 and 290. Switches 287 and 290 also receive inputs from the left side of trigger 284 which is turned ON at a count of nine. Thus if there has been a count of three but not a count of nine, relatively positive inputs will be supplied from triggers 281 and 284 to each of the switches 287 and 290. During EVEN scan periods, an output may be supplied from switch 277 to switch 287 and during ODD scans, an output may be supplied from switch 278 to circuit 290. Therefore, the output from switch 290 may be defined as the existence of two crossovers on an ODD scan separated by a short included white area, i.e. 2X*so*. An output from switch 287 is an indication that two crossovers with a short gap between them exist on an EVEN scan, i.e. 2X*se*.

Switches 288 and 291 are adapted to be connected to receive the outputs from the EVEN and ODD switches 277 and 278, respectively. In addition, the right side of trigger 284, which is positive when at least a count of nine has been received is supplied to each of the switches 288 and 291. Since it is desired to indicate a medium sized gap only when there is not a large sized gap, the output of the left side of trigger 286 is supplied to each of these last-named switches. Therefore, if there is a count in the counter at least as large as nine but not as large as fifteen, relatively positive outputs will be supplied from triggers 284 and 286 to switches 288 and 291. The output from switch 291 will indicate the existence of two crossovers separated by a medium sized gap on an ODD scan, i.e. 2X*mo*. The output from switch 288 will be indicative of the existence of two crossovers separated by a medium sized gap on an EVEN scan, i.e. 2X*me*.

Switches 289 and 292 are adapted to be connected to switches 277 and 278, respectively, to receive the EVEN and ODD scan information, and in addition, these switches are connected to the right side of trigger 286. This trigger will provide relatively positive outputs to the switches in the event of a count of at least fifteen. Therefore, an output from switch 292 is an indication of the existence of two crossovers separated by a long gap on an ODD scan, i.e. 2X*lo*, and an output from switch 289 is an indication of two crossovers separated by a long gap on an EVEN scan, i.e. 2X*le*.

The outputs from switches 287, 288, 289, 290, 291 and 292 are shown in FIG. 4b, it being understood that each terminal carrying a similar output designation on FIG. 4a is adapted to be connected to a similarly labeled terminal on FIG. 4b. Also these outputs, i.e. 2X*so*, 2X*se*, 2X*mo*, 2X*me*, 2X*lo* and 2X*le* are adapted to be connected to serve as inputs to OR circuit 255 in FIG. 3.

As shown in FIG. 4b, a plurality of inverters 293, 294, 295, 296, 297 and 298 are adapted to be connected to receive the outputs from switches 287, 288, 289, 290, 291 and 292, respectively, and to supply outputs through triggers 299, 300, 301, 302, 303 and 304, respectively. It will be apparent that triggers 299, 300 and 301 will receive information on EVEN scans while triggers 302, 303 and 304 will receive information on ODD scans. Since it is desired that the information from the inverters which feed these triggers be used to turn these triggers ON, it is necessary to reset the triggers at the beginning of the scan on which they are adapted to receive information from their associated inverters. This is accomplished by utilizing the outputs of trigger 279. It has been shown that the right side of trigger 279 will become relatively positive and the left side relatively negative for EVEN scans. The left side of trigger 279 will become relatively positive and the right side relatively negative for ODD scans. Thus when trigger 279 turns ON, a relatively negative signal is supplied from the left side thereof. This signal may be utilized to reset any one of triggers 299, 300 and 301 which is ON. On the other hand, when trigger 279 turns OFF, a relatively negative output may be taken from the right side thereof and supplied to the left sides of each of triggers 302, 303 and 304, thereby resetting any one of these triggers which is ON.

To sum up the operation of the circuits to this point, it will be seen that each of triggers 299, 300 and 301 will be turned OFF for EVEN scans at the beginning of each EVEN scan so that if information is available on an EVEN scan which is to be fed to these triggers they are receptive to being turned ON by this information. These triggers, if turned ON during an EVEN scan, will remain ON during the ODD scan and then be reset at the beginning of the next EVEN scan. Triggers 302, 303 and 304 are adapted to be turned OFF at the beginning of each ODD scan so that they are receptive to being turned ON by any information which may be supplied thereto during an ODD scan. These latter triggers will remain ON during the EVEN scan and will be turned OFF at the beginning of the next ODD scan.

In order to produce an indication of a valid short included white area, it is necessary that the short included white areas be seen on two successive scans and that three crossovers have not been seen on either of the two scans. The signature component to indicate this condition is $2Xs$. It should be apparent that this signature component will exist if a short included white area has been seen on an ODD scan as well as been an EVEN scan and that three crossovers have not been seen on either of the scans. Thus when outputs representing $2Xso$ and $2Xse$ are supplied to triggers 302 and 299, respectively, their outputs from the right sides thereof to a switch 305 will be relatively positive. One additional input to switch 305 is the lack of three crossovers on either the ODD or EVEN scans for which outputs are supplied from triggers 302 and 299, i.e. $(\overline{3Xi+3Xa})$. Thus an output from switch 305 will occur when signals representing the expression $2Xso \cdot 2Xse \cdot (\overline{3Xi+3Xa})$ are received. The output from switch 305 is used to turn a trigger 306 ON by way of an inverter 307. The right side of this trigger is connected to a switch 308 which receives in addition the SCAN SYNC+1 pulse. Thus if trigger 306 is turned ON by the time the SCAN SYNC+1 pulse occurs, an output indicating $2Xs$ is produced from switch 308.

A valid medium sized included white area indication, i.e. $2Xm$, may be produced by several conditions. In any case, three crossovers must not have been seen on either the instant scan or the immediately previous (antedated) scan, i.e. $(\overline{3Xi+3Xa})$. Thus if $2Xmo$ and $2Xme$ exist and $3Xi$ or $3Xa$ do not exist, the signature component $2Xm$ is indicated. This may be expressed as $$2Xm = 2Xmo \cdot 2Xme \cdot (\overline{3Xi+3Xa})$$

There are occasions when a medium sized included white area may exist on one of two successive scans and a small included white area may exist on the other of these scans. Thus if $2Xso$ and $2Xme$, or $2Xse$ and $2Xmo$, exist along with $(\overline{3Xi+3Xa})$, a medium sized included white area $2Xm$ is indicated. This may be expressed as $2Xm = [(2Xso \cdot 2Xme) + (2Xse \cdot 2Xmo)] \cdot (\overline{3Xi+3Xa})$.

Signals representing $2Xmo$ and $2Xme$ may be obtained from the right sides of triggers 303 and 300, respectively, and supplied to a switch 309 which also receives $(\overline{3Xi+3Xa})$ from FIG. 5. The output from this switch is fed through an OR circuit 310 and an inverter 311 to turn a trigger 312 ON. The right side of this trigger will become relatively positive when it is turned ON and supply an input to a switch 313 which also receives the SCAN SYNC+1 pulse. Thus if trigger 312 is ON when the SCAN SYNC+1 pulse occurs, an output indicating the signature component $2Xm$ is produced.

As there is the possibility of a medium sized included white area on one scan and a small included white area on another scan, the circuitry now to be described will produce an indication of $2Xm$. An OR circuit 314 is arranged to receive inputs from the right sides of triggers 302 and 299 and to supply an output to a switch 315. Another input to this switch comes by way of an OR circuit 316 which is connected to the right sides of triggers 303 and 300. Switch 315 also is adapted to receive a signal indicating $(\overline{3Xi+3Xa})$. If the signals representing $2Xso$ and $2Xme$, or $2Xse$ and $2Xmo$, and $(\overline{3Xi+3Xa})$ occur in coincidence, an output will be supplied from switch 315 by way of OR circuit 310 and inverter 311 to turn trigger 312 ON. As before, the output to this trigger may be sampled by the SCAN SYNC+1 pulse in switch 313 to produce an indication of $2Xm$.

From the above, it will be seen that an implementation has been furnished for the expression $$2Xm = [(2Xso \cdot 2Xme) + (2Xse \cdot 2Xmo) + (2Xmo \cdot 2Xme)] \cdot (\overline{3Xi+3Xa})$$

A valid long included white area indication, i.e. $2Xl$, may be produced also by several conditions. Under any of the conditions, however, three crossovers must not have been seen on either the instant scan or the immediately previous scan, i.e. $(\overline{3Xi+3Xa})$. In such a case, a long included white area may be indicated if there is the presence of a long included white area on each of two adjacent scans. Thus if $2Xlo$ and $2Xle$ and $(\overline{3Xi+3Xa})$ occur in coincidence, the signature component $2Xl$ is indicated. This may be expressed as $$2Xl = 2Xlo \cdot 2Xle \cdot (\overline{3Xi+3Xa})$$

There are occasions when a long included white area may exist on one of two successive scans and a short included white area may exist on the other of the scans. Thus if $2Xso$ and $2Xle$, or $2Xse$ and $2Xlo$ exist along with the absence of $3Xi$ and $3Xa$, a long included white area $2Xl$ is indicated. This may be expressed as $$2Xl = [(2Xso \cdot 2Xle) + (2Xse \cdot 2Xlo)] \cdot (\overline{3Xi+3Xa})$$

Another instance where a long included white area is indicated is when a medium sized included white area may exist on one of two successive scans and a large included white area may exist on the other of the scans. Thus, if $2Xmo$ and $2Xle$, or $2Xme$ and $2Xlo$ exist along with the absence of $3Xi$ and $3Xa$, a long included white area $2Xl$ is indicated. This may be expressed as $$2Xl = [(2Xmo \cdot 2Xle) + (2Xme \cdot 2Xlo)] \cdot (\overline{3Xi+3Xa})$$

To implement the first-described manner of recognizing $2Xl$, there is provided a switch 317 which is adapted to receive inputs from the right sides of triggers 301 and 304, the remaining input to this switch being $(\overline{3Xi+3Xa})$. The output from the right side of trigger 301 is $2Xle$ and the output from the right side of trigger 304 is $2Xlo$. Therefore, the output from switch 317 is equal to $2Xlo \cdot 2Xle \cdot (\overline{3Xi+3Xa})$ and is supplied through an OR circuit 318 and inverter 323 to turn a trigger 319 ON. The condition of the right side of trigger 319 is sampled in a switch 320 which also receives the SCAN SYNC+1 pulse. If trigger 319 is turned ON during the scan, an output indicating $2Xl$ will be supplied from switch 320 at SCAN SYNC+1 time.

The implementation for the second-described manner of indicating $2Xl$ is furnished by a switch 321a which is connected to receive the output of OR circuit 314 and an OR circuit 321b, the latter OR circuit being connected to the right sides of triggers 301 and 304. Switch 321a also receives $(\overline{3Xi+3Xa})$ so that the output therefrom will be representative of $$[(2Xso \cdot 2Xle) + (2Xse \cdot 2Xlo)] \cdot (\overline{3Xi+3Xa})$$

and is supplied through OR circuit 318 and inverter 323 to turn trigger 319 ON. As before, the condition of the right side of trigger 319 is sampled in the switch 320 by the SCAN SYNC+1 pulse to produce an output signal representing 2Xl.

To implement the third-described manner of determining 2Xl, there is furnished a switch 322. This switch is adapted to be connected to receive the outputs of OR circuits 316 and 321b and also to receive the indication of $(\overline{3Xi+3Xa})$. Thus if there is an output from switch 322, it represents $$[(2Xmo \cdot 2Xle)+(2Xme \cdot 2Xlo)] \cdot (\overline{3Xi+3Xa})$$

The output of switch 322 is supplied through an OR circuit 318 and an inverter 323 to turn trigger 319 ON. As in the two previous cases, the condition of the right side of trigger 319 is sampled in a switch 320 by the SCAN SYNC+1 pulse to produce an indication of 2Xl.

A further condition which it is desirable to learn in FIG. 4b is the absence of two crossovers on the present and the prior scan. There is furnished an OR circuit 324 which is adapted to receive the outputs of each of the OR circuits 314, 316 and 321b. Therefore, it will be seen that the output of this OR circuit, if positive, will indicate $2Xso+2Xse+2Xmo+2Xme+2Xle+2Xlo$. This expression is defined herein as being equal to $2Xi+2Xa$, i.e. two crossovers of any kind on either the instant or immediately previous scans. By supplying the output of OR circuit 324 through an inverter 325, it is possible to obtain an output which, if positive, indicates that there has been an absence of two crossovers on both the instant scan and the immediate previous scan, i.e. $(\overline{2Xi+2Xa})$. The expression can also be stated as $\overline{2Xi} \cdot \overline{2Xa}$.

It will be remembered that a signal 2X was supplied to the switch 260 in FIG. 3. This signal is representative of the fact that signals representative of either 2Xs or 2Xm or 2Xl are produced in the circuit shown in FIGS. 4a and 4b. The expression $2X=2Xs+2Xm+2Xl$ is seen to be representative of this condition. To produce the signal 2X, there is furnished an OR circuit 326 which is connected to receive the outputs 2Xs, 2Xm and 2Xl from switches 308, 313 and 320, respectively. The output from OR circuit 326 is supplied to a cathode follower 329 whose output is representative of $2Xs+2Xm+2Xl=2X$. As mentioned heretofore, this signal is adapted to be supplied to switch 260 in FIG. 3. Also the same signal is used in FIG. 5.

Reference is now made to FIG. 5. The principal object of this circuit is to detect the existence of a valid single crossover X and a valid triple crossover 3X. In each case the requirement is made that the crossover or crossovers must exist on two adjacent scans, i.e., the instant scan and the immediate previous scan. Another output produced by this circuit is representative of the existence of three crossovers on the instant scan or the immediate previous scan, i.e. $3Xi+3Xa$. Also for use in FIG. 4b, an output representing $(\overline{3Xi+3Xa})$ is furnished. Still another output provided by this circuit is representative of the absence of the following: a single crossover on two successive scans, a double crossover on two successive scans, and a triple crossover on two successive scans, i.e. $\overline{X} \cdot \overline{2X} \cdot \overline{3X}$. This expression may also be stated as $(\overline{X+2X+3X})$ and represents the absence of all crossover signature components.

In FIG. 4a, an output was produced from an inverter 282 in the form of a negative going pulse representing the occurrence of a gap equal to or larger than two sample intervals during the instant scan, i.e. $Gi \geqq 2$. This output is supplied to the circuit shown in FIG. 5 and is supplied directly to a trigger 330. Thus it will be seen that as soon as a gap equal to or larger than two SAMPLE intervals is detected, trigger 330 will be turned ON and supply a relatively positive output to a switch 331. As shown, trigger 330 is adapted to be reset by the SCAN SYNC+2 pulse so that at the end of the scan during which a gap greater or equal to two SAMPLE intervals occurs, the trigger will be reset and thereby turn a trigger 332 ON. If on the next scan another gap equal to or larger than two SAMPLE intervals is furnished to turn trigger 330 ON, it will be seen that the outputs from both triggers 330 and 332 from the right sides thereof will supply relatively positive signals to a switch 331 to indicate that $Ga \geqq 2$ has occurred on two successive scans. However, before calling this a valid single crossover, it must be determined that there exists the absence of two crossovers on either the present scan or the immediate previous scan and that a triple crossover did not exist on either the present scan or the immediately previous scan. Signals representing $(\overline{2Xi+2Xa})$ are supplied from FIG. 4b.

In order to detect $(\overline{3Xi+3Xa})$ there is provided a trigger 333 which is arranged with both sides thereof to receive the input signal representing a gap larger or equal to two SAMPLE intervals, $Gi \geqq 2$. Therefore, the first signal representing a gap larger or equal to two SAMPLE intervals will turn trigger 333 ON and a second such signal will turn trigger 333 OFF. When this trigger is turned OFF, a negative going output signal representing $2Gi \geqq 2$ is supplied from the right side thereof which turns the trigger 334 ON. If a third signal $Gi \geqq 2$ occurs, trigger 333 will be turned ON again. A switch 195 is connected to the right sides of each of triggers 333 and 334. Thus if three signals $Gi \geqq 2$ occur during a scan, switch 195 will receive relatively positive inputs from the right sides of trigger 333 and 334 and supply a positive going input representing $3Gi \geqq 2$ to an inverter 196. The output from this inverter will be a negative going signal which will turn a trigger 197 ON. At the end of the scan on which the three gaps are detected, each of triggers 333, 334 and 197 will be reset by the SCAN SYNC+2 pulse. When trigger 197 is reset, a negative going output signal representing $3Gi \geqq 2$ is supplied from the right side thereof to turn ON a trigger 335. The first time trigger 197 is turned ON, an output is taken from the right side thereof, which is representative of $3Gi \geqq 2$. This signal is seen to also represent the existence of three crossovers on the scan upon which they occur, i.e. $3Xi$, and is supplied through an OR circuit 336 and inverter 337 to the previously described switch 331. If there is the presence of crossovers on the instant scan, the output from inverter 337 will be relatively negative and will inhibit switch 331. Also if trigger 335 is turned ON when trigger 197 goes OFF, it will be ON during the next scan. Thus the right side of trigger 335 will be relatively positive to indicate $3Ga \geqq 2$, which is equal to $3Xa$, and supply an input through an OR circuit 336 and an inverter 337 to inhibit switch 331 for the next scan. Thus if the output of inverter 337 is relatively positive, there is produced a signal representing the condition $(\overline{3Xi+3Xa})$ which is supplied to switch 331. It will be seen also that the output of OR circuit 336, if positive, is representative of $3Xi+3Xa$.

Switch 331 now has all of the requirements supplied thereto and if they are all relatively positive in coincidence, a positive output signal will be supplied representing a valid single crossover X. Thus the expression $$X = Gi \geqq 2 \cdot (\overline{3Xi+3Xa}) \cdot (\overline{2Xi+2Xa})$$

has been implemented.

As described above, if three crossovers exist on a first scan, i.e., a signal representing $3Gi \geqq 2$ is produced, trigger 197 will be ON at the end of the scan. The SCAN SYNC+2 pulse resets this trigger and turns trigger 335 ON and it will remain ON during the second scan. Thus the right side of trigger 335 will be relatively positive and represent $3Ga \geqq 2a$. If during the second scan three crossovers again occur, trigger 197 will again be turned ON. A switch 338 is adapted to be connected to receive the outputs of the right sides of triggers 197 and 335 as well as the SCAN SYNC+1 pulse. Thus if during each of the first and second scans three crossovers have been detected, the right sides of triggers 197 and 335 will be relatively positive and a positive output pulse will be supplied from switch 338 indicating the existence of a valid three crossovers, i.e. $3Xi \cdot 3Xa = 3X$.

In order to produce an output indicating the nonexistence of a single crossover X, a double crossover 2X, and a triple crossover 3X, an OR circuit 339 is arranged to receive the outputs of switches 331 and 338 which respectively represent the signature components X and 3X. In addition, OR circuit 339 receives a signal representing 2X from the circuit previously described in FIG. 4b. Therefore, if any one of these signals are present, an output will be supplied representing $X+2X+3X$. An inverter 340a is connected to receive the output from OR circuit 339. Thus if there is no signal representing $X+2X+3X$, then inverter 340a will supply a relatively positive output signal representing $(\overline{X+2X+3X})$. This expression can also be stated as $\overline{X} \cdot \overline{2X} \cdot \overline{3X}$. A switch 340b is adapted to be connected to receive the outputs of inverter 340a and the SCAN SYNC+1 pulse. Thus switch 340b will supply a relatively positive output signal representing $\overline{X} \cdot \overline{2X} \cdot \overline{3X}$ only at the time when the SCAN SYNC+1 pulse exists.

The object of the circuit shown in FIG. 6a is to look at the upper contour of the character and obtain information regarding the difference in altitude between the first character portion seen on a present scan and the first character portion seen on the immediate previous scan. This relative altitude information can be obtained by detecting the difference in altitude between the first XX signals occurring on two successive scans through a character. The difference is measured as the number of pulses which are supplied to either of two terminals, the particular terminal selected being dependent on whether the change is positive or negative. For example, if in successive vertical scans which progress from left to right through the character "A," positive changes in altitude will be detected on the left side of the character and negative changes in altitude will be detected on the right side of the character. The character "T," on the other hand, would produce no output pulses since the bar thereof is horizontal.

Referring now to FIG. 6a, a trigger 341 is provided which is adapted to receive the XX signals occurring on a scan. It will be seen that this trigger will receive the first XX signal and be turned ON thereby. The remaining XX signals during a scan will have no effect on the trigger. However, the SCAN SYNC+2 pulse is utilized to reset this trigger at the end of the scan. The output from the left side of trigger 341 will be a negative going pulse when the trigger is turned ON and is used to turn a trigger 342 either ON or OFF, depending on its state before receipt of the negative going signal. Trigger 342 is arranged to have both sides thereof receive the input. Thus it will be seen that the trigger may be ON or OFF at the beginning of character scanning. However, let it be assumed that the trigger is in an OFF condition and is turned ON by the first XX signal to occur on a scan through a particular character. When trigger 342 is turned ON, the output from the left side thereof will be a negative going voltage which is supplied to a trigger 344 to turn this trigger ON. When trigger 344 is turned ON, an output is taken from the right side thereof which is relatively positive and supplied to a switch 343. This switch is also connected to receive the relatively positive voltage from the right side of trigger 342. With both these inputs to switch 343 up, the SAMPLE pulses are allowed to pass therethrough and through an OR circuit 345 to the first of a group of five triggers which are connected as a conventional binary counter and labeled with reference numerals 346, 347, 348, 349 and 350. Thus it is seen that each sample pulse which occurs after the first XX signal on a scan is entered into the counter. This counter has the capability of counting up to thirty-two, which is equal to the number of SAMPLE pulses generated during a scan.

Let it be assumed now that the first XX signal on the next scan occurs before the counter has counted to 32. This will be the case, for example, in scanning the left side of the character "A" from left to right. In this event, the first XX signal on the next scan would occur before the counter had counted to 32 and would turn trigger 341 ON, which in turn, would turn trigger 342 OFF. When trigger 342 goes OFF, the output from the right side thereof is relatively negative and immediately shuts off switch 343 and allows no more pulses to be entered into the counter therethrough. However, at the same time, the output from the right side of trigger 342 is used to turn a trigger 353 ON. The right side of the latter trigger is now used to supply a relatively positive potential to each of switches 354 and 361. It will be seen that the left side of trigger 342 is relatively positive and that it is supplied to switch 354. This allows SAMPLE pulses to pass through switch 354 and OR circuit 355 to enter the first trigger of a group of triggers 356, 357, 358, 359 and 360 which form a binary counter capable of counting to 32. When switch 361 received the relatively positive potential from trigger 353, the right side of trigger 342, which is connected to switch 361, is relatively negative. This inhibits switch 361 and allows none of the SAMPLE pulses to pass therethrough. It will be seen that trigger 344 will remain ON even after trigger 342 is turned OFF. This is due to the fact that trigger 344 is connected to the left side of trigger 342 which becomes relatively positive, thereby having no effect on the trigger. However, switch 351 is connected to the right side of trigger 344 and left side of trigger 342 and receives relatively positive signals therefrom. This allows SAMPLE pulses to pass through switch 351 and through an OR circuit 352 to produce output pulses indicating a relatively positive change in altitude which is identified herein as D+. At the same time, the pulses from switch 351 are supplied back to OR circuit 345 which supplies pulses to the counter comprising stages 346, 347, 348, 349 and 350. Thus these pulses are used to make the last-mentioned counter count on up to 32. As soon as this counter reaches the count of 32, the right side of trigger 350 supplies a relatively negative voltage to turn trigger 344 OFF, which in turn inhibits switch 351. Therefore, no more pulses are supplied through OR circuit 352. Thus it is seen, for example, that if the counter comprising stages 346, 347, 348, 349 and 350 had counted up to 27, by the time the first XX signal on the next scan resets trigger 342, then five pulses are allowed to pass through the OR circuit 352, thereby providing a measure in terms of pulses of the difference between the first XX signal on the first scan and the first XX signal on the second scan.

As previously mentioned, the sample pulses occurring after the first XX signal on the second scan are allowed to pass through switch 354 and OR circuit 355 to enter the counter comprising stages 356, 357, 358, 359 and 360. Let it be assumed again that this counter has only counted up to 27 by the time the first XX signal occurs in the third scan. On this third scan the first XX signal will be used to turn trigger 342 back ON. When trigger 342 turns ON again, the left side thereof supplies a negative going voltage to trigger 344, thereby turning it ON. The right side of this trigger becomes relatively positive and opens up a switch 343 which is also connected to receive the positive signal from the right side of trigger 342. Therefore, the SAMPLE pulses can pass through switch 343 and OR circuit 345 to enter the counter comprising stages 346, 347, 348, 349 and 350. At the same time that trigger 342 was turned back ON, the right side thereof became relatively positive and supplied an input to a switch 361, which switch is also connected to receive the relatively positive voltage from the right side of trigger 353. It will be seen that trigger 353 will still be ON since it is reset by the fact that a count of 32 has arrived in the counter comprising stages 356, 357, 358, 359 and 360. Since a count of 27 has only been entered into this counter by the time the first XX signal is seen on the third scan, switch 361 will be allowed to pass SAMPLE pulses through the OR circuit 352 until the last-mentioned counter counts up to 32. At a count of 32 in the counter, the right side of trigger 360 goes negative and is used to reset trigger 353, which in turn inhibits switch 361 and allows no more SAMPLE pulses to be supplied therethrough to the OR circuit 352.

Thus five pulses, which is a measure of the difference between the first XX signal in the second scan and the first XX signal in the third scan, are supplied from OR circuit 352 indicating a positive change in relative altitude.

Let it now be assumed that the right side of the character "A" is being scanned from left to right and that during a first scan thereof the first XX signal which occurs turns trigger 341 ON which in turn results in turning trigger 342 ON. As before, the left side of this trigger supplies a negative going voltage to turn a trigger 344 ON. This trigger supplies an output from the right side thereof to switch 343, which switch also receives a relatively positive potential from the right side of trigger 342. SAMPLE pulses are now allowed to pass through switch 343 and OR circuit 345 to enter the counter comprising stages 346, 347, 348, 349 and 350. However, in scanning the right side of the character "A," it will be seen that the first XX signal on the second scan will not be encountered until after the counter comprising stages 346, 347, 348, 349 and 350 has already counted to 32. At a count of 32, the negative going output of the right side of trigger 350 will reset trigger 344, which in being reset, will supply a negative signal from the right side thereof to inhibit switch 343 and will also supply a negative voltage to a trigger 362 to turn it ON. The right side of trigger 362 will become relatively positive when the trigger goes ON and will supply an input to a switch 363. This switch is also connected to receive the relatively positive voltage on the left side of trigger 344. In addition, the switch is connected to receive the output of trigger 342 which is still ON since the first XX signal in the second scan has not yet been seen. Therefore, SAMPLE pulses are allowed to pass through switch 363 and through an OR circuit 364 to produce a series of pulses representing a measure of the negative change in altitude, i.e. D—. As soon as the first crossover is seen in the second scan, trigger 342 is turned OFF so that the left side thereof becomes relatively positive and supplies an input to switch 354. At the same time, the negative going voltage from the right side of trigger 342 is used to turn the trigger 353 ON. The right side of the latter trigger now goes positive and raises the second input to switch 354. Thus the SAMPLE pulses are allowed to pass through this switch and through an OR circuit 355 to the counter comprising stages 356, 357, 358, 359 and 360. Here again, this counter will count to 32 before the first XX signal is seen in the third scan. In this event, trigger 360 will supply a negative going signal to turn trigger 353 OFF. The right side of this trigger will inhibit switch 354 and turn trigger 365 ON. When trigger 365 goes ON, a relatvely positive signal is supplied from the right side thereof to a switch 366. This switch also is connected to receive the relatively positive signal from the left side of trigger 353 which is now OFF. Since switch 342 is still OFF, a relatively positive signal will be supplied from the left side thereof to switch 366 which, with the remaining signals, will allow the SAMPLE pulses to pass therethrough to OR circuit 364 to again indicate a negative change in altitude.

As soon as the first XX signal occurs during the third scan, trigger 342 is turned ON and in going ON, the left side thereof supplies a negative voltage to switch 366 to inhibit this switch, thereby allowing no more pulses to pass therethrough to the OR circuit 364. As before, when trigger 342 is turned ON, the left side thereof supplies a negative step to turn a trigger 344 ON whose right side becomes positive and raises the input to switch 343. This switch also receives a relatively positive voltage from the right side of trigger 342 and thereby SAMPLE pulses can pass through the switch 343 and the OR circuit 345 to enter the counter comprising stages 346, 347, 348, 349 and 350. This operation continues as long as the signals continue to be supplied.

In the event of scanning the character "T," for example, it will be seen that no pulses should be provided as outputs from OR circuits 352 and 364. Thus when the XX signal occurs on a first scan through the character, trigger 342 will be turned ON, for example, which, as before, turns a trigger 344 ON and allows the SAMPLE pulses to pass through switch 343 and OR circuit 345 to enter the counter comprising 346, 347, 348, 349 and 350. However, since the first XX signal on the second scan will occur at the same time that the counter comprising stages 346, 347, 348, 349 and 350 is up to 32, trigger 344 will be turned OFF and inhibit switch 351. Thus no pulses are allowed to pass through switch 351 to OR circuit 352. It will be seen that if the circuitry is followed through that on the second scan switch 361 will be turned OFF from the right side of trigger 353 at the time the counter comprising stages 356, 357, 358, 359 and 360 has reached 32, and no output pulses will be supplied from switch 361 to OR circuit 352. Since triggers 344 and 353 are each turned OFF at a count of 32, at the same time that the trigger 342 is turned OFF or ON, respectively, neither of the switches 363 or 366 will be allowed to supply output pulses, thereby preventing the occurrence of pulses from OR circuit 364.

It should be appreciated that due to the variations in ink density on certain horizontal lines of characters that variations may occur from scan to scan as to the time when the first XX signal is produced. For example, it is possible that the first XX signal on one scan will occur earlier or later in the scan than the first XX signal on the next scan. In this event, a number of pulses will be supplied from either of OR circuits 352 or 364 dependent upon whether the change is positive or negative. The number of pulses supplied is determined by how soon or how much later the first XX signal occurs in the second scan.

The circuit shown in FIG. 6b utilizes the D+ signals from FIG. 6a to produce signature components indicating a large positive change in altitude, $D+l$, a small positive change in altitude, $D+s$, a small positive slope over a predetermined number of scans, $S+$, and no change in slope over a plurality of scans, $So$. In generating the signature component $S+$, there must not be an indication of D— during said predetermined number of scans. Also a signature component $So$ is implemented to allow for small changes in altitude over the plurality of scans used to indicate it, providing the change in altitude is not more than one D+ or D— pulse variation during any scan from the first of the group of scans under consideration.

The first signature component to be described is a large change in altitude due to a positive slope, i.e. $D+l$. The D+ pulses supplied from FIG. 6a are fed through an inverter 367 to the first stage of a binary counter which is comprised of triggers 368, 369, 370 and 371. A large change in altitude is indicated by a count of fourteen D+ pulses. Thus the outputs from the right sides of stages 369, 370 and 371 will all be relatively positive at a count of fourteen and will supply an output through a switch 372a and an inverter 372b to turn a trigger 373 ON. The right side of this trigger will be positive and supply an input to a switch 374 which, at SCAN SYNC+1 time, will supply an output indicating $D+l$.

The reset for triggers 368, 369, 370 and 371 is by way of a circuit which includes a trigger 375 which is connected to receive the output of inverter 367. Thus the first D+ pulse will turn trigger 375 ON which will supply a relatively positive output to switch 376. At the end of SCAN SYNC+2 time, a negative going signal is provided from this switch to turn the trigger 377 ON. When the trigger 377 is turned ON, an output from the right side thereof is supplied to a switch 378 which receives the SCAN SYNC+1 pulse which is utilized to supply an output to an inverter 379. The output of the inverter is connected to the plates of the right sides of each of triggers 368, 369, 370, 371 and 375, and thereby resets the triggers.

In order to detect the signature component $D+s$, the output of the inverter 367 is also supplied to the first stage of a counter comprising triggers 380, 381 and 382. This counter counts up to four D+ pulses. Thus it is but necessary to connect the left side of trigger 382 to turn a trigger 383 ON when trigger 382 turns ON. It will be seen that trigger 383 is connected to be reset by the fact that trigger 373 turns ON. That is, the output of the left side of trigger 373 is connected to serve as an input to the left side of trigger 383. Thus if a large change in relative altitude occurs, trigger 383 will be turned OFF so that it will not supply an output to switch 384. However, if trigger 373 is not turned ON and trigger 383 is turned ON, an output will be supplied therefrom to switch 384 which will supply an output at SCAN SYNC+1 time to indicate $D+s$. Triggers 373, 380, 381, 382 and 383 are all adapted to be reset OFF at SCAN SYNC+2 time. Thus to this point the manner of detecting the $D+l$ and the $D+s$ signature components has been described, it being understood that $D+l$ is determined on the basis of two scans while $D+s$ is detected on the basis of a single scan.

The implementation for the small positive slope signature component S+ includes a trigger 395 which is adapted to be reset at SCAN SYNC+2 time. The first D+ pulse received from OR circuit 352 in FIG. 6a during a scan turns trigger 395 ON so that the right side thereof furnishes a relatively positive voltage to a switch 396. This switch also receives the SCAN SYNC pulse. In the event at least one D+ pulse is received before in SCAN SYNC pulse, a positive pulse is supplied to an inverter 193. This causes the inverter to produce a negative pulse and turn a trigger 385 ON, it being assumed for the moment that trigger 385 was previously in an OFF condition. A relatively positive voltage appears on the right side of trigger 385 when it is turned ON. This voltage is applied to the right side of a trigger 386. However, since this trigger is responsive to negative going pulses, it remains OFF. Here again, it is assumed that the trigger is reset to an OFF condition. At SCAN SYNC+1 time, the condition of the right side of trigger 386 is sampled in a switch 387. However, since the right side of trigger 386 is relatively negative, an output will not be produced from switch 387 to indicate S+.

There are several conditions under which trigger 385, which is now ON, can be turned OFF. There is furnished an OR circuit 393 which is adapted to receive several inputs. The first input may come from the right side of trigger 373. Thus if trigger 373 is turned ON, indicating a $D+l$ condition, a relatively positive voltage is applied to OR circuit 393. This produces a positive voltage to an inverter 394. The output of inverter 393 will be a negative going pulse which is adapted to be applied to the right plate of trigger 385. This, of course, will turn trigger 385 OFF. The negative going output of inverter 394 is also adapted to be connected to the right plate of trigger 386. Thus if trigger 386 had been turned ON, it would be reset OFF by the occurrence of $D+l$. From the above, it is seen that an S+ signature component cannot be indicated if there is the presence of a $D+l$ signature component.

Another time when each of triggers 385 and 386 are reset OFF is when the signature component $D+s$ occurs. The right side of trigger 383 is connected to OR circuit 393. If trigger 383 has been turned ON to indicate $D+s$, the right side will be relatively positive. As soon as trigger 383 is turned ON, OR circuit 393 supplies a positive going pulse to inverter 394, thereby causing this inverter to supply a negative going pulse to the right side of each of triggers 385 and 386.

These triggers are also reset OFF when four scans elapse without at least one D+ signal being obtained during two out of the four scans. A counter comprising triggers 388, 390 and 391 is adapted to receive the SCAN SYNC+1 signal which occurs after the end of each scan. It will be noted that a negative going pulse is supplied to the counter by the trailing edge of the SCAN SYNC+1 pulse. If this counter is allowed to count up to four without being reset, the right side of trigger 391 will be relatively positive. A switch 392 is connected to the right side of trigger 391. The SCAN SYNC+2 pulse is applied to switch 392. Thus if trigger 391 is ON, when the SCAN SYNC+2 pulse occurs, a positive output pulse is provided to OR circuit 393. This causes inverter 394 to supply a negative going pulse to the right side of each of triggers 385 and 386, thereby placing them in their reset condition.

One further condition which causes triggers 385 and 386 to be reset is the occurrence of a D— signal during a scan. If a D— signal is produced from OR circuit 364 in FIG. 6a, a positive pulse is applied to OR circuit 393, thereby causing inverter 394 to reset each of triggers 385 and 386.

Let it now be assumed that during a first scan at least one D+ pulse occurs and turns trigger 395 ON. In this event, a positive pulse will be supplied from switch 396 at SCAN SYNC time. This causes inverter 193 to supply a negative going pulse to both sides of trigger 385. Assuming that trigger 385 was OFF before the occurrence of this input, it will be turned ON by inverter 193. Thus during the first scan trigger 385 is turned ON. Trigger 395 is turned OFF by the SCAN SYNC+2 pulse so that it is ready for any D+ pulses which may occur during the second scan.

Let it be assumed that at least one D+ pulse occurs during the second scan. This time, the negative going output from inverter 193 at SCAN SYNC time will turn trigger 385 OFF. As trigger 385 goes OFF, a negative going pulse is supplied from the right side thereof to trigger 386, thereby turning the latter trigger ON. This causes a relatively positive voltage to be applied to the switch 387 from the right side of trigger 386. At SCAN SYNC+1 time, an output S+ will be provided from switch 387.

In the foregoing explanation, it was stated that at least one D+ signal was produced during each of the first and second scans. It will be appreciated that if more than three D+ signals had been produced during either scan, or more than fourteen D+ signals had been produced during two scans, triggers 385 and 386 would have been reset OFF by way of inverter 394. That is, this inverter resets the triggers if either $D+l$ or $D+s$ is indicated as having been produced. Thus in order to indicate S+, there must have been produced at least one but not more than three D+ signals during each of the scans.

Assuming that there was only one D+ signal during each of the first and second scans, trigger 385 will be OFF at the end of the second scan. This means that the left side thereof will be relatively positive and will supply an input to a switch 194a. This switch is also connected to receive the SCAN SYNC+2 pulse. The positive output pulse from switch 194a is inverted by inverter 194b and will reset the counter comprising triggers 388, 390 and 391 to zero. That is, each of the triggers in the counter will be turned OFF. This means that the counter will begin counting the SCAN SYNC+1 pulses all over again.

If during four scans, a D+ signal is produced during only one of the scans, the counter will be up to four and trigger 391 will be ON. The right side thereof will be relatively positive, and when the SCAN SYNC+2 signal is produced, a positive pulse is supplied from switch 392 to OR circuit 393. This causes inverter 394 to reset trigger 385.

From the above, it is seen that in order to produce a signal representing the signature component S+, at least one but not more than three D+ pulses must have been produced in each of at least two out of four scans without the occurrence of a D— signal.

To produce the signature component So, i.e. a zero slope condition, the circuit looks for the occurrence of no more than one D+ or one D— signal on any one of five successive scans. Furthermore, there cannot be a succession of one D+ pulse on one scan followed within the five scans by another D+ pulse unless a D— pulse occurs therebetween. Also there cannot be a succession of one D— pulse on one scan followed within the five scans by another D— pulse unless a D+ pulse occurs therebetween. In the event more than one D+ or more than one D— signal occurs on a scan, a counter, which is capable of counting up to five, is reset to zero to begin counting the scans again. As previously mentioned, a tolerance of one D+ or one D— signal is allowed on a scan, providing two D+ pulses or two D— pulses do not occur in succession, because of ink density variations in the characters.

In the circuit there is shown a three stage counter which comprises trigger 397, 398 and 399. These counters are adapted to receive the SCAN SYNC+1 pulses so that at the end of five scans triggers 397 and 399 will have relatively positive outputs from the right sides thereof which will produce an output from a switch 400 to turn a trigger 401 ON by way of an inverter 389. If this trigger is allowed to be turned ON, a relatively positive output will be supplied from the right side thereof to a switch 402 which at the following SCAN SYNC+1 time will produce an output indicating the signature component So.

In order that slight variations in ink density along horizontal lines will not prevent the production of an So signal, a trigger 403 is provided. The right side of this trigger is arranged to receive the D— pulses so as to turn the trigger ON and the left side of trigger is arranged to receive the D+ pulses so as to turn the trigger OFF. The D— pulses are also applied to a single shot multivibrator 191 which has a time constant such that the first D— pulse thereto will produce a relatively positive output pulse which will last for at least five but not more than six scans. Similarly, the D+ pulses are applied to a single shot multivibrator 192 which has a time constant such that the first D+ pulse thereto will produce a relatively positive output pulse which will last for at least five but not more than six scans. As is well known, single shot multivibrators are not affected by input pulses once they are turned ON. However, as soon as they turn OFF at the end of the duration provided by their time constant, they are again receptive to being turned ON to produce another output. It will be apparent that the trigger will be turned ON or OF only on the trailing edge of the D— and D+ pulses, respectively. Thus, for example, let it be assumed that trigger 403 is OFF and that during a scan a single D— pulse is received. When this D— pulse occurs, it will be relatively positive and will supply a relatively positive input to a switch 404. However, since the trigger is presently OFF, the right side thereof, which is also connected to switch 404, will not allow an output to be supplied from the switch. Although this first D— pulse caused the single shot multivibrator 191 to supply a relatively positive input to switch 404, the switch is held off by the right side of trigger 403. Thus no output will be supplied from the switch. However, in the event that a first D— pulse turns the trigger ON and during the same scan a second D— pulse occurs, an output will be supplied through the switch 404 and OR circuit 405 to produce a negative going reset pulse from an inverter 407. The output from this inverter is used to reset each of the triggers 397, 398 and 399. Therefore, the counter is reset to zero so that it has to begin all over again in attempting to count up to five scans.

On the other hand, if trigger 403 is ON due to a D— pulse and a singe D+ pulse occurs during a scan, the trigger 403 will be turned OFF. However, since the trigger has been ON, the left side thereof will be relatively negative and will not allow the D+ pulse to pass through switch 406. Although this first D+ pulse causes the single shot multivibrator 192 to supply a relatively positive input to switch 406, the switch is held off by the left side of trigger 403. If a second D+ pulse occurs on the same scan, then an output will be supplied from switch 406 through OR circuit 405 and inverter 407 to reset the counter.

Let it now be assumed that during the one scan a D— pulse is received to turn trigger 403 ON and to cause the single shot multivibrator 191 to produce a relatively positive output signal of at least five but less than six scans duration. If another D— signal is received during the five scans without an intervening D+ pulse, trigger 403 will still be ON and the second D— pulse will cause an output to be supplied from the switch 404 to the OR circuit 405, thence to the inverter 407 to reset the counter comprising triggers 397, 398 and 399 to zero. In other words, the counter must start all over again trying to count up to five.

On the other hand, let it be assumed that during one scan a D+ pulse is received to turn trigger 403 OFF and to cause the single shot multivibrator 192 to produce a relatively positive output signal of at least five but not more than six scans duration. If another D+ signal should occur during the five scans without an intervening D— pulse, trigger 403 will still be OFF and the second D+ pulse will cause an output to be supplied from the switch 406 to the OR circuit 405, thence to the inverter 407 to reset the counter comprising triggers 397, 398 and 399 to zero. In other words, the counter must start all over again trying to count up to five.

As previously mentioned, if the counter comprising triggers 397, 398 and 399 does count up to five, an output is supplied from switch 400 and inverter 389 to turn trigger 401 ON. If this trigger is still ON by the time the SCAN SYNC+1 pulse occurs at the end of the next scan, an output is produced from switch 402 representing the signature component So.

The circuit shown in FIG. 6c utilizes the D— signals from FIG. 6a to produce signature components indicating a large negative change in altitude, D—l, a small negative change in altitude, D—s, and a small negative slope over a predetermined number of scans, S—. In generating the signature component S—, there must not be an indication of D+, D—l or D—s during said predetermined number of scans.

The inverter 420 is adapted to receive the D— pulses from FIG. 6a. The output of this inverter is supplied to a trigger 421 which, in combination with triggers 422, 423 and 424 forms a four stage binary counter. A switch 425 is arranged to be connected to the right sides of triggers 422, 423 and 424 so that at a count of fourteen, i.e., there are furnished fourteen D— pulses thereto, an output is provided from switch 425a to turn a trigger 426 ON through inverter 425b. When this trigger is turned ON, the right side thereof becomes relatively positive and supplies an input to a switch 427. The SCAN SYNC+1 pulse is also supplied to switch 427 and will produce an output therefrom indicating D—l, providing trigger 426 is turned ON during a scan.

The reset for the counter comprising triggers 421, 422, 423 and 424 is by way of a circuit now to be described. A trigger 428 is adapted to be turned ON by the first D— pulse to occur during a scan. The output from the right side thereof will be relatively positive when the trigger is turned ON and will supply an input to a switch 429. This switch also receives the SCAN SYNC+2 pulse which, if trigger 428 is ON, will produce an output to turn a trigger 430 ON. Thus it is seen that the occurrence of a D— pulse on one scan is remembered during the next scan by trigger 430. If this trigger is turned ON, a relatively positive voltage will appear on the right side thereof and will be supplied to a switch 431 which receives the SCAN SYNC+1 pulse. The output from switch 431 is supplied through an inverter 432 to serve as a plate reset for each of the triggers 421, 422, 423, 424 and 428. Thus it is seen that it is possible to look for up to fourteen D— pulses on any two successive scans in the counter comprising stages 421, 422, 423 and 424. If in two scans fourteen D— pulses have occurred, an output indicating D—l will be produced from switch 427 at SCAN SYNC+1 time.

To indicate the signature component D—s, there is provided a counter comprising stages 433, 434 and 435. This counter is adapted to receive the D— pulses from inverter 420. If a count of four arrives in this counter, the left side of trigger 435 will supply a negative going pulse to turn the trigger 436 ON. If this trigger is turned ON and is not turned OFF during the scan in which it is turned ON by the occurrence of a D—l signal, a relatively positive output voltage is supplied from the right side of trigger 436 to a switch 437. When the SCAN SYNC+1 pulse occurs, an output will be produced from switch 437 to indicate D—s. Each of the triggers 433, 434, 435 and 436 is adapted to be reset OFF by the SCAN SYNC+2 pulse. This means that the signature component D—s is looked for on the basis of each scan through the character.

The implementation for the small negative slope signature component S— includes a trigger 447 which is adapted to be reset at SCAN SYNC+2 time. The first D— pulse received from OR circuit 364 in FIG. 6a during a scan turns trigger 447 ON so that the right side thereof furnishes a relatively positive voltage to a switch 448. This switch also receives the SCAN SYNC pulse. In the event, at least one D— pulse is received before the SCAN SYNC pulse, a positive pulse is supplied to inverter 449. This causes the inverter to produce a negative pulse and turn a trigger 444 ON, it being assumed for the moment that trigger 444 was previously in an OFF condition. A relatively positive voltage appears on the right side of trigger 444 when it is turned ON. This voltage is applied to the right side of trigger 445. However, since this trigger is responsive to negative going pulses, it remains OFF. Here again, it is assumed that the trigger is reset to an OFF condition. At SCAN SYNC+1 time, the condition of the right side of trigger 445 is sampled in a switch 446. However, since the right side of trigger 445 is relatively negative, an output will not be produced from switch 446 to indicate S—.

There are several conditions under which trigger 444, which is now ON, can be turned OFF. There is furnished an OR circuit 442 which is adapted to receive several inputs. The first input may come from the right side of the trigger 426. Thus if trigger 426 is turned ON, indicating a D—l condition, a relatively positive voltage is applied to OR circuit 442. This produces a positive voltage to an inverter 443. The output of inverter 443 will be a negative going pulse which is adapted to be applied to the right plate of trigger 444. This, of course, will turn trigger 444 OFF. The negative going output of inverter 443 is also adapted to be connected to the right plate of trigger 445. Thus if trigger 445 had been turned ON, it would be reset OFF by the occurrence of D—l. From the above, it is seen that the S— signature component cannot be indicated if there is the presence of a D—l signature component.

Another time when each of triggers 444 and 445 are reset OFF is when the signature component D—s occurs. The right side of trigger 436 is connected to OR circuit 442. If trigger 436 has been turned ON to indicate D—s, the right side will be relatively positive. As soon as trigger 436 is turned ON, OR circuit 442 supplies a positive going pulse to inverter 443, thereby causing this inverter to supply a negative going pulse to the right side of each of triggers 444 and 445. These triggers are also reset OFF when four scans elapse without at least one D— signal being obtained during two out of the four scans. A counter comprising triggers 438, 439 and 440 is adapted to receive the SCAN SYNC+1 signal which occurs after the end of each scan. It will be noted that a negative going pulse is supplied to the counter by the trailing edge of the SCAN SYNC+1 pulse. If this counter is allowed to count up to four without being reset, the right side of trigger 440 will be relatively positive. A switch 441 is connected to the right side of trigger 440. The SCAN SYNC+2 pulse is applied to switch 441. Thus if trigger 440 is ON when the SCAN SYNC+2 pulse occurs, a positive output pulse is provided to OR circuit 442. This causes inverter 443 to supply a negative going pulse to the right side of each of triggers 444 and 445, thereby placing them in their reset condition.

One further condition which causes triggers 444 and 445 to be reset is the occurrence of a D+ signal during a scan. If a D+ signal is produced from OR circuit 352 in FIG. 6a, a positive pulse is applied to OR circuit 442, thereby causing inverter 443 to reset each of triggers 444 and 445.

Let it be assumed that during a first scan at least one D— pulse occurs and turns trigger 447 ON. In this event, a positive pulse will be supplied from switch 448 at SCAN SYNC time. This causes inverter 449 to supply a negative going pulse to both sides of trigger 444. Assuming that trigger 444 was OFF before the occurrence of this input, it will be turned ON by inverter 449. Thus during the first scan trigger 444 is turned ON. Trigger 447 is turned OFF by the SCAN SYNC+2 pulse so that it is ready for any D— pulses which may occur during the second scan.

Let it be assumed that at least one D— pulse occurs during the second scan. This time, the negative going output from inverter 449 at SCAN SYNC time will turn trigger 444 OFF. If trigger 444 goes OFF, a negative going pulse is supplied from the right side thereof to trigger 445, thereby turning the latter trigger ON. This causes a relatively positive voltage to be applied to the switch 446 from the right side of trigger 445. At SCAN SYNC+1 time, an output S— will be provided from switch 446.

In the foregoing explanation, it was stated that at least one D— signal was produced during each of the first and second scans. It will be appreciated that if more than three D— signals had been produced during either scan or more than fourteen D— signals had been produced, during two scans, triggers 444 and 445 would have been reset OFF by way of inverter 443. That is, this inverter resets the triggers if either D—l or D—s is indicated as having been produced. Thus in order to indicate S—, there must have been produced at least one but not more than three D— signals during each of the scans.

Assuming that there was only one D— signal during each of the first and second scans, triggers 444 must be OFF at the end of the second scan. This means that the left side thereof will be relatively positive and will supply an input to a switch 450a. This switch is also connected to receive the SCAN SYNC+2 pulses. The positive output pulse from switch 450a is inverted by inverter 450b and will reset the counter comprising 438, 439 and 440 to zero. That is, each of the triggers in the counter will be turned OFF. This means that the counter will begin counting the SCAN SYNC+1 pulses all over again.

If, during four scans, a D— signal is produced during only one of the scans, the counter will be up to four and trigger 440 will be ON. The right side thereof will be relatively positive when the SCAN SYNC+2 signal is produced. A positive pulse is supplied from switch 441 to OR circuit 442. This causes inverter 443 to reset trigger 444.

From the above, it is seen that in order to produce a signal representing the signature component S—, at least one but not more than three D— pulses must have been produced in each of at least two out of four scans without the occurrence of a D+ signal.

To this point in the description there has been described the circuitry for generating all of the signature components which are used in determining the identity of six or more different type blocks of alphanumeric characters. The vertical line signature components circuit shown in FIG. 3 generates signals representing the signature components $Vs$, $Vsu$, $Vm$, $Vl$, $2Vs$ and $\overline{V}$. The included white signature components circuit shown in FIGS. 4a and 4b, generates signals representing the signature components $2Xs$, $2Xm$ and $2Xl$. The single and triple crossover signature components circuit, shown in FIG. 5, produces signals representing the signature components X, 3X and $\overline{X \cdot 2X \cdot 3X}$, which in the future will be referred to as Z. The relative altitude signature components circuit shown in FIGS. 6a, 6b and 6c, produces signals representing the signature components $D+l$, $D+s$, $S+$, $So$, $D-l$, $D-s$ and $S-$.

Those signals representing the vertical line signature components, the included white signature components and the single and triple crossover signature components are fed to a group of shift registers shown in FIGS. 7a and 7b. Referring now to FIGS. 7a and 7b, signals representing the signature components $Vs$, $Vsu$, $Vm$, $Vl$, $2Vs$, $\overline{V}$, X, $2Xs$, $2Xm$, $2Xl$, 3X and Z are supplied to inverters 460, 461, 462, 463, 464, 465, 466, 467, 468, 469, 470 and 471, respectively.

It will be remembered that the signture components signals occur at SCAN SYNC+1 time. Thus if a signal $Vs$ is supplied to inverter 460, a negative going output pulse will be supplied therefrom to turn trigger 510 ON. Trigger 510 forms position 10 of a ten position shift register. Positions one through nine of this shift register are comprised of triggers 501 through 509, respectively. It will be noted that the units order digit in reference numerals 501 through 509 is representative of the number of the position which the trigger forms.

The logical circuitry for detecting the identity of a character is designed for use where the scanning means makes successive vertical scans through the character, which scans progress one after the other across the character from left to right. In order that the signature components obtained in scanning the character may appear in the shift register in positions one through ten in the same order in which they are obtained, each signature component enters position ten and is progressively moved through positions nine, eight, seven, six, five, four, three, two and one. The rate at which a signature component moves from one position to the next is one-half the scan frequency. For example, let it be assumed that twenty scans are required to scan a character. The first scan is near the left edge of the character and the twentieth scan is near the right edge of the character. If a signature component $Vs$ is obtained in either of the first two scans at SCAN SYNC+1 time, a negative going pulse is applied from inverter 460 to the left side of trigger 510, thereby turning this trigger ON. It will be seen that if a signal $Vs$ is produced at SCAN SYNC+1 time for the first scan as well as the second scan, trigger 510 will be turned ON by the first $Vs$ signal and will be unaffected by the second $Vs$ signal.

In order to perform the shifting operation in the shift register illustrated, positive and negative sync signals are required. These signals are generated by supplying the SCAN SYNC+2 pulses to both sides of the trigger 472. Assuming that this trigger is OFF before the SCAN SYNC+2 pulse is supplied at the end of the first scan, the trigger will be turned ON when the SCAN SYNC+2 pulse occurs at the end of the first scan. The output from the left side of the trigger 472 will be a negative going voltage which is supplied to the sync generator 473. This sync generator is affected only by positive going pulses. Thus at this time no action results in the sync generator from the negative going voltage produced by trigger 472 at the end of the first scan. However, at SCAN SYNC+2 time for the second scan, trigger 472 is turned OFF and supplies a positive going pulse to the sync generator 473.

As shown in FIG. 8, the scan sync generator 473 comprises a single shot multivibrator 476 which has a time constant such that it produces a four microsecond positive output pulse in response to the positive going voltage supplied thereto from the left side of trigger 472 at SCAN SYNC+2 time for the second scan. The four microsecond positive pulse from the single shot multivibrator 476 is supplied to an inverter 477 which supplies in turn a four microsecond negative pulse. The trailing edge of this negative pulse is a positive going voltage which is supplied to a single shot multivibrator 478. The single shot multivibrator 478 has a time constant such that it produces a three microsecond output pulse which begins at the trailing edge of the four microsecond output pulse from inverter 477. This positive pulse of three microsecond duration is supplied to a cathode follower 474 and an inverter 475. The positive pulse from cathode follower 474 is supplied to each of the triggers 501 through 510 as the positive sync. The output from inverter 475 is a three microsecond negative pulse which is also supplied to each of triggers 501 through 510 as the negative sync.

If trigger 510 is turned ON during the first two scans by the occurrence of a $Vs$ signal at SCAN SYNC+1 time for either the first or the second scans, trigger 510 will be turned OFF by the shifting pulses, and in going OFF will turn trigger 509 ON. Thus at the beginning of the third scan the $Vs$ signal obtained during the first two scans now rests in position nine of the shift register and trigger 510 is OFF awaiting the possibility of a $Vs$ signal during the third and fourth scans at SCAN SYNC+1 time. Since the sync pulses supplied to each of the triggers 501 through 510 occur at the end of the second, fourth, sixth, eighth, tenth, twelfth, fourteenth, sixteenth, eighteenth and twentieth scans, it will be seen that the $Vs$ signal obtained during either of the first two scans will be shifted into trigger 501, i.e. the first position of the shift register, after the twentieth scan. Thus the first $Vs$ signal has successively progressed from trigger 510 to trigger 509, from trigger 508 to trigger 507, etc., finally winding up in trigger 501. Of course, after the twenty-second scan has occurred, trigger 501 will receive the $Vs$ signal which was produced during the third or fourth scan and the first $Vs$ signal will be lost, i.e., the $Vs$ signal produced during either the first or second scan will be lost.

From the above description, it will be obvious that if $Vs$ signals were produced, by way of example, on the first, tenth and twentieth scans in scanning a character that at the time the $Vs$ signal produced during the first scan appears in trigger 501, the $Vs$ signal produced for the tenth scan will be in trigger 505, and the $Vs$ signal produced for the twentieth scan will be in trigger 510. On the other hand, if $Vs$ signals were produced during the first, third, fifth, seventh, ninth, eleventh, thirteenth, fifteenth, seventeenth and nineteenth scans, the triggers 501 through 510 would all be ON at the beginning of the twentieth scan. That is, the $Vs$ signal for the first scan will progress from trigger 510 down to trigger 501. The $Vs$ signal produced for the third scan will progress from trigger 510 down to trigger 502. The Vs signal produced for the fifth scan will progress from trigger 510 down to trigger 503, etc.

It will be remembered that it was assumed that trigger 472, which is used in generating the shifting pulses after the end of every other scan, was assumed to be in an OFF condition when the first scan through a character occurred. This, of course, is not necessary since it very well could have been ON. The point, of course, is that the shifting pulses will occur on the basis of every other scan, regardless of whether a character is being scanned or not. This means that the scanner may enter a character and get a first Vs signal, and after the end of this Vs signal, which enters stage 510, shifting may occur. However, it will be seen that two more scans will elapse, i.e. scans two and three, before the information which was shifted into trigger 509 will be shifted on down to trigger 508. Thus it is seen that it makes little or no difference when the first Vs signal is seen in terms of the occurrence of the shifting pulses.

To this point in the description, it has been explained how Vs signals supplied to inverter 460 are placed into the tenth position of the shift register and progressively advanced down to the first position after the end of every other scan. The same action occurs regarding the remaining signature components $Vsu$, $Vm$, $Vl$, $2Vs$, $\overline{V}$, $X$, $2Xs$, $2Xm$, $2Xl$, $3X$ and $Z$. That is, a $Vsu$ signal presented to inverter 461 is adapted to be supplied as a negative pulse to trigger 520, thereby turning this trigger ON. Trigger 520 is the tenth position of a shift register which is composed of triggers 511, 512, 513, 514, 515, 516, 517, 518, 519 and 520. The units order digit of the reference numeral to a particular trigger is representative of the position in the shift register which that trigger forms. Here again, the positive and negative shifting pulses which were produced from cathode follower 474 and inverter 475 are supplied to each of the triggers 511 through 520. Every other scan, the information in trigger 520, for example, is shifted into trigger 519. At the same time, if the information existed in trigger 519, it is shifted into trigger 518, etc. Outputs may be taken from each of the triggers 511 through 520, which outputs are $Vsu(1)$, $Vsu(2)$, $Vsu(3)$, $Vsu(4)$, $Vsu(5)$, $Vsu(6)$, $Vsu(7)$, $Vsu(8)$, $Vsu(9)$ and $Vsu(10)$, respectively. As before, the numbers one through ten associated with the signature component $Vsu$ represent the position of the shift register from which the signal is obtained.

The signals representing the signature components $Vm$, which are presented to inverter 462, are supplied from the inverter to trigger 530 which forms the tenth position of a shift register comprised of triggers 521, 522, 523, 524, 525, 526, 527, 528, 529 and 530. Here again, the $Vm$ signals presented to trigger 530 are progressively advanced to triggers 529, 528, 527, etc., on the basis of the shifting sync signals supplied from cathode follower 474 and inverter 475 on the basis of every other scan. Thus output signals may be obtained from triggers 521, 522, 523, 524, 525, 526, 527, 528, 529 and 530 representing $Vm(1)$, $Vm(2)$, $Vm(3)$, $Vm(4)$, $Vm(5)$, $Vm(6)$, $Vm(7)$, $Vm(9)$ and $Vm(10)$, respectively. As before the numbers one through ten associated with the signature component $Vm$ represent the position from which that particular output is obtained.

The signature component signals representing $Vl$, which are presented to inverter 463, are supplied from the inverter to a trigger 540, this trigger forming the tenth position of a shift register which is comprised of triggers 531, 532, 533, 534, 535, 536, 537, 538, 539 and 540. As in the previously described shift register, signals which are supplied to trigger 540 are successively advanced to triggers 539, 538, 537, etc., by the positive and negative shifting sync pulses supplied from cathode follower 474 and inverter 475 after the end of every other scan. Signals representing $Vl(1)$, $Vl(2)$, $Vl(3)$, $Vl(4)$, $Vl(5)$, $Vl(6)$, $Vl(7)$, $Vl(8)$, $Vl(9)$ and $Vl(10)$ are obtained from triggers 531, 532, 533, 534, 535, 536, 537, 538, 539 and 540, respectively.

The signals representing the signature component $2Vs$ which are presented to inverter 464 are supplied from the inverter to a trigger 550 which forms the tenth position of a shifting register which is comprised of triggers 541, 542, 543, 544, 545, 546, 547, 548, 549 and 550. The $2Vs$ signal presented to trigger 550 is successively advanced down the shift register through triggers 549, 548, 547, etc., by the positive and negative shifting sync signals supplied from cathode follower 474 and inverter 475, respectively, on the basis of every other scan. Output signals may be taken from triggers 541, 542, 543, 544, 545, 546, 547, 548, 549 and 550 which respectively represent $2Vs(1)$, $2Vs(2)$, $2Vs(3)$, $2Vs(4)$, $2Vs(5)$, $2Vs(6)$, $2Vs(7)$, $2Vs(8)$, $2Vs(9)$ and $2Vs(10)$.

The signals representing the signature component $\overline{V}$, which are supplied to inverter 465, are fed to a trigger 560 to turn this trigger ON. Trigger 560 is the tenth position of a shift register comprising triggers 551, 552, 553, 554, 555, 556, 557, 558, 559 and 560. The information in trigger 560 is successively advanced through triggers 559, 558, 557, etc., by the positive and negative shifting sync pulses supplied from cathode follower 474 and inverter 475 after the completion of every other scan. Output signals are taken from the ten triggers and are designated as $\overline{V}(1)$, $\overline{V}(2)$, $\overline{V}(3)$, $\overline{V}(4)$, $\overline{V}(5)$, $\overline{V}(6)$, $\overline{V}(7)$, $\overline{V}(8)$, $\overline{V}(9)$ and $\overline{V}(10)$.

The signals representing the signature components $X$, which are supplied to inverter 466, are fed from the inverter to a trigger 570 to turn this trigger ON. Trigger 570 is the tenth position of a shift register which is comprised of triggers 561, 562, 563, 564, 565, 566, 567, 568, 569 and 570. As in the shift registers described above, the information in trigger 570 is successively advanced through triggers 569, 568, 567, etc., by the positive and negative shifting sync pulses supplied from the cathode follower 474 and the inverter 475 after the completion of every other scan. Thus output signals may be taken representing $X(1), X(2), X(3), X(4), X(5), X(6), X(7), X(8), X(9)$ and $X(10)$ may be taken from triggers 561, 562, 563, 564, 565, 566, 567, 568, 569 and 570, respectively.

The signals representing the signature component $2Xs$, which are supplied to inverter 467, are fed from the inverter to trigger 580 which forms the tenth position of a shifting register which is comprised of triggers 571, 572, 573, 574, 575, 576, 577, 578, 579 and 580. The $2Xs$ signals which center trigger 580 are successively advanced to triggers 579, 578, 577, etc., by the positive and negative shifting sync signals supplied from cathode follower 474 and inverter 475 after the completion of every other scan. Signals representing $2Xs(1)$, $2Xs(2)$, $2Xs(3)$, $2Xs(4)$, $2Xs(5)$, $2Xs(6)$, $2Xs(7)$, $2Xs(8)$, $2Xs(9)$ and $2Xs(10)$ are obtained from triggers 571, 572, 573, 574, 575, 576, 577, 578, 579 and 580, respectively.

The signals representing the signature component $2Xm$, which are supplied to an inverter 468, are fed from the inverter to turn on a trigger 590. This trigger forms the tenth position of a shift register which comprises triggers 581, 582, 583, 584, 585, 586, 587, 588, 589 and 590. The $2Xm$ signals supplied to trigger 590 are successively advanced to triggers 529, 528, 527, etc., by the positive and negative shifting sync signals supplied from cathode follower 474 and inverter 475, respectively, after the completion of every other scan. Thus, signals representing $2Xm(1)$, $2Xm(2)$, $2Xm(3)$, $2Xm(4)$, $2Xm(5)$, $2Xm(6)$, $2Xm(7)$, $2Xm(8)$, $2Xm(9)$ and $2Xm(10)$ may be obtained from triggers 581, 582, 583, 584, 585, 586, 587, 588, 589 and 590, respectively.

Signals representing the signature component $2Xl$, which are supplied to inverter 469, are fed from the inverter to a trigger 600. This trigger forms the tenth position of the shift register which is comprised of triggers 591, 592, 593, 594, 595, 596, 597, 598, 599 and 600. The 2Xl signals applied to trigger 600 are successively advanced to triggers 599, 598, 597, etc., by the positive and negative shifting sync pulses obtained from cathode follower 474 and inverter 475, after the completion of every other scan. Signal representing $2Xl(1)$, $2Xl(2)$, $2Xl(3)$, $2Xl(4)$, $2Xl(5)$, $2Xl(6)$, $2Xl(7)$, $2Xl(8)$, $2Xl(9)$ and $2Xl(10)$ may be obtained from triggers 591, 592, 593, 594, 595, 596, 597, 598, 599 and 600, respectively.

Signals representing the signature component 3X, which are supplied to inverter 470, are fed therefrom to trigger 610 to turn this trigger ON. Trigger 610 forms the tenth position of a shifting register which is comprised of triggers 601, 602, 603, 604, 605, 606, 607, 608, 609 and 610. The 3X signals supplied to trigger 610 are successively advanced to triggers 609, 608, 607, etc., by the positive and negative shifting sync signals supplied from cathode follower 474 and inverter 475, respectively, after the completion of every other scan. Thus signals representing $3X(1)$, $3X(2)$, $3X(3)$, $3X(4)$, $3X(5)$, $3X(6)$, $3X(7)$, $3X(8)$, $3X(9)$ and $3X(10)$ are obtained from triggers 601, 602, 603, 604, 605, 606, 607, 608, 609 and 610, respectively.

Signals representing the signature component Z, which are fed to inverter 471, are fed from the inverter to a trigger 620. Triggers 620 forms the tenth position of a shifting register which is comprised of triggers 611, 612, 613, 614, 615, 616, 617, 618, 619 and 620. The Z signals supplied to trigger 620 are successively advanced to triggers 619, 618, 617, 616, etc., by the positive and negative shifting sync signals supplied from cathode follower 474 and inverter 475 after the completion of every other scan. Signals representing $Z(1)$, $Z(2)$, $Z(3)$, $Z(4)$, $Z(5)$, $Z(6)$, $Z(7)$, $Z(8)$, $Z(9)$ and $Z(10)$ are obtained from triggers 611, 612, 613, 614, 615, 616, 617, 618, 619 and 620, respectively.

It has now been explained how the signature component signals are entered into a shift register and advanced down the register after the completion of every other scan through the character. Also it has been explained how output signals may be obtained from each position of the shift register. The output from a particular position will be relatively positive, providing there is the existence of a signature component signal stored in that position. The output signal from a particular position will be relatively negative if there is the absence of a signature component signal stored in that position. In order to identify a particular signature component signal with a particular position, a number from one to ten is enclosed in parentheses following the signature component representation.

The register matrices block, illustrated by reference numeral 207 in FIG. 1 is comprised of the circuitry found in FIGS. 11 through 20. The outputs from position one of each of the twelve shift registers are supplied as inputs to FIG. 11. Thus the outputs $Vs(1)$, $Vsu(1)$, $Vm(1)$, $Vl(1)$, $2Vs(1)$, $\overline{V}(1)$, $X(1)$, $2Xs(1)$, $2Xm(1)$, $2Xl(1)$, $3X(1)$ and $Z(1)$ are fed to cathode followers 630, 631, 632, 633, 634, 635, 636, 637, 638, 639, 640 and 641, respectively. A plurality of switches are illustrated as receiving inputs from one of the cathode followers 630, 631, 632, 633, 634, 635, and one of the cathode followers 636, 637, 638, 639, 640, 641. Each of these switches will produce an output signal providing there is a coincidence of relatively positive voltages applied over the two input lines thereto. Thus there is provided a switch 642 which receives signals representing $Vs(1)$ and $X(1)$ so that if these two signals occur in coincidence, an output signal representing $X \cdot Vs(1)$ is produced. A switch 643 is arranged to receive as inputs $Vm(1)$ and $X(1)$ so that if these inputs are in coincidence, an output signal representing $X \cdot Vm(1)$ is produced. Switch 644 is connected to receive the signature component signals $X(1)$ and $Vl(1)$ so that if these inputs occur in coincidence, an output signal representing $X \cdot Vl(1)$ is produced. The signature component signals $X(1)$ are also supplied to a switch 645 along with the signature component $\overline{V}(1)$, thus producing an output from the switch in the case of the existence of both of these inputs a signal representing $X \cdot \overline{V}(1)$.

The switch 646 is adapted to receive the signals representing $2Xs(1)$ and $Vs(1)$ and will produce an output signal representing $2Xs \cdot Vs(1)$ in the event these input signals occur in coincidence. A switch 647 is arranged to receive in addition to $2Xs(1)$ a signal representing $Vm(1)$. This produces an output from this switch representing $2Xs \cdot Vm(1)$ in the event the inputs occur in coincidence. A switch 648 is arranged to receive in addition to $2Xs(1)$, a signal representing $Vl(1)$. Thus the output from switch 648 will represent $2Xs \cdot Vl(1)$. A switch 649 is arranged to receive signals representing $2Xs(1)$ and $\overline{V}(1)$ and will produce a relatively positive output signal in the event these inputs occur in coincidence representing $2Xs \cdot \overline{V}(1)$.

It is seen that the signature component signal $2Xm(1)$ is supplied to each of switches 650, 651, 652 and 653. A signature component signal $Vs(1)$ is supplied to switch 650 so that an output signal representing $2Xm \cdot Vs(1)$ is produced therefrom. The signal $Vsu(1)$ is supplied to switch 651. Thus an output signal representing $$2Xm \cdot Vsu(1)$$

will be produced from this switch in the event that the inputs thereto occur in coincidence. Switch 652 is adapted to receive the signal representing $Vm(1)$ and will produce an output signal representing $2Xm \cdot Vm(1)$ in the event of a coincidence of input signals. Switch 653 is adapted to receive, in addition to the $2Xm(1)$ signal, a signal representing $\overline{V}(1)$ so that the output therefrom will represent $2Xm \cdot \overline{V}(1)$.

Switch 654 is arranged to receive as inputs the signals representing $2Xl(1)$ and $\overline{V}(1)$, thus producing an output signal representing $2Xl \cdot \overline{V}(1)$ in the event of coincidence of these inputs.

It is noted that in this particular figure the signature components $2Vs(1)$ and $3X(1)$, which are supplied to cathode followers 634 and 640, respectively, are not used. This does not mean, however, that if it were desired to extend the identification of the present system to other type blocks of characters that the signature component signals $2Vs(1)$ and $3X(1)$ would not be used.

The signature component signal $Z(1)$ is supplied through cathode follower 641 to each of the switches 655, 656 and 657. Switch 655 is adapted to also receive the signal representing $Vs(1)$ and will produce as an output $Z \cdot Vs(1)$. Switch 656 receives, in addition to the $Z(1)$ signal, a signal representing $Vl(1)$. Thus an output signal representing $Z \cdot Vl(1)$ is produced. Switch 657 receives the signal representing $\overline{V}(1)$ and will produce an output $Z \cdot \overline{V}(1)$.

Referring now to FIG. 12, the output signals from position two of each of the shift registers previously described are received thereby. Thus the outputs $Vs(2)$, $Vsu(2)$, $Vm(2)$, $Vl(2)$, $2Vs(2)$, $\overline{V}(2)$, $X(2)$, $2Xs(2)$, $2Xm(2)$, $2Xl(2)$, $3X(2)$ and $Z(2)$ are supplied to cathode followers 658, 659, 660, 661, 662, 663, 664, 665, 666, 667, 668, 669, respectively. A plurality of switches are illustrated as receiving inputs from one of the cathode followers 658, 659, 660, 661, 662, 663 and from one of the cathode followers 664, 665, 666, 667, 668 and 669. Each of these switches will produce an output signal providing there is a coincidence of relatively positive voltages supplied over the two input lines thereto.

The signal representing $X(2)$ is supplied to each of switches 670, 671, 672, and 673. Switch 670 also receives the signal representing $Vs(2)$ and will produce an output signal representing $X \cdot Vs(2)$. Switch 671 also receives the signal representing $Vm(2)$ and will produce an output signal representing $X \cdot Vm(2)$ in the event of a coincidence of inputs of the two inputs thereto. Switch 672 is connected to receive the $Vl(2)$ signal so that it can produce output signals representing $X \cdot Vl(2)$. Switch 673 is adapted to receive the $\overline{V}(2)$ signals and will produce as an output a signal representing $X \cdot \overline{V}(2)$.

The signal $2Xs(2)$ is supplied through cathode follower 665 to each of the switches 674 and 675. Switch 674 also receives the signal representing $Vs(2)$ and will produce an output signal representing $2Xs \cdot Vs(2)$. Switch 675 receives as its second input a signal representing $2Vs(2)$ and will produce as an output a signal representing $2Xs \cdot 2Vs(2)$.

The signature components signal $2Xm(2)$ is supplied through cathode follower 666 to switches 676, 677, 679, 680 and 681. Switch 676 receives its second input from cathode follower 658 so that the output from this switch will represent $2Xm \cdot Vs(2)$. Switch 677 receives as its second input a signal representing $Vsu(2)$ so that its output will represent $2Xm \cdot Vsu(2)$. Switch 679 is adapted to receive the output of cathode follower 659 by way of an inverter 678. Thus if a signal representing $Vsu(2)$ is not present, the output from inverter 678 will be relatively positive. If this condition occurs in coincidence with $2Xm$, an output signal is produced from this switch representing $2Xm \cdot \overline{Vsu}(2)$. The switches 680 and 681 receive as their second inputs signals representing $2Vs(2)$ and $\overline{V}(2)$, respectively. Thus switch 680 produces an output representing $2Xm \cdot 2Vs(2)$ while switch 681 produces an output signal representing $2Xm \cdot \overline{V}(2)$.

The signals representing $3X(2)$ are supplied through cathode follower 668 to each of switches 682 and 683. Switch 682 receives as its second input the signal representing $Vs(2)$ from cathode follower 658. Thus the output from switch 682 represent $3X \cdot Vs(2)$. The second input to switch 683 is the signal $\overline{V}(2)$ which is supplied to cathode follower 663. In the event of coincidence of inputs to switch 683 an output signal representing $3X \cdot \overline{V}(2)$ is produced.

The signals representing $Z(2)$ are supplied through cathode follower 669 to each of the switches 684 and 685. The second input to switch 684 comes by way of cathode follower 660 which receives the signal representing $Vm(2)$. Thus the output from switch 684 represents $Z \cdot Vm(2)$. Switch 685 receives its second input from cathode follower 661 which receives the signal $Vl(2)$. Thus this switch produces an output representing $Z \cdot Vl(2)$.

It is noted that in this particular figure the signature component $2Xl(2)$, which is supplied to cathode 667, is not used. This does not mean, however, that if it were desired to extend the identification of the present system to other type blocks of characters that the signature components signal $2Xl(2)$ would not be used.

Reference is now made to FIG. 13 which is adapted to receive the outputs from stage three of each of the twelve shift registers shown in FIGS. 7a and 7b. The outputs $Vs(3)$, $Vsu(3)$, $Vm(3)$, $Vl(3)$, $2Vs(3)$, $\overline{V}(3)$, $X(3)$, $2Xs(3)$, $2Xm(3)$, $2Xl(3)$, $3X(3)$ and $Z(3)$ are supplied to cathode followers 686, 696b, 687, 688, 689, 690, 691, 692, 693, 694, 695 and 696a, respectively. A plurality of switches are illustrated as receiving inputs from one of the cathode followers 686, 687, 688 and 690 and from one of the cathode followers 691, 692, 693, 694 and 695. Each of these switches will produce an output signal providing there is a coincidence of relatively positive voltages supplied thereto over the two voltages lines.

The signals representing $X(3)$ are supplied through cathode follower 691 to each of the switches 697, 698, 699 and 700. Switch 697 is also arranged to receive the signal representing $Vs(3)$. Thus it will produce an output $X \cdot Vs(3)$. Switch 698 is arranged to receive as its second input the signal $Vm(3)$, and will therefore produce an output signal $X \cdot Vm(3)$ when the inputs thereto are in coincidence. Switch 699 is adpted to receive as its second input the signal $Vl(3)$, thereby producing an output signal $X \cdot Vl(3)$. Switch 700 is arranged to receive as its second input signal $\overline{V}(3)$, thereby producing an output signal $X \cdot \overline{V}(3)$.

Signals representing $2Xs(3)$ are supplied through cathode follower 692 to each of switches 701, 702 and 703. The second input to switch 701 is the $Vs(3)$ signal supplied by way of cathode follower 686. The output from switch 701 represents $2Xs \cdot Vs(3)$. The second input to switch 702 is the $Vm(3)$ signals supplied by way of cathode follower 687. Thus, an output from switch 702 will represent $2Xs \cdot Vm(3)$. Switch 703 receives by way of cathode follower 690 the signals representing $\overline{V}(3)$, thereby producing an output signal representing $2Xs \cdot \overline{V}(3)$.

The signals representing $2Xm(3)$ are supplied by way of cathode follower 693 to each of the switches 704, 705 and 706. Switch 704 in addition receives a signal $Vs(3)$, thereby producing as an output signal $2Xm \cdot Vs(3)$. Switch 705 receives as its second input the $Vm(3)$ signals to produce an output which represents $2Xm \cdot Vm(3)$. Switch 706 receives as its second input the signals representing $\overline{V}(3)$ supplied by way of cathode follower 690. Thus the output from this switch represents $2Xm \cdot \overline{V}(3)$.

Those signals representing $2Xl(3)$ are supplied through cathode follower 694 to each of switches 707 and 708. The other inputs to these switches being signals representing $Vs(3)$ and $\overline{V}(3)$, respectively. Thus the output from switch 707 represents $2Xl \cdot Vs(3)$ while the output from switch 708 represents $2Xl \cdot \overline{V}(3)$. The signals representing $3X(3)$ are supplied through cathode follower 695 to switches 709 and 710, the second inputs to these switches representing $Vs(3)$ and $\overline{V}(3)$. Thus the outputs from switch 709 represent $3X \cdot Vs(3)$ while the outputs from switch 710 represents $3X \cdot \overline{V}(3)$.

In the embodiment illustrated the $Vsu(3)$, $2Vs(3)$, and $Z(3)$ signals are not utilized. This does not mean, however, that if it were desired to extend the identification of the present system to other type fonts of characters that the signature components $Vsu(3)$, $2Vs(3)$ and $Z(3)$ would not be utilized.

Figure 14:
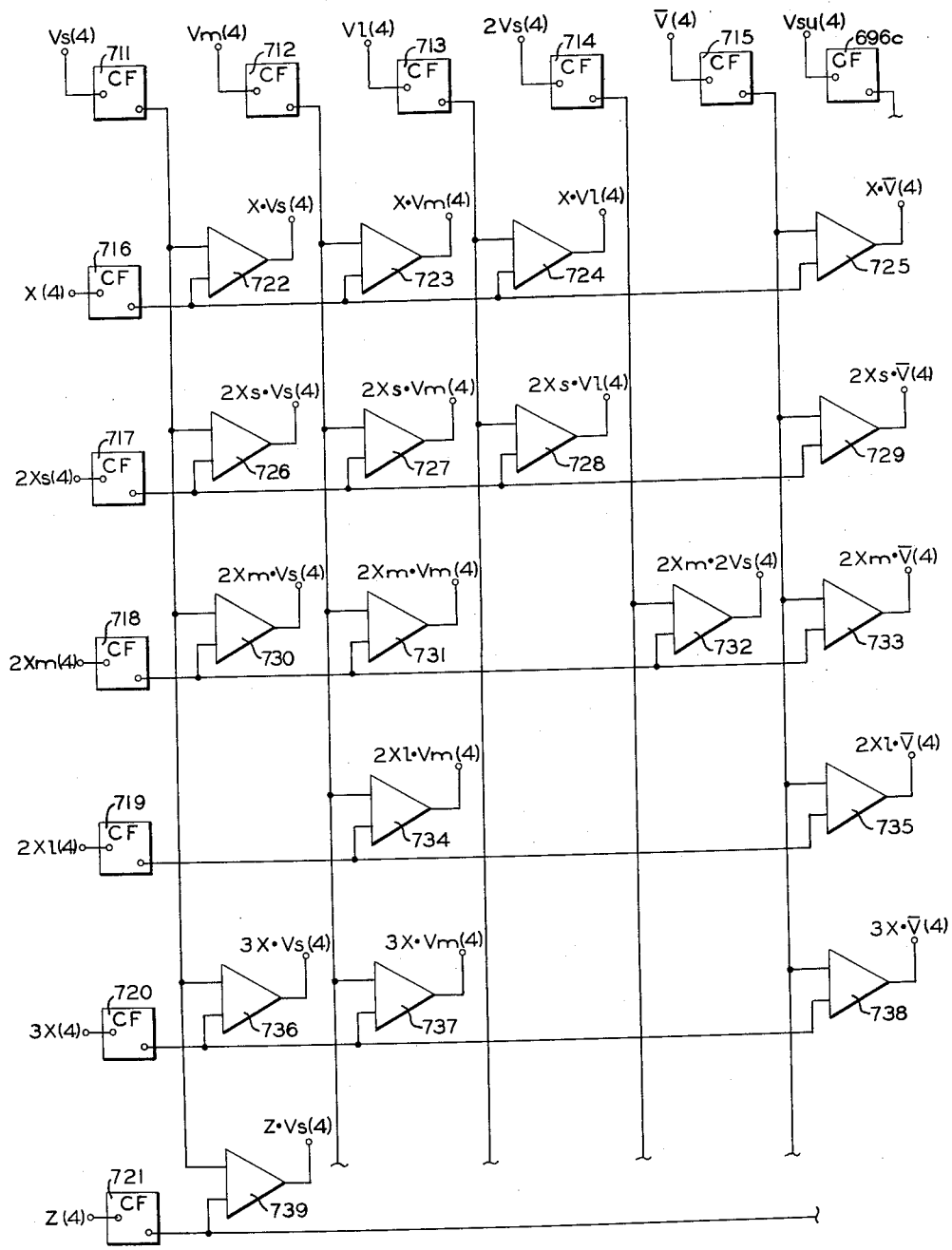

Referring now to FIG. 14, the outputs from position four of each of the shift registers are received thereof. Thus the signals representing $Vs(4)$, $Vsu(4)$, $Vm(4)$, $Vl(4)$, $2Vs(4)$, $\overline{V}(4)$, $X(4)$, $2Xs(4)$, $2Xm(4)$, $2Xl(4)$, $3X(4)$ and $Z(4)$ are respectively supplied to cathode follower 711, 696c, 712, 713, 714, 715, 716, 717, 718, 719, 720 and 721. A plurality of switches are illustrated as receiving inputs from one of the cathode followers 711, 712, 713, 714 and 715 and from one of the cathode followers 716, 717, 718, 719, 720 and 721.

The signals representing $X(4)$ are supplied through cathode follower 716 to each of a plurality of switches having reference numerals 722, 723, 724 and 725 supplied thereto. Switch 722 receives as its second input a signal representing $Vs(4)$ by way of cathode follower 711. Thus the output $X \cdot Vs(4)$ is supplied from switch 722. A switch 723 receives as its second input $Vm(4)$ which is supplied thereto by way of cathode follower 712. Thus the output from switch 723 represents $X \cdot Vm(4)$. A signal $Vl(4)$ is supplied by way of cathode follower 713 to serve as a second input to switch 724 thereby producing from this switch an output representing $X \cdot Vl(4)$. The signals representing $\overline{V}(4)$ are supplied by way of cathode follower 715 to serve as the second input to switch 725, thereby producing an output from the switch representing $X \cdot \overline{V}(4)$.

Those signals representing $2Xs(4)$ are supplied through a cathode follower 717 to each of the switches 726, 727, 728, and 729. The second input to switch 726 represents the signal $Vs(4)$ which is supplied by way of cathode follower 711. Thus the output from switch 726 becomes $2Xs \cdot Vs(4)$. The second input to switch 727 represents $Vm(4)$ and is supplied by way of cathode follower 712. The output from switch 727 represents $2Xs \cdot Vm(4)$.

Switches 728 and 729 receive as inputs the signals $Vl(4)$ and $\overline{V}(4)$, which are supplied through cathode followers 713 and 715, respectively. Thus the output from switch 728 becomes $2Xs \cdot Vl(4)$ and the output from switch 729 is $2Xs \cdot \overline{V}(4)$.

The signals representing $2Xm(4)$ are supplied through cathode follower 718 to each of the switches 730, 731, 732 and 733. The second input to switch 730 is a signal $Vs(4)$ which is supplied by way of cathode follower 711, thereby producing an output from switch 730 representing $2Xm \cdot Vs(4)$. Switch 731 receives as its second input the signals $Vm(4)$ which is supplied by way of cathode follower 712. Thus the output from switch 731 becomes $2Xm \cdot Vm(4)$. Switch 732 is adapted to receive by way of cathode follower 714 those signals representing $2Vs(4)$, thereby producing as an output signal $2Xm \cdot 2Vs(4)$. The signals $\overline{V}(4)$ which are supplied by way of cathode follower 715 to serve as a second input to switch 733 allow switch 733 to produce an output signal representing $2Xm \cdot \overline{V}(4)$.

The $2Xl(4)$ signals are supplied by way of cathode follower 719 to switches 734 and 735, the other inputs to these switches being $Vm(4)$ and $\overline{V}(4)$, respectively, thereby producing output signals representing $2Xl \cdot Vm(4)$ and $2Xl \cdot \overline{V}(4)$, respectively.

Those signals representing $3X(4)$ are supplied by way of cathode follower 720 to each of the switches 736, 737 and 738. The second input to switch 736 comes by way of cathode follower 711 and represents $Vs(4)$. The output from this switch becomes $3X \cdot Vs(4)$. Switch 737 is adapted to receive as its second input those signals representing $Vm(4)$, the output therefrom being $3X \cdot Vm(4)$. Switch 738 receives as its input $\overline{V}(4)$ signals supplied by way of cathode follower 715. Thus, the output from switch 738 represents $3X \cdot \overline{V}(4)$.

A switch 739 is arranged to receive the $Z(4)$ signals by way of cathode follower 721 and the $Vs(4)$ signals by way of cathode follower 711, thereby producing as an output signal $Z \cdot Vs(4)$. In the embodiment illustrated, the $Vsu(4)$ signals are not utilized but they may be utilized if it is desired to extend the present system to other type fonts of characters.

Figure 15:
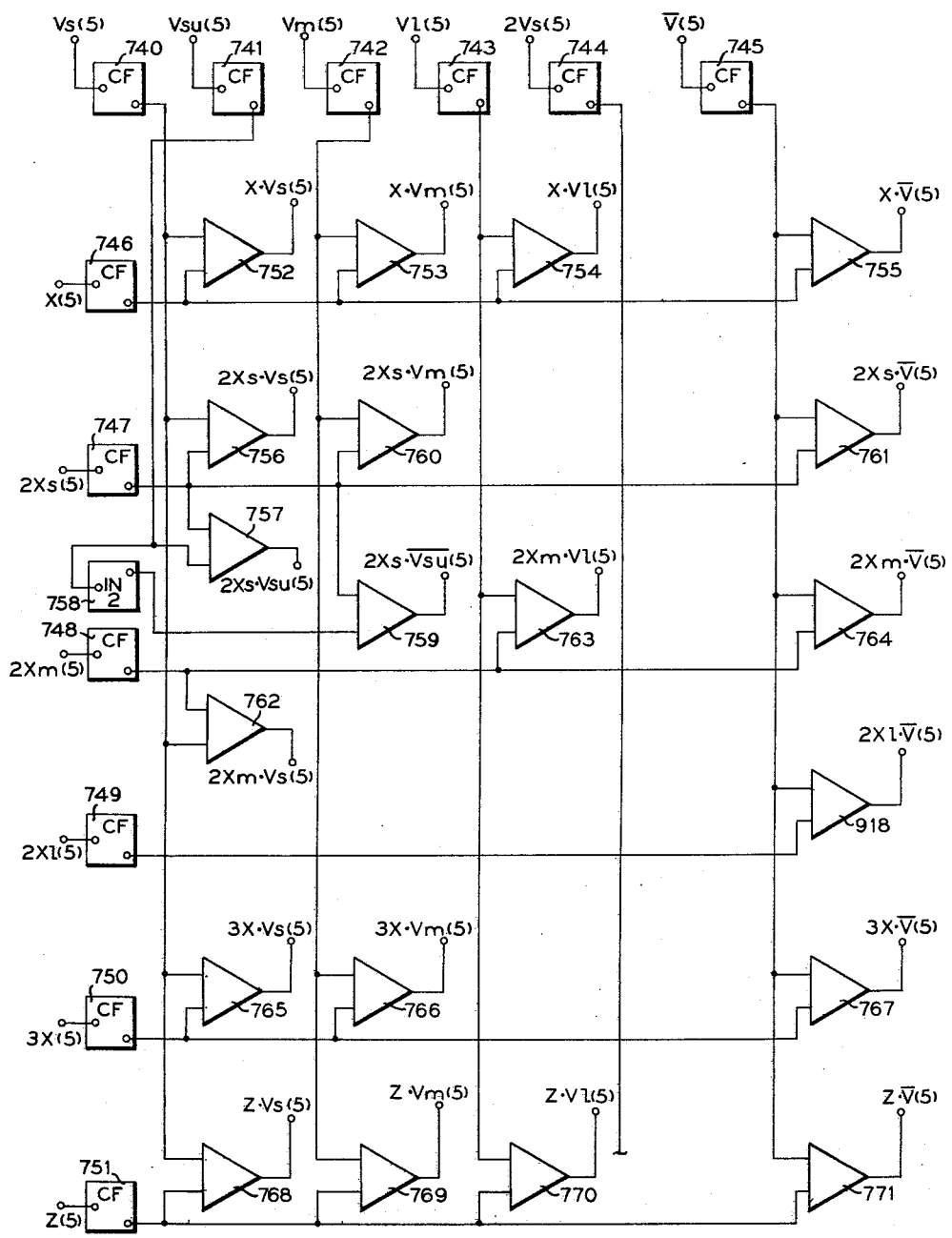

Referring now to FIG. 15, the circuit shown therein is adapted to receive inputs from position five of each of the shift registers. Thus the outputs $Vs(5)$, $Vsu(5)$, $Vm(5)$, $Vl(5)$, $2Vs(5)$, $\overline{V}(5)$, $X(5)$, $2Xs(5)$, $2Xm(5)$, $2Xl(5)$, $3X(5)$ and $Z(5)$ are supplied to cathode followers 740, 741, 742, 743, 744, 745, 746, 747, 748, 749, 750 and 751, respectively. A plurality of switches are arranged to receive one input from one of the cathode followers 740, 741, 742, 743 and 745 and another input from one of cathode followers 746, 747, 748, 749, 750 and 751.

Those signals representing $X(5)$ are supplied through a cathode follower 746 to each of the switches 752, 753, 754 and 755. Switch 752 receives as its second input the signal $Vs(5)$. Thus the output from switch 752 becomes $X \cdot Vs(5)$. Switch 753 receives as its second input the signals representing $Vm(5)$, which were supplied thereto by way of cathode follower 742. The output from this switch becomes $X \cdot Vm(5)$. Switches 754 and 755 receive as their second inputs those signals representing $Vl(5)$ and $\overline{V}(5)$, respectively, which second inputs are supplied by way of cathode follower 743 and 745, respectively. The output from switch 754 represents $X \cdot Vl(5)$ and the output from switch 755 represents $X \cdot \overline{V}(5)$.

Those signals representing $2Xs(5)$ are supplied by way of cathode follower 747 to each of the switches 756, 757, 759, 760 and 761. The second input to switch 756 represents $Vs(5)$ and is supplied to the switch by way of cathode follower 740. The output from this switch becomes $2Xs \cdot Vs(5)$. The second input to switch 757 comes by way of cathode follower 741 and represents $Vsu(5)$, thereby producing as an output from this switch $2Xs \cdot Vsu(5)$. Switch 759 is adapted to receive an input from cathode follower 741 by way of an inverter 758. Thus if the signal $Vsu(5)$ is not present, the output of inverter 758 will be relatively positive thereby allowing an output signal from switch 759 representing $2Xs \cdot \overline{Vsu}(5)$. Switch 760 receives as its second input the $Vm(5)$ signals supplied by way of cathode follower 742. The output from this switch becomes $2Xs \cdot Vm(5)$. The second input to switch 761 is supplied by way of cathode follower 745 and represents $\overline{V}(5)$, thereby producing as an output from the switch $2Xs \cdot \overline{V}(5)$.

The signals representing $2Xm(5)$ are supplied through a cathode follower 748 to each of switches 762, 763 and 764. The second input to switch 762 comes by way of cathode follower 740 and represents $Vs(5)$, thereby producing as an output from switch 762 $2Xm \cdot Vs(5)$. The second input to switch 763 is $Vl(5)$ which is received by way of cathode follower 743. The output from switch 763 therefore becomes $2Xm \cdot Vl(5)$. Switch 764 receives as its second input $\overline{V}(5)$. The latter input is supplied by way of cathode follower 745 and produces as an output from switch 764 the signal representing $2Xm \cdot \overline{V}(5)$.

A switch 918 is provided and receives as its two inputs the signals $2Xl(5)$ and $\overline{V}(5)$, thereby producing an output representing $2Xl \cdot \overline{V}(5)$.

Signals representing $3X(5)$ are supplied through cathode follower 750 to each of the switches 765, 766 and 767. The second input to switch 765 is from the cathode follower 740 and represents $Vs(5)$, thereby producing an output signal representing $3X \cdot Vs(5)$. The second input to switch 766 is representative of $Vm(5)$, thereby producing an output signal representing $3X \cdot Vm(5)$. A signal representing $\overline{V}(5)$ is supplied through cathode follower 745 to serve as a second input to switch 767. This allows the last-mentioned switch to produce an output signal representing $3X \cdot \overline{V}(5)$.

Those signals representing $Z(5)$ are supplied through cathode follower 751 to each of a plurality of switches identified by reference numerals 768, 769, 770 and 771. The second inputs to switches 768 and 769 are supplied by way of cathode followers 740 and 742, respectively, and represent $Vs(5)$ and $Vm(5)$, respectively. Therefore, the output from switch 768 becomes $Z \cdot Vs(5)$ and the output from switch 769 becomes $Z \cdot Vm(5)$. Switches 770 and 771 receive their second inputs from cathode followers 743 and 745, respectively, these inputs being signals representing $2Vl(5)$ and $\overline{V}(5)$, respectively. The output from switch 770 becomes $Z \cdot Vl(5)$ while the output from switch 771 becomes $Z \cdot \overline{V}(5)$.

In the embodiment illustrated the $2Vs(5)$ signals are not utilized but they may be utilized if it is desired to extend the present system to other type fonts of characters.

Figure 16:
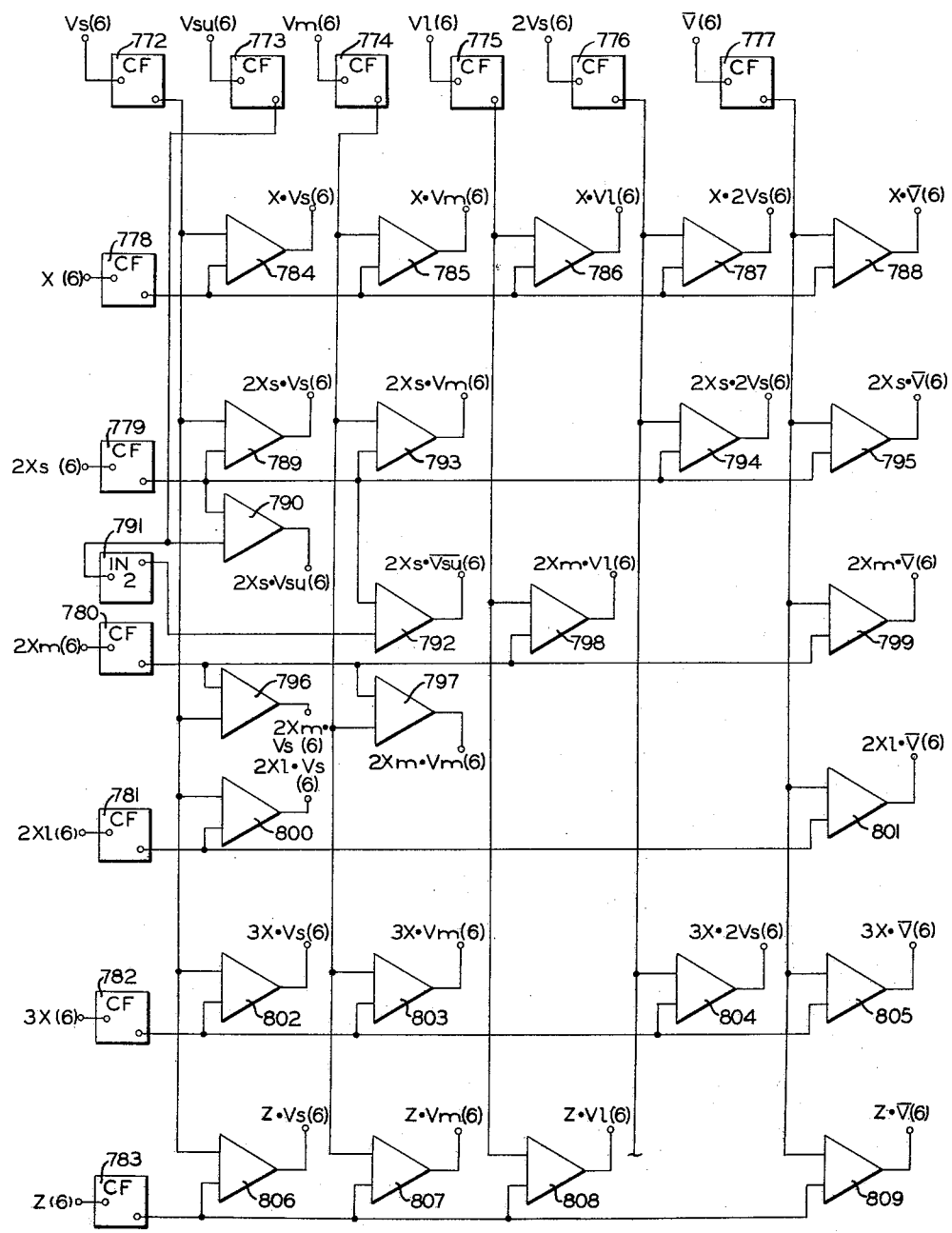

Reference is now made to FIG. 16 which is adapted to receive the output from position six of each shift register. Thus the outputs $Vs(6)$, $Vsu(6)$, $Vm(6)$, $Vl(6)$, $2Vs(6)$, $\overline{V}(6)$, $X(6)$, $2Xs(6)$, $2Xm(6)$ and $2Xl(6)$, $3X(6)$ and $Z(6)$ are supplied to cathode followers 772, 773, 774, 775, 776, 777, 778, 779, 780, 781, 782 and 783, respectively. A plurality of switches are arranged to receive one input from one of the cathode followers 772, 773, 774, 775, 776, and 777 and another input from one of the cathode followers 778, 779, 780, 781, 782 and 783.

Those signals representing $X(6)$ are supplied through cathode follower 778 to each of the switches 784, 785, 786, 787 and 788. The second input to these switches represents $Vs(6)$, $Vm(6)$, $Vl(6)$, $2Vs(6)$ and $\overline{V}(6)$, respectively. Therefore, the output from switch 784 becomes $X \cdot Vs(6)$. The outputs from switches 785 and 786 are signals representing $X \cdot Vm(6)$ and $X \cdot Vl(6)$, respectively. The outputs from switches 787 and 788 are signals representing $X \cdot 2Vs(6)$ and $X \cdot \overline{V}(6)$, respectively.

Those signals representing $2Xs(6)$, are supplied through a cathode follower 779 to switches 789, 790, 792, 793, 794 and 795. The second input to switch 789 is supplied from cathode follower 772 and represents $Vs(6)$. This produces an output from switch 789 representing $2Xs \cdot Vs(6)$. The second input to switch 790 is supplied by way of cathode follower 773 and is a signal representing $Vsu(6)$. The output from switch 790 therefore becomes $2Xs \cdot Vsu(6)$. Switch 792 is adapted to receive its second input from cathode follower 773 by way of an inverter 791. Thus it is seen that if a signal representing $Vsu(6)$ is not supplied to cathode follower 773, the output of inverter 791 will be relatively positive thereby allowing an output from switch 792 representing $2Xs \cdot \overline{Vsu}(6)$. Switch 793 is adapted to receive the signals representing $Vm(6)$ by way of cathode follower 774, thereby producing an output signal representing $2Xs \cdot Vm(3)$. Switches 794 and 795 are adapted to receive their second inputs by way of cathode followers 776 and 777, respectively, which inputs represent $2Vs(6)$ and $\overline{V}(6)$, respectively. The output switch 794 therefore becomes $2Xs \cdot 2Vs(6)$ and the output from switch 795 represents $2Xs \cdot \overline{V}(6)$.

Those inputs representing $2Xm(6)$ are supplied through cathode follower 780 to each of a plurality of switches provided with reference numerals 796, 797, 798 and 799. The second input to switch 796 represents $Vs(6)$ supplied by way of cathode follower 772, thereby producing an output signal from switch 796 representing $2Xm \cdot Vs(6)$. Those signals representing $Vm(6)$ are supplied through cathode follower 774 to serve as a second input to switch 797, thereby producing an output representing $$2Xm \cdot Vm(6)$$

The second inputs to switches 798 and 799 are supplied by way of cathode followers 775 and 777 respectively, these inputs representing $Vl(6)$ and $\overline{V}(6)$, respectively. Thus the output from switch 798 represents $2Xm \cdot Vl(6)$ while the output from switch 799 represents $2Xm \cdot \overline{V}(6)$.

The signals representing $2Xl(6)$ are supplied by way of cathode follower 781 to each of the switches 800 and 801. The second input to switch 800 is supplied by way of cathode follower 772 and represents $Vs(6)$. This produces an output to switch 800 representing $2Xl \cdot Vs(6)$. The $\overline{V}(6)$ signals supplied to cathode follower 777 are connected to be supplied to switch 801, thus producing an output from the switch representing $2Xl \cdot \overline{V}(6)$.

The signals representing $3X(6)$ are supplied to cathode follower 782, the output of the cathode follower being used to supply inputs to each of the switches 802, 803, 804 and 805. The second input to switch 802 is a signal representing $Vs(6)$ supplied by way of cathode follower 772, thus providing an output signal from the switch representing $3X \cdot Vs(6)$. Those signals representing $Vm(6)$ are supplied by way of cathode follower 774 to serve as a second input to switch 803, thus producing an output from this switch representing $3X \cdot Vm(6)$. The signals representing $2Vs(6)$ and $\overline{V}(6)$ are supplied by way of cathode followers 776 and 777, respectively, to serve as the second inputs to switches 804 and 805, respectively. The output from switch 804 is a signal representing $3X \cdot 2Vs(6)$. The output from switch 805 is a signal representing $3X \cdot \overline{V}(6)$.

Those signals representing $Z(6)$ are supplied by way of cathode follower 783 to each of the switches 806, 807, 808 and 809. The second input to switches 806 and 807 are received from cathode followers 772 and 774, respectively, these signals representing $Vs(6)$ and $Vm(6)$, respectively. The output from switch 806 becomes $Z \cdot Vs(6)$, while the output from switch 807 becomes $Z \cdot Vm(6)$. Switches 808 and 809 are adapted to receive their second inputs from cathode followers 775 and 777, respectively, which inputs represent $Vl(6)$ and $\overline{V}(6)$, respectively. The output from switch 808 therefore becomes $Z \cdot Vl(6)$ and the output from switch 809 represents $Z \cdot \overline{V}(6)$.

Figure 17:
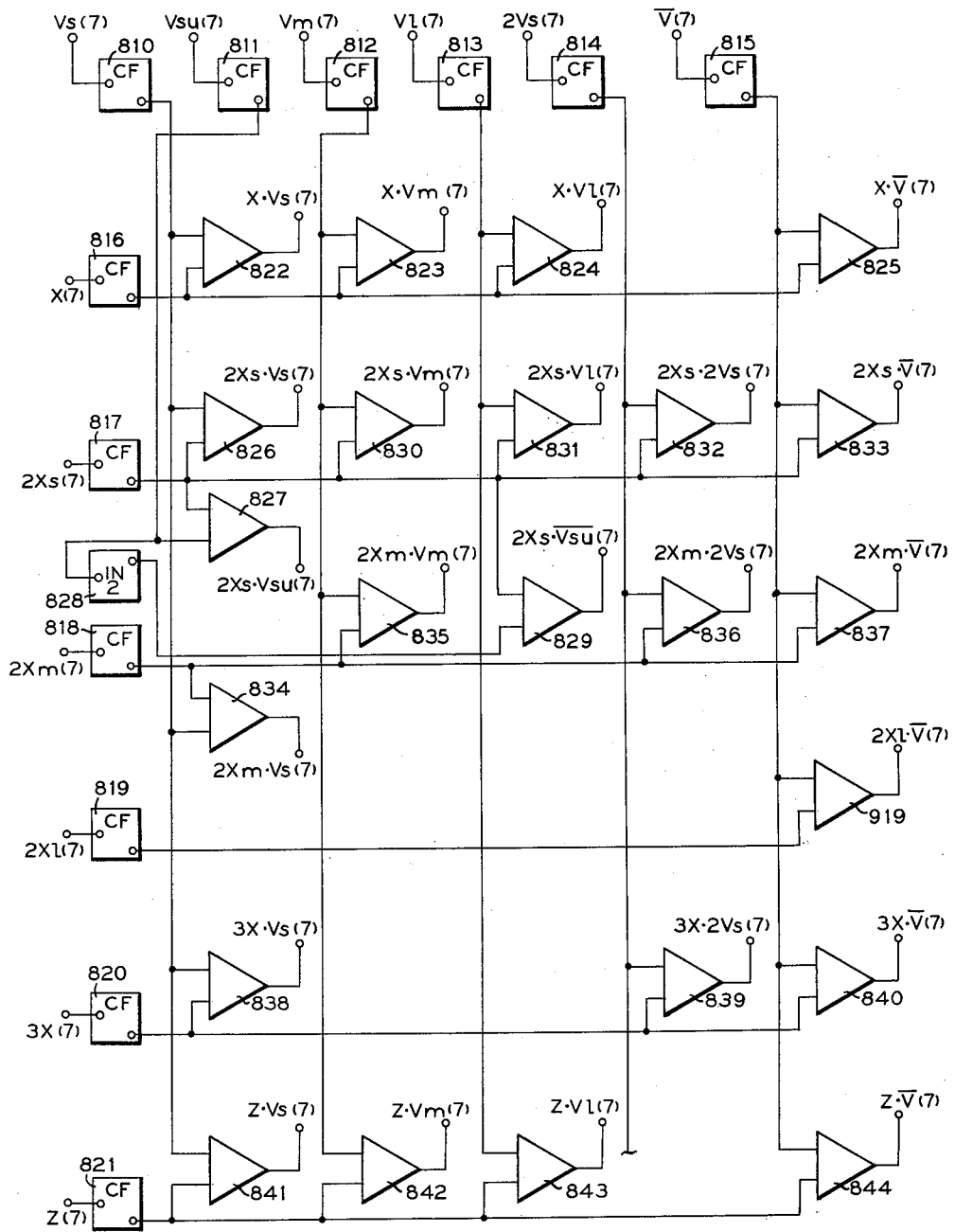

Reference is now made to FIG. 17. The outputs from position 7 of each of the twelve shift registers are supplied as inputs to FIG. 17. Thus the outputs $Vs(7)$, $Vsu(7)$, $Vm(7)$, $Vl(7)$, $2Vs(7)$, $\overline{V}(7)$, $X(7)$, $2Xs(7)$, $2Xm(7)$, $2Xl(7)$, $3X(7)$, and $Z(7)$ are supplied to cathode followers 810, 811, 812, 813, 814, 815, 816, 817, 818, 819, 820 and 821, respectively. A plurality of switches are arranged to receive one input from one of the cathode followers 810 through 815 and a second input from one of the cathode followers 816 through 821.

Those signals representing $X(7)$ are supplied through cathode follower 816 to each of the switches 822, 823, 824 and 825. The second input to switch 822 arrives by way of cathode follower 810 and represents $Vs(7)$. This produces an output from switch 822 representing $X \cdot Vs(7)$. The second input to switch 823 represents $Vm(7)$, which input is supplied from cathode follower 812. The output from switch 823 represents $X \cdot Vm(7)$. Switches 824 and 825 are adapted to receive signals representing $Vl(7)$ and $\overline{V}(7)$, respectively, these signals being supplied to switches 824 and 825 by way of cathode followers 813 and 815, respectively. The output from switch 824 represents $X \cdot Vl(7)$ while the output from switch 825 represents $X \cdot \overline{V}(7)$.

Cathode follower 817 is connected to receive those signals representing $2Xs(7)$ and to supply an output to each of the switches 826, 827, 829, 830, 831, 832 and 833. The second inputs to the switches 826, 827, 830, 831, 832 and 833 are supplied by way of cathode followers 810, 811, 812, 813, 814 and 815, respectively, which inputs represent $Vs(7)$, $Vsu(7)$, $Vm(7)$, $Vl(7)$, $2Vs(7)$ and $\overline{V}(7)$, respectively. With these inputs, switches 826 and 827 produce outputs representing $2Xs \cdot Vs(7)$ and $2Xs \cdot Vsu(7)$, respectively. The outputs from switches 830, 831, 832 and 833 are signals representing $2Xs \cdot Vm(7)$, $2Xs \cdot Vl(7)$, $2Xs \cdot 2Vs(7)$ and $2Xs \cdot \overline{V}(7)$, respectively. The switch 829 is adapted to receive its second input from cathode follower 811 by way of an inverter 828. Thus if a signal representing $Vsu(7)$ is not supplied to cathode follower 811, the output of the inverter 828 will be relatively positive and will allow an output signal therefrom representing $2Xs \cdot \overline{Vsu}(7)$.

Those signals representing $2Xm(7)$ are supplied through cathode follower 818 to each of the switches 834, 835, 836 and 837. Switch 834 receives its second input from cathode follower 810, this input representing $Vs(7)$. The output from switch 834 therefore becomes $$2Xm \cdot Vs(7)$$

Switch 835 receives its second input by way of cathode follower 812, the second input thereto representing $Vm(7)$. The output from switch 835 becomes $$2Xm \cdot Vm(7)$$

Switches 836 and 837 receive their second inputs from cathode followers 814 and 815, respectively, which inputs represent $2Vs(7)$ and $\overline{V}(7)$, respectively. The outputs from switches 836 and 837 are signals representing $2Xm \cdot 2Vs(7)$ and $2Xm \cdot \overline{V}(7)$, respectively.

Signals representing $2Xl(7)$ and $\overline{V}(7)$ are supplied by way of cathode followers 819 and 815, respectively, to a switch 919. These signals produce an output from the switch representing $2Xl \cdot \overline{V}(7)$.

The signals representing $3X(7)$ are supplied through cathode follower 820 to each of the switches 838, 839 and 840. The second input to switch 838 is a signal representing $Vs(7)$ supplied by way of cathode follower 810. Thus the output from switch 838 represents $3X \cdot Vs(7)$. The second inputs to the switches 839 and 840 are signals representing $2Vs(7)$ and $\overline{V}(7)$, respectively, these signals being supplied by way of cathode followers 814 and 815, respectively. The output from switch 839 will be a signal representing $3X \cdot 2Vs(7)$. Switch 840 will produce an output representing $3X \cdot \overline{V}(7)$.

The signals representing $Z(7)$ are supplied through cathode follower 821 to each of the switches 841, 842, 843 and 844. The second input to switch 841 is a signal representing $Vs(7)$ which is supplied by way of cathode follower 810. The output from switch 841 will be a signal representing $Z \cdot Vs(7)$. Signals representing $Vm(7)$ are supplied by way of cathode follower 812 to serve as a second input to switch 842, thus producing as an output from this switch a signal representing $Z \cdot Vm(7)$. The second input to switch 843 will be a signal representing $Vl(7)$ which is supplied by way of cathode follower 813. The output from switch 843 therefore becomes $Z \cdot Vl(7)$. The switch 844 is adapted to receive the $\overline{V}(7)$ signals by way of cathode follower 815. The output from switch 844 is a signal representing $Z \cdot \overline{V}(7)$.

Figure 18:
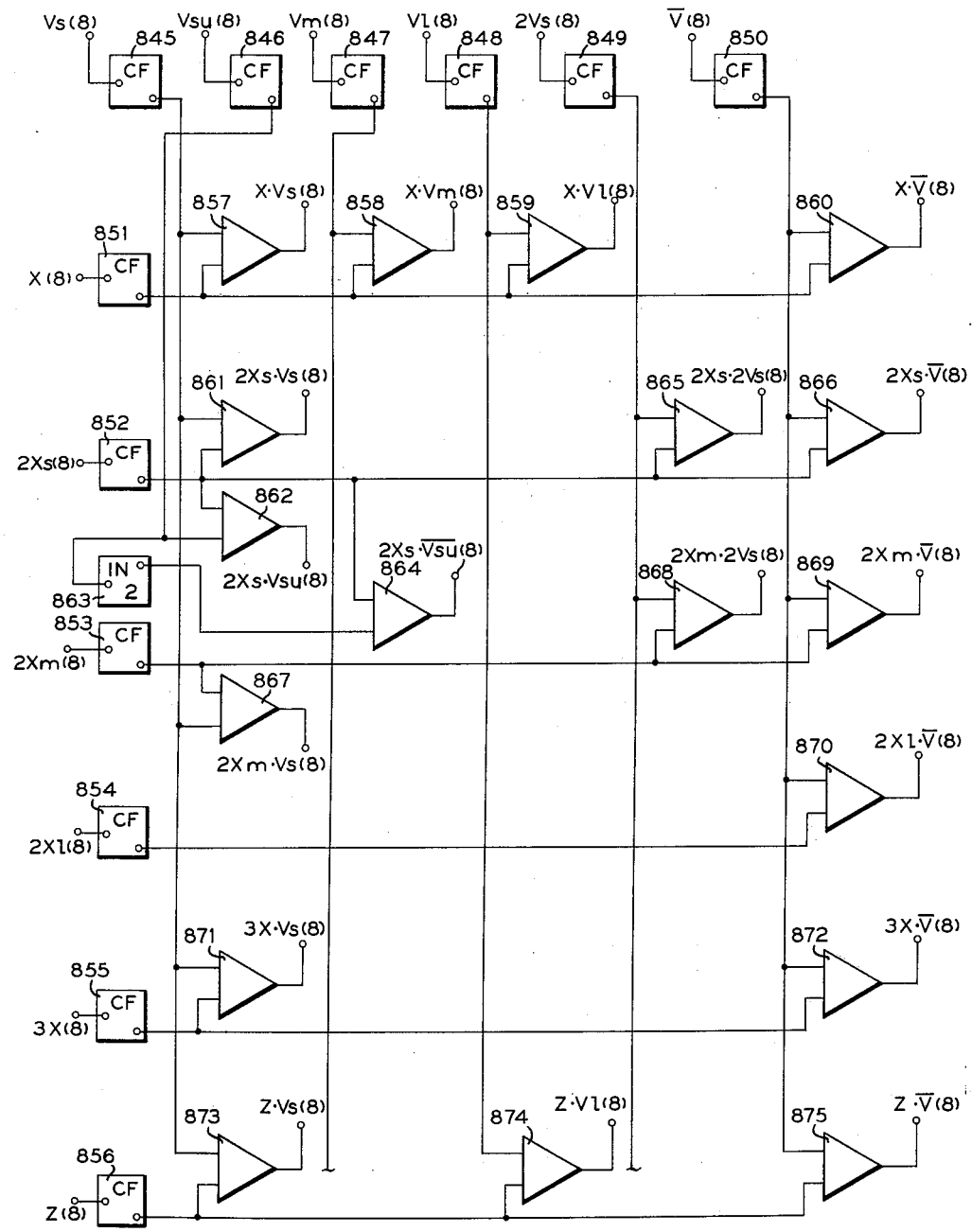

The outputs from position eight of each of the shift registers in FIGS. 7a and 7b are supplied to the matrix arrangement shown in FIG. 18. Thus signals representing $Vs(8)$, $Vsu(8)$, $Vm(8)$, $Vl(8)$, $2Vs(8)$, $\overline{V}(8)$, $X(8)$, $2Xs(8)$, $2Xm(8)$, $2Xl(8)$, $3X(8)$ and $Z(8)$ are supplied to cathode followers 845, 846, 847, 848, 849, 850, 851, 852, 853, 854, 855 and 856, respectively. A plurality of switches are provided, each of which is adapted to receive two inputs, one of the inputs coming from one of the cathode followers 845 through 850 and the other of the inputs coming from one of the cathode followers 851 through 856.

Those signals representing $X(8)$ are supplied through cathode follower 851 to each of the switches 857, 858, 859 and 860. The second input to switch 857 is a signal representing $Vs(8)$ which is supplied through cathode follower 845 to the switch. The output from the switch therefore becomes $X \cdot Vs(8)$. The signal representing $Vm(8)$ are supplied by way of cathode follower 847 to serve as a second input to switch 858 thereby producing as an output from the switches a signal representing $X \cdot Vm(8)$. Signals representing $Vl(8)$ are supplied by way of cathode follower 848 to the switch 859, thereby producing an output from the switch representing $V \cdot Vl(8)$. Switch 860 is adapted to receive its second input from cathode follower 850, this input representing $\overline{V}(8)$. The output from switch 860 is a signal representing $X \cdot \overline{V}(8)$.

The signals representing $2Xs(8)$ are supplied to cathode follower 852, the output therefrom being supplied as the first input to each of the switches 861, 862, 864, 865 and 866. The second input to the switch 861 is a signal representing $Vs(8)$ which is supplied by way of cathode follower 845 to the switch. The output from switch 861 will be a signal representing $2Xs \cdot Vs(8)$. The signal $Vsu(8)$ is supplied by way of cathode follower 846 to the switch 862, thereby producing an output from the switch representing $2Xs \cdot Vsu(8)$. If a signal representing $Vsu(8)$ is not present, the output from cathode follower 846 will be relatively negative so that when this voltage is supplied through an inverter 863 to the switch 864, the second input to the switch will be relatively positive. Thus an output signal will be produced representing $2Xs \cdot \overline{Vsu}(8)$. Signals representing $2Vs(8)$ and $\overline{V}(8)$ are supplied as second inputs to switches 865 and 866, respectively. The output from switch 865 therefore becomes $2Xs \cdot 2\overline{V}s(8)$ while the output from switch 866 becomes $2Xs \cdot \overline{V}(8)$.

Those signals representing $2Xm(8)$ are supplied by way of cathode follower 853 to each of the switches 867, 868 and 869. The second input to switch 867 is the signal representing $Vs(8)$, thereby producing as an output from this switch a signal representing $2Xm \cdot Vs(8)$. The second input to switch 868 is a signal representing $2Vs(8)$, this signal being supplied through cathode follower 849. The output from switch 868 will be a signal representing $2Xm \cdot 2Vs(8)$. The second input to switch 869 is a signal $\overline{V}(8)$ supplied thereto by way of cathode follower 850, thus producing an output to the switch representing $2Xm \cdot \overline{V}(8)$.

Signals representing $2Xl(8)$ and $\overline{V}(8)$ are supplied by way of cathode followers 854 and 850, respectively, to serve as the two inputs to switch 870. The output from this switch will be a signal representing $2Xl \cdot \overline{V}(8)$.

The signals representing $3X(8)$ are supplied through cathode follower 855 to each of the switches 871 and 872. Output signals representing $Vs(8)$ and $\overline{V}(8)$ are supplied by way of cathode followers 845 and 850, to the switches 871 and 872, respectively. The output from switch 871 therefore becomes $3X \cdot Vs(8)$ while the output from switch 872 becomes $3X \cdot \overline{V}(8)$.

Those signals representing $Z(8)$ which are supplied through cathode follower 856 to each of switches 873, 874 and 875. The second input to switch 873 is a signal representing $Vs(8)$ so that an output is produced from the switch representing $\overline{X} \cdot Vs(8)$. The second input to switch 874 is a signal representing $Vl(8)$ and will allow an output to be produced from the switch 874 representing $Z \cdot Vl(8)$. Signals representing $\overline{V}(8)$ are supplied by way of cathode follower 850 to switch 875, thus producing an output from the switch representing $Z \cdot \overline{V}(8)$.

Figure 19:
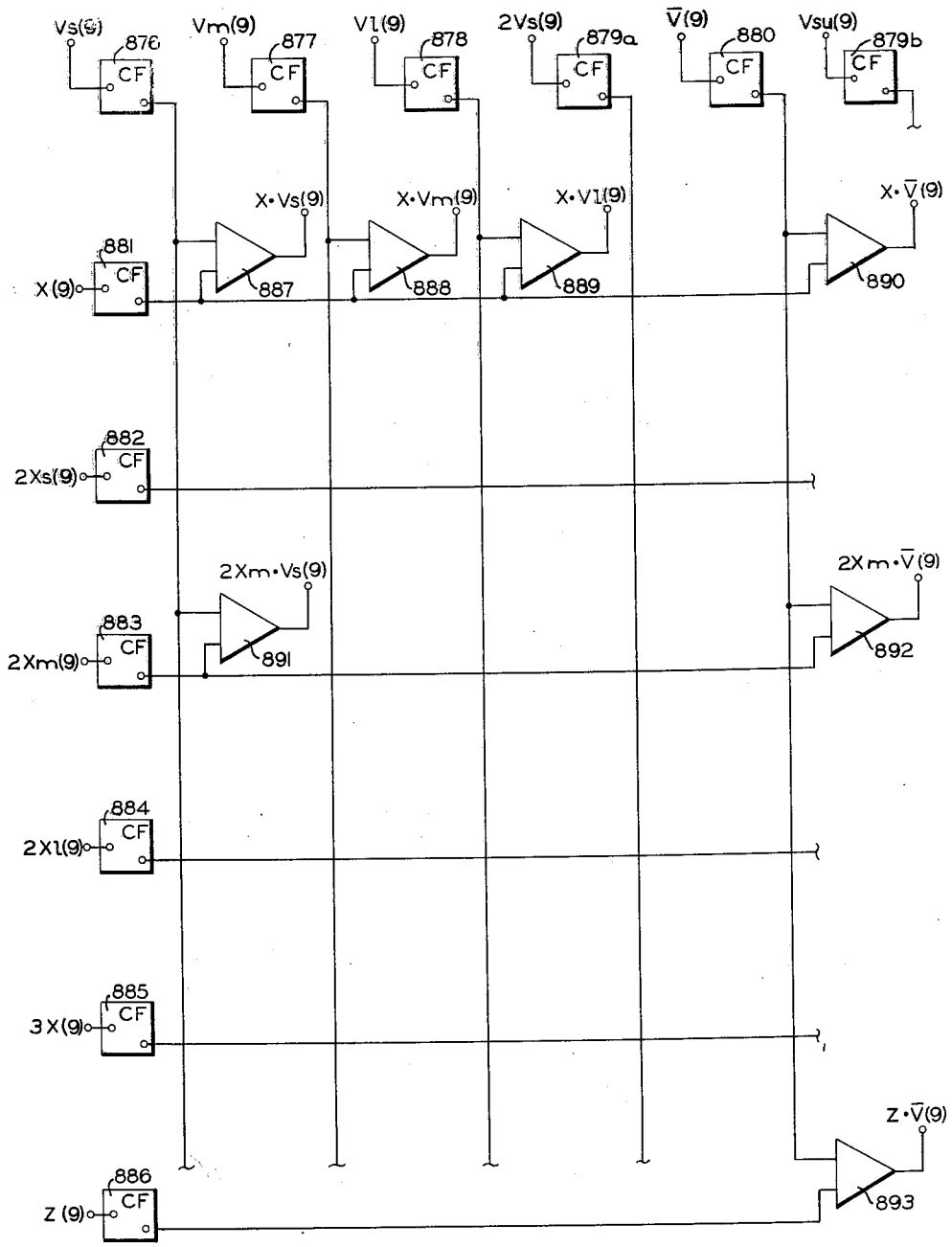

Reference is now made to FIG. 19. The inputs to the circuits shown herein are adapted to be supplied from position nine of each of the shift registers shown is FIGS. 7a and 7b. Thus output signals representing $Vs(9)$, $Vsu(9)$, $Vm(9)$, $Vl(9)$, $2Vs(9)$, $\overline{V}(9)$, $X(9)$, $2Xs(9)$, $2Xm(9)$, $2Xl(9)$, $3X(9)$ and $Z(9)$ are supplied to cathode followers 876, 879b, 877, 878, 879a, 880, 881, 882, 883, 884, 885 and 886, respectively.

Those signals representing $X(9)$ are supplied by way of cathode follower 881 to each of a plurality of switches 887, 888, 889 and 890. The second input to switch 887 arrives by way of cathode follower 876 and represents a signal $Vs(9)$. This produces an output for switch 887 representing $X \cdot Vs(9)$. The second input to switch 888 is a signal representing $Vm(9)$, which is supplied by way of cathode follower 877. The output of switch 888 becomes $X \cdot Vm(9)$. Switches 889 and 890 are adapted to receive signals representing $Vl(9)$ and $\overline{V}(9)$, respectively, which are supplied by way of cathode followers 878 and 880, respectively. The respective outputs from switches 889 and 890 are signals representing $X \cdot Vl(9)$ and $X \cdot \overline{V}(9)$.

Signals representing $2Xm(9)$ are supplied through cathode follower 883 to each of the switches 891 and 892. The second input to switch 891 is a signal representing $Vs(9)$ which is supplied by way of cathode follower 876. The output from switch 891 will be a signal representing $2Xm \cdot Vs(9)$. Signals representing $\overline{V}(9)$ are supplied through cathode follower 880 to the switch 892, thus allowing this switch to produce an output representing $2Xm \cdot \overline{V}(9)$. The signal representing $Z(9)$ is supplied through cathode follower 886 to serve as a first input to switch 893. The other input to this switch being a signal representing $\overline{V}(9)$ which is supplied by way of cathode follower 880. Thus the output from this switch becomes $Z \cdot \overline{V}(9)$. It is seen that the signals representing $Vsu(9)$, $2Vs(9)$, $2Xs(9)$, $2Xl(9)$ and $3X(9)$ are not utilized in the present embodiment. This does not mean, however, that in handling other types of characters that such outputs would not be utilized.

Figure 20:
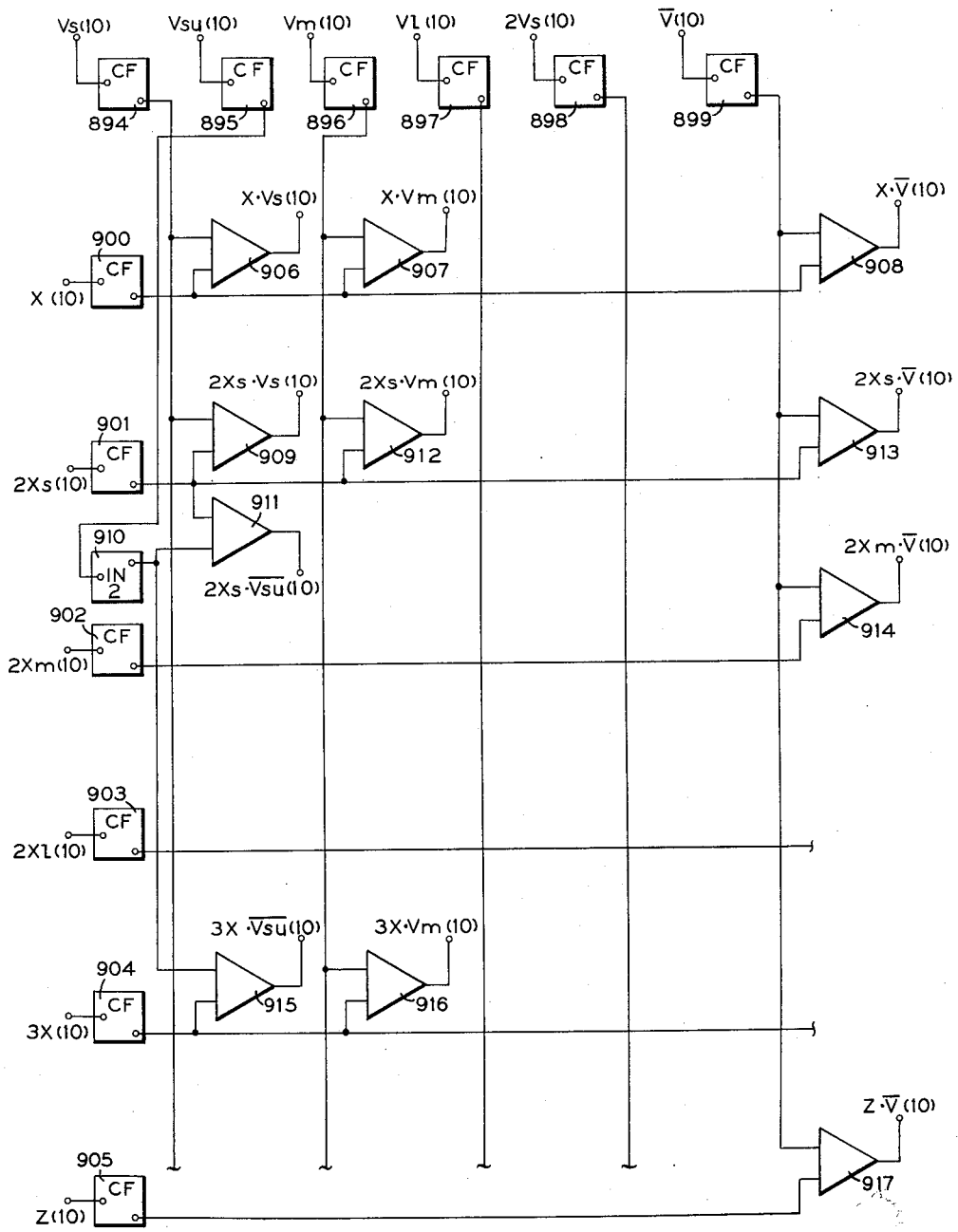

Reference is now made to FIG. 20. The circuit shown is adapted to receive outputs from position ten of each of the shift registers shows in FIGS. 7a and 7b. Thus signals representing $Vs(10)$, $Vsu(10)$, $Vm(10)$, $Vl(10)$, $2Vs(10)$, $\overline{V}(10)$, $X(10)$, $2Xs(10)$, $2Xm(10)$, $2Xl(10)$, $3X(10)$ and $Z(10)$ are respectively supplied to cathode followers 894, 895, 896, 897, 898, 899, 900, 901, 902, 903, 904 and 905.

A plurality of switches are arranged such that two inputs are supplied to each. One of the inputs being supplied from one of the cathode followers 894 through 899 and the other input being supplied from one of the cathode followers 900 through 905. The signals representing X(10) are supplied through cathode follower 900 to each of the switches 906, 907 and 908. The second input to switch 906 is a signal representing $Vs(10)$ which is supplied thereto by way of cathode follower 894, the output from switch 906 representing $X \cdot Vs(10)$. The signal representing $Vm(10)$ is supplied as a second input to switch 907 by way of cathode follower 896, thus allowing the output from switch 907 to represent $X \cdot Vm(10)$. Switch 908 receives its second input from cathode follower 899, the second input representing $\overline{V}(10)$. The output from switch 908 therefore becomes $X \cdot \overline{V}(10)$.

The signals representing $2Xs(10)$ are supplied through cathode follower 901 to the switches 909, 911, 912 and 913. The second input to switch 909 is a signal representing $Vs(10)$ supplied by way of cathode follower 894. The output from switch 909 will be a signal representing $2Xs \cdot Vs(10)$. Switch 911 is adapted to receive its second input by way of cathode follower 895 and inverter 910. Thus if the signal $Vsu(10)$ is not present as an input to switch 895, the output from inverter 910 to the switch 911 will be relatively positive thereby allowing the switch to produce an output signal representing $2Xs \cdot \overline{Vsu}(10)$. Switches 912 and 913 are arranged to receive their inputs from cathode followers 896 and 899, the inputs representing $Vm(10)$ and $\overline{V}(10)$, respectively. The output from switches 912 and 913 will be signals representing $2Xs \cdot Vm(10)$ and $2Xs \cdot \overline{V}(10)$, respectively.

A switch 914 is arranged to receive the signals representing $2Xm(10)$ and $\overline{V}(10)$ by way of cathode followers 902 and 899, respectively. Thus the output from switch 914 will be a signal representing $2Xm \cdot \overline{V}(10)$. Switches 915 and 916 are arranged to receive a first input from cathode follower 904 representing $3X(10)$. The second inputs to switches 915 and 916 are signals representing $\overline{Vsu}(10)$ and $Vm(10)$, respectively. Thus the output from switch 915 will be a signal representing $$3X \cdot \overline{Vsu}(10)$$

while the output from switch 916 will be a signal representing $3X \cdot Vm(10)$.

A switch 917 is arranged to receive as its two input signals representing $Z(10)$ and $\overline{V}(10)$, these inputs being supplied through cathode followers 905 and 899, respectively, the output from switch 917 will be a signal representing $Z \cdot \overline{V}(10)$.

In the embodiment illustrated, the $Vl(10)$, $2Vs(10)$ and $2Xl(10)$ signals are not utilized but they may be utilized if it is desired to extend the present system to other types of characters.

Figure 21:
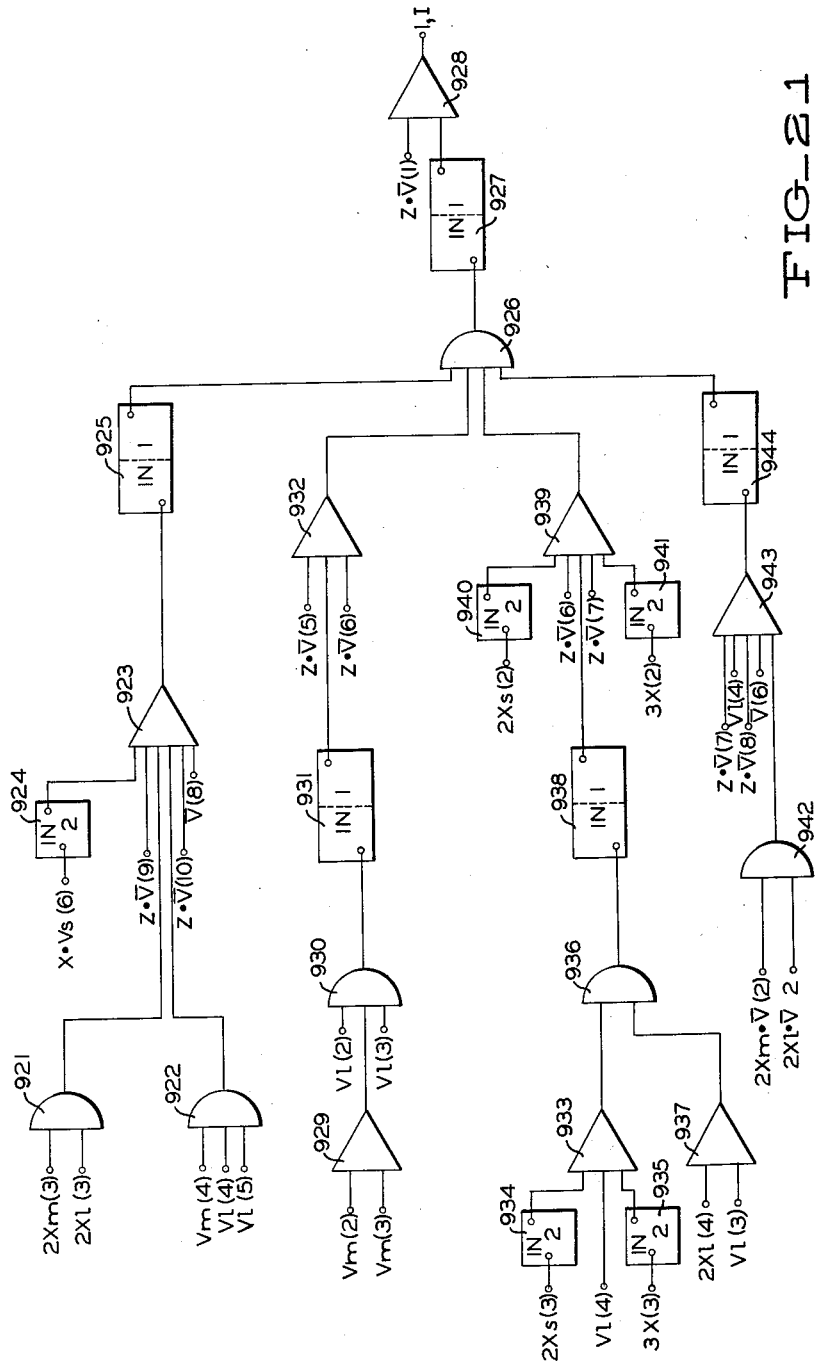

The block labeled OUTPUT CIRCUITS in FIG. 1 is comprised of the circuits found in FIGS. 21 through 58. The circuits shown in each of FIGS. 21 through 54 is used to represent a particular character, except in two instances. The circuit in FIG. 21 is used to identify either the numeral "1" or the letter "I" and the circuit in FIG. 30 is used to recognize the numeral "0" and the letter "O." Though a large number of different type fonts are to be identified, it is more practical to not attempt the distinction between these characters by the particular circuit. Input signals supplied to FIGS. 21 through 58 may be obtained from various points in the drawings already described.

Referring now to FIG. 21, there is illustrated the circuit for identifying either a numeral "1" or the letter "I." In view of the fact that a large range of type fonts may be identified, there are many alternate paths by which these characters may be recognized. The first path to be described includes a switch 923 which is adapted to receive a plurality of inputs, all of which must occur in coincidence if there is to be an output therefrom. The first input is supplied from an inverter 924 which receives as its input the signal representing $X \cdot Vs(6)$. Thus if this signal is not present as an input to inverter 924, a relatively positive voltage will be supplied to switch 923. The second input to switch 923 is a signal representing $Z \cdot \overline{V}(9)$. The third input to switch 923 comes by way of OR circuit 921. Thus if either of the inputs $2Xm(3)$ or $2Xl(3)$ are supplied to OR circuit 921, an output will be supplied to switch 923. OR circuit 922 is adapted to receive as its inputs $Vm(4)$, $Vl(4)$ and $Vl(5)$. Thus if any of these inputs are present, an output will be supplied through OR circuit 922 to switch 923. The remaining inputs to switch 923 are signals representing $Z \cdot \overline{V}(10)$ and $\overline{V}(8)$.

Assuming that the afore-mentioned inputs are present in coincidence to switch 923, an output will be supplied through a double inverter 925 and through an OR circuit 926 to a double inverter 927. The output of inverter 927 is supplied to a switch 928 which is also connected to receive a signal representing $Z \cdot \overline{V}(1)$. If the switch 928 receives the two inputs in coincidence, an output signal representing the numeral "1" or the letter "I" will be produced.

Another path by which an input signal may be supplied through switch 928 is by way of a switch 929 which is adapted to receive signals representing $Vm(2)$ and $Vm(3)$. Thus if these signals are present in coincidence, an output signal will be supplied to an OR circuit 930. This is also adapted to receive $Vl(2)$ and $Vl(3)$. Thus an output will be supplied from switch 930 in the event there is the presence of a signal representing $Vl(2)$, or a signal representing $Vl(3)$, or signals representing $Vm(2)$ and $Vm(3)$. The output of OR circuit 930 is supplied through a double inverter 931 to serve as one input to a switch 932. The other inputs to this switch being signals representing $Z \cdot \overline{V}(5)$ and $Z \cdot \overline{V}(6)$. The output from switch 932 is supplied through OR circuit 926 and through the remainder of the circuit as previously described to provide identification signals. A third alternate way of identifying the numeral "1" or the letter "I" is by way of a circuit which comprises a switch 933 which is adapted to receive three inputs. The first input is by way of an inverter 934 which is adapted to receive $2Xs(3)$. The second input $Vl(4)$ is supplied directly to switch 933 and a third input $3X(3)$ is supplied through an inverter 935 to the switch. Thus switch 933 will produce an output in the event $2Xs(3)$ is not present, and $Vl(4)$ is present and $3X(3)$ is not present. The signal supplied from switch 933 could be written as $\overline{2Xs}(3) \cdot Vl(4) \cdot \overline{3X}(3)$. The output from switch 933 is supplied through an OR circuit 936 which will also receive an output from a circuit 937. The inputs to this switch are $2Xl(4)$ and $Vl(3)$. If these two inputs are presented to switch 937, an output may be provided to OR circuit 936. Thus if either of switches 933 or 937 produce an output, an input will be supplied through the double inverter 938 to a switch 939. This switch is adapted to receive inputs from several sources. A signal representing $2Xs(2)$ is supplied to an inverter 940. If this signal is not present, an output from inverter 940 representing $\overline{2Xs}(2)$ will be supplied to switch 939. Another input to this switch is $Z \cdot \overline{V}(6)$. Another input to the switch is $Z \cdot \overline{V}(7)$. The last input supplied to switch 939 is $\overline{3X}(2)$. This input is obtained by connecting an inverter 941 to receive signals representing $3X(2)$. Thus if a signal representing $3X(2)$ is not present the output from inverter 941 will be relatively positive representing $\overline{3X}(2)$. If the following inputs to switch 939 are relatively positive in coincidence, an output is supplied through OR circuit 926 and through the remainder of the circuit to produce identification signals. The next alternate path for producing identification signal requires that either $2Xm \cdot \overline{V}(2)$ or $2Xl \cdot \overline{V}(2)$ be supplied to an inverter 942. If either one of these signals is present, an input will be supplied to a switch 943. Other inputs to this switch are output signals representing $Z \cdot \overline{V}(7)$, $Vl(4)$, $Z \cdot \overline{V}(8)$ and $\overline{V}(6)$. In the event switch 943 receives all of its inputs in coincidence, an output signal supplied therefrom through a double inverter 944 to OR circuit 926 will supply an input to the remainder of the circuit to produce an identification signal.

Figure 22:
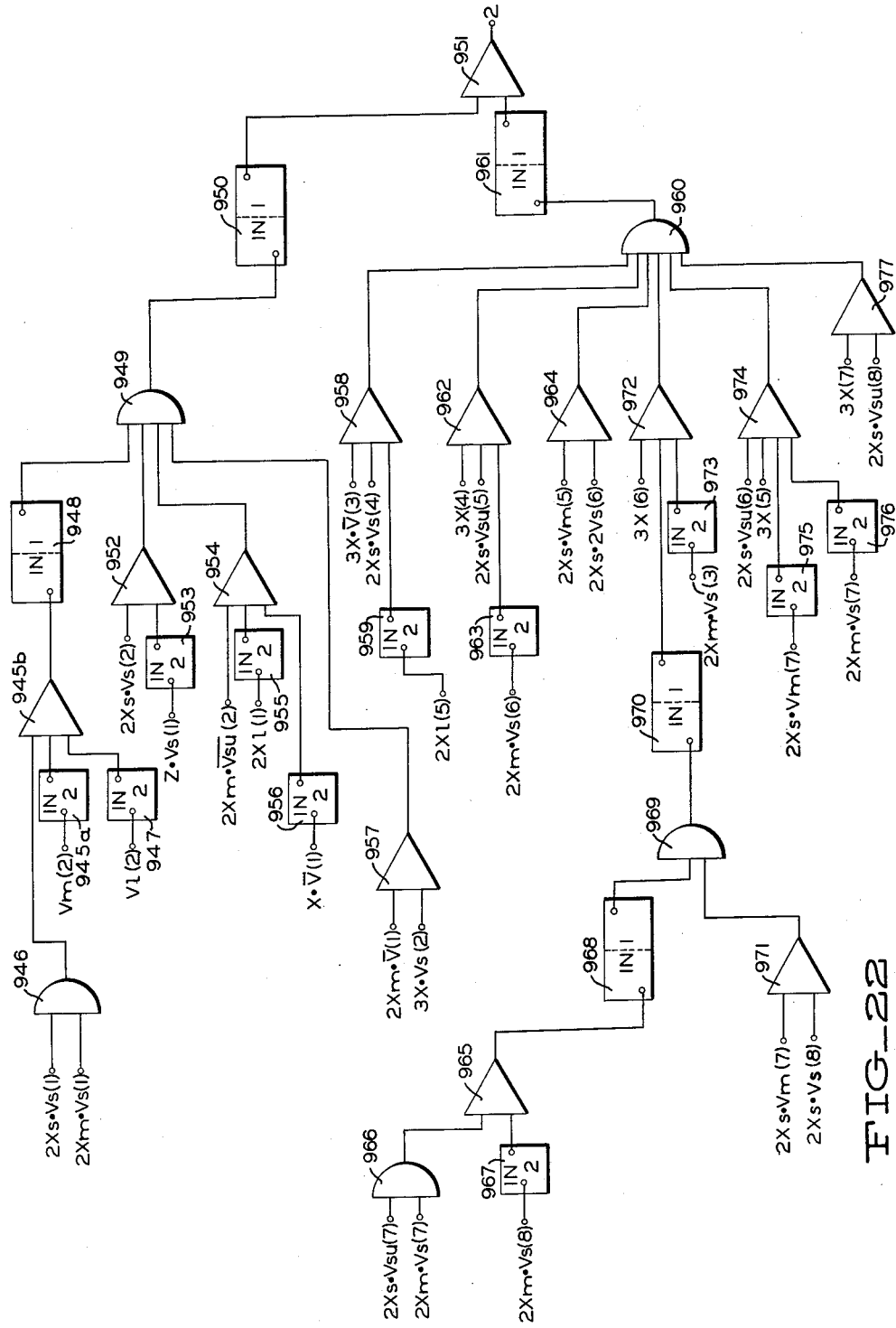

References now made to FIG. 22 show the circuitry used for identifying the character two. There are several alternate paths for identifying the character two. Referring to a switch 945b, it is seen that this switch is adapted to receive signals representing either $2Xs \cdot Vs(1)$ or $2Xm \cdot Vs(1)$ by way of an OR circuit 946. This switch is also adapted to receive a signal representing $\overline{Vm}(2)$ by way of an inverter 945a. That is, if a signal representing $Vm(2)$ is not present as an input to the inverter 945a an output representing $\overline{Vm}(2)$ will be supplied as a relatively positive voltage to switch 945b from the inverter 945a. Another input to switch 945b is $\overline{Vl}(2)$. This input is received from an inverter 947 which is connected to the line supplying signals representing $Vl(2)$. Thus if a signal representing $Vl(2)$ is not present, the output from inverter 947 will be relatively positive and will represent $\overline{Vl}(2)$. In the event of the coincidence of the inputs to switch 945b, an output will be supplied therefrom through a double inverter 948 and an OR circuit 949 to a double inverter 950. The output of this inverter is supplied to a switch 951.

It is seen that OR circuit 949 may receive as many as three other inputs. This means that there are alternate paths other than that just described for producing an output from OR circuit 949. A second path may be by way of a switch 952 which is adapted to receive signals representing $2Xs \cdot Vs(2)$ and $\overline{Z \cdot Vs}(1)$. The latter signal is produced by an inverter 953 which is connected to receive $Z \cdot Vs(1)$. Thus if a relatively positive voltage is not supplied to inverter 953, it will supply a relatively positive voltage to switch 952. In the event of the coincidence of inputs to switch 952, an output signal will be supplied to the OR circuit 949 and on to the switch 951 as previously described. A third path to OR circuit 949 is by way of a switch 954. This switch is adapted to receive the signal representing $2Xm \cdot \overline{Vsu}(2)$. A second input is received from an inverter 955, which inverter receives the signal representing $2Xl(1)$. In the event an input is not provided to inverter 955, the output therefrom will be relatively positive to the switch and will represent $\overline{2Xl}(1)$. The third input to switch 954 comes from an inverter 956 which is connected to receive as its input a signal representing $X \cdot \overline{V}(1)$. Thus if switch 956 does not receive an input, the output therefore will be relatively positive and will represent $\overline{X \cdot V}(1)$. The output from switch 954 is supplied to OR circuit 949 and is used as before to supply an input to switch 951. The fourth input to the OR circuit 949 will be by way of a switch 957 which in order to provide an output must receive signals representing $2Xm \cdot \overline{V}(1)$ and $3X \cdot Vs(2)$.

There has now been described the manner in which a first input may be supplied to switch 951 by any of several alternate paths. The other input to switch 951 will now be described. Referring to a switch 958, input signals representing $3X \cdot \overline{V}(3)$ as well as $2Xs \cdot Vs(4)$ are adapted to be supplied there. The third input comes from in inverter 959 which is adapted to receive as its input $2Xl(5)$. In the event inverter 959 does not receive a relatively positive input signal, the output therefrom will be relatively positive and will represent $\overline{2Xl}(5)$. The output from switch 958 is adapted to be supplied to an OR circuit 960 and a double inverter 961 to serve as a second input to switch 951.

An alternate way of getting a second input to switch 951 is by way of switch 962. This switch is to receive signals representing $3X(4)$ and $2Xs \cdot Vsu(5)$. A third input to switch 962 comes by way of an inverter 963 which is adapted to receive a signal representing $2Xm \cdot Vs(6)$. Thus if inverter 963 does not receive an input signal, it will produce a relatively positive output voltage to the switch representing $\overline{2Xm \cdot Vs}(6)$. The output from switch 962 is adapted to be supplied through OR circuit 960 and inverter 961 which serves as a second input to switch 951.

A switch 964 is arranged to receive as inputs $2Xs \cdot Vm(5)$ and $2Xs \cdot 2Vs(6)$. Thus if these two inputs are in coincidence, an output is supplied from the switch to OR circuit 960 and an inverter 961 to the switch 951. A fourth input to OR circuit 960 is adapted to be supplied in the manner now to be described. There is provided a switch 965 which is adapted to receive signals representing either $2Xs \cdot Vsu(7)$ or $2Xm \cdot Vs(7)$ by way of an OR circuit 966. The other input to switch 965 represent $\overline{2Xm \cdot Vs}(8)$. The input will be received from an inverter 967 which will use as its inputs $2Xm \cdot Vs(8)$. The output of switch 965 is supplied through a double inverter 968 to an OR circuit 969, the output of the OR circuit being supplied through a double inverter 970 to a switch 972.

An alternate way of obtaining an input through OR circuit 969 is by way of a switch 971 which, in order to provide a signal to the OR circuit 969, must receive signals representing $2Xs \cdot Vm(7)$ and $2Xs \cdot Vs(8)$ in coincidence.

Switch 972 is adapted to receive signals representing $3X(6)$ and $\overline{2Xm \cdot Vs}(3)$. The last-mentioned signal is obtained from inverter 973 which is connected to receive as an input signals representing $2Xm \cdot Vs(3)$. Thus if a signal representing $2Xm \cdot Vs(3)$ is not supplied to inverter 973, the output of inverter 973 will be relatively positive representing $\overline{2Xm \cdot Vs}(3)$.

The output from switch 972 is supplied through OR circuit 960 and inverter 961 to serve as the second input to switch 951.

Another alternate input to OR circuit 960 may be by way of switch 974 which is arranged to receive input signals representing $2Xs \cdot Vsu(6)$ and $3X(5)$. Another input to switch 974 is a signal representing $\overline{2Xs \cdot Vm}(7)$ from an inverter 975, the input to this inverter being a signal representing $2Xs \cdot Vm(7)$. Thus if the input to inverter 975 is relatively negative representing the fact that a positive signal is not supplied, the output will be relatively positive. The remaining input to switch 974 represents $\overline{2Xm \cdot Vs}(7)$ and is supplied by way of an inverter 976. The input to the inverter being a signal representing $2Xm \cdot Vs(7)$. In the event of a relatively positive input on all input lines to switch 974, an output is provided therefrom to circuit 960. The final alternate input to OR circuit 960 is provided by way of a switch 977 which is adapted to receive as inputs $3X(7)$ and $2Xs \cdot Vsu(8)$.

If and when the two inputs to switch 951 occur in coincidence, an output signal representing the character two is produced.

Figure 23:
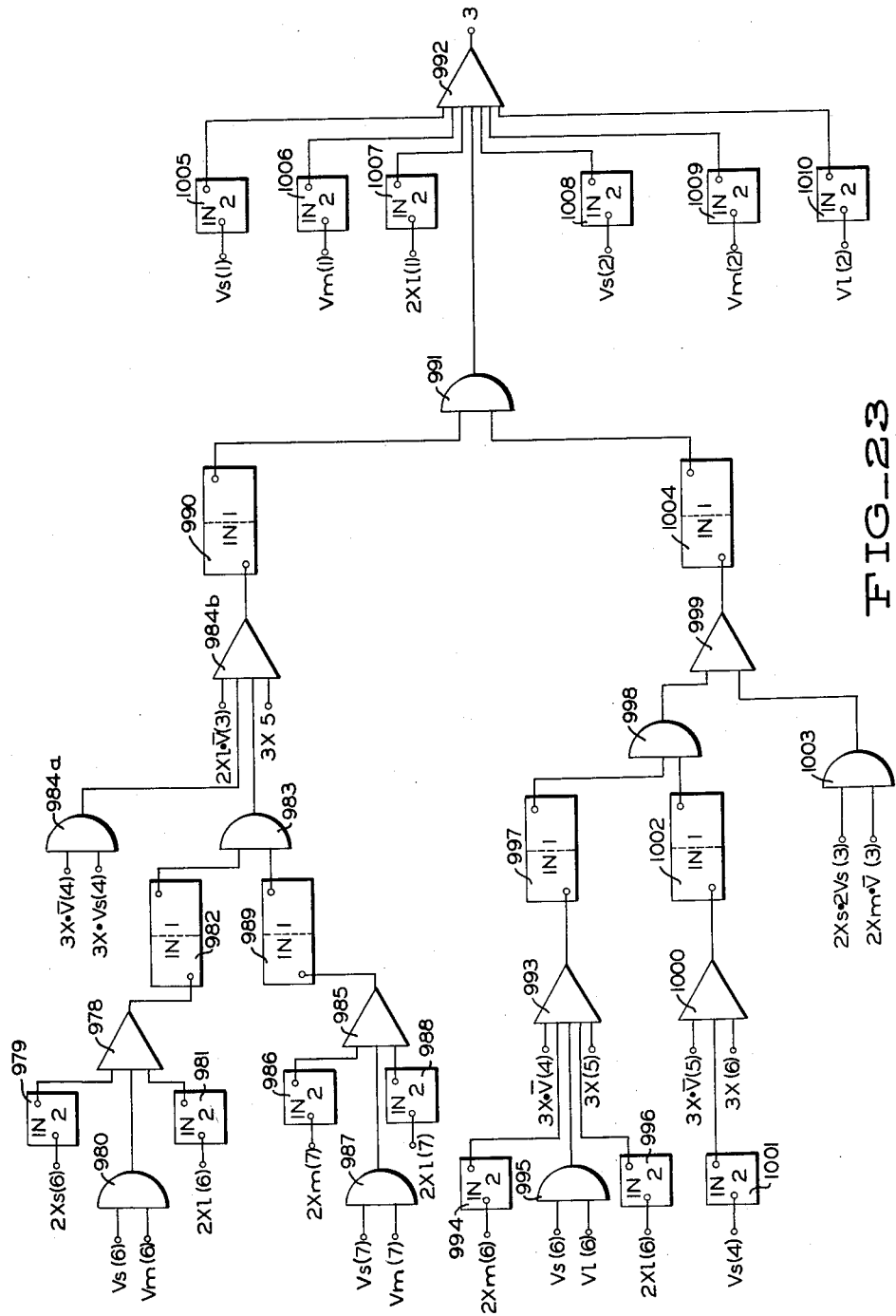

Reference is now made to FIG. 23 which discloses the circuit for identifying the numeral three. A switch 978 is provided in this circuit which is adapted to receive as inputs $\overline{2Xs}(6)$ from an inverter 979, $Vs(6)$ or $Vm(6)$ from an OR circuit 980 and $\overline{2Xl}(6)$ from an inverter 981. Thus if inverters 979 and 981 do not receive relatively positive input signals and if OR circuit 980 receives either one of the two possible input signals, an output is supplied from switch 978 through a double inverter 982 to an OR circuit 983. The output from this OR circuit being supplied to a switch 984. An alternate way of getting an input from OR circuit 983 to the switch 984 is by way of a switch 985 which is adapted to receive a signal representing $\overline{2Xm}(7)$ from an inverter 986, either a signal $Vs(7)$ or a signal $Vm(7)$ from an OR circuit 987 and a signal representing $\overline{2Xl}(7)$ from an inverter 988. In the event of relatively positive inputs to switch 985, an output is supplied therefrom through a double inverter 989 to the OR circuit 983.

Switch 984b is adapted to receive additional inputs, which inputs are signals representing $2Xl \cdot \overline{V}(3)$ and $3X(5)$. Another input to switch 984b is supplied by way of OR circuit 984a which is adapted to receive $3X \cdot \overline{V}(4)$ and $3X \cdot Vs(4)$. Thus if either of these signals are supplied to OR circuit 984a, an output is provided to switch 984b. The output of switch 984b is supplied through a double inverter 990 and an OR circuit 991 to serve as a first input to a switch 992.

There is an alternate way of obtaining this first input to switch 992 which will now be described. Referring to a switch 993, it is seen that this switch is adapted to receive signals representing $3X \cdot \overline{V}(4)$ and $3X(5)$. Additional inputs to this switch are $\overline{2Xm}(6)$, supplied by way of inverter 994, $Vs(6)$ or $Vl(6)$, supplied by way of OR circuit 995 and $\overline{2Xl}(6)$, which is supplied from inverter 996. The output of switch 993 is supplied through a double inverter 997 through an OR circuit 998 to a switch 999. An alternate way of getting this same input to switch 999 is by way of a switch 1000 which is adapted to receive signals representing $3X \cdot \overline{V}(5)$, $3X(6)$, and $\overline{Vs}(4)$, the last-mentioned signal being supplied from an inverter 1001. The output of switch 1000 is supplied through a double inverter 1002 and the OR circuit 998 to switch 999. The second input to switch 999 will be a signal representing either $2Xs \cdot 2Vs(3)$ or $2Xm \cdot \overline{V}(3)$, which is supplied by way of OR circuit 1003. The output of switch 999 is supplied by way of a double inverter 1004 and OR circuit 991 to serve as the afore-mentioned first input to switch 992. Additional inputs required by switch 992 are $\overline{Vs}(1)$, $Vm(1)$, $\overline{2Xl}(1)$, $\overline{Vs}(2)$, $\overline{Vm}(2)$ and $\overline{Vl}(2)$, these inputs being supplied from inverters 1005, 1006, 1007, 1008, 1009 and 1010, respectively. As before, each of the inverters which is supplying the negation of a particular signal is adapted to receive a relatively positive voltage any time the signal is present. That is, for inverter 1005 to produce an output representing $\overline{Vs}(1)$, it receives as its input $Vs(1)$. Thus if $Vs(1)$ is not provided as an input to inverter 1005, the output therefrom will be relatively positive and will represent $\overline{Vs}(1)$.

Figure 24:
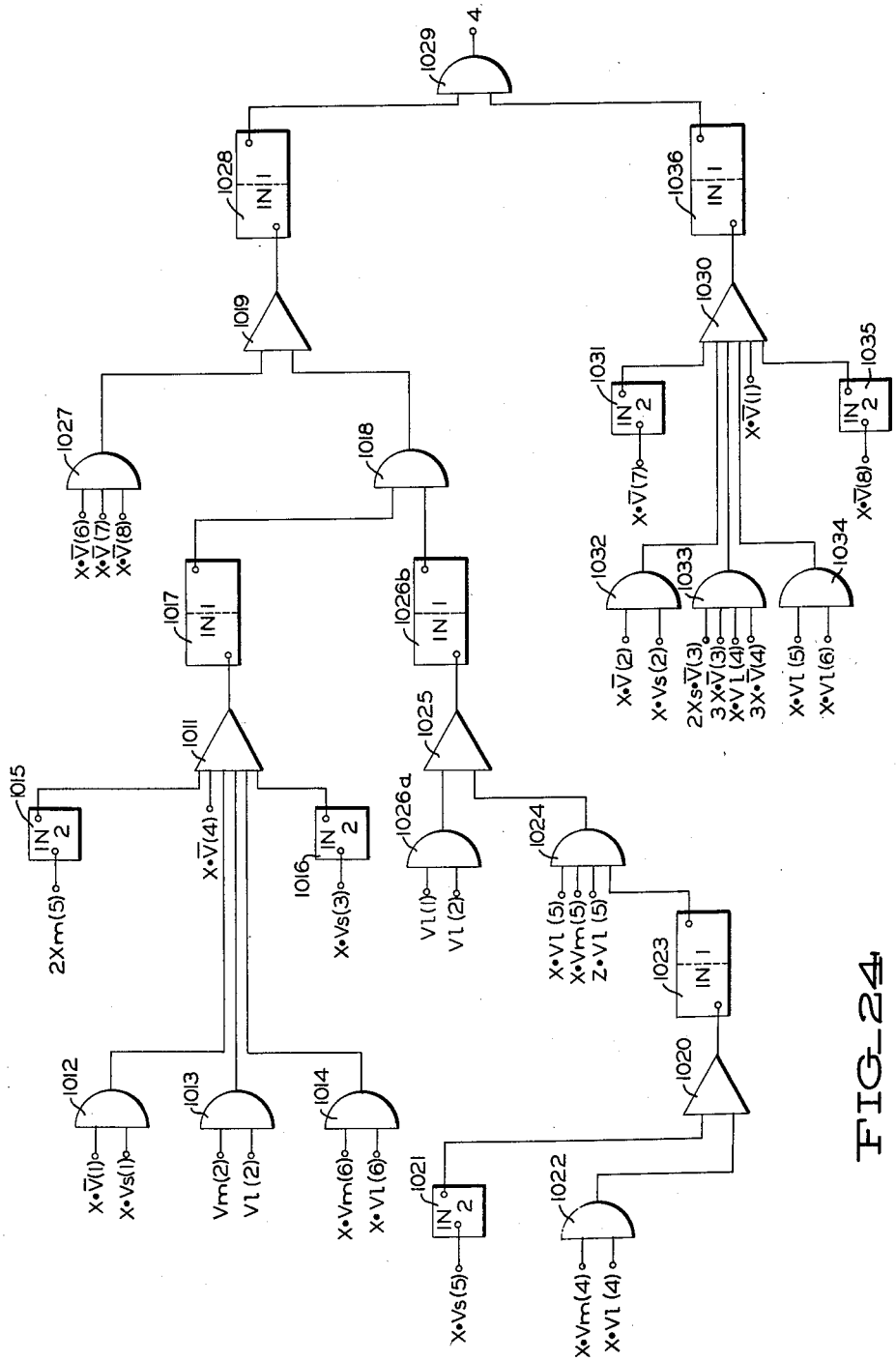

Referring to FIG. 24, there is illustrated the logical circuitry used in identifying the character four. Reference is made to a switch 1011 which is connected to receive either $X \cdot \overline{V}(1)$ or $X \cdot Vs(1)$ from an OR circuit 1012, and either $Vm(2)$ or $Vl(2)$ from an OR circuit 1013, and either $X \cdot Vm(6)$ or $X \cdot Vl(6)$ from an OR circuit 1014. An additional input to this switch is from an inverter 1015. This inverter will supply a relatively positive voltage representing $\overline{2Xm}(5)$ in the event there is not provided a signal representing $2Xm(5)$ to the inverter. Another input to switch 1011 is a signal representing $X \cdot \overline{V}(4)$. The last input to switch 1011 is supplied from an inverter 1016. If there is the absence of a signal representing $X \cdot Vs(3)$ through the inverter, the output therefrom will be a relatively positive voltage representing $\overline{X \cdot Vs}(3)$. The output of switch 1011 is supplied through a double inverter 1017 and an OR circuit 1018 to a switch 1019.

There is an alternate path for producing this input to switch 1019. Reference is made to a switch 1020 which is adapted to receive $\overline{X \cdot Vs}(5)$ from an inverter 1021 and either $X \cdot Vm(4)$ or $X \cdot Vl(4)$ from the OR circuit 1022. The output from 1020 is supplied to a double inverter 1023 to an OR circuit 1024 to serve as one input to a switch 1025. The same input to switch 1025 may be provided by supplying signals $X \cdot Vl(5)$, $X \cdot Vm(5)$ or $Z \cdot Vl(5)$ to the OR circuit 1024. The second input to switch 1025 may be either $Vl(1)$ or $Vl(2)$ which are supplied from OR circuit 1026a. The output from switch 1025 is supplied through a double inverter 1026b and an OR circuit 1018 to the switch 1019. The second input to switch 1019 may be either $X \cdot \overline{V}(6)$, $X \cdot \overline{V}(7)$ or $X \cdot \overline{V}(8)$, these inputs being supplied through an OR circuit 1027 to the switch 1019. The output of switch 1019 is adapted to be supplied through a double inverter 1028 to the OR circuit 1029 and in the event one of the positive voltages is supplied to the OR circuit 1029, an output signal representing the character four will be provided.

An alternate route for providing an output signal from the OR circuit 1029 may be by way of a switch 1030. The first input to this switch is $X \cdot \overline{V}(7)$ which is supplied from an inverter 1031. The second input to switch 1030 may be either $X \cdot \overline{V}(2)$ or $X \cdot Vs(2)$ which are supplied from OR circuit 1032. An OR circuit 1033 is arranged to receive as inputs either $2Xs \cdot \overline{V}(3)$, $3X \cdot \overline{V}(3)$, $X \cdot Vl(4)$ or $3X \cdot \overline{V}(4)$. The output of this OR circuit is supplied to switch 1030. An OR circuit 1034 is arranged to receive either signals representing $X \cdot Vl(5)$ or $X \cdot Vl(6)$. The output of this OR circuit being supplied to switch 1030 as well. Another input to switch 1030 is a signal representing $X \cdot \overline{V}(1)$. The last signal required by switch 1030 is the absence of the input signal $X \cdot V(8)$ which is supplied to inverter 1035. That is, if there is an absence of this input signal to the inverter, a relatively positive voltage is supplied to switch 1030. The output of this switch being supplied through a double inverter 1036 and through an OR circuit 1029 to provide a signal representing the identity of the character four.

Figure 25:
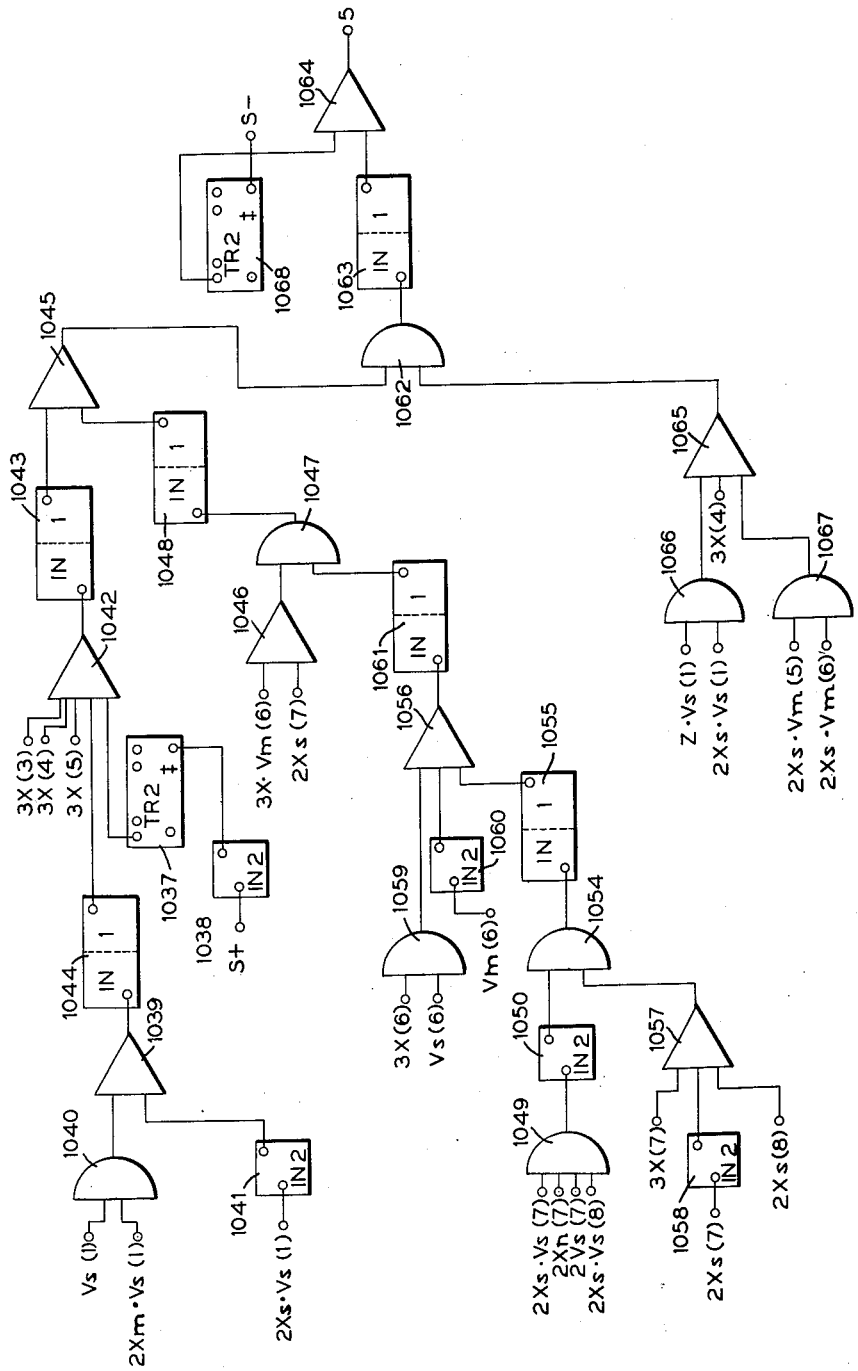

Reference is now being made to FIG. 25 which illustrates the logical circuit utilized to identify the character "5."

There is provided an OR circuit 1040 which is adapted to receive signals representing $Vs(1)$ and $2Xm \cdot Vm(1)$. The output of this OR circuit is supplied as one input to a switch 1039. The other input to this switch is a signal from the inverter 1041, which represents $\overline{2Xs \cdot Vs}(1)$ if the two inputs to switch 1039 occur in coincidence, an output is supplied through the double inverter 1044 to serve as one input to switch 1042. Other inputs to this switch are signals representing $3X(3)$, $3X(4)$ and $3X(5)$. The remaining input to switch 1042 is supplied from the one left side of a trigger 1037. It is seen that a signal representing S+ is supplied through the inverter 1038 to turn trigger 1037 On, the left side of the trigger will supply a relatively negative voltage to the switch 1042. Thus in order for the switch 1042 to receive a relatively positive voltage from the trigger 1037, it is necessary that a signal S+ not be received. When all of the inputs to switch 1042 are relatively positive in coincidence, an output is supplied therefrom through a double inverter 1043 to serve as one input to a switch 1045.

The method of obtaining the second input to switch 1045 will now be described. There is provided a switch 1046 which is adapted to receive signals representing $3X \cdot Vm(6)$ and $2Xs(7)$ and if these two signals are present, an output is supplied from the switch 1046 through an OR circuit 1047 and a double inverter 1048 to the switch 1045.

An alternative way of producing the second input to switch 1045 is by way of a circuit now to be described. There is provided an OR circuit 1049 which is arranged to receive signals representing $2Xs \cdot Vs(7)$, $2Xm(7)$, $2Vs(7)$ and $2Xs \cdot Vs(8)$. The output of the OR circuit is supplied through an inverter 1050 to serve as one input to an OR circuit 1054. Therefore, in order for the OR circuit to receive a relatively positive voltage from the inverter 1050, it is required that none of the inputs connected to OR circuit 1049 be received thereby.

It is seen that OR circuit 1054 is also adapted to receive another input, thus providing an alternate way of getting an input to a switch 1056. There is provided a switch 1057 which is adapted to receive signals representing $3X(7)$, $\overline{2Vs}(7)$ and $2Xs(8)$. The signal representing $\overline{2Vs}(7)$ is supplied from an inverter 1058 which will supply this signal providing a signal representing $2Vs(7)$ is not supplied as the input thereto.

The other inputs required by switch 1056 are either $3X(6)$ or $Vs(6)$, supplied from OR circuit 1059, or $\overline{Vm}(6)$, supplied from an inverter 1060. The output from switch 1056 is supplied through a double inverter 1061 and an OR circuit 1047 and a double inverter 1048 to a switch 1045. In the event of an output from switch 1045, a relatively positive signal is supplied through OR circuit 1062 and the double inverter 1063 to serve as the first input to a switch 1064. There is an alternative way of providing an input to the last-mentioned switch other than by the circuit previously described. Referring to a switch 1065, there is a switch 1065 which is adapted to receive by way of OR circuit 1066 signals representing either $Z \cdot Vs(1)$ or $2Xs \cdot Vs(1)$. Another input to the switch 1065 is the signal representing $3X(4)$. The remaining input comes from an OR circuit 1067 which receives signals representing $2Xs \cdot Vm(5)$ or $2Xs \cdot Vm(6)$. In the event of an output from switch 1065, a relatively positive voltage will be supplied through OR circuit 1062 and the double inverter 1063 to the switch 1064. In addition, it is required by switch 1064 that an S— signal must not have been seen, since the last recognition signal. Thus there is provided a trigger 1068 which will be turned ON if an S— signal is produced. However, if an S— signal is not produced, the left side of the trigger will be relatively positive and will supply an input to switch 1064. The output from this switch will represent the character "5".

Figure 26:
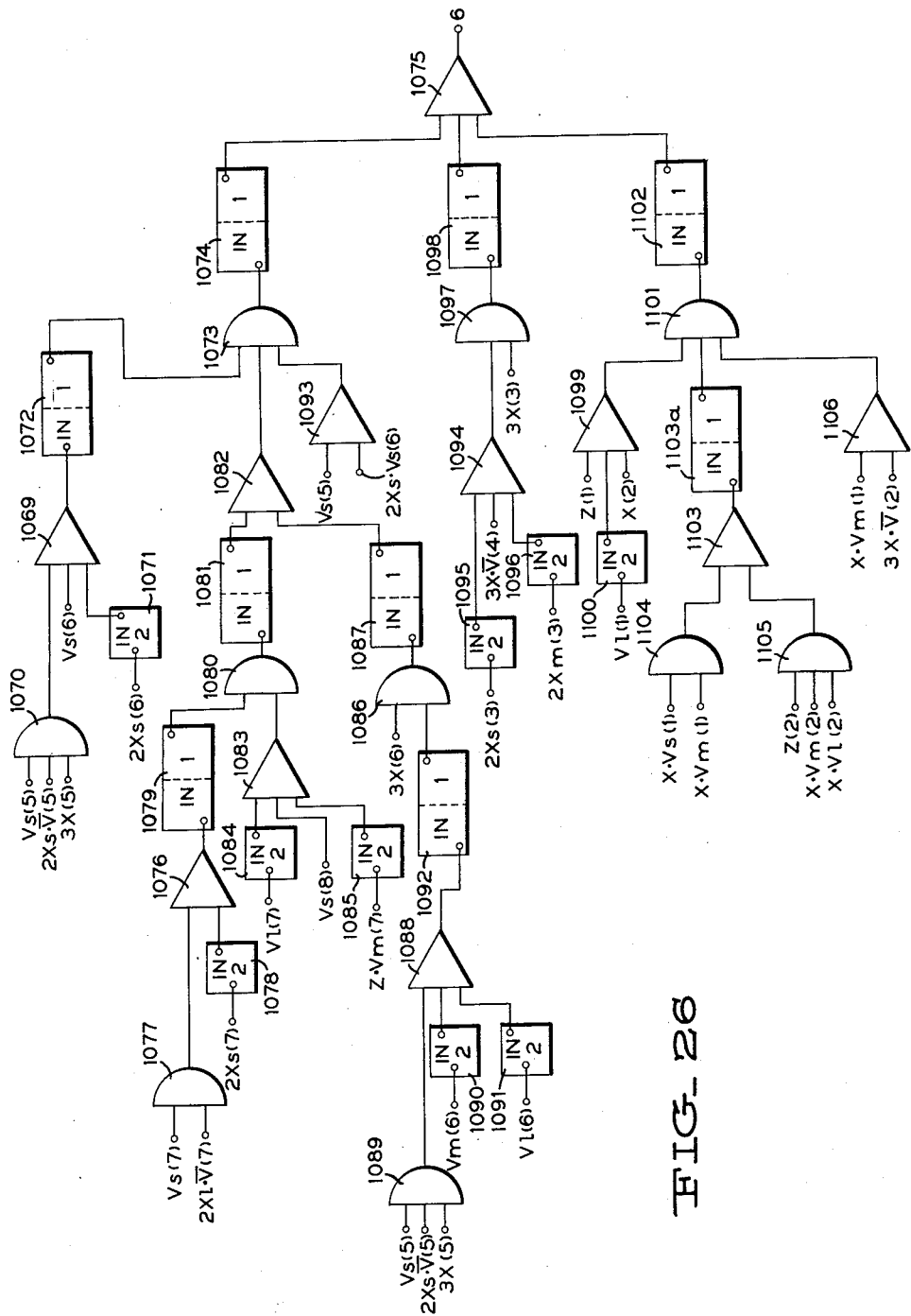

Reference is now made to FIG. 26 which disposes the logical circuitry capable of identifying the character "6". There is provided a switch 1069 which is adapted to receive either the $Vs(5)$, $2Xs \cdot \overline{V}(5)$ or $3X(5)$ from OR circuit 1070. Another input to this switch is $Vs(6)$. The remaining input is supplied from an inverter 1071 and represents $\overline{2Xs}(6)$. If these inputs are all relatively positive in coincidence, an output is supplied through the switch 1069 and through a two-stage inverter 1072 to present a positive voltage to the OR circuit 1073. The output of the OR circuit is supplied through a double inverter 1074 to serve as one input to a switch 1075. It is seen that OR circuit 1073 is arranged to receive other inputs than that obtained from the inverter 1072. The second possible input to OR circuit 1073 is supplied from a circuit which includes a switch 1076 which is adapted to receive either $Vs(7)$ or $2Xl \cdot \overline{V}(7)$ from an OR circuit 1077 and $\overline{2Xs}(7)$ from an inverter 1078. In the event of relatively positive inputs to switch 1076, an output is supplied through a double inverter 1079 and an OR circuit 1080 to another double inverter 1081. The output of the last inverter being supplied to a switch 1082. There is an alternate way of providing an input to OR circuit 1080 which includes a switch 1083 which is arranged to receive signal representing $\overline{Vl}(7)$ from an inverter 1084, $Vs(8)$ and $\overline{Z \cdot Vm}(7)$ from an inverter 1085. The output from switch 1083 is supplied through the OR circuit 1080 and the double inverter 1081 to the switch 1082.

The second input to switch 1082 may be supplied in one of several ways. In the event of a signal $3X(6)$, an output will be supplied from an OR circuit 1086 through a double inverter 1087 to the switch 1082. Another way of getting a signal through OR circuit 1086 is by way of a switch 1088 which is arranged to receive signals representing either $Vs(5)$, $2Xs \cdot \overline{V}(5)$ or $3X(5)$ from an OR circuit 1089, and a signal representing $\overline{Vm}(6)$ from an inverter 1090 and a signal representing $\overline{Vl}(6)$ from an inverter 1091. If the inputs to switch 1088 are relatively positive in coincidence, an output is supplied through a double inverter 1092 and to the OR circuit 1086. As before, the OR circuit will supply an output through the double inverter 1087 and will raise the input to switch 1082. Thus if the two inputs to switch 1082 are relatively positive in coincidence, an output is supplied through the OR circuit 1073 and the double inverter 1074 to produce the first-described input to switch 1075. There is another way of obtaining this first input to the switch 1075 and that is by way of a switch 1093. Thus if this switch receives signals representing $Vs(5)$ and $2Xs \cdot Vs(6)$, a relatively positive voltage will be supplied from the switch through the OR circuit 1073 and the double inverter 1074 to the switch 1075. The second input required by switch 1075 is controlled by way of a switch 1094. This switch, in order to provide a relatively positive output, must receive a signal representing $\overline{2Xs}(3)$ from an inverter 1095, $3\overline{X} \cdot \overline{V}(4)$, and $\overline{2Xm}(3)$ from an inverter 1096. The output from switch 1094 was supplied through an OR circuit 1097 which is also arranged to receive an input 3X(3). In the event of a positive input from either of the two positive sources to OR circuit 1097, a relatively positive input will be supplied from the double inverter 1098 to serve as the second input to switch 1075. The third input required by switch 1075 may come by way of a switch 1099 which in order to supply an input must receive signals representing $Z(1)$ and $\overline{Vl}(1)$ from an inverter 1100 and $X(2)$. The output from switch 1099 is supplied through an OR circuit 1101 and a double inverter 1102 to serve as the third input to switch 1075. It is noted that OR circuit 1101 is arranged to receive two other inputs, thereby indicating that there are two alternate paths to supply this third input to switch 1075. A switch 1103, in order to produce a relatively positive output, must receive either $X \cdot Vs(1)$ or $X \cdot Vm(1)$ from an OR circuit 1104, and either $Z(2)$, $X \cdot Vm(2)$ or $X \cdot Vl(2)$ from an OR circuit 1105. The output from switch 1103 is supplied through a double inverter 1103a to the OR circuit 1101. The third possible input to OR circuit 1101 is by way of a switch 1106 which in order to produce this input must receive signals representing $X \cdot Vm(1)$ and $3X \cdot \overline{V}(2)$. If all three inputs to switch 1075 are positive in coincidence, the output of this switch will be positive, signifying that a "6" has been recognized.

Figure 27:
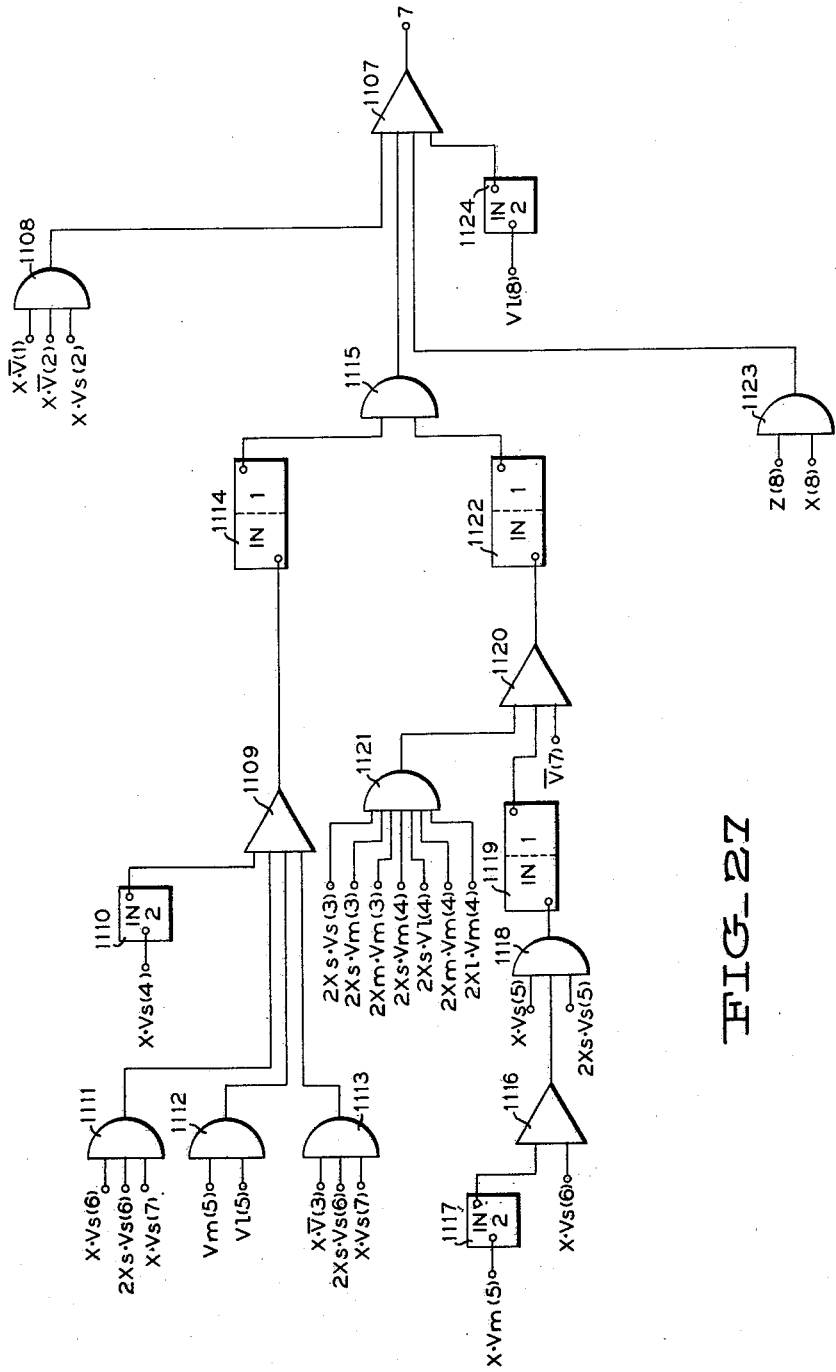

Referring now to FIG. 27, there is provided a switch 1107 which produces an output signal, signifying that a "7" has been recognized, in the event all of the inputs thereto are relatively positive in coincidence. The first input to this switch may be either $X \cdot \overline{V}(1)$, $X \cdot \overline{V}(2)$, or $X \cdot Vs(2)$, these inputs being supplied by way of an OR circuit 1108. The second input to switch 1107 may be by one of two alternate paths. Referring to a switch 1109, this switch must receive a signal representing $\overline{X \cdot Vs}(4)$ from an inverter 1110, either $X \cdot Vs(6)$, $2Xs \cdot Vs(6)$ or $X \cdot Vs(7)$ from an OR circuit 1111. An additional input to this switch is required to be either $Vm(5)$ or $Vl(5)$ from an OR circuit 1112. The remaining input required is a signal representing either $X \cdot \overline{V}(3)$, $2Xs \cdot Vs(6)$, or $X \cdot Vs(7)$ from an OR circuit 1113. If all of the inputs to switch 1109 are relatively positive in coincidence, an output is supplied through a double inverter 1114 and an OR circuit 1115 to serve as a second input to switch 1107.

It is noted that OR circuit 1115 may receive another input. There is provided a switch 1116 which in order to produce an output must receive a signal representing $\overline{X \cdot Vm}(5)$ from an inverter 1117 and $X \cdot Vs(6)$. In the event these two inputs occur in coincidence, an output is supplied to an OR circuit 1118. This OR circuit may also receive signals representing $X \cdot Vs(5)$ or $2Xs \cdot Vs(5)$. Thus if any of the inputs to OR circuit 1118 are relatively positive, an output will be supplied therefrom through a double inverter 1119 to serve as one input to a switch 1120. Another input required by switch 1120 may come from OR circuit 1121. This OR circuit will produce a relatively positive input providing either of the signals $2Xs \cdot Vs(3)$, $2Xs \cdot Vm(3)$, $2Xm \cdot Vm(3)$, $2Xs \cdot Vm(4)$, $2Xs \cdot Vl(4)$, $2Xm \cdot Vm(4)$ or $2Xl \cdot Vm(4)$. The remaining input required by switch 1120 is $\overline{V}(7)$. The output from switch 1120 is supplied through a double inverter 1122 and the OR circuit 1115 to serve as a second input to switch 1107. The third input required by switch 1107 is the lack of a long vertical line in position 8 of the shift register. Thus a signal representing $\overline{Vl}(8)$ may by supplied from an inverter 1124. Another input required by switch 1107 is the presence of either $Z(8)$ or $X(8)$, which inputs may be supplied from an OR circuit 1123. Therefore, if all of the inputs to switch 1107 occur in coincidence, an output signal representing the character "7" will be produced.

Figure 28:
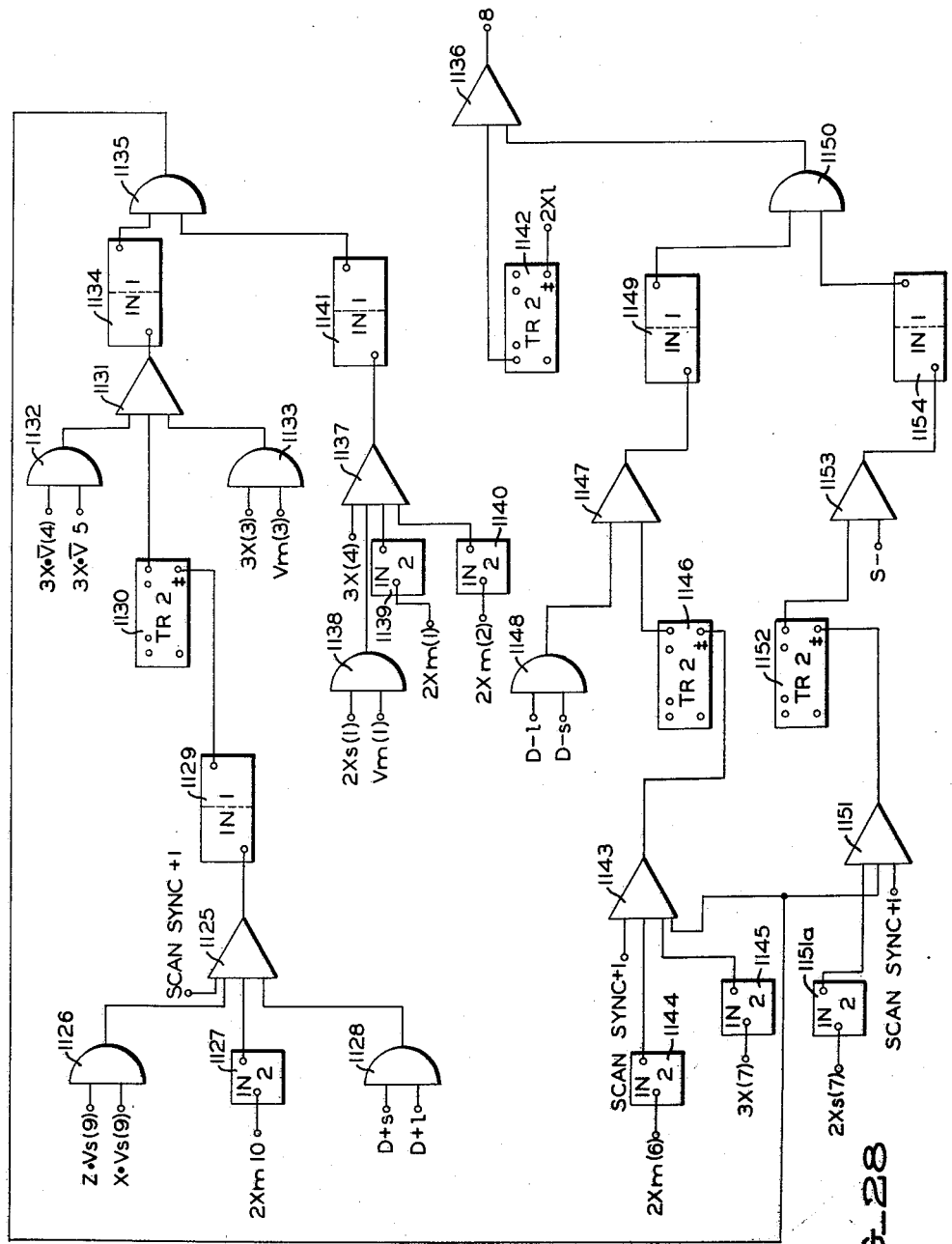

Reference is now made to FIG. 28 which discloses the circuitry utilized in detecting the character "8." There is provided a switch 1125 which is adapted to receive the SCAN SYNC+1 pulse. In addition, this switch must receive either $Z \cdot Vs(9)$ or $X \cdot Vs(9)$ from an OR circuit 1126 and $\overline{2Xm}(10)$ from an inverter 1127, and either $D+s$ or $D+l$ from an OR circuit 1128. If the inputs from OR circuits 1126 and 1128 as well as inverter 1127 are relatively positive at SCAN SYNC+1 time, a pulse will be supplied from the switch 1125 through a double inverter 1129 to a trigger 1130. The trailing edge of this positive pulse will be a negative going voltage and will turn trigger 1130 ON, thereby producing a relatively positive voltage from the right side thereof to a switch 1131. Another input required by switch 1131 is either $3X \cdot \overline{V}(4)$ or $3X \cdot \overline{V}(5)$ from an OR circuit 1132. The remaining input to switch 1131 is either $3X(3)$ or $Vm(3)$ which input is supplied by way of OR circuit 1133. In the event of an output from switch 1131, this output will be supplied through a double inverter 1134 and an OR circuit 1135 to serve as inputs to switches 1143 and 1151. An alternative way of producing these inputs to switches 1143 and 1151 is by way of a switch 1137. The first input required by this switch is a signal representing $3X(4)$. The second input is either $2Xs(1)$ or $Vm(1)$ which is supplied by way of OR circuit 1138. The third input to this switch is $\overline{2Xm}(1)$ supplied from an inverter 1139. The remaining input is $\overline{2Xm}(2)$ supplied from an inverter 1140. If all of the inputs to switch 1137 are relatively positive in coincidence, an output is supplied through a double inverter 1141 and the OR circuit 1135 to switches 1143 and 1151. One input to switch 1136 is the absence of a signal representing $2Xl$. That is, if a signal $2Xl$ occurs, a trigger 1142 will be turned ON and produce a relatively negative voltage from the left side thereof to the switch. Therefore, if the signal representing $2Xl$ is not received by trigger 1142, the output from the left side of trigger 1142 will be relatively positive and will supply this voltage to switch 1136. The second input to switch 1136 may be supplied by two alternate paths.

The first path to be described is by way of a switch 1143 which in addition to receiving the SCAN SYNC+1 pulse also receives a signal representing $\overline{2Xm}(6)$ from an inverter 1144, $\overline{3X}(7)$ from an inverter 1145, and the output of OR circuit 1135. The output from switch 1143 will be a pulse which occurs in coincidence with the SCAN SYNC+1 pulse, the trailing edge of which may turn a trigger 1146 ON, thereby producing a relatively positive voltage from the right side of this trigger to the switch 1147. The other input required by switch 1147 is either $D-l$ or $D-s$ from the OR circuit 1148. The output of switch 1147 will be a positive voltage if an output is obtained from OR circuit 1148 after trigger 1146 has been turned ON. This relatively positive voltage is supplied through a double inverter 1149 and through an OR circuit 1150 to serve as the second input to the switch 1136. It is noted that OR circuit 1150 can also receive an input by way of another path. There is provided a switch 1151 which must receive $\overline{2Xs}(7)$ by way of inverter 1151a, a positive voltage from OR circuit 1135, and the SCAN SYNC+1 pulse in order to turn a trigger 1152 ON. If this trigger is turned ON, it is seen that a positive voltage is supplied to a switch 1153. Thus in order to get an output from switch 1153, it is required that switch 1151 turns trigger 1152 ON. In the event trigger 1152 is turned ON, the output from the right side thereof will be relatively positive which, when it occurs in coincidence with a signal S—, will supply a relatively positive voltage from the switch 1153. This relatively positive voltage is taken through the double inverter 1154 and through the OR circuit 1150 to serve as the second input to switch 1136. Providing both inputs to switch 1136 are relatively positive, an output signal representing the character "8" is produced.

Figure 29:
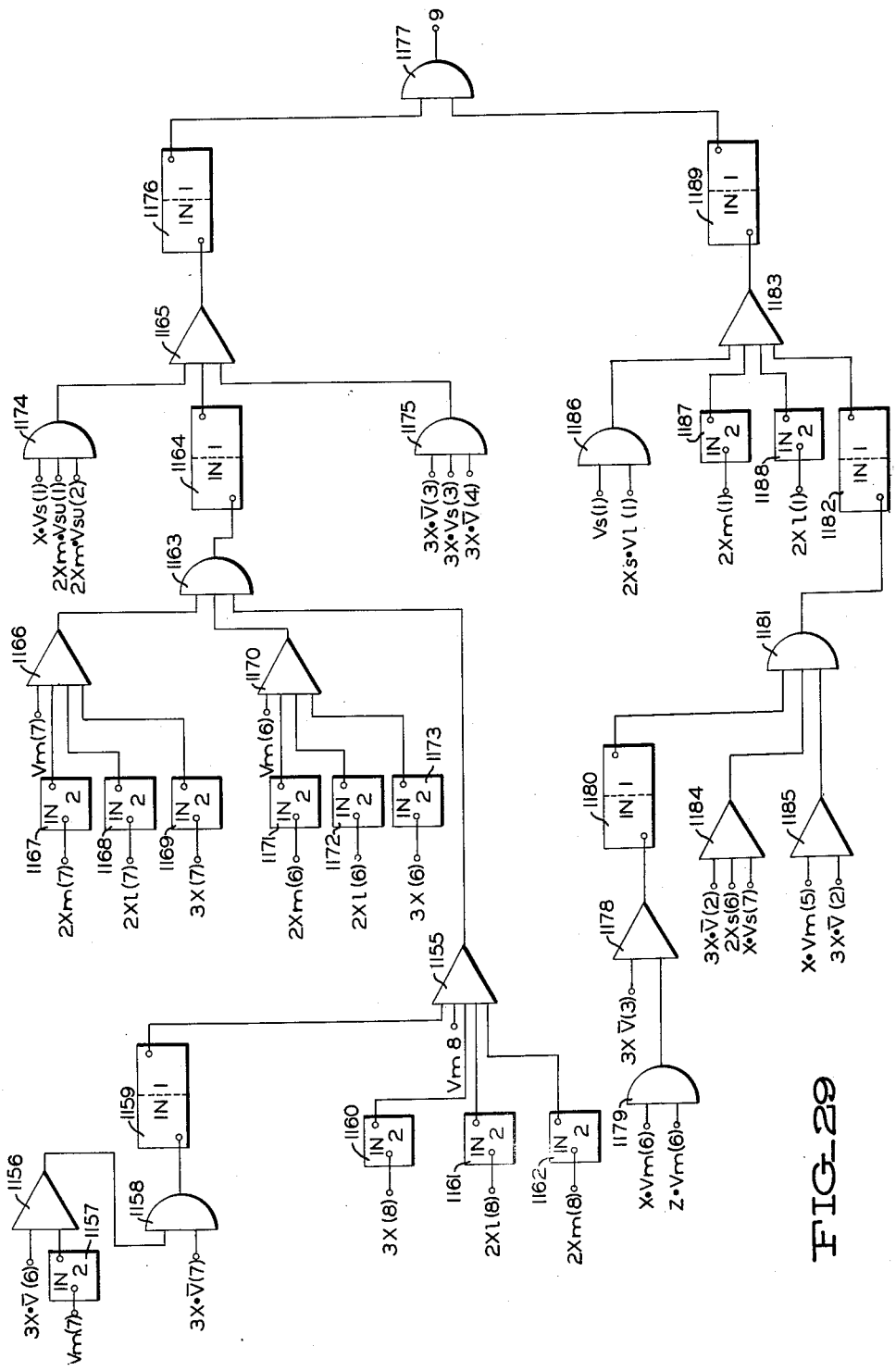
Figure 30:
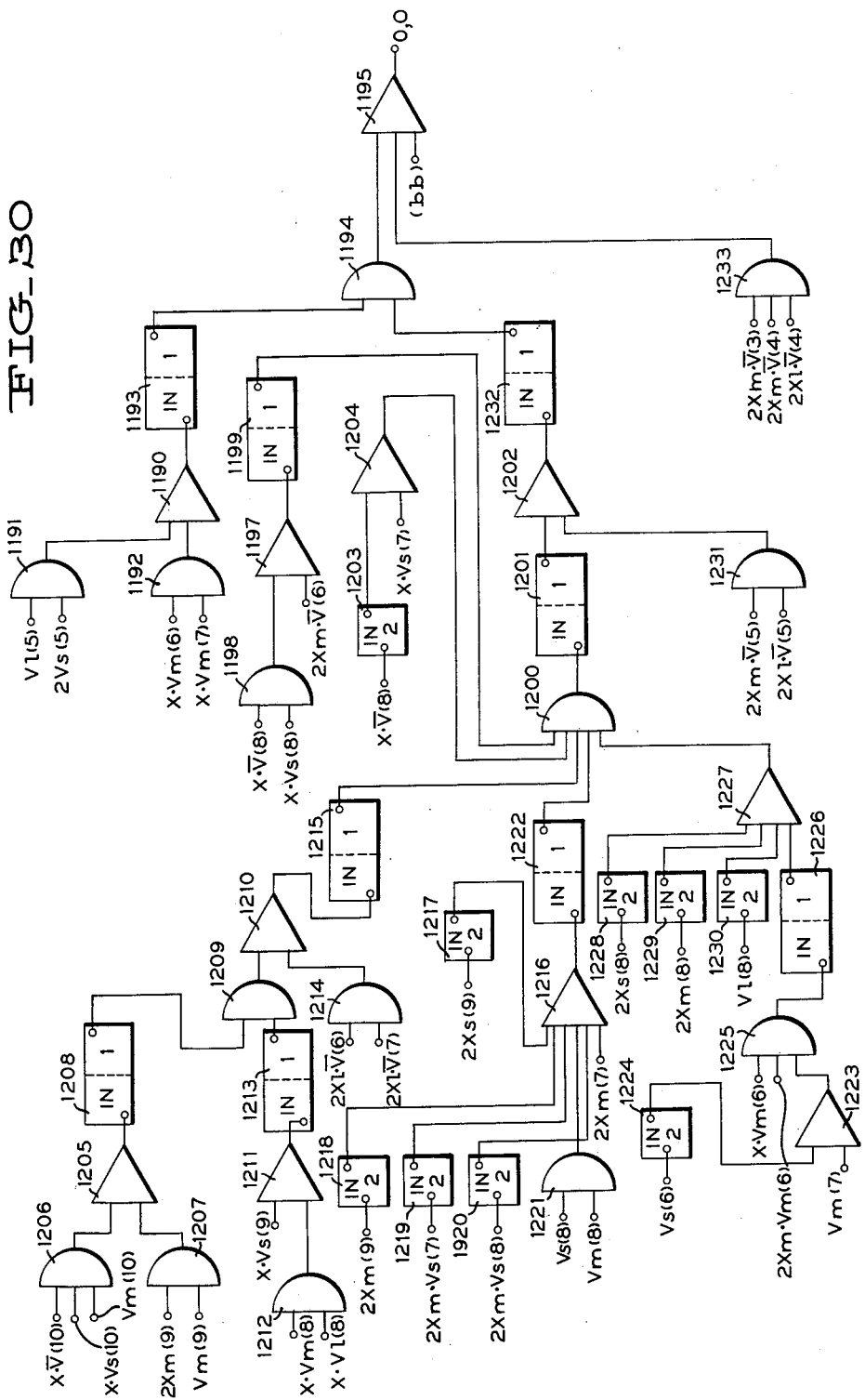

Reference is now made to FIG. 29 which discloses the circuitry utilized in identifying the character "9." There are several alternate paths for identifying the character "9" the first one of which will now be described. There is provided a switch 1155 which is adapted to receive as an input the output from a switch 1156. This swtch 1156 must receive signals representing $3X \cdot \overline{V}(6)$ and $\overline{Vm}(7)$, the last-mentioned signal being supplied from an inverter 1157. The output of switch 1156 is supplied to an OR circuit 1158 which may also receive a signal representing $3X \cdot \overline{V}(7)$. If either of the inputs to OR circuit 1158 are relatively positive, an output is supplied therefrom through the OR circuit 1159 to serve as the first input to switch 1155. The second input to this switch is a signal representing $Vm(8)$. The third input required by this switch is a signal representing $\overline{3X}(8)$ which is supplied by way of an inverter 1160. The remaining inputs required by this switch are signals representing $\overline{2Xl}(8)$ and $\overline{2Xm}(8)$, supplied by way of inverters 1161 and 1162, respectively. The output of switch 1155 is supplied as one input to an OR circuit 1163 which is connected to supply an output through a double inverter 1164 to a switch 1165.

There are alternative ways of obtaining an output from OR circuit 1163. There is provided a switch 1166. The switch 1166 must receive a signal representing $Vm(7)$. The remaining inputs to this switch must be $\overline{2Xm}(7)$, $\overline{2Xl}(7)$ and $\overline{3X}(7)$, which inputs are supplied by way of inverters 1167, 1168 and 1169, respectively. The output from switch 1166 is supplied to the OR circuit 1163. There is also provided a switch 1170 which is connected to supply an output to OR circuit 1163. This switch in order to provide an output must receive a signal representing $Vm(6)$. Other signals required by this switch are $\overline{2Xm}(6)$, $\overline{2Xl}(6)$ and $\overline{3X}(6)$, which signals may be supplied from inverters 1171, 1172 and 1173, respectively.

It has now been explained how the first input to switch 1165 may be provided. Another input to this switch is either $X \cdot Vs(1)$, $2Xm \cdot Vsu(1)$ or $2Xm \cdot Vsu(2)$. These inputs may be supplied by OR circuit 1174. An OR circuit 1175 is arranged to receive three signals representing $3X \cdot \overline{V}(3)$, $3X \cdot Vs(3)$ or $3X \cdot \overline{V}(4)$. In the event any of these signals are present, an output will be supplied through OR circuit 1175 to the switch. The output from switch 1165 is supplied through a double inverter 1176 and through an OR circuit 1177 to product an output signal representing the character "9." It is seen that an alternative path is provided to produce a signal representing the character "9" to the OR circuit 1177.

Referring to a switch 1178, inputs to this switch are $3X \cdot \overline{V}(3)$ and either $X \cdot Vm(6)$ or $Z \cdot Vm(6)$, the latter two inputs being supplied through OR circuit 1179. An output from switch 1178 is supplied through a double inverter 1180 into an OR circuit 1181. The output of this circuit is supplied through a double inverter 1182 to a switch 1183. There is an alternative way of supplying an output from the OR circuit 1181. Thus in the event of inputs $3X \cdot \overline{V}(2)$ and $2Xs(6)$ and $X \cdot Vs(7)$ to a switch 1184, it is seen that a second input is supplied to OR circuit 1181. The remaining input to this OR circuit is by way of a switch 1185 which in order to produce an output must receive $V \cdot Vm(5)$ and $3X \cdot \overline{V}(2)$. Switch 1183 must receive in addition to the input already described a signal representing $Vs(1)$ or $2Xs \cdot Vl(1)$ from an OR circuit 1186. Another input to the switch is $\overline{2Xm}(1)$ which is received by way of inverter 1187. The inverter 1188 is adapted to supply a signal representing $\overline{2Xl}(1)$ to the switch. Thus if the inputs to switch 1183 are relatively positive in coincidence, an output is supplied through the double inverter 1189 to the OR circuit 1177, thereby producing a signal representing the character "9."

Reference is now made to FIG. 30 which discloses the logical circuitry utilized to identify the character "O" which may be either the numeral "0" or the letter "O." There is a switch 1190 provided which is adapted to receive signals representing either $Vl(5)$ or $2Vs(5)$ from an OR circuit 1191 and signals representing $X \cdot Vm(6)$ or $X \cdot Vm(7)$ from an OR circuit 1192. In the event of relatively positive inputs to switch 1190, an output is supplied through a double inverter 1193 and an OR circuit 1194 to serve as the first input to a switch 1195. It is noted that OR circuit 1194 may produce an output as a result of an input from a second path. Referring to a switch 1197, the inputs thereto are either $X \cdot \overline{V}(8)$ or $X \cdot Vs(8)$ from an OR circuit and a signal representing $2Xm \cdot \overline{V}(6)$. The output of switch 1197 is supplied through a double inverter 1199 to serve as a first input to an OR circuit 1200, the output of which is supplied through a double inverter 1201 to a switch 1202. Another possible way of obtaining an input to switch 1202 is by way of OR circuit 1200 from a switch 1204, which is adapted to receive an input signal representing $\overline{X \cdot \overline{V}}(8)$, from an inverter 1203, and $X \cdot Vs(7)$. A third possible input to OR circuit 1200 may be by way of a switch 1205 which is adapted to receive either $X \cdot \overline{V}(10)$, $X \cdot Vs(10)$ or $Vm(10)$ from OR circuit 1206. The other input required by switch 1205 is either $2Xm(9)$ or $Vm(9)$, which inputs may be supplied from an OR circuit 1207. The output of switch 1205 is supplied through a double inverter 1208 to an OR circuit 1209, the output of the OR circuit being supplied to a switch 1210.

Since OR circuit 1209 is adapted to receive another input, it is seen that this second input may be supplied from a switch 1211. This switch, in order to produce an output signal, must receive a signal representing $X \cdot Vs(9)$ and either $X \cdot Vm(8)$ or $X \cdot Vl(8)$, the latter two inputs being supplied by way of OR circuit 1212. The output of switch 1211 is supplied through a double inverter 1213 to the OR circuit 1209.

The remaining input required by switch 1210 may be either $2Xl \cdot \overline{V}(6)$ or $2Xl \cdot \overline{V}(7)$, which inputs are supplied through OR circuit 1214. The output of switch 1210 is supplied through a double inverter 1215 to the OR circuit 1200. The other possible way of getting an output through OR circuit 1200 is by way of a switch 1216 which must receive several inputs in order to produce an output. The first input which is required is a signal representing $2Xs(9)$, which signal may be supplied from an inverter 1217. Other inputs required by switch 1216 are $2\overline{Xm}(9)$, $\overline{2Xm \cdot Vs}(7)$, and $\overline{2Xm \cdot Vs}(8)$, these inputs being supplied from inverters 1218, 1219 and 1220, respectively. Another input required by switch 1216 is the signal represent either $Vs(8)$ or $Vm(8)$, which signals may be supplied by way of OR circuit 1221. The last input required by switch 1216 is a signal representing $2Xm(7)$. The output of switch 1216 is supplied through a double inverter 1222 to OR circuit 1200. The remaining possibility of obtaining an input to OR circuit 1200 will now be described. A switch 1223 is arranged to receive a signal representing $\overline{Vs}(6)$ from an inverter 1224 and a signal representing $Vm(7)$. The output of this switch is supplied to an OR circuit 1225 which may also receive signals representing $X \cdot Vm(6)$ or $2Xm \cdot Vm(6)$. In the event of an output from OR circuit 1225, a relatively positive voltage will be supplied therefrom through a double inverter 1226 to a switch 1227. The remaining inputs required by this switch are $\overline{2Xs}(8)$, $\overline{2Xm}(8)$, and $\overline{Vl}(8)$, these three inputs being supplied from inverters 1228, 1229 and 1230, respectively. The output of switch 1227 is supplied to the OR circuit 1200.

It has now been described how a very large number of paths are available for supplying a first input to a switch 1202. The second input required by this switch is supplied from an OR circuit 1231 and may be either $2Xm \cdot \overline{V}(5)$ or $2Xl \cdot \overline{V}(5)$. In the event of an output from switch 1202, a relatively positive voltage is supplied through the double inverter 1232 and an OR circuit 1194 to serve as an alternate first input to the switch 1195. The second input required by switch 1195 is supplied by way or OR circuit 1233 which input may be a signal representing $2Xm \cdot \overline{V}(3)$, $2Xm \cdot \overline{V}(4)$ or $2Xl \cdot \overline{V}(4)$. It will be noted that switch 1195 also receives a signal which is indicated as being (bb). Since this particular designation is used in several of the circuits, it has been shown as a separate circuit in FIG. 56. Referring now to FIG. 56, there is illustrated a switch 1234 which must receive an input from both of the OR circuits 1235 and 1236. OR circuit 1235 will produce an input to this switch providing either $2Xs(2)$, $2Xm(2)$, $Vm(2)$, or $Vl(2)$ are produced. OR circuit 1236 will produce an input to switch 1234 providing either $Z \cdot Vs(1)$ or $X \cdot Vs(1)$ are received. The output of switch 1234 is supplied through a double inverter 1237 to an OR circuit 1238. There are alternative ways of producing these signals (bb). Thus, such a signal will be produced if signals representing either $X \cdot Vm(7)$ or $X \cdot Vm(2)$ or $\overline{X} \cdot Vm(2)$ are present.

Thus if the switch 1195 receives relatively positive inputs from its three sources, an output signal representing the character "9" will be produced.

Figure 31:
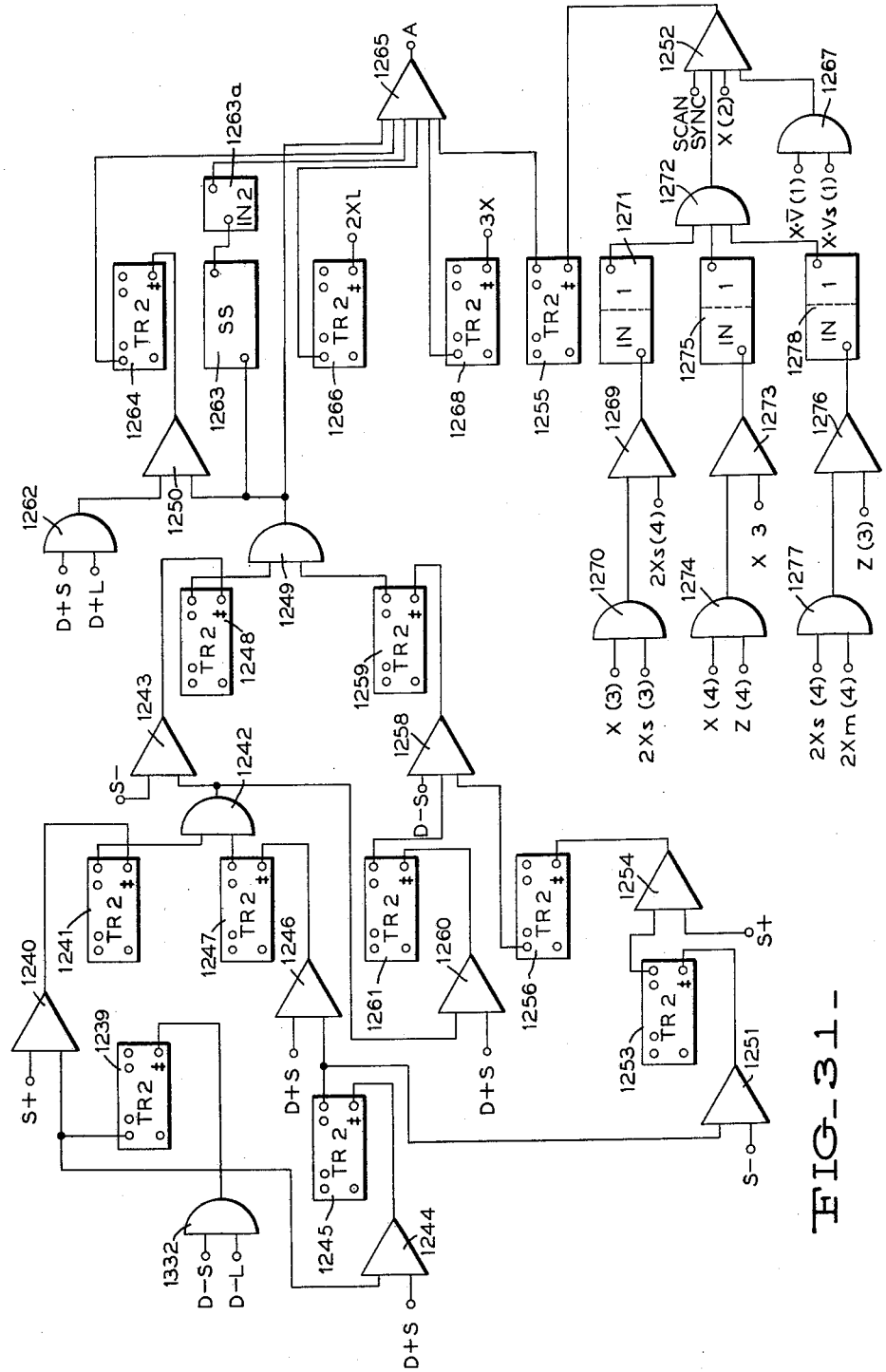

Reference is now made to FIG. 31, which discloses the logical circuit required to recognize the character "A." It will be seen that in scanning the character A from left to right that a positive slope will be obtained during the first half of the scan and a negative slope will be indicated during the second half of the scan. Therefore, a trigger 1239 is provided which as long as it remains OFF, will supply a relatively positive voltage to a switch 1240 and a switch 1244. The other input to switch 1240 is a signal representing S+. Thus in the event of a coincidence of inputs to switch 1240, a trigger 1241 will be turned ON with the trailing edge of the S+ pulse, allowing a relatively positive voltage to be supplied from the right side thereof or through an OR circuit 1242 to a switch 1243. Alternatively, switch 1244 is adapted to receive a signal representative of D+s. This switch will supply an input to a trigger 1245 to turn the trigger ON. As soon as trigger 1245 is turned ON, a relatively positive voltage will be supplied from the right side thereof to a switch 1246 which is adapted to receive also D+s. Thus if there is a first D+s signal followed by the second D+s signal, switch 1246 will supply an output signal to a trigger 1247, thereby turning the trigger ON. A relatively positive voltage will be supplied from the right side thereof to the switch 1243.

It is seen the trigger 1241 or trigger 1245 must be turned ON before a D−s or a D−l signal is produced. Thus if OR circuit 1332 receives either of these signals, trigger 1239 will be turned ON and will thereby prevent the S+ signals supplied to switch 1240 and the D+s signals supplied to switch 1244 from turning the triggers 1241 and 1245 ON, respectively. As soon as an S− signal is supplied to switch 1243, after a relatively positive voltage becomes available at the output of OR circuit 1242, an output is supplied to turn a trigger 1248 ON. When this trigger is turned ON, a relatively positive voltage is supplied through an OR circuit 1249 to a switch 1250, a single-shot multivibrator 1263, and a switch 1265.

There is an alternative procedure by which switch 1250, single-shot multivibrator 1263 and switch 1265 can receive this input. It is noted that OR circuit 1242 is also connected to supply an input to a switch 1260. Thus in the event a $D-s$ signal is supplied to this switch, a trigger 1261 will be turned ON, thereby producing a relatively positive voltage from the right side thereof which will be supplied to a switch 1258. Also the switch 1258 will receive an input by way of a switch 1251 which is connected to the right side of trigger 1245. Thus if an $S-$ signal is produced, switch 1251 may receive relatively positive inputs and turn a trigger 1253 ON with the trailing edge of the $S-$ pulse. The output of the right side of this trigger will be relatively positive so that if all of this occurs before an $S+$ signal occurs, an output will be supplied from the switch 1254 to turn a trigger 1256 ON with the trailing edge of the $S+$ pulse. If this trigger is turned ON, a relatively negative voltage will be supplied from the right side thereof to the switch 1258. In the event triggers 1256 and 1261 supply relatively positive voltages to the switch 1258 at the time a $D-s$ signal is supplied thereto, a relatively positive pulse will be supplied to a trigger 1259, the trailing edge of which pulse will turn trigger 1259 ON so that a relatively positive voltage will be supplied from the right side thereof to OR circuit 1259. It is seen now that switch 1250 may receive an input from a number of alternate paths. Another input required to this switch is that supplied by way of an OR circuit 1262. If either a $D+s$ or $D+l$ pulse is supplied to OR circuit 1262 after a relatively positive output voltage is obtained from OR circuit 1249, the output of switch 1250 will become relatively positive and turn ON trigger 1264 with the trailing edge of a $D+s$ or $D+l$ pulse. Trigger 1264 will then supply a relatively negative voltage from the left side thereof to a switch 1265, thereby inhibiting switch 1265.

A third input to switch 1265 is provided by single-shot multivibrator 1263 through inverter 1263a. Keeping in mind the operation of a conventional single-shot multivibrator, it can be seen that the output of single-shot multivibrator 1263 will become relatively positive as soon as a relatively positive output from OR circuit 1249 is available. The single-shot multivibrator 1263 is designed with a time constant that will permit the output to be relatively positive for a period longer than two scans, but less than three scans, where a scan is about 256 microseconds in duration in the present embodiment. Therefore, the inverter 1263a will provide a relatively negative voltage to switch 1265 which will inhibit that switch for about two scans following an output. This temporary inhibition of switch 1265 by inverter 1263a is necessary in order to give trigger 1264 time to be turned ON by a $D+s$ or $D+l$ pulse from OR circuit 1262 and thereby inhibit switch 1265.

It should be kept in mind that the outputs from OR circuit 1249, trigger 1264 and inverter 1263a become available immediately following the SCAN SYNC+1 pulse, whereas the remaining circuitry for identification of character A, now to be described, is switched immediately following the SCAN SYNC+2 pulse, since all inputs originate in the shifting register previously described.

A fourth input to switch 1265 is supplied from the trigger 1266. If this trigger is not turned OFF by the occurrence of a signal representing $2Xl$, a relatively positive voltage will be supplied from the left side thereof.

Another input required by switch 1265 is supplied from a trigger 1268. If this trigger is not turned ON by a signal representing $3X$, a relatively positive voltage will be supplied from the left side thereof to the switch. The last input to switch 1265 is provided by way of switch 1252. One further input required by switch 1252 is that supplied from an OR circuit 1267, the input of which may be either a signal representing $X \cdot \overline{V}(1)$ or a signal representing $X \cdot Vs(1)$.

A further input required by switch 1252 is a signal representing $X(2)$. Another input to switch 1252 may come from one of three alternate paths. A switch 1269 is adapted to receive signals representing either $X(3)$ or $2Xs(3)$ from an OR circuit 1270. The other input to this switch is $2Xs(4)$. The output from switch 1269 is supplied through a double inverter 1271 and an OR circuit 1272 to the switch 1252. Alternatively, a switch 1273 is connected to receive signals representing either $X(4)$ or $Z(4)$ from an OR circuit 1274, the other input to switch 1273 being a signal representing $X(3)$. An output from switch 1273 will be supplied through the double inverter 1275 and the OR circuit 1272 to the switch 1252. The remaining possibility of providing an input to the switch 1252 is by way of the switch 1276. This switch is adapted to receive signals representing either $2Xs(4)$ or $2Xm(4)$ from an OR circuit 1277, the other input to this switch being $Z(3)$. In the event of an output from switch 1276, a relatively positive voltage will be supplied to the double inverter 1278 which is connected through OR circuit 1272 to switch 1252.

Another input to switch 1252 is the SCAN SYNC pulse. Thus if all inputs to switch 1252 are relatively positive in coincidence, the trailing edge of the SCAN SYNC pulse will turn trigger 1255 ON. After trigger 1255 has been turned ON, its right side, which is connected to switch 1265, will be relatively positive. If all of the inputs to switch 1265 occur in coincidence, a signal representing the character "A" will be produced therefrom.

Figure 32:
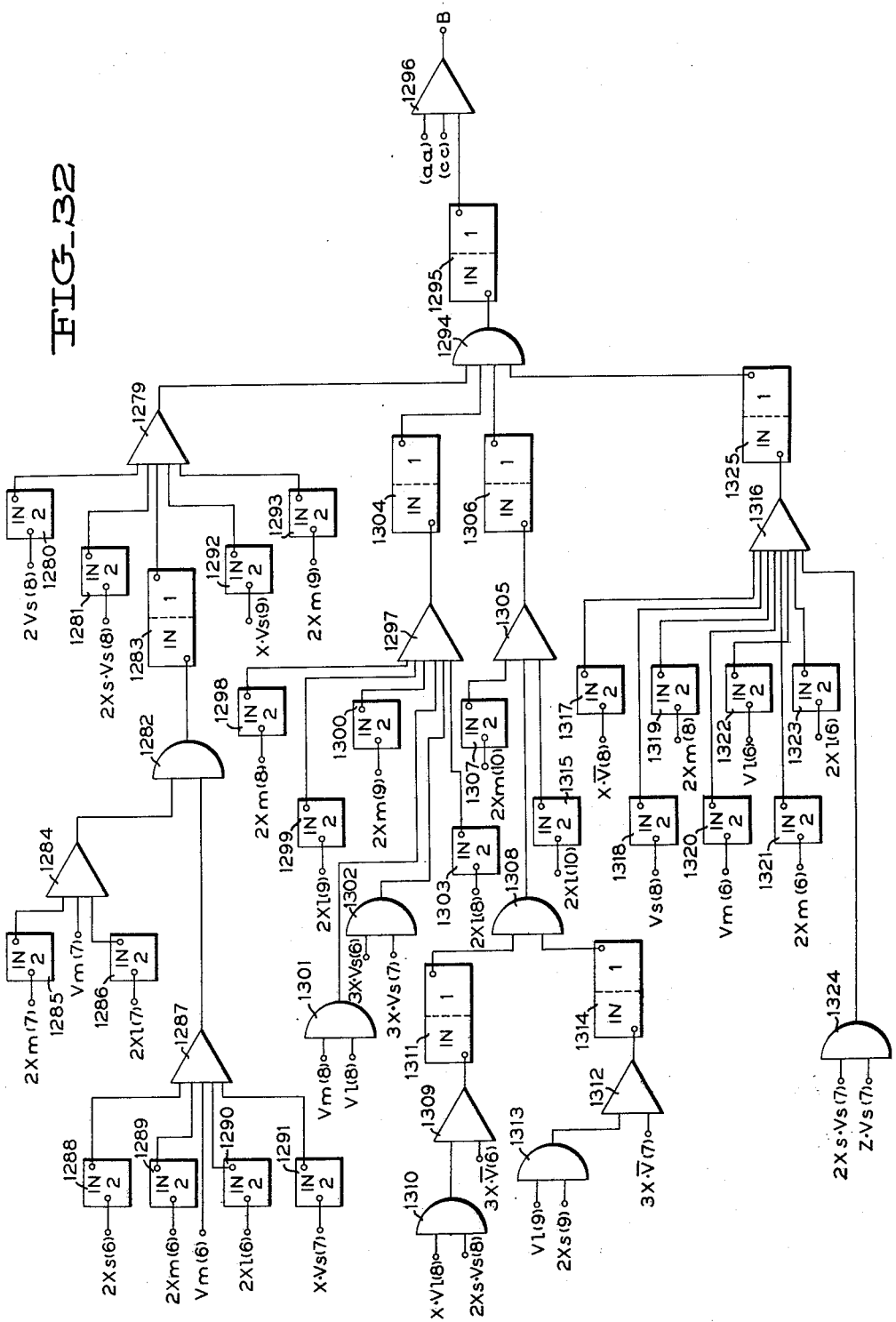

Reference is now made to FIG. 32 which discloses the logical circuitry utilized to identify the character "B." There is provided a switch 1279 which is adapted to receive a plurality of inputs. The first input may be a signal representing $\overline{2Vs}(8)$ which is supplied from an inverter 1280. The second input supplied by this switch is $\overline{2Xs \cdot V}(8)$, this signal being supplied from an inverter 1281. The third input to switch 1279 may come by way of two alternate paths through OR circuit 1282 which is connected to this switch 1279 by way of a double inverter 1283.

The first input to OR circuit 1282 is supplied from a switch 1284. The switch must receive signals representing $\overline{2Xm}(7)$ from an inverter 1285, a signal representing $Vm(7)$, and a signal representing $\overline{2Xl}(7)$, the latter signal being supplied from inverter 1286. Alternatively, an input will be supplied to OR circuit 1282 from the switch 1287. The first input required by this switch is $\overline{2Xs}(6)$ which is supplied from inverter 1288. Another input to the switch 1287 is the signal representing $\overline{2Xm}(6)$ which is supplied from an inverter 1289. A signal representing $Vm(6)$ is also required by the switch 1287. Other inputs to the switch are signals representing $\overline{2Xl}(6)$ and $\overline{X \cdot Vs}(7)$, these signals being supplied by way of inverters 1290 and 1291, respectively.

Other inputs required by switch 1279 are signals representing $\overline{X \cdot Vs}(9)$ and $\overline{2Xm}(9)$, which signals are supplied by way of inverters 1292 and 1293, respectively. The output of switch 1279 is supplied to an OR circuit 1294 and a double inverter 1295 to a switch 1296. It is noted that OR circuit 1294 may receive inputs from three other sources. The first to be described is controlled by a switch 1297. This switch must receive signals representing $\overline{2Xm}(8)$, $\overline{2Xl}(9)$ and $\overline{2Xm}(9)$, these inputs being supplied from inverters 1298, 1299, and 1300, respectively. Another input to switch 1297 must be either $Vm(8)$ or $Vl(8)$ which are supplied to the switch through OR circuit 1301. Another input to switch 1297 may be supplied by way of an OR circuit 1302 which is connected to receive signals representing $3X \cdot Vs(6)$ and $3X \cdot Vs(7)$.

The last signal required by switch 1297 is $\overline{2Xl}(8)$ supplied from inverter 1303. If all of the inputs to switch 1297 are relatively positive in coincidence, an output will be supplied therefrom through the double inverter 1304 to the OR circuit 1294. A third possible path for an input to OR circuit 1294 is by way of a switch 1305 which is connected to supply its output through the double inverter 1306. This switch is adapted to receive a first input representing $\overline{2Xm}(10)$ from an inverter 1307. The second input is supplied by way of two alternate paths to an OR circuit 1308. The first path to be described comprises a switch 1309 which is adapted to receive signals representing either $X \cdot Vl(8)$ or $2Xs \cdot Vs(8)$ from an OR circuit 1310. The second input to switch 1309 is a signal representing $3X \cdot \overline{V}(6)$. The output of this switch is supplied through a double inverter 1311 through the OR circuit 1308. The other input to this OR circuit comprises a switch 1312 which is adapted to receive signals representing either $Vl(9)$ or $2Xs(9)$ from OR circuit 1313 and a signal representing $3X \cdot \overline{V}(7)$. The output of switch 1312 is supplies through a double inverter 1314 through the OR circuit 1308. The last input required by switch 1305 is a signal representing $\overline{2Xl}(10)$ which is supplied from inverter 1315. The output from switch 1305 is supplied through the double inverter 1306 to be the third input to the OR circuit 1294. The last input to OR circuit 1294 is adapted to be supplied from a switch 1316. This switch is adapted to receive signals representing $\overline{X \cdot V}(8)$, $\overline{Vs}(8)$, $\overline{2Xm}(8)$, $\overline{Vm}(6)$, $Vl(6)$, $2Xm(6)$ and $2Xl(6)$, these inputs being supplied from inverters 1317, 1318, 1319, 1320, 1321, 1322 and 1323. The remaining inputs required by switch 1316 is a signal representing either $2Xs \cdot Vs(7)$ or $Z \cdot Vs(7)$, these outputs being supplied from the OR circuit 1324. The output of switch 1316 will be relatively positive in the event all of the inputs thereto are relatively positive and will supply an input through the double inverter 1325 to the OR circuit 1294.

It has now been described how a large number of alternative paths are provided for obtaining a first input to the switch 1296. It is noted that two other inputs are required by this switch. One of the inputs is identified by the symbol (aa). The remaining signal is represented by the signal (cc).

To produce the signal (aa), there is provided a circuit for which a large number of alternate paths are provided. Referring to FIG. 55, there is illustrated an OR circuit 1333. The first input to this OR circuit may be by way of a switch 1334 which is adapted to receive signals representing either $Vm(3)$ or $Vl(3)$ from the OR circuit 1335 and a signal representing $\overline{2Xs}(3)$ from the inverter 1336. The output from switch 1334 is supplied to a double inverter 1337 through an OR circuit 1338, this circuit also being arranged to receive the signal representing $Vm(2)$. The output of the OR circuit is supplied to a switch 1339 which must also receive a signal representing $2Xl(1)$. The output of this switch is supplied through a double inverter 1340 to the OR circuit 1333. In the event such a signal is supplied to the OR circuit, an output is supplied through the double inverter 1349 which will represent (aa).

The second possible path for supplying an input to OR circuit 1333 is by way of a switch 1341 which is adapted to receive a signal representing either $Vl(1)$ or $\overline{2Xs}(1)$ from the OR circuit 1342, a signal $Vl(2)$ and a signal representing $\overline{2Xs}(2)$ from the inverter 1344. It is seen that this signal $\overline{2Xs}(1)$ is supplied to the OR circuit 1342 from an inverter 1343. The output from switch 1341 is supplied through a double inverter 1345 to the OR circuit 1333. The third possible input to the last-mentioned OR circuit is by way of a switch 1346 which is adapted to receive a signal representing $Vl(1)$ and a signal representing $\overline{2Xs}(1)$, the last-mentioned signal being supplied from an inverter 1347. The fourth possible input to the OR circuit 1333 may be received from a switch 1348 which in order to produce an output signal must receive inputs signals representing $2Xm \cdot \overline{V}(1)$, $Vl(2)$, and $X \cdot Vl(3)$. Thus it is seen that any one of the four inputs to OR circuit 1333 will produce an output signal from the double inverter 1349 representing (aa). As before mentioned, this input is adapted to be supplied to the switch 1296 in FIG. 32 and is one of the required inputs thereto before the character "B" will be identified.

The circuit necessary for producing a signal representing (cc) is illustrated in FIG. 57. Referring to FIG. 57, there is illustrated an OR circuit 1326 which may receive inputs from one of two alternate paths. The first input may come from a switch 1327 which is adapted to receive a signal representing $3X(4)$ and $\overline{2Xl}(5)$, the latter signal being supplied from an inverter 1328. The second possible input to OR circuit 1326 is by way of a switch 1329 which in order to produce an output must receive signals representing $3X(5)$ and $\overline{Vl}(5)$, the latter signal being supplied from an inverter 1330. The output of OR circuit 1326 is supplied through a double inverter 1331 to produce the signal representing symbol (cc). As mentioned heretofore, this signal must be supplied to switch 1296 in order for there to be an output signal representing the character "B."

Figure 33:
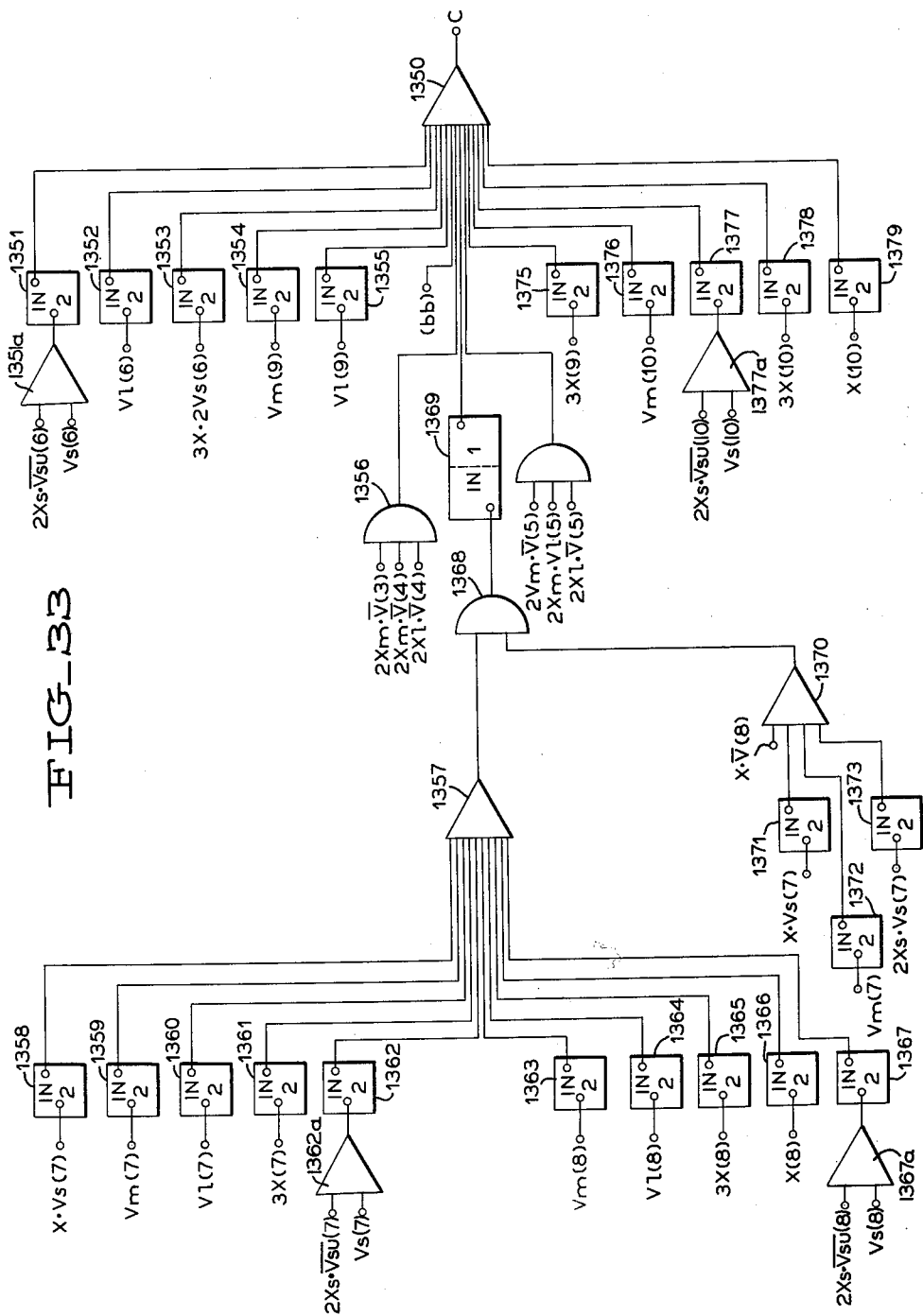

Reference is now made to FIG. 33 which discloses a logical circuit utilized to identify the character "C." There is provided a switch 1350 which must receive each of a plurality of inputs in order to provide the output signal represented by the character "C." The first several inputs to this switch are signals representing $2Xs \cdot \overline{Vsu} \cdot Vs(6)$, $\overline{Vl}(6)$, $\overline{3X \cdot 2Vs}(6)$, $\overline{Vm}(9)$ and $\overline{Vl}(9)$, these signals being supplied from inverters 1351, 1352, 1353, 1354 and 1355, respectively. The output of inverter 1351 is relatively positive when one of the inputs to switch 1351a, i.e. $2Xs \cdot \overline{Vsu}(6)$ and $Vs(6)$, is absent. Another input required by the switch 1350 is a signal representing the signal (bb). This input has previously been described as being produced by the circuit shown in FIG. 56. Another input required by the switch 1350 is a signal representing either $2Xm \cdot \overline{V}(3)$, $2Xm \cdot \overline{V}(4)$ or $2Xl \cdot \overline{V}(4)$, these signals being supplied through to the OR circuit 1356 which is connected to supply its output to the switch 1350.

The next input to switch 1350 may be supplied by way of two alternate paths. The first path to be described comes from a switch 1357 which in order to produce an output signal must receive signals representing $\overline{X \cdot Vs}(7)$, $\overline{Vm}(7)$, $\overline{Vl}(7)$, $\overline{3X}(7)$, $\overline{2Xs \cdot Vsu \cdot Vs}(7)$, $\overline{Vm}(8)$, $\overline{Vl}(8)$, $\overline{3X}(8)$, $\overline{X}(8)$, and $2Xs \cdot \overline{Vsu} \cdot Vs(8)$, these inputs being supplied from inverters 1358, 1359, 1360, 1361, 1362, 1363, 1364, 1365, 1366 and 1367, respectively. It is noted that the output of inverter 1362 will be relatively positive when one of the inputs to switch 1362a, i.e., $2Xs \cdot \overline{Vsu}(7)$ or $Vs(7)$, is absent. Similarly, the output of inverter 1367 will be relatively positive when one of the inputs to switch 1367a, i.e. $2Xs \cdot \overline{Vsu}(8)$ or $Vs(8)$, is absent. In the event all of these inputs are present to switch 1357, an output is supplied to an OR circuit 1368 which is connected to supply an input to switch 1360 by way of the double inverter 1369.

The alternate path to supplying this input signal to the switch is determined by a switch 1370 which must receive as inputs signals representing $X \cdot \overline{V}(8)$, $\overline{X \cdot Vs}(7)$, $\overline{Vm}(7)$ and $\overline{2Xs \cdot Vs}(7)$. The last three inputs being supplied from inverters 1371, 1372 and 1373, respectively.

The fourth input required by switch 1350 is a signal representing either $2Vm \cdot \overline{V}(5)$, $2Xm \cdot Vl(5)$ or $2Xl \cdot \overline{V}(5)$, these signals being supplied through OR circuit 1374 to the switch 1350. The remaining inputs required by switch 1350 are signals representing $\overline{3X}(9)$, $\overline{Vm}(10)$, $\overline{Vs \cdot 2Xs \cdot Vsu}(10)$, $\overline{3X}(10)$ and $X(10)$, these signals being supplied from the inverters 1375, 1376, 1377, 1378, and 1379, respectively. The output of inverter 1377 will be relatively positive when one of the inputs to switch 1377a, i.e., $2Xs\cdot\overline{Vsu}(10)$ or $Vs(10)$, is absent. In the event all of the inputs to switch 1350 are relatively positive in coincidence, an output signal representing the character "C" will be produced.

Figure 34:
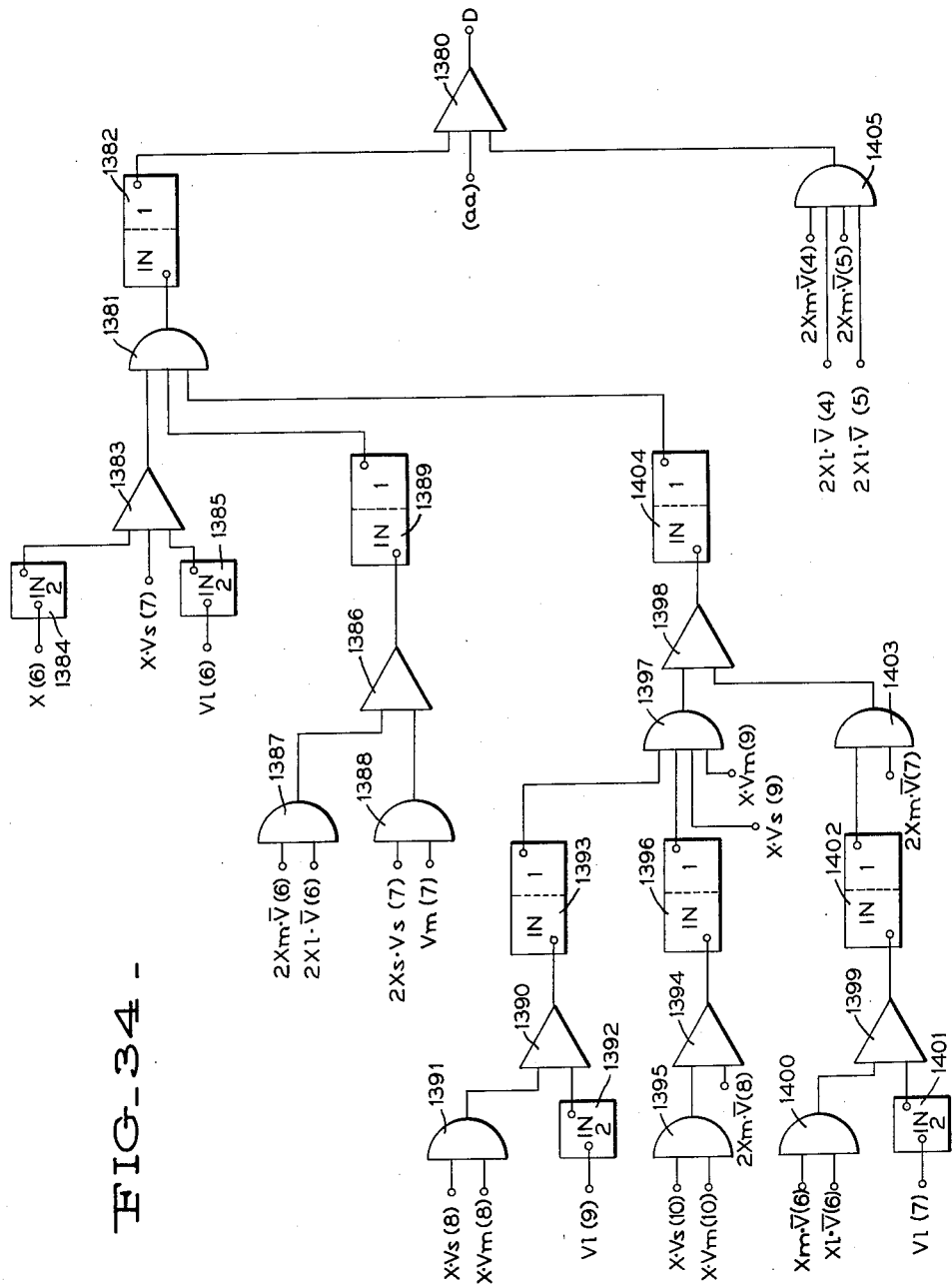

Reference is now made to FIG. 34 which discloses the logical circuit utilized to identify the character "D." It is noted that there is provided a switch 1380 which must receive three inputs in order to produce a signal representing the character "D." The first of these inputs may be supplied by way of an OR circuit 1381 through a double inverter 1382. This OR circuit may receive signals from one of three paths. The first path comprises a switch 1383 which must receive signals representing $\overline{X}(6)$ from inverter 1384, $X\cdot Vs(7)$ and $\overline{Vl}(6)$, the last-mentioned signal being supplied from inverter 1385. The second possible manner of getting an input to OR circuit 1381 is by way of a switch 1386 which must receive signals representing either $2Xm\cdot\overline{V}(6)$ or $2Xl\cdot\overline{V}(6)$ from OR circuit 1387 and a signal representing either $2Xs\cdot Vs(7)$ or $Vm(7)$, one of these signals being supplied through the OR circuit 1388 to the switch. The output of switch 1386 is supplied through a double inverter 1389 to serve as a second possible input to the OR circuit 1381.

The third possible manner of getting an input to OR circuit 1381 is by way of certain alternate paths. The first path includes a switch 1390 which must receive either $X\cdot Vs(8)$ or $X\cdot Vm(8)$ from OR circuit 1391 and $\overline{Vl}(9)$ from the inverter 1392. The output from this switch is supplied through a double inverter 1393 to serve as one of several inputs to an OR circuit 1397, the output from the OR circuit being supplied to a switch 1398. Another possible input to the OR circuit 1397 is a switch 1394. In order for this switch to produce an output, it must receive a signal representing $X\cdot Vs(10)$ or $X\cdot Vm(10)$ from the OR circuit 1395 and a signal representing $2Xm\cdot\overline{V}(8)$. The output from this switch is supplied through a double inverter 1396 to the OR circuit 1397. Other possible inputs to this OR circuit are signals representing $X\cdot Vs(9)$ and $X\cdot Vm(9)$. The switch 1398 must receive an additional input other than that previously described. This input is supplied by way of a switch 1399 which must receive signals representing either $Xm\cdot\overline{V}(6)$ or $Xl\cdot\overline{V}(6)$ from OR circuit 1400 and a signal representing $\overline{Vl}(7)$ from the inverter 1401. The output of this switch is supplied through a double inverter 1402 to an OR circuit 1403. This OR circuit may also supply an output if it receives a signal representing $2Xm\cdot\overline{V}(7)$.

In the event switch 1398 receives a relatively positive input on both its input lines, a positive voltage will be supplied therefrom through the double inverter 1404 to the OR circuit 1381.

Any of the signals supplied to 1381 will result in a relatively positive input to switch 1380.

The second required input to this switch is a signal representing $(aa)$, this input being supplied from the circuit shown in FIG. 55. The remaining input required by switch 1380 is a signal representing either $2Xm\cdot\overline{V}(4)$, $2Xl\cdot\overline{V}(4)$, $2Xm\cdot\overline{V}(5)$ or $2Xl\cdot\overline{V}(5)$, this signal being supplied to the switch 1380 from an OR circuit 1405. Thus if the three inputs to switch 1380 are relatively positive in coincidence, an output signal representing the character "D" will be supplied.

Figure 35:
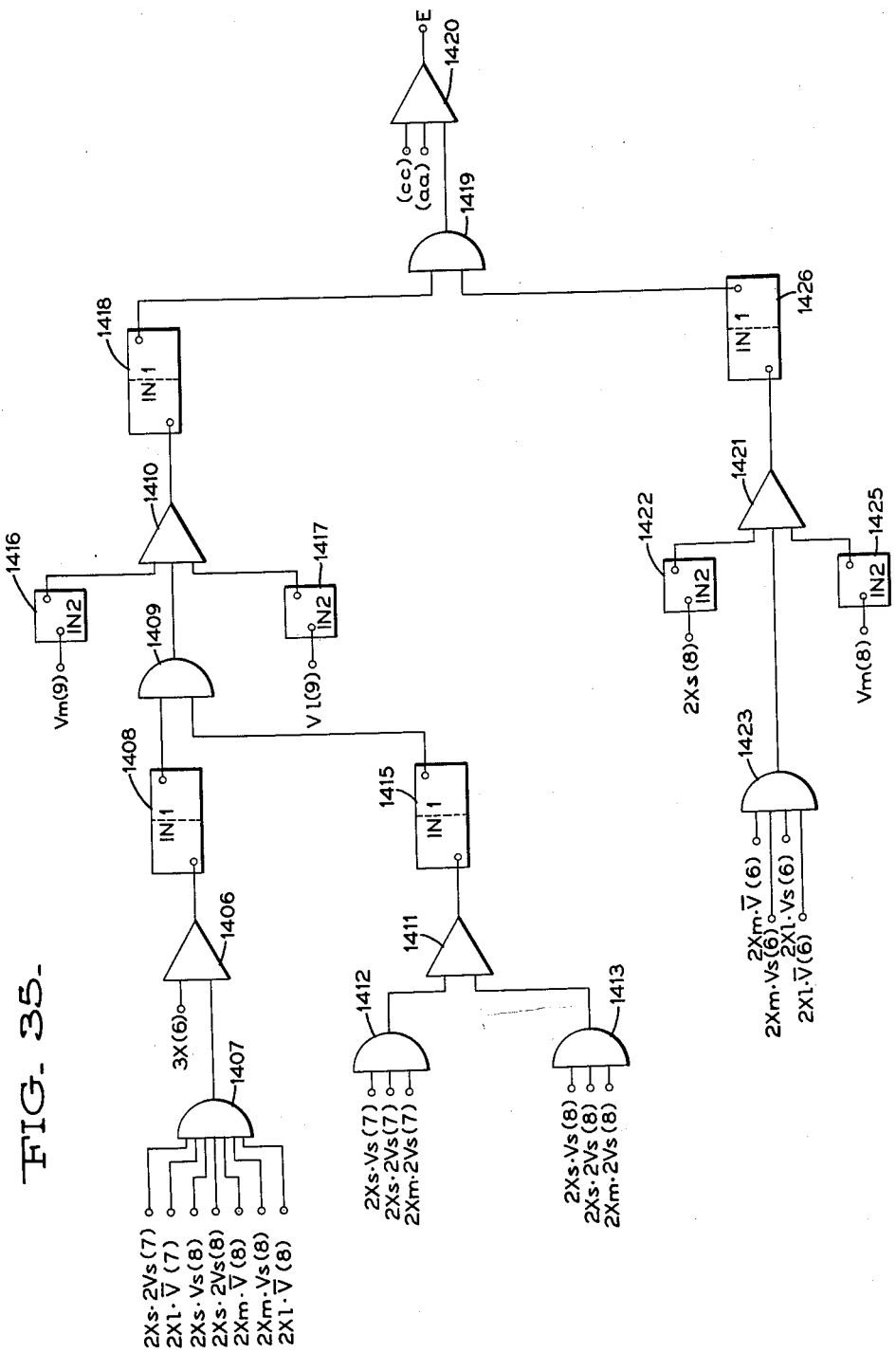

Reference is now made to FIG. 35, which discloses the circuitry utilized to identify the character "E." Reference is made to a switch 1406 which is adapted to receive a signal representing a $3X(6)$, and a signal representing either $2Xs\cdot 2Vs(7)$, $2Xl\cdot\overline{V}(7)$, $2Xs\cdot Vs(8)$, $2Xs\cdot 2Vs(8)$, $2Xm\cdot\overline{V}(8)$, $2Xm\cdot Vs(8)$ and $2Xl\cdot\overline{V}(8)$, these inputs being supplied from OR circuit 1407. The output from switch 1406 is fed through a double inverter 1408 and an OR circuit 1409 to a switch 1410.

It is seen that OR circuit 1409 has another source for input signals. There is provided a switch 1411 which in order to produce an output signal must receive signals representing either $2Xs\cdot Vs(7)$, $2Xs\cdot 2Vs(7)$, or $2Xm\cdot 2Vs(7)$ from OR circuit 1412 and either $2Xs\cdot Vs(8)$, $2Xs\cdot 2Vs(8)$, or $2Xm\cdot 2Vs(8)$, from the OR circuit 1413. The output from switch 1411 is supplied through a double inverter 1415 to serve as the alternate input to the OR circuit 1409. The second input required by switch 1410 is the signal representing $\overline{Vm}(9)$, this input being supplied from inverter 1416. The remaining input to switch 1410 is a signal representing $\overline{Vl}(9)$, this input being supplied from the inverter 1417.

The output of switch 1410 is supplied through a double inverter 1418 and an OR circuit 1419 to serve as a first input to a switch 1420. It is seen that there is an alternate way of obtaining an input to the switch 1420 in that there are two possible inputs to the OR circuit 1419. Reference is made to a switch 1421 which is adapted to receive a signal representing $\overline{2Xs}(8)$ from an inverter 1422, a signal representing either $2Xm\cdot\overline{V}(6)$, $2Xm\cdot Vs(6)$, $2Xl\cdot Vs(6)$ or $2Xl\cdot\overline{V}(6)$ from the OR circuit 1423. The third input required by switch 1421 is a signal representing $\overline{Vm}(8)$, which is supplied from the inverter 1425. The output from switch 1421 is supplied through a double inverter 1426 and through the OR circuit 1419 to serve as an alternate input to the switch 1420. The other two inputs required by a switch 1420 are the signals representing $(cc)$ and $(aa)$, the circuit for generating these signals has already been described. In the event all of these signals are present as an input to switch 1420, an output signal representing the character "E" will be produced therefrom.

Figure 36:
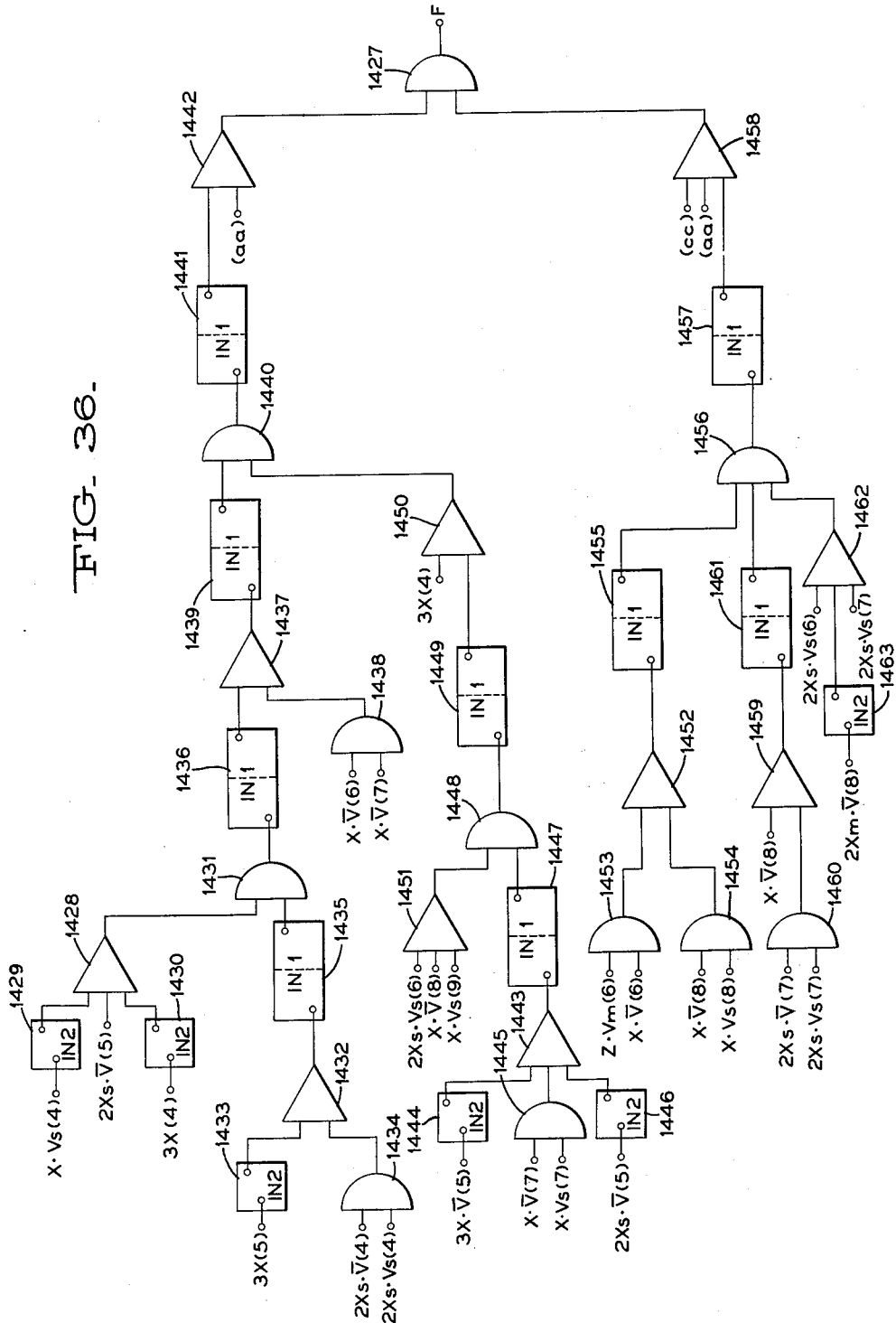

Reference is now made to FIG. 36 which discloses the logical circuit which is utilized to identify the character "F." Reference is made to an OR circuit 1427 which actually produces the signal representative of the character. It is noted that there are two alternate paths by which an input may be supplied to the OR circuit. The first path to be described comprises a switch 1428 which is adapted to receive a signal $\overline{X\cdot Vs}(4)$ from an inverter 1429, $2Xs\cdot\overline{V}(5)$ and $\overline{3X}(4)$, the last-mentioned signal being supplied from an inverter 1430. The output of switch 1428 is supplied to an OR circuit 1431 which has an alternate input supplied from a switch 1432. This switch will produce an output providing it receives signals representing $\overline{3X}(5)$ and either $2Xs\cdot\overline{V}(4)$ or $2Xs\cdot Vs(4)$. The first-described input to switch 1432 arrives by way of an inverter 1433 and either of the last two are supplied by way of an OR circuit 1434. The output of switch 1432 is supplied through the double inverter 1435 to the OR circuit 1431. The output of this OR circuit is supplied through a double inverter 1436 to serve as a first input to a switch 1437, the other input to this switch being supplied from an OR circuit 1438 and representing either $X\cdot\overline{V}(6)$ or $X\cdot\overline{V}(7)$. The output of switch 1437 is supplied through a double inverter 1439 through the OR circuit 1440 and through a double inverter 1441 to a switch 1442.

It is noted that there is an alternate path by which an input may be supplied to the OR circuit 1440. Reference is made to a switch 1443 which is adapted to receive a signal $\overline{3X\cdot\overline{V}}(5)$ from an inverter 1444. By way of an OR circuit 1445, signals representing either $X\cdot\overline{V}(7)$ or $X\cdot Vs(7)$ are supplied therefrom to the switch. The remaining input required by switch 1443 is $2Xs\cdot\overline{V}(5)$ which is supplied from inverter 1446. The output of switch 1443 is supplied through the double inverter 1447 to an OR circuit 1448. The output of this OR circuit is supplied through a double inverter 1449 to a switch 1450. It is noted that there is an alternate path for producing an input to the OR circuit 1448. This path is by way of a switch 1451 which in order to produce an output signal must receive signals representing $2Xs \cdot Vs(6)$, $X \cdot \overline{V}(8)$ and $X \cdot Vs(9)$. Switch 1450 must also receive a signal $3X(4)$ in order to produce an output to the OR circuit 1440.

Switch 1442 which may receive an input from one of the two alternate sources previously described must also receive a signal representing $(aa)$. It has already been described how this signal is produced. The output from switch 1442 passes through the OR circuit 1427 to produce an output signal representing the character "F."

The alternate circuit for producing an output from the OR circuit 1427 is by one of several paths. Reference is made to a switch 1452 which must receive either $Z \cdot Vm(6)$ or $X \cdot \overline{V}(6)$ from an OR circuit 1453 and either $X \cdot \overline{V}(8)$ or $X \cdot Vs(8)$ from the OR circuit 1454. The output of this switch is supplied through a double inverter 1455 to an OR circuit 1456. This signal passes through the OR circuit and through the double inverter 1457 to a switch 1458.

It is noted that there are two alternate paths by which a signal may be supplied to the OR circuit 1456. Referring to a switch 1459, this switch must receive a signal representing $X \cdot \overline{V}(8)$ and a signal representing either $2Xs \cdot \overline{V}(7)$ or $2Xs \cdot Vs(7)$ from an OR circuit 1460. The output of this switch is supplied through a double inverter 1461 to the OR circuit 1456. The remaining alternate path comprises a switch 1462 which is adapted to receive signals $2Xs \cdot Vs(6)$, $2Xs \cdot Vs(7)$ and $\overline{2Xm \cdot \overline{V}(8)}$, the last-mentioned signal being supplied from an inverter 1463.

In order to produce an output from switch 1458, it is necessary that signals representing $(aa)$ as well as $(cc)$ be supplied thereto. If all of the inputs to switch 1458 are relatively positive in coincidence, an output signal will be supplied through the OR circuit 1427 to provide an identification signal for the character "F."

Figure 37:
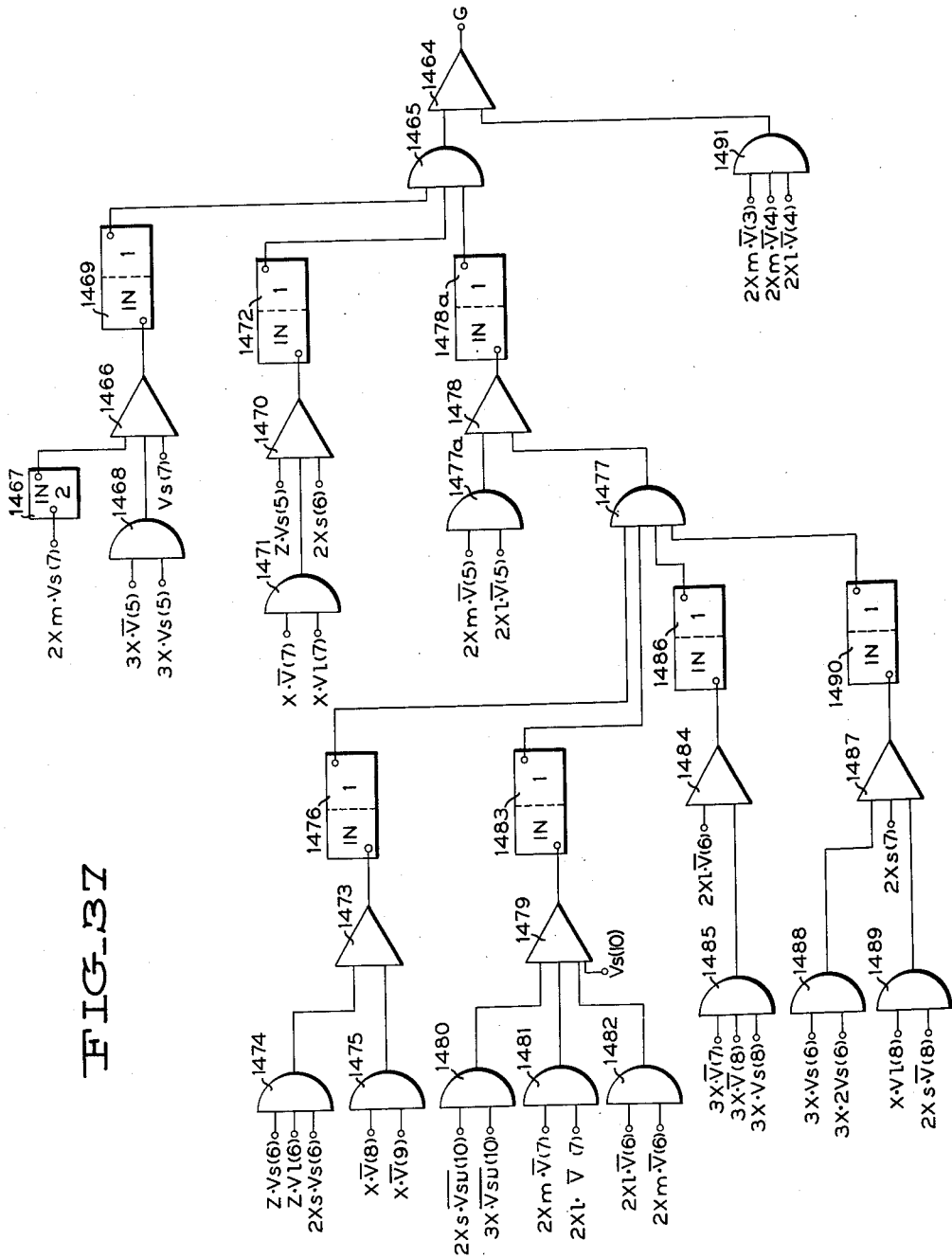

Reference is now made to FIG. 37 which discloses the logical circuitry utilized to generate a signal indicative of the character "G." There is provided a switch 1464 which must receive two inputs in order to produce the output signal. The first input may be received by way of an OR circuit 1465 which is adapted to receive three alternate inputs.

The first of the alternate inputs to OR circuit 1465 comes by way of a switch 1466. The first input to this switch is a signal representing $\overline{2Xm \cdot Vs}(7)$ which is supplied from an inverter 1467. The additional inputs required by the switch are either $3X \cdot \overline{V}(5)$ or $3X \cdot Vs(5)$ supplied from the OR circuit 1468 and a signal representing $Vs(7)$. The output of the switch is supplied through a double inverter 1469 to the OR circuit 1465. The second possible way of obtaining an input to OR circuit 1465 is from a switch 1470. This switch must receive signals representing $Z \cdot Vs(5)$, either $X \cdot \overline{V}(7)$ or $X \cdot Vl(7)$ from OR circuit 1471 and $2Xs(6)$. The output of switch 1470 is supplied through the double inverter 1472 to the OR circuit 1465.

The remaining input to the OR circuit 1465 is by one of several paths. The first path to be described comprises a switch 1473 which must receive a signal representing either $Z \cdot Vs(6)$, $Z \cdot Vl(6)$ or $2Xs \cdot Vs(6)$ from OR circuit 1474, and either $X \cdot \overline{V}(8)$ or $X \cdot \overline{V}(9)$, from OR circuit 1475. The output of switch 1473 is supplied through the double inverter 1476 to an OR circuit 1477 from which it is supplied to the switch 1478. There are three other alternate inputs to the OR circuit 1477. The first alternate input comprises a switch 1479 which must receive four inputs. The first input is supplied from an OR circuit 1480 and must be a signal representing either $2Xs \cdot \overline{Vsu}(10)$ or $3X \cdot \overline{Vsu}(10)$. The second signal is supplied from an OR circuit 1481 and must be a signal representing either $2Xm \cdot \overline{V}(7)$ or $2Xl \cdot V(7)$. The third input required by switch 1479 is supplied from OR circuit 1482 and must be a signal representing either $2Xl \cdot \overline{V}(6)$ or $2Xm \cdot \overline{V}(6)$. The fourth input to switch 1479 represents $Vs(10)$. The output of switch 1479 is supplied through a double inverter 1483 to the OR circuit 1477. The second alternate path comprises a switch 1484. This switch receives a signal representing $2Xl \cdot \overline{V}(6)$. It must receive another signal from OR circuit 1485 which is representative of either $3X \cdot \overline{V}(7)$, $3X \cdot \overline{V}(8)$, $3X \cdot Vs(8)$. The output of switch 1484 is supplied through a double inverter 1486 to the OR circuit 1477. The third alternate input to OR circuit 1477 includes a switch 1487 which is adapted to receive signals representing either $3X \cdot Vs(6)$, or $3X \cdot 2Vs(6)$, from an OR circuit 1488 and either $X \cdot Vl(8)$ or $2Xs \cdot \overline{V}(8)$ from an OR circuit 1489. The remaining input to switch 1487 is a signal representing $2Xs(7)$. The output of switch 1587 is supplied through a double inverter 1490 to the OR circuit 1477.

The remaining input required by switch 1478 is a signal representing either $2Xm \cdot \overline{V}(5)$ or $2Xl \cdot \overline{V}(5)$ supplied from an OR circuit, 1477a. The output of switch 1478 is supplied through a double inverter 1478a to the OR circuit 1465.

To this point, the first input to switch 1464 has been described. The second input is supplied from an OR circuit 1491 and must be a signal representing either $2Xm \cdot \overline{V}(3)$, $2Xm \cdot \overline{V}(4)$ or $2Xl \cdot \overline{V}(4)$. Providing these two inputs to switch 1464 occur in coincidence, an output signal is supplied therefrom indicative of the character "G".

Figure 38:
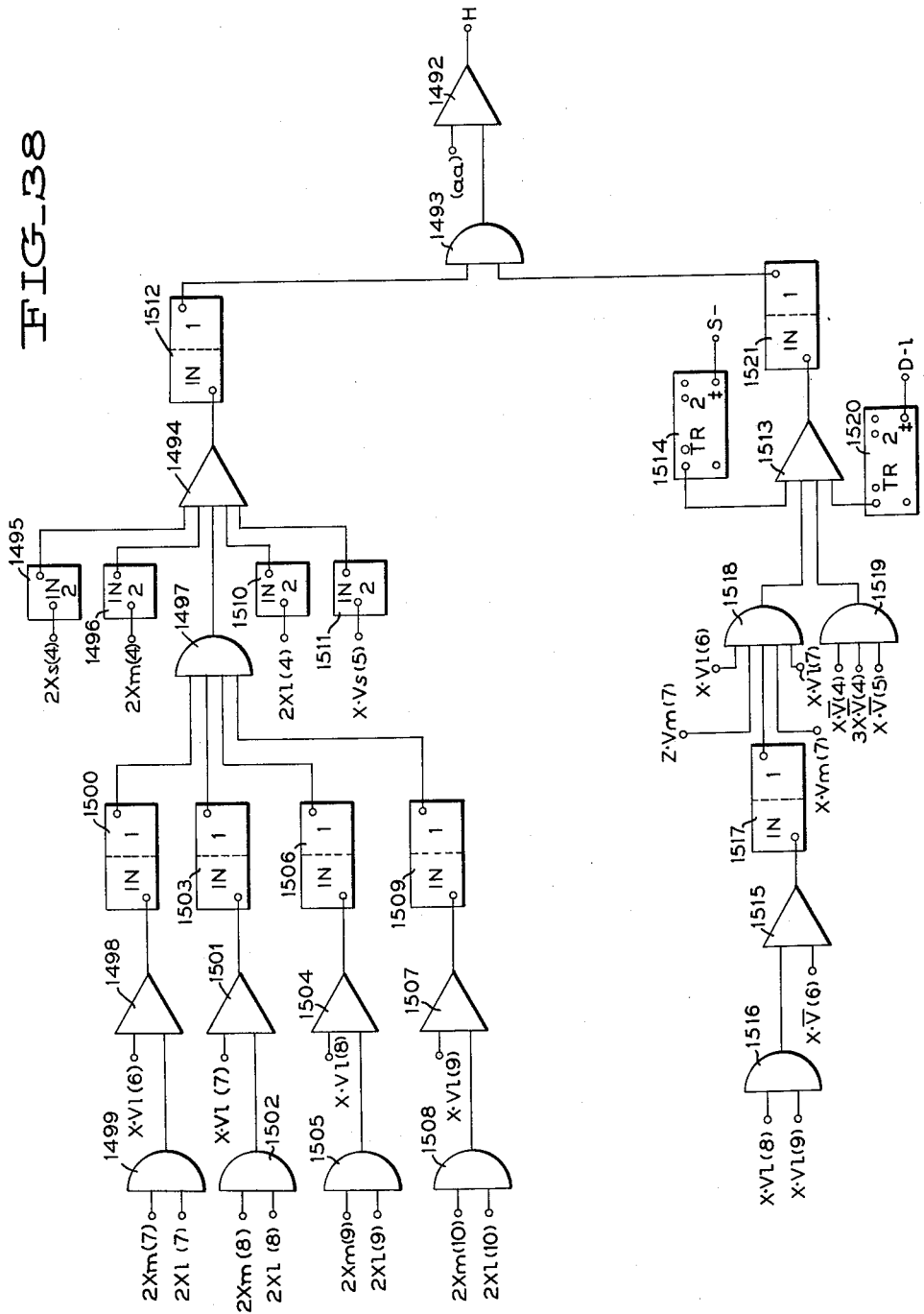

Reference is now made to FIG. 38 which discloses the logical circuitry utilized to identify the character "H". There is provided in the circuit a switch 1492 which is adapted to receive an input from an OR circuit 1493, there being two possible inputs to the OR circuit 1493. The first input to be described comes by way of several alternate paths centered mostly around a switch 1494. The first and second inputs to this switch must be signals representing $\overline{2Xs}(4)$ and $\overline{2Xm}(4)$ from inverters 1495 and 1496, respectively. The third input to this switch 1494 is adapted to be supplied from OR circuit 1497 which may receive an input from four possible sources.

The first pulse for providing an input to the OR circuit 1497 comes from a switch 1498 which is adapted to receive a signal $X \cdot Vl(6)$. The second signal required by this switch is either $2Xm(7)$ or $2Xl(7)$ which is supplied from an OR circuit 1499. The output of switch 1498 is supplied through a double inverter 1500 to the OR circuit 1497. The second manner of obtaining an input to the last-mentioned OR circuit is by way of a switch 1501 which is adapted to receive a signal representing $X \cdot Vl(7)$ and a signal representing either $2Xm(8)$ or $2Xl(8)$, the last two inputs being supplied to the OR circuit 1502. The output of switch 1501 is supplied through a double inverter 1503 to the OR circuit 1497. The third path to OR circuit 1497 is by way of switch 1504 which must receive a signal representing $X \cdot Vl(8)$ and in addition a signal representing $2Xm(9)$ or $2Xl(9)$ from an OR circuit 1505. The output of switch 1507 is supplied through a double inverter 1506 to the OR circuit. The fourth way of obtaining an input to the OR circuit 1497 is by way of a switch 1507 which in order to produce an output signal must receive an input signal representing $X \cdot Vl(9)$, and in additon either $2Xm(10)$ or $2Xl(10)$ from an OR circuit 1508. The output of switch 1507 is supplied through a double inverter 1509 to the OR circuit 1497.

The fourth and fifth inputs required by switch 1494 are supplied from inverters 1510 and 1511, these signals representing $\overline{2Xl}(4)$ and $\overline{X \cdot Vs}(5)$, respectively. The output of switch 1494 is supplied through a double inverter 1512 to the OR circuit 1492.

The other alternate path to the OR circuit 1493 centers around a switch 1513. The first input to this switch is provided from the left side of a trigger 1514. Thus if the trigger 1514 is not turned ON by a signal representing S—, the left side of trigger 1514 will be relatively positive so as to allow a switch 1513 to operate. The second input to switch 1513 is supplied by way of a switch 1515 which receives a signal representing either $X \cdot Vl(8)$ or $X \cdot Vl(9)$ from an OR circuit 1516 and a signal representing $X \cdot \overline{V}(6)$. The output of switch 1515 is supplied through a double inverter 1517 to an OR circuit 1518, this OR circuit supplying the second input to switch 1513. There are alternate inputs from which OR circuit 1518 can supply an output signal. These alternate input signals are either $X \cdot Vl(6)$, $Z \cdot Vm(7)$, $X \cdot Vm(7)$ and $X \cdot Vl(7)$. The third input required by 1513 is a signal representing either $X \cdot \overline{V}(4)$, $3X \cdot \overline{V}(4)$ or $X \cdot \overline{V}(5)$, this signal being supplied by way of switch 1519. The fourth input to switch 1513 must be an indication that $D—l$ has not occurred during the scanning of the character. The signal $D—l$ is supplied to the right side of the trigger 1520. Thus if $D—l$ is not supplied to the trigger, a relatively positive output signal will be supplied from the left side of the trigger to the switch 1513. The output of switch 1513 is supplied through a double inverter 1521 to the OR circuit 1493.

In the event an output is supplied from OR circuit 1493 to the switch 1492, this switch must receive in addition a signal representing $(aa)$, in order to produce the output signal representing the character "H."

Figure 39:
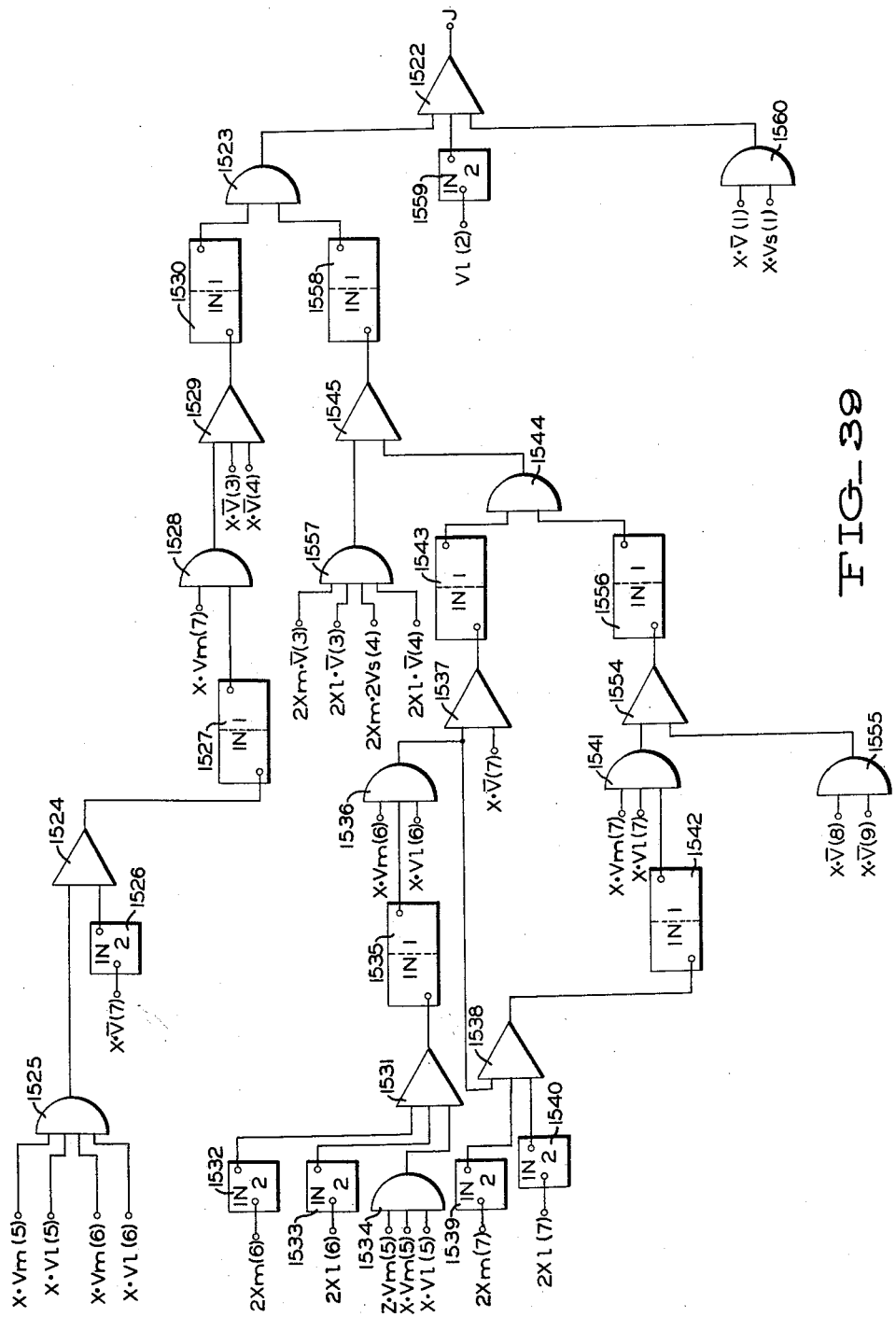

Reference is now made to FIG. 39 which discloses the logical circuitry utilized to identify the character "J." The switch 1522 is adapted to receive three inputs, the first one of which will now be described. The first input is received from OR circuit 1523 which may in turn receive two alternate inputs. The first of these inputs is produced by way of a switch 1524 which is adapted to receive a first input from an OR circuit 1525 representing either $X \cdot Vm(5)$, $X \cdot Vl(5)$, $X \cdot Vm(6)$, or $X \cdot Vl(6)$. The second input required by switch 1524 is a signal representing $\overline{X \cdot V}(7)$ which is supplied from the inverter 1526. The output of switch 1524 is supplied through a double inverter 1527 to the OR circuit 1528, which may also receive a signal representing $X \cdot Vm(7)$. The output of the OR circuit is supplied to a switch 1529 which must receive, in addition, signals representing $X \cdot \overline{V}(3)$ and $X \cdot \overline{V}(4)$. The output of the switch 1529 is supplied through a double inverter 1530 to the OR circuit 1523.

In describing the second input to OR circuit 1523, reference is made to a switch 1531 which must receive a signal representing $\overline{2Xm}(6)$ from an inverter 1532, $\overline{2Xl}(6)$ from an inverter 1533, and either $Z \cdot Vm(5)$, $X \cdot Vm(5)$, or $X \cdot Vl(5)$, from an OR circuit 1534. The output of switch 1531 is supplied through the double inverter 1535 to an OR circuit 1536, the last-mentioned circuit being also arranged to receive signals representing either $X \cdot Vm(6)$ or $X \cdot Vl(6)$. The output of the OR circuit 1536 is supplied as a first input to switches 1537 and 1538. The other input required by switch 1537 is $X \cdot \overline{V}(7)$. The output of this switch is supplied through a double inverter 1543 to an OR circuit 1544, from which a signal may be supplied to the switch 1545. It is noted that there is an alternate path provided for supplying an input to OR circuit 1544. This fashions around the aforementioned switch 1538. Switch 1538 must also receive signals representing $\overline{2Xm}(7)$ from an inverter 1539, and $\overline{2Xl}(7)$ from an inverter 1540. If all of the inputs to this switch are relatively positive in coincidence, an output is supplied through the double inverter 1542 to an OR circuit 1541. The last-mentioned circuit may also receive the signals representing either $X \cdot Vm(7)$ or $X \cdot Vl(7)$. The output of OR circuit 1541 serves as a first input to switch 1554, the other input to this switch being a signal representing either $X \cdot \overline{V}(8) \cdot X \cdot \overline{V}(9)$ supplied from an OR circuit 1555. Switch 1554 supplies an output through a double inverter 1556 and through the OR circuit 1554 to the switch 1545.

Switch 1545 also requires a signal representing either $2Xm \cdot \overline{V}(3)$, $2Xl \cdot \overline{V}(3)$, $2Xm \cdot 2Vs(4)$, or $2Xl \cdot \overline{V}(4)$ from the OR circuit 1557. The output of switch 1545 is supplied through a double inverter 1558 to the OR circuit 1523, from which a signal will be supplied to serve as a first input to the switch 1522. Another input required by the switch 1522 is a signal representing $\overline{Vl}(2)$ which is supplied from an inverter 1559, the remaining input required by switch 1552 is a signal representing either $X \cdot \overline{V}(1)$ or $X \cdot Vs(1)$ which is supplied by way of OR circuit 1560. Thus, if the three inputs to the switch 1522 are relatively positive in coincidence, an output signal representing the character "J" will be produced.

Figure 40:
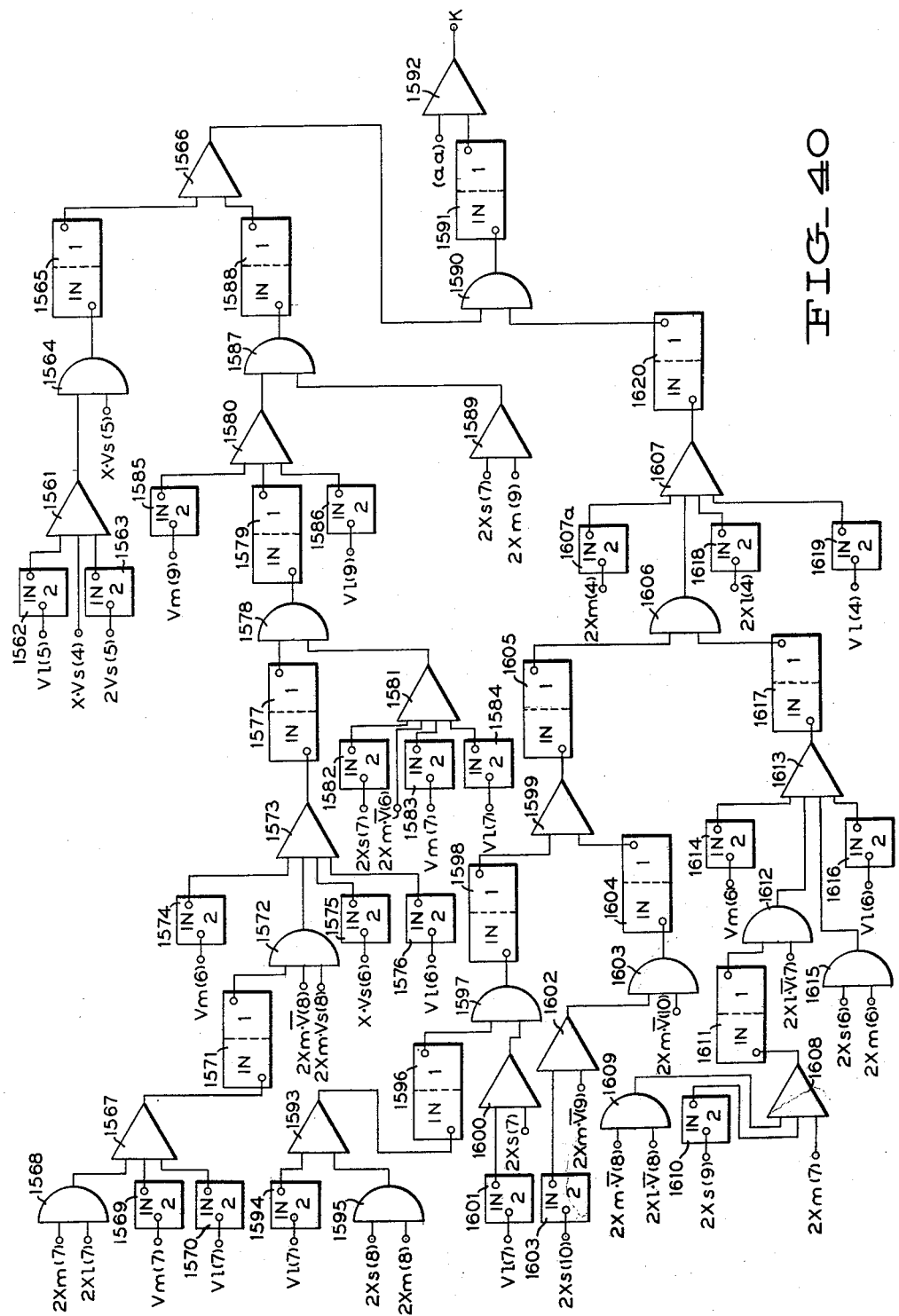
Figure 41:
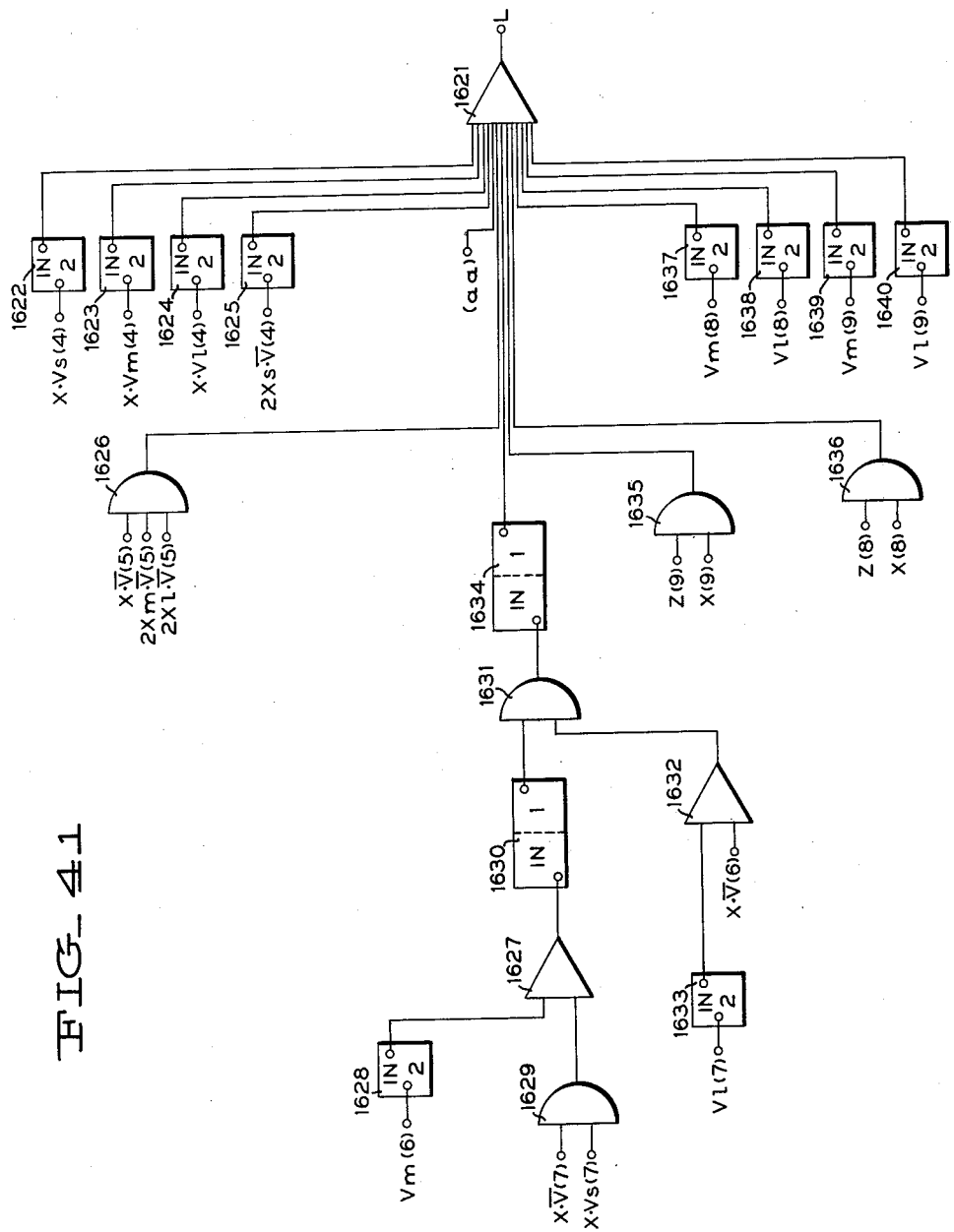

Reference is made to FIG. 40 which discloses the logical circuitry utilized to identify the character "K." Reference is made to a switch 1561 which must receive input signals representing $\overline{Vl}(5)$ from an inverter 1562, a signal representing $X \cdot Vs(4)$, and a signal representing $\overline{2Vs}(5)$ from an inverter 1563. The output of switch 1561 is supplied to an OR circuit 1564 which may also receive a signal representing $X \cdot Vs(5)$. The output of the OR circuit is supplied through a double inverter 1565 to serve as a first input to a switch 1566. The other input to this switch may be derived through a number of alternate paths. The first path to be described centers around a switch 1567 which must receive three inputs. The first signal supplied to this signal may be either $2Xm(7)$ or $2Xl(7)$, which is supplied from the OR circuit 1568. The remaining inputs must be $\overline{Vm}(7)$ and $\overline{Vl}(7)$, which signals are supplied from the inverter 1569 and 1570. The output of switch 1567 is supplied through a double inverter 1571 to an OR circuit 1572, the other input to this OR circuit being signals representing either $2Xm \cdot \overline{V}(8)$ or $2Xm \cdot Vs(8)$. OR circuit 1572 serves as first input to a switch 1573. Another input required by the switch 1573 is a signal representing $\overline{Vm}(6)$ which is supplied from an inverter 1574. Other inputs required by the switch are signals representing $\overline{X \cdot Vs}(6)$ and $\overline{Vl}(6)$, which signals are supplied from the inverter 1575 and 1576, respectively. The output of switch 1573 is supplied through a double inverter 1577 to an OR circuit 1578. An alternate input to the OR circuit 1578 is devised by way of a switch 1581. The first input to this switch must be a signal representing $\overline{2Xs}(7)$ from an inverter 1582. The second signal must represent $2Xm \cdot \overline{V}(6)$. The third and fourth inputs required by this switch are $\overline{Vm}(7)$ and $\overline{Vl}(7)$ which are supplied from inverters 1583 and 1584, respectively. The output of switch 1581 is supplied through the OR circuit 1578 and through the double inverter 1579 to serve as the first input to a switch 1580. Another input required by the switch 1580 is a signal representing $\overline{Vm}(9)$ supplied from the inverter 1585, and $Vl(9)$ supplied from the inverter 1586. The output of the switch 1580 is supplied to an OR circuit 1587, a double inverter 1588 to produce the second input to switch 1566. There is an alternate way of obtaining an input to the OR circuit 1587. This input being supplied from a switch 1589. In order for this input to be produced, this switch must receive signals representing $2Xs(7)$ and $2Xm(9)$. The output of switch 1566 is supplied through an OR circuit 1590 and a double inverter 1591 to the switch 1592. It is noted that OR circuit 1590 may receive an input through another path.

Reference is now made to a switch 1593, which in order to produce an output signal must receive signals representing $\overline{Vl}(7)$ from inverter 1594, and signals representing either $2Xs(8)$ or $2Xm(8)$ from an OR circuit 1595. The output from switch 1593 is supplied through a double inverter 1596 through an OR circuit 1597 and a double inverter 1598 to serve as a first input to a switch 1599. There is an alternate way of producing this first input to the switch which comprises a switch 1600. The first input to this switch must be a signal representing $\overline{Vl}(7)$ from an inverter 1601 and the second a signal representing $2Xs(7)$. The output of this switch is supplied through the OR circuit 1597 and the double inverter 1598 to the switch 1599. The second input required by the switch 1599 is adapted to be received by way of a switch 1602. This switch must receive an input representing $\overline{2Xs}(10)$ from an inverter 1603 and a signal representing $2Xm \cdot \overline{V}(9)$. The output of this switch is supplied through an OR circuit 1603 and through the double inverter 1604 to the switch 1599.

It is noted that alternately OR circuit 1603 may receive another input representing $\overline{2Xm \cdot V}(10)$. The output of switch 1599 is supplied through a double inverter 1605 and an OR circuit 1606 to a switch 1607. Another input required by the switch 1607 is a signal representing $\overline{2Xm}(4)$ which is supplied from inverter 1607a. A third input to the switch 1607 is supplied from inverter 1618 which represents $\overline{2Xl}(4)$. The remaining input to switch 1607 is a signal representing $\overline{Vl}(4)$ which is supplied from the inverter 1619.

It is seen that OR circuit 1606 may supply an input to switch 1607 by way of two output paths, only one of which has been described to the present. The second alternate path includes a switch 1608 which is adapted to receive a signal representing either $2Xm \cdot \overline{V}(8)$ or $2Xl \cdot \overline{V}(8)$ from an OR circuit 1609. Another input to switch 1608 is supplied from an inverter 1610, this signal representing $\overline{2Xs}(9)$. The remaining input required by switch 1608 is a signal representing $2Xm(7)$. The output of switch 1608 is supplied through a double inverter 1611 to an OR circuit 1612. OR circuit 1612 can receive an input alternatively representing $2Xl \cdot \overline{V}(7)$. The output of the OR circuit is supplied to serve as a first input to switch 1613. Another input required by this switch is a signal representing $\overline{Vm}(6)$ which is supplied from inverter 1614. The third input required by switch 1613 is the signal representing either $2Xs(6)$ or $2Xm(6)$ which is supplied from OR circuit 1615. The last input required by switch 1613 is a signal representing $\overline{Vl}(6)$ which is supplied from a double inverter 1616. The output from switch 1613 is supplied through a double inverter 1617 to the OR circuit 1606 thereby producing an input to switch 1607.

In the event switch 1607 receives relatively positive inputs on each of the input lines, a signal will be supplied therefrom through the double inverter 1620 and the OR circuit 1590 and the double inverter 1591 to the switch 1592. The only remaining input required by the switch 1592 is a signal representing $(aa)$. Thus, if both inputs to the switch 1592 are relatively positive in coincidence, an output signal representing the character "K" will be produced.

Reference is now made to FIG. 51 which discloses the logical circuitry utilized to identify the character "L." There is provided a switch 1621 which is adapted to receive a number of inputs. The first group of these inputs are signals representing $\overline{X \cdot Vs}(4)$, $\overline{X \cdot Vm}(4)$, $\overline{X \cdot Vl}(4)$ and $\overline{2Xs \cdot V}(4)$, these signals being supplied from inverters 1622, 1623, 1624 and 1625, respectively. Another input required by the switch 1621 is a signal representing $(aa)$. A further input required is a signal representing either $X \cdot \overline{V}(5)$, $2Xm \cdot \overline{V}(5)$, or $2Xl \cdot \overline{V}(5)$, this signal being supplied to the switch 1621 from the OR circuit 1626. Another input required by the switch 1621 is supplied by way of two alternate paths. The first path comprises a switch 1627 which must receive a signal representing $\overline{Vm}(6)$ from an inverter 1628 and a signal representing either $X \cdot \overline{V}(7)$ or $X \cdot \overline{Vs}(7)$ from the OR circuit 1629. The output of switch 1627 is supplied through a double inverter 1630 to an OR circuit 1631. This OR circuit may receive another input from a switch 1632 which in order to produce this input to the OR circuit must receive a signal representing $\overline{Vl}(7)$ from an inverter 1633 and a signal representing $X \cdot \overline{V}(6)$. The output of the OR circuit 1631 is supplied through a double inverter 1634 to the switch 1621. Another input required by the switch is a signal representing $Z(9)$ or $X(9)$, which signal is supplied from an OR circuit 1635. A signal representing $Z(8)$ or $X(8)$ is supplied from the OR circuit 1636 to serve as another input to the switch 1621. The remaining inputs required by the switch 1621 are signals representing $\overline{Vm}(8)$, $\overline{Vl}(8)$, $\overline{Vm}(9)$, and $\overline{Vl}(9)$, these signals being supplied from the inverters 1637, 1638, 1639 and 1640, respectively. In the event all of the inputs to switch 1621 occur and are relatively positive in coincidence, an output signal representing the character "L" will be produced.

Figure 42:
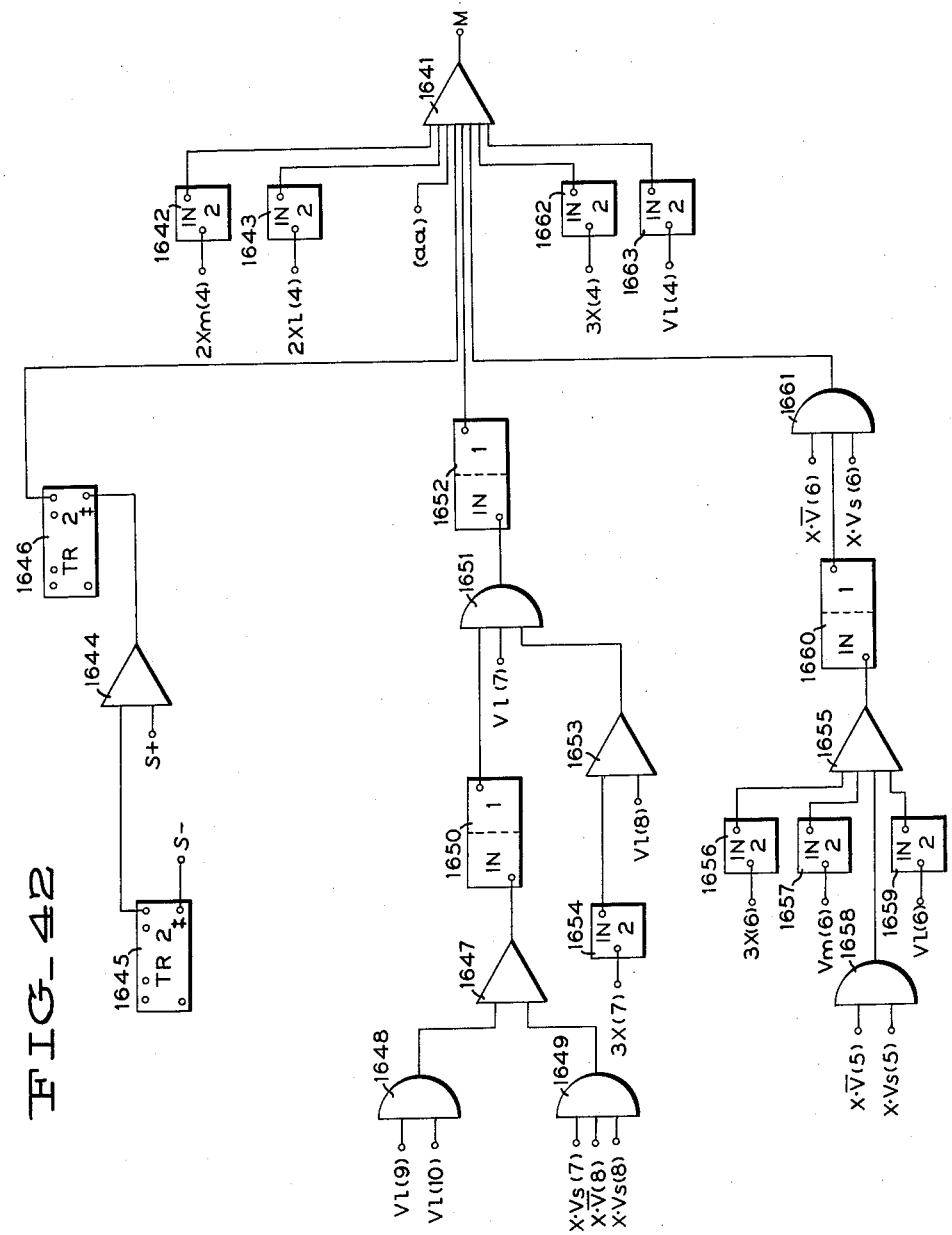

Reference is now made to FIG. 42 which discloses the circuitry utilized to identify the character "M."

There is provided a switch 1641 which must receive a plurality of inputs in order to produce an output. The first two inputs are $\overline{2Xm}(4)$ and $\overline{2Xl}(4)$ from the inverters 1642 and 1643, respectively. The next input required is a signal representing $(aa)$. Another input required is supplied from a switch 1644. This switch will produce an output in the event a signal representing S— is supplied to a trigger 1645 to turn the trigger ON, thereby allowing the trigger to supply an output indicating S— to a switch 1664. If this condition is followed by a signal S+, an output is supplied to turn a trigger 1646 ON. In this event, the output of the trigger 1646 is a relatively positive voltage and is supplied to the switch 1641. Another input to the switch 1641 comes by way of a switch 1647 which must receive signals representing either $Vl(9)$ or $Vl(10)$ from the OR circuit 1648 and signals representing either $X \cdot Vs(7)$, $X \cdot \overline{V}(8)$, or $X \cdot Vs(8)$, these signals being supplied from the OR circuit 1649. The output of switch 1647 is supplied through a double inverter 1650 to serve as a first input to an OR circuit 1651. Alternatively, a signal representing $Vl(7)$ may be supplied to the OR circuit 1651. In addition, a signal may be supplied from a switch 1653. This switch, in order to produce an output signal, must receive a signal representing $\overline{3X}(7)$ from an inverter 1654 and a signal representing $Vl(8)$. The output of OR circuit 1651 is supplied through a double inverter 1652 to the switch 1641. Another input to switch 1641 is supplied by way of a switch 1655. In order for this switch to produce an output it must receive signals representing $\overline{3X}(6)$ and $\overline{Vm}(6)$ from inverters 1656 and 1657, respectively. The switch must also receive a signal representing either $X \cdot \overline{V}(5)$ or $X \cdot \overline{Vs}(5)$ by way of an OR circuit 1658. The last input required by the switch 1655 is the signal representing $\overline{Vl}(6)$ supplied from an inverter 1659. The output of the switch is supplied through the double inverter 1660 to an OR circuit 1661. An output may also be supplied from this OR circuit in the event it receives signals representing $X \cdot \overline{V}(6)$ or $X \cdot Vs(6)$. The output from the OR circuit is supplied to a switch 1641. The remaining two inputs required by switch 1641 are signals representing $\overline{3X}(4)$ and $\overline{Vl}(4)$ from inverters 1662 and 1663, respectively.

In the event all of the inputs previously described are supplied to switch 1641 in coincidence, an output signal representing the character "M" is produced.

Figure 43:
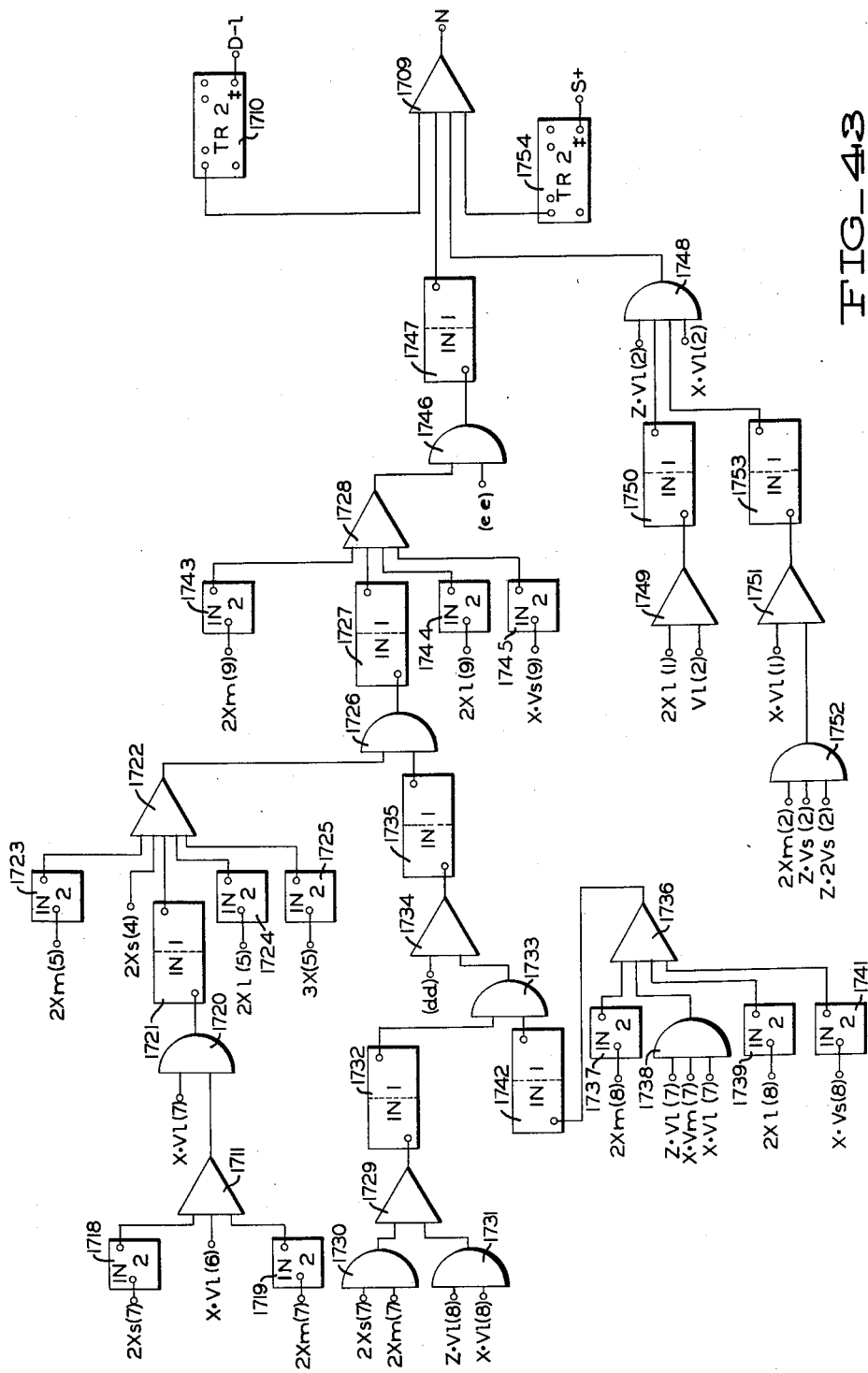

Reference is made to FIG. 43 which discloses the logical circuitry utilized to identify the character "N." It is noticed that signals representing $(dd)$ and $(ee)$ are supplied as inputs to this circuit. Before getting into the details of this circuit, reference is made to FIG. 58 which discloses the circuitry utilized to generate the signals representing $(dd)$ and $(ee)$. One of the prime factors in determining the symbols is furnished by a switch 1664. This switch is adapted to receive as its first, second, and third inputs signals representing $\overline{2Xl}(6)$, $\overline{3X}(6)$ and $\overline{2Xl}(7)$, these signals being supplied from the inverters 1665, 1666, and 1667, respectively. A fourth input required by this switch is the SCAN SYNC+1 signal. The fifth input to the switch 1664 may be a signal representing either $Z \cdot Vl(10)$, $X \cdot Vm(10)$ or $X \cdot Vl(10)$, this signal being supplied from the OR circuit 1668. An OR circuit 1669 is utilized to supply a signal representing either $X \cdot \overline{V}(8)$ or $X \cdot Vs(8)$ to the switch 1664. The next input to switch 1664 may come by one of several paths through an OR circuit 1670. Thus OR circuit 1670 will produce an output signal if it receives a signal representing $Z \cdot Vl(5)$. It will also produce an output in the event it receives a signal from a switch 1671 which is adapted to receive a signal representing either $2Xs(5)$, $Z \cdot Vs(5)$ or $Z \cdot 2Vs(5)$ from the OR circuit 1672, and a signal representing $X \cdot Vl(4)$. The output of switch 1671 is supplied through a double inverter 1673 to the OR circuit 1670. Another possible input to the OR circuit 1670 is derived by way of a switch 1674 which is adapted to receive signals representing $2Xl(4)$ and $Vl(5)$. The output of this switch is supplied through a double inverter 1675 to the OR circuit. The remaining possible input to the OR circuit 1670 is a signal representing $X \cdot Vl(5)$. Switch 1664 is also adapted to receive signals representing $\overline{3X}(7)$ and $\overline{3X}(9)$ from the inverters 1676 and 1677, respectively.

The remaining input to the switch 1664 is derived in a manner now to be described. There is provided a switch 1678 which is adapted to receive an input from many sources. The first input is a signal representing $\overline{3X}(10)$ which is supplied from inverter 1679. The next three inputs are signals representing $\overline{2Xl}(7)$, $\overline{3X}(7)$, and $\overline{2Xl}(8)$, which are supplied from inverters 1680, 1681, 1682, respectively. The next input to the switch 1678 is derived from an OR circuit 1685 which is adapted to receive four alternate inputs. The first of these alternate inputs is derived from the switch 1683 which receives signals representing $2Xl(5)$ and $Vl(6)$. The output of the switch is supplied through a double inverter 1684 to the OR circuit. Another input to this OR circuit are signals representing $Z \cdot Vl(6)$ and $X \cdot Vl(6)$. The remaining input to the OR circuit 1685 is derived from a switch 1686 which must receive a signal representing either $2Xs(6)$, $Z \cdot Vs(6)$ or $Z \cdot 2Vs(6)$ from the OR circuit 1687 and a signal representing $X \cdot Vl(5)$. The output of the switch is supplied through a double inverter 1688 to the OR circuit 1685. The next input required by the switch 1678 is supplied from an OR circuit 1689 and may be a signal representing either $X \cdot \overline{V}(9)$ or $X \cdot Vs(9)$. A further input to this switch is a signal representing $\overline{3X}(8)$ which is supplied from inverter 1690. It is noted that the SCAN SYNC+1 pulse is also supplied to the switch 1678. One final input to switch 1678 is derived from the left side of the trigger 1691. If this trigger is not turned ON during the scanning of a character by an SO signal, the left side thereof will be relatively positive so as to allow the switch 1678 to provide an output. However, if the trigger 1691 is turned ON, and not turned OFF before the input conditions to switch 1678 are all relatively positive, the switch will be inhibited until the trigger 1691 is turned OFF.

The circuitry required for turning this trigger 1691 OFF will now be described. There is provided a switch 1692 which is adapted to receive signals representing $\overline{2Xl}(9)$, $\overline{3X}(9)$, $\overline{2Xl}(10)$, and $\overline{3X}(10)$, these signals being supplied through the inverter 1693, 1694, 1695, and 1696, respectively. The fourth input required by switch 1692 is a signal from the OR circuit 1700. This OR circuit may receive four inputs, the first of which is derived from a switch 1697 which in order to produce an output signal must receive a signal representing either $2X(8)$, $Z \cdot Vs(8)$, or $Z \cdot 2Vs(8)$ from an OR circuit 1698. The remaining input required by the switch 1697 is a signal representing $X \cdot Vl(7)$. The output of this switch is supplied through a double inverter 1699 to the OR circuit 1700. The other input to this OR circuit may be signals representing $X \cdot Vl(8)$ or $Z \cdot Vl(8)$. The remaining input is derived from a switch 1701 which in order to produce an output signal through the double inverter 1702 must receive signals representing $2Xl(7)$ and $Vl(8)$. The output of OR circuit 1700 is supplied to the switch 1692. If all of the inputs to this switch are relatively positive in coincidence at the SCAN SYNC+1 time, a positive pulse will be supplied to the trigger 1691, the trailing edge of which pulse will turn the trigger OFF. It is seen, therefore, that if the trigger is OFF, an output can be supplied through the switch 1678 providing all of its inputs are relatively positive in coincidence.

In the event of an output from the switch 1678, a trigger 1703 will be turned ON thus providing an output from the right side of this trigger representing the symbol $(dd)$. The output of switch 1678 is also supplied to a trigger 1704 and will turn the trigger ON with the trailing edge of the output. It is seen that the left side of the trigger is connected to the switch 1664 and would inhibit this switch, providing the trigger 1704 is turned ON. Thus, if the trigger is turned ON, it may be turned OFF by way of an OR circuit 1705 which is adapted to receive the signals representing $D+s$ and $D+l$. If all of the inputs to switch 1664 are relatively positive in coincidence, an output is supplied therethrough which is of the same duration as the SCAN SYNC+1 pulse to turn a trigger 1706 ON. The output from the right side of this trigger will be relatively positive and is supplied to a switch 1707, the other input to this switch being a signal representing $\overline{X \cdot Vs}(8)$ which is supplied from an inverter 1708. The output of switch 1707 is a signal representing the symbol $(ee)$. Referring again to FIG. 43, there is disclosed a switch 1709 which must receive a number of inputs in order to produce an output signal representing the character "N." The first of these output signals is received from the left side of the trigger 1710. If the trigger 1710 is not turned ON by a signal representing $D-l$, a relatively positive voltage will be supplied from the left side thereof to the switch 1709. Thus, a signal representing $D-l$ must not be received in order to identify the character "N."

Another signal required by the switch 1709 is derived a number of alternate ways. The first of which includes a switch 1711 which in order to produce an output signal must receive signals representing $\overline{2Xs}(7)$ from inverter 1718, $X \cdot Vl(6)$, and $\overline{2Xm}(7)$ from an inverter 1719. The output of switch 1711 is supplied to an OR circuit 1720, which may also receive a signal representing $X \cdot Vl(7)$. The output of the OR circuit 1720 is supplied through a double inverter 1721 to serve as the first input to a switch 1722. Other inputs required with this switch are signals representing $\overline{2Xm}(5)$, which is supplied from the inverter 1723. Another input to the switch 1722 is a signal representing $2Xs(4)$. The remaining two signals required by the switch 1722 are $\overline{2Xl}(5)$ and $\overline{3X}(5)$ which are supplied from the inverter 1724 and 1725, respectively. The output of this switch 1722 is supplied through an OR circuit 1726 and a double inverter 1727 to a switch 1728. It is noted that there is an alternative way of producing a signal since the OR circuit 1726 may receive a signal by an alternative path. Referring to a switch 1729, an output will be produced therefrom providing it receives a signal representing either $2Xs(7)$ or $2Xm(7)$ from an OR circuit 1730, and a signal representing either $\overline{X} \cdot Vl(8)$ or $X \cdot Vl(8)$ from an OR circuit 1731. The output of switch 1729 is supplied through a double inverter 1732 to an OR circuit 1733. This OR circuit will produce an output to a switch 1734 which if it receives a signal representing $(dd)$ will supply an output signal through a double inverter 1735 to the OR circuit 1736. There is an alternative way of producing an output to the OR circuit in that 1733 will receive a signal from a double inverter 1742 which is supplied from a switch 1736. The first input supplied to this switch is the signal representing $\overline{2Xm}(8)$ which is supplied from inverter 1737. The next input to this switch is a signal representing either $Z \cdot Vl(7)$, $X \cdot Vm(7)$ or $X \cdot Vl(7)$, which signal is supplied from an OR circuit 1738. The last two inputs provided to switch 1736 are signals representing $\overline{2Xl}(8)$, $\overline{X} \cdot Vs(8)$ which signals are supplied from the inverter 1739 and 1741, respectively. Other inputs required by the switch 1728 are signals representing $\overline{2Xm}(9)$, $\overline{2Xl}(9)$ and $\overline{X \cdot Vs}(9)$, these signals being supplied from the inverter 1743, 1744, and 1745, respectively. The output of switch 1728 is supplied to an OR circuit 1746 which may also receive the signal representing the signal (ee). The output of the OR circuit is supplied through a double inverter 1747 to serve as a second input to the switch 1709.

The third input to the switch 1709 will be supplied from an OR circuit 1748. The first input to this OR circuit is a signal representing $Z \cdot Vl(2)$. The second input is derived from a switch 1749 which in order to produce an output must receive a signal representing $2Xl(1)$ and $Vl(2)$. The output from switch 1749 is supplied through a double inverter 1750 to the OR circuit. Another input to the OR circuit is derived from a switch 1751 which must receive signals representing $X \cdot Vl(1)$ and a signal representing either $2Xm(2)$ or $Z \cdot Vs(2)$ or $Z \cdot 2Vs(2)$ from the OR circuit 1752. The output of switch 1751 is supplied through the double inverter 1752 to the OR circuit 1748. The remaining alternative input to OR circuit 1748 may be a signal representing $Z \cdot Vl(2)$ or $X \cdot Vl(2)$. In order for switch 1709 to produce an output signal it must receive a further input from a trigger 1754. This signal will be relatively positive providing a signal S+ has not been supplied to the trigger. It is seen that a positive slope is not normally found in the character "N." Thus, if a signal S+ is not supplied to the trigger 1754 to turn the trigger ON, the left side thereof will be relatively positive and will not inhibit the switch 1709. Thus, all of the inputs to switch 1709 will produce an output signal representative of the character "N."

Figure 44:
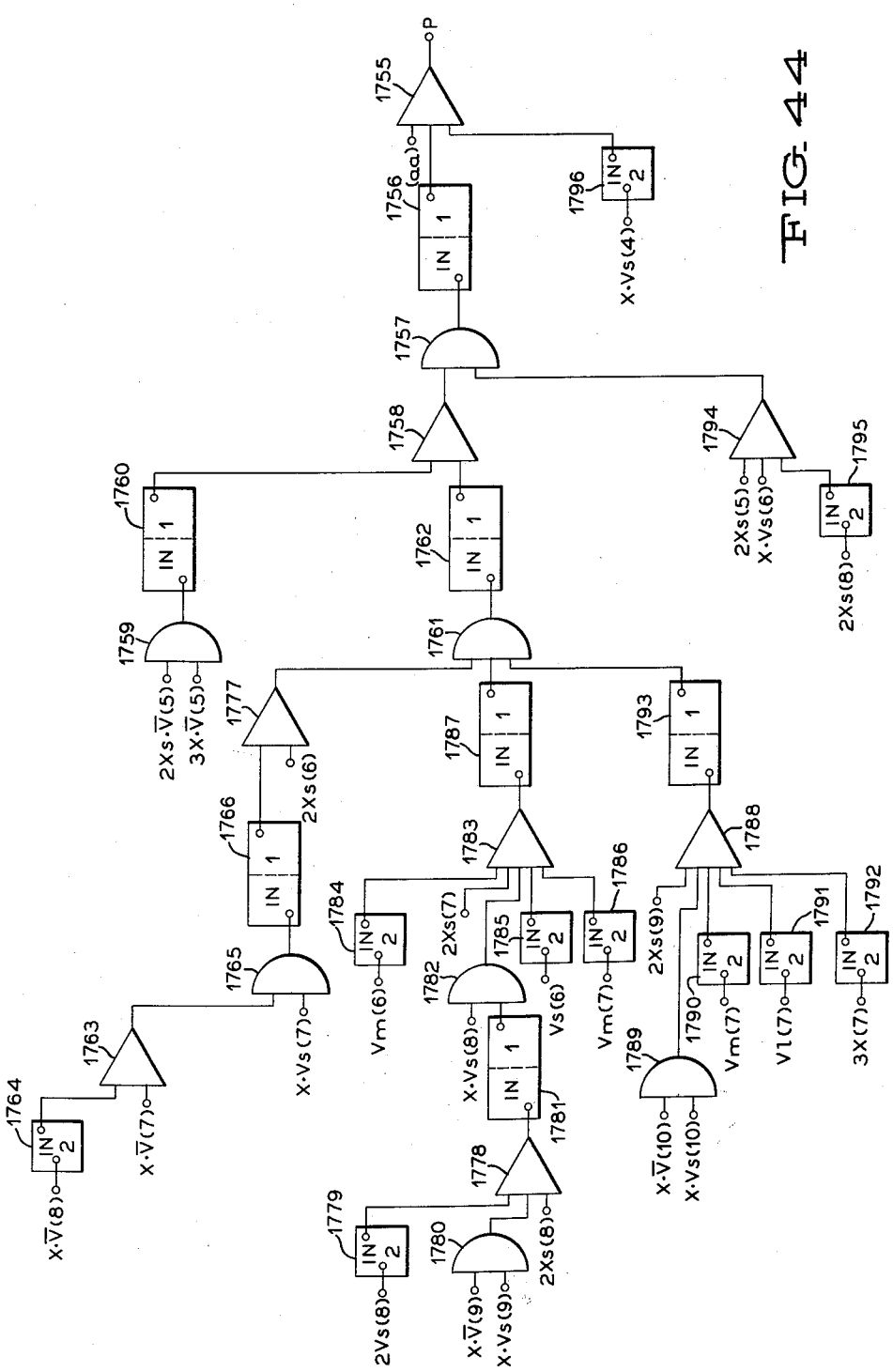

FIG. 44 discloses the circuitry utilized to identify the character "P." There is provided a switch 1755 which is adapted to receive signals representing (aa). Another input to this switch is provided from an OR circuit 1757 through a double inverter 1756. It is noted that there are two possible inputs to the OR circuit 1757. The first of these inputs is derived from a switch 1758 which must receive signals representing $2Xs \cdot \overline{V}(5)$ or $3X \cdot \overline{V}(5)$ by way of an OR circuit 1759 and a double inverter 1760. The second input required by switch 1758 is received from an OR circuit 1761 through a double inverter 1762.

There are three possible inputs to the OR circuit 1761. The first of which is derived from a switch 1763 which must receive the signals representing $\overline{X \cdot \overline{V}}(8)$ from an inverter 1764, and a signal representing $X \cdot \overline{V}(7)$. The output of switch 1763 is supplied to an OR circuit 1765 which may also receive a signal representing $X \cdot Vs(7)$. The output of the OR circuit is supplied through a double inverter 1766 to a switch 1777, the other input to this switch being a signal representing $2Xs(6)$. The output of switch 1777 serves as one of the three inputs to OR circuit 1761.

The second input to OR circuit 1761 is derived from a switch 1778 which must receive input signals representing $\overline{2Vs}(8)$ from an inverter 1779, signals representing either $X \cdot \overline{V}(9)$ or $X \cdot Vs(9)$ from an OR circuit 1780 and a signal representing $2Xs(8)$. The output of the switch 1778 is supplied through a double inverter 1781 to an OR circuit 1782, there being another possible input to this OR circuit representing $X \cdot Vs(8)$. The output of the OR circuit 1782 is supplied to serve as an input to switch 1783. Another input required by this switch is a signal representing $\overline{Vm}(6)$ which is supplied from an inverter 1784. Another input is a signal representative of $2Xs(7)$. The remaining inputs are signals representing $\overline{Vs}(6)$ and $\overline{Vm}(7)$, these last two signals being supplied from inverters 1785 and 1786, respectively. The output of the switch 1783 is supplied through a double inverter 1787 to serve as a second possible input to the OR circuit 1761.

The third possible input to the OR circuit 1761 is derived by way of a switch 1788. The input signals required by this switch are signals representing $2Xs(9)$, signals representing either $X \cdot \overline{V}(10)$ or $X \cdot Vs(10)$ supplied by way of OR circuit 1789, and signals representing $\overline{Vm}(7)$, $\overline{Vl}(7)$, and $\overline{3X}(7)$, the last three signals being supplied by way of inverters 1790, 1791 and 1792. The output of the switch 1788 is supplied through a double inverter 1793 to serve as a possible input to the OR circuit 1761.

The output of OR circuit 1761 is supplied through a double inverter 1762 to serve as a second input to switch 1758. The output of the switch 1758 serves as the first of two possible inputs to the OR circuit 1757, the outputs of which will be supplied through the double inverter 1756 to the switch 1755. Alternatively, an input may be supplied to the OR circuit 1757 from a switch 1794 which receives signals representing $2Xs(5)$, $X \cdot Vs(6)$, and $\overline{2Xs}(8)$, the last-mentioned signal being supplied from inverter 1795. The remaining input required by switch 1755, in order to produce an output signal, is a signal representing $\overline{X \cdot Vs}(4)$ which is supplied from an inverter 1796. If all of the inputs to switch 1755 are relatively positive in coincidence, an output signal representing the character "P" will be produced.

Figure 45:
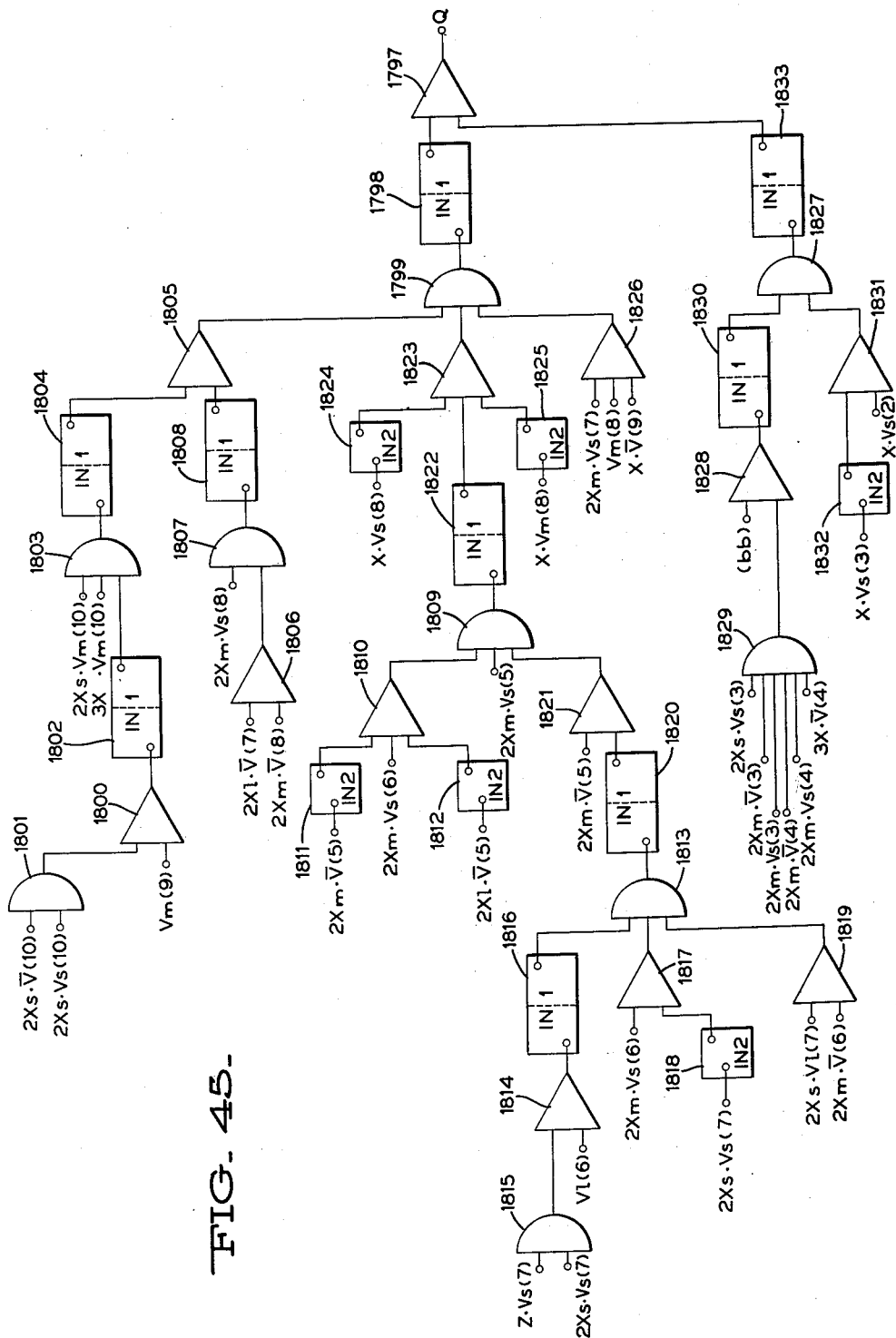

Reference is now made to FIG. 45 which discloses the circuit utilized to identify the character "Q." There is provided a switch 1797 which is adapted to receive an input through a double inverter 1798 from an OR circuit 1799.

There are three possible inputs to the OR circuit 1799. The first of which is derived in a manner now to be described. There is provided a switch 1800 which receives signals representing either $2Xs \cdot \overline{V}(10)$ or $2Xs \cdot Vs(10)$ from an OR circuit 1801 and a signal representing $Vm(9)$. The output of this switch is supplied through a double inverter 1802 to an OR circuit 1803. This OR circuit may also receive signals representing $2Xs \cdot Vm(10)$ or $3X \cdot Vm(10)$. The output of the OR circuit is supplied through a double inverter 1804 to a switch 1805. The second input required by switch 1805 is supplied from a switch 1806 which receives signals representing $2Xl \cdot \overline{V}(7)$ and $2Xm \cdot \overline{V}(8)$. The output of the switch is mixed with a signal representing $2Xs \cdot Vm(8)$. The output of this switch is applied to an OR circuit 1807, the other input of which is a signal representing $2Xm \cdot Vs(8)$. The output of the OR circuit 1807 is supplied through a double inverter 1808 to a switch 1805. The output of the latter switch represents the first input to the OR circuit 1799.

The second input to the OR circuit 1799 is derived from an OR circuit 1809 which may receive an input from one of three sources. The first of these inputs may be derived from a switch 1810, which in order to produce an input to the OR circuit 1809 must receive signals representing $\overline{2Xm \cdot \overline{V}}(5)$ from an inverter 1811, a signal representing $2Xm \cdot Vs(6)$, and a signal representing $\overline{2Xl \cdot \overline{V}}(5)$, the last-mentioned signal being supplied from an inverter 1812. The second possible input to the OR circuit 1809 is a signal representing $2Xm \cdot Vs(5)$. The third input to this OR circuit is derived from an OR circuit 1813, this circuit also being capable of receiving as many as three inputs. The first of these inputs is derived from a switch 1814, which in order to produce an output signal must receive a signal representing either $Z \cdot Vs(7)$ or $2Xs \cdot Vs(7)$ from an OR circuit 1815 and a signal representing $Vl(6)$. The output of the switch 1814 is supplied through a double inverter 1816 to the OR circuit 1813. The second possible input to the OR circuit 1813 is derived from a switch 1817 which receives as input signals $2Xm \cdot Vs(6)$ and $\overline{2Xs \cdot Vs}(7)$, the last-mentioned signal being supplied from an inverter 1818. The third possible input to the OR circuit 1813 comes from a switch 1819, which receives signals representing $2Xs \cdot Vl(7)$ and $2Xm \cdot \overline{V}(6)$. The output of the OR circuit is supplied through a double inverter to a switch 1821 which also receives a signal representing $2Xm \cdot \overline{V}(5)$. The output of OR circuit 1809 is supplied through a double inverter 1822 to the switch 1823. Two other inputs are required by this switch in order to produce an output to the OR circuit 1799. These signals are $\overline{X \cdot Vs}(8)$ and $\overline{X \cdot Vm}(8)$, these signals being supplied from inverters 1824 and 1825, respectively.

The third possible input to OR circuit 1799 comes from a switch 1826 which receives input signals representing $2Xm \cdot Vs(7)$, $Vm(8)$, and $X \cdot \overline{V}(9)$.

Switch 1797 must also receive an input signal from an OR circuit 1827. There are two possible inputs to this OR circuit, the first of which is derived from a switch 1828 which receives a signal representing $(bb)$ and a signal from an OR circuit 1829. The OR circuit 1829 will produce a signal if either $2Xs \cdot Vs(3)$, $2Xm \cdot \overline{V}(3)$, $2Xm \cdot Vs(3)$, $2Xm \cdot Vs(4)$ or $3X \cdot \overline{V}(4)$, are present. The output of switch 1828 is supplied through a double inverter 1830 to serve as one of the inputs to OR circuit 1827. The other input to this OR circuit is derived from a switch 1831 which receives signals representing $\overline{X \cdot Vs}(3)$ from an inverter 1832 and a signal representing $X \cdot Vs(2)$. The output of the OR circuit 1827 is supplied through a double inverter 1833 to the switch 1797. Thus, if both the inputs to this circuit are relatively positive in coincidence, an output signal representing the character "Q" will be produced.

Figure 46:
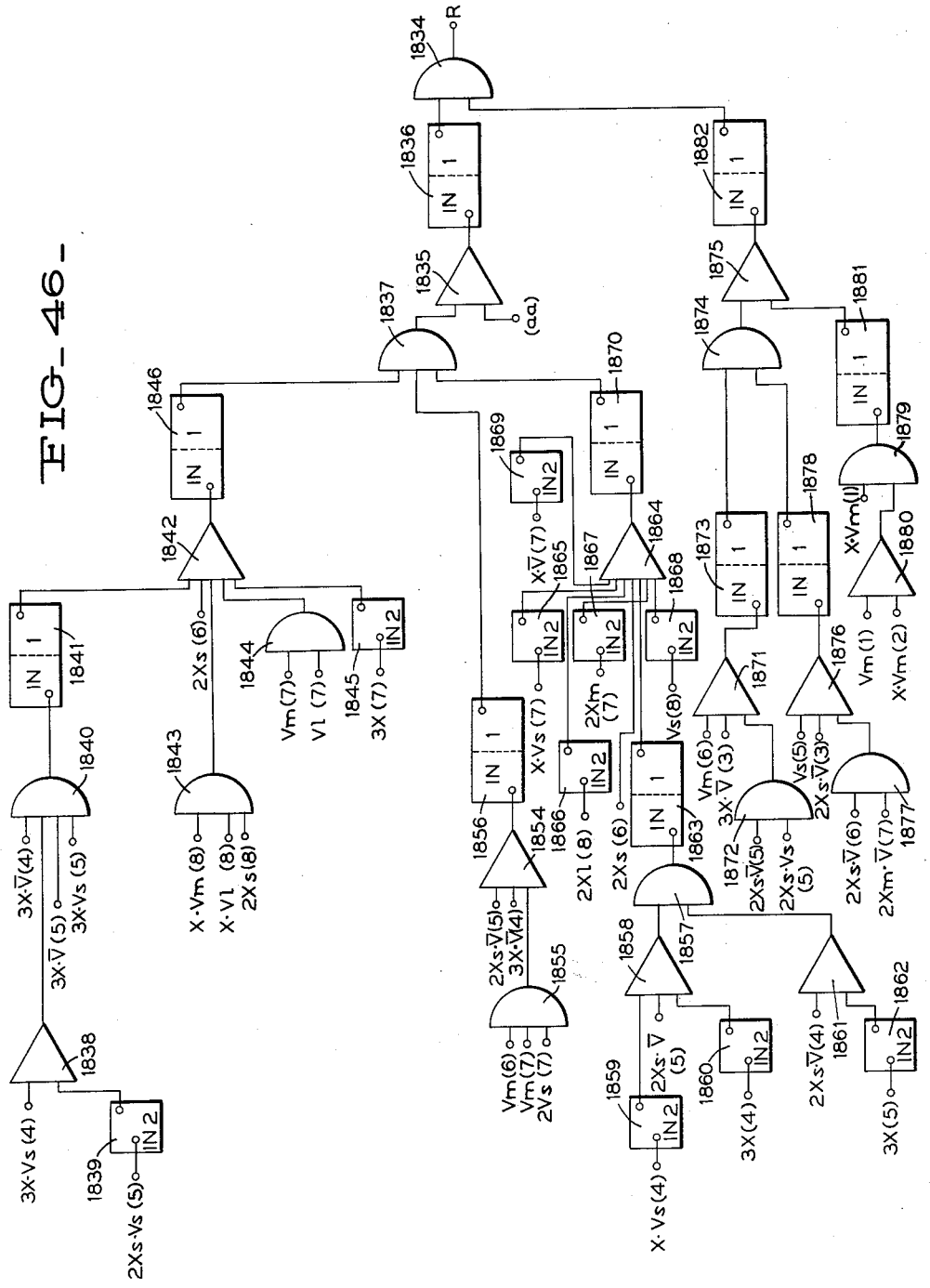

Referring to FIG. 46, there is disclosed the circuitry disclosed to identify the character "R." There is provided an OR circuit 1834 which may receive inputs from either of two sources. The first of these inputs may be received from a switch 1835 through a double inverter 1836. The switch 1835 receives a signal representing $(aa)$. The other input required by this switch is a signal of an OR circuit 1837, this OR circuit having supplied thereto three possible inputs.

The first of the inputs to OR circuit 1837 will now be described. There is provided a switch 1838 which is adapted to receive a signal representing $3X \cdot Vs(4)$ and a signal representing $\overline{2Xs \cdot Vs}(5)$, the last-mentioned signal being supplied from inverter 1839. The output of this switch is supplied through an OR circuit 1840 which may receive three other inputs, these other inputs being signals representing $3X \cdot \overline{V}(4)$, $3X \cdot \overline{V}(5)$, and $3X \cdot Vs(5)$. The output of the OR circuit 1840 is supplied through a double inverter 1841 to serve as a first input to a switch 1842. Another input to this switch is a signal representing $2Xs(6)$. Another input is a signal representing $X \cdot Vm(8)$, $X \cdot Vl(8)$, or $2Xs(8)$ which is supplied from the OR circuit 1843. OR circuit 1844 will supply an input if signals representing either $Vm(7)$ or $Vl(7)$ are supplied thereto. The remaining input to the switch 1842 is a signal representing $\overline{3X}(7)$ which is supplied from the inverter 1845. The output of switch 1842 is supplied through a double inverter 1846 to the OR circuit 1837.

The second possible input to the OR circuit 1837 is derived from a switch 1854 which supplies an output signal through the double inverter 1856. The switch 1854 receives a signal representing $2Xs \cdot \overline{V}(5)$, $3X \cdot \overline{V}(4)$, and either of the signals supplied to the OR circuit 1855, these signals being $Vm(6)$, $Vm(7)$, and $2Vs(7)$. The output of the OR circuit 1855 is supplied to the switch 1854 which if it also receives signals representing $2Xs \cdot \overline{V}(5)$ and $3X \cdot \overline{V}(4)$, will supply an output through a doublet inverter 1856 to serve as the second possible input to the OR circuit 1837.

The third possible input to the OR circuit 1837 is derived through an OR circuit 1857. This OR circuit is adapted to receive either of two possible inputs. The first of which may be supplied from a switch 1858 which is connected to receive a signal representing $\overline{X \cdot Vs}(4)$ from an inverter 1859, a signal representing $2Xs \cdot \overline{V}(5)$, and a signal representing $\overline{3X}(4)$ from an inverter 1860. The other possible input to OR circuit 1857 is supplied from a switch 1861, this switch receiving signals representing $2Xs \cdot \overline{V}(4)$ and $\overline{3X}(5)$ the last-mentioned signal being supplied from inverter 1862. The output of the OR circuit 1857 is supplied through a double inverter 1863 to serve as one input to a switch 1864. There are many other inputs required by this switch. These inputs are the signal representing $\overline{X \cdot Vs}(7)$ which is supplied from an inverter 1865, a signal representing $\overline{2Xl}(8)$ which is supplied from an inverter 1866, a signal representing $\overline{2Xm}(7)$, which is supplied from inverter 1867, a signal representing $2Xs(6)$, and a signal representing $\overline{Vs}(8)$, which is supplied from an inverter 1868. The output of the switch 1864 is supplied through a double inverter 1870 to serve as the third possible input to the OR circuit 1867.

It will be remembered that there is an alternative way of supplying an input signal to OR circuit 1834. There is provided a switch 1871 which is adapted to receive signals representing $Vm(6)$, $3X \cdot \overline{V}(3)$ and signal representing either $2Xs \cdot \overline{V}(5)$ or $2Xs \cdot Vs(5)$ from an OR circuit 1872. The output of switch 1871 is supplied through a double inverter 1873 to an OR circuit 1874. The other possible input to this OR circuit is derived from a switch 1876, which is adapted to receive signals representing $Vs(5)$, $2Xs \cdot \overline{V}(3)$, and signals representing either $2Xs \cdot \overline{V}(6)$ or $2Xm \cdot \overline{V}(7)$ from the OR circuit 1877. The output of switch 1876 is supplied through a double inverter 1878 to the OR circuit 1874. The output of OR circuit 1874 is used as one input to a switch 1875. The other input to switch 1875 is obtained by way of a switch 1880. This switch is adapted to receive signals representing $Vm(1)$ and $X \cdot Vm(2)$. The output of the switch 1880 is supplied through an OR circuit 1879, which may also receive the signal $X \cdot Vm(1)$, and through a double inverter 1881, as the second input signal to the switch 1875. The output of this switch is supplied through a double inverter 1882 to serve as the second alternative input to OR circuit 1884, thereby allowing an output signal to be produced representing the character "R".

Figure 47:
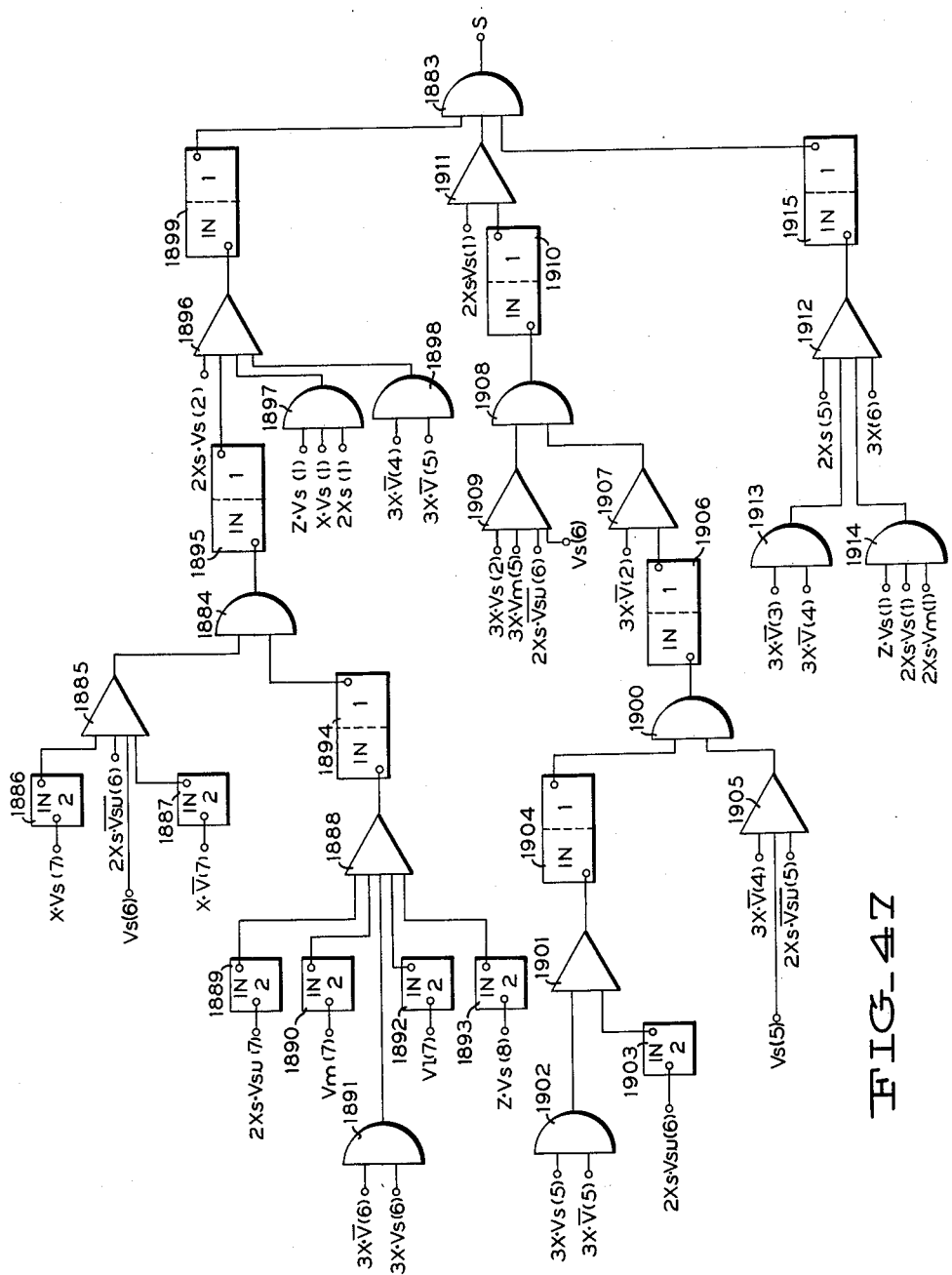

Reference is made to FIG. 47, the circuit for detecting the presence of the character "S". There is an OR circuit 1883 which is adapted to receive an input signal by any one of three alternative paths. The first of these paths centers around an OR circuit 1884 which is adapted to receive a signal from either of two sources. The first path to OR circuit 1884 is from a switch 1885 which is adapted to receive a signal representing $X \cdot Vs(7)$ from an inverter 1886, signals representing $2Xs \cdot \overline{Vsu}(6)$ and $Vs(6)$, and a signal representing $\overline{X \cdot V}(7)$ from an inverter 1887. The second possible input to OR circuit 1884 is derived from a switch 1888 which receives five inputs. The first two of these inputs are signals representing $\overline{2Xs \cdot Vsu}(7)$ and $\overline{Vm}(7)$ which are supplied from inverters 1889 and 1890. A signal representing either $3X \cdot \overline{V}(6)$ or $3X \cdot Vs(6)$ is supplied from the OR circuit 1891 to the switch 1888. The remaining two inputs to the switch 1888 are signals representing $\overline{Vl}(7)$ and $\overline{X \cdot Vs}(8)$, these signals being supplied from inverters 1892 and 1893, respectively. The output of switch 1888 is supplied through the double inverter 1894 to the OR circuit 1884. If either one of the two possible inputs to OR circuit 1884 is relatively positive, an output signal will be supplied through the double inverter 1895 to serve as one input to a switch 1896. Another input required by this switch is a signal representing $2Xs \cdot Vs(2)$.

A signal representing $Z \cdot Vs(1)$, $X \cdot Vs(1)$, or $2Xs(1)$ may be supplied from the OR circuit 1897 to the switch 1896. A signal representing either $3X \cdot \overline{V}(4)$ or $3X \cdot \overline{V}(5)$ may be supplied from an OR circuit 1898 to the switch 1896. In the event of relatively positive inputs to switch 1896, an output signal will be supplied therefrom through a double inverter 1899 to the OR circuit 1883 and will produce an output signal representing the character "S".

The second possible input to this OR circuit is derived through an OR circuit 1900. This OR circuit may receive a signal from either of two alternate paths. The first path comprises a switch 1901 which is adapted to receive signals representing either $3X \cdot Vs(5)$ or $3X \cdot \overline{V}(5)$ from an OR circuit 1902, and a signal representing $2Xs \cdot \overline{Vsu}(6)$ from an inerter 1903. The output of this switch is supplied through a double inverter 1904 to the OR circuit 1900. The second path for a signal to OR circuit 1900 is from a switch 1905 which is adapted to receive signals representing $3X \cdot \overline{V}(4)$, $2Xs \cdot \overline{Vsu}(5)$, and $Vs(5)$. The output of OR circuit 1900 is supplied through a double inverter 1906 to a switch 1907. The other input to this switch being a signal representing $3X \cdot \overline{V}(2)$. The output of this switch is applied to an OR circuit 1908, the other input of which receives a signal from a switch 1909. The switch 1909 will produce an output signal providing it receives input signals representing $3X \cdot Vs(2)$, $3X \cdot Vm(5)$, $2Xs \cdot \overline{Vsu}(6)$, and $Vs(6)$. The output of the OR circuit 1908 is supplied through a double inverter 1910 to a switch 1911. This switch requires in addition a signal representing $2Xs \cdot Vs(1)$ before it will provide an output signal through the OR circuit 1883 to produce a signal representing the character "S".

A third possible input to the OR circuit 1883 is provided from a switch 1912. This switch must receive signals representing $2Xs(5)$, signals representing either $3X \cdot \overline{V}(3)$ or $3X \cdot \overline{V}(4)$ from an OR circuit 1913, signals representing either $Z \cdot Vs(1)$, $2Xs \cdot Vs(1)$, or $2Xs \cdot Vm(1)$ from an OR circuit 1914 and a signal representing $3X(6)$. The output of this switch 1912 is supplied through a double inverter 1915 to the OR circuit 1883 to produce an identification signal for the character "S".

Figure 48:
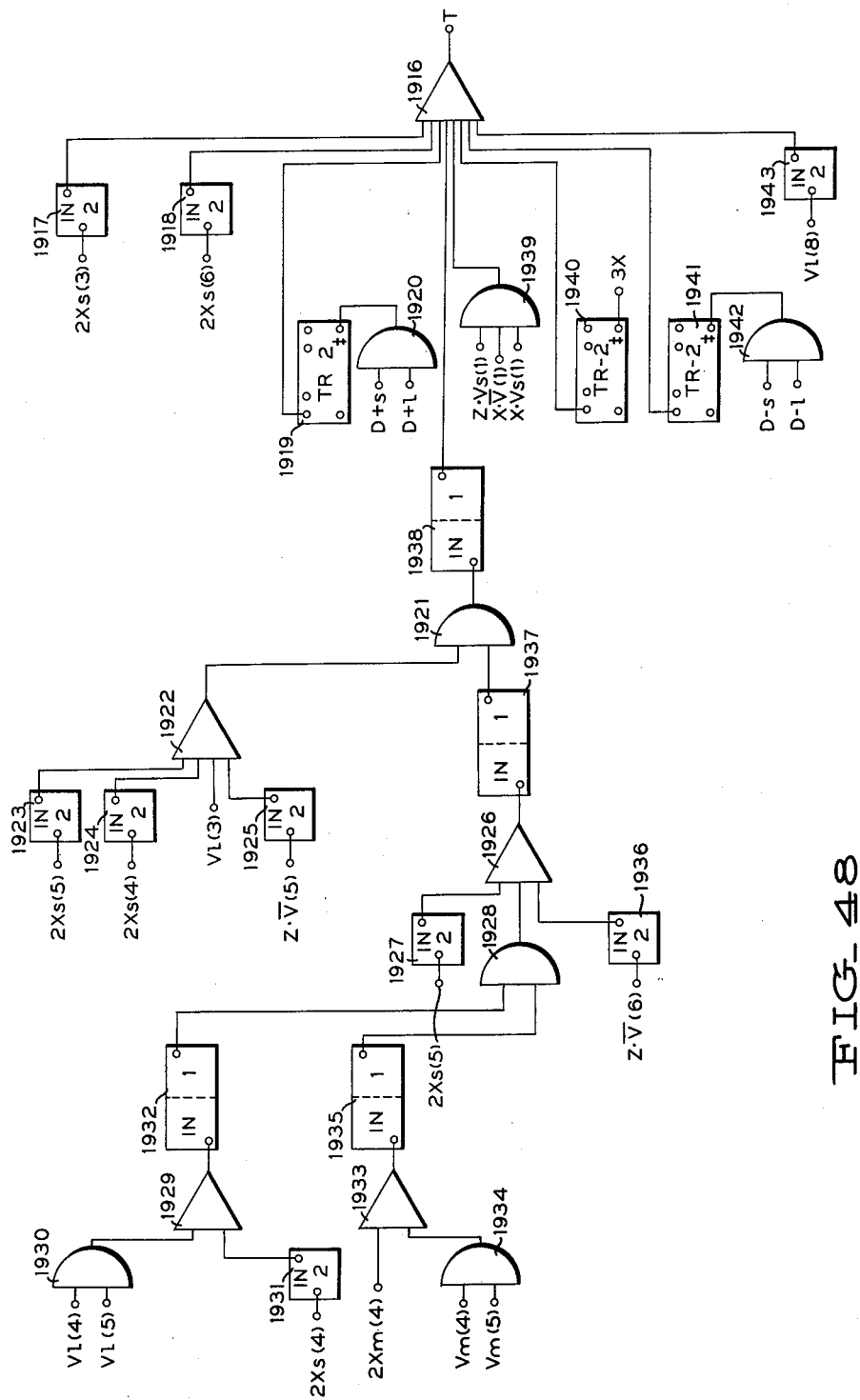

Reference is now made to FIG. 48 which discloses the logical circuitry utilized to identify the character "T." There is provided a switch 1916 which must receive a plurality of inputs in order to provide an output. The first two of these inputs are signals representing $\overline{2Xs}(3)$ and $\overline{2Xs}(6)$, these signals being provided by an inverter 1917 and 1918, respectively. The third input to switch 1916 is supplied from the left side of a trigger 1919. This trigger is normally OFF and will normally supply relatively positive voltage to the switch 1916. However, if it is turned ON by the occurrence of a $D+s$ signal as a $D-l$ signal by way of an OR circuit 1920, a relatively negative voltage will be supplied from the trigger 1919 to inhibit the switch 1916. Thus, signals representing $D+s$ or $D+l$ must not be received in scanning the circuit for recognition of the "T."

The fourth input to the switch 1916 is derived from an OR circuit 1921 which may receive either one of two possible inputs. The first of these inputs may be provided from a switch 1922 which is adapted to receive signals representing $\overline{2Xs}(5)$, $\overline{2Xs}(4)$, these signals being supplied from inverters 1923 and 1924, respectively. Another input required by the switch 1922 is a signal representing $Vl(3)$. The remaining input required by this switch is a signal representing $Z \cdot \overline{V}(5)$, this input being supplied from inverter 1925. The other possible input to OR circuit 1921 is derived from a switch 1926 which is adapted to receive a first input from an inverter 1927 representing $\overline{2Xs}(5)$. The second input to the switch 1926 is derived from the OR circuit 1928 which may receive an input from either one of two sources. The first of these sources comprises a switch 1929 which is adapted to receive a signal representing $Vl(4)$ or $Vl(5)$ from an OR circuit 1930, and a signal representing $\overline{2Xs}(4)$ from an inverter 1931. The output of the switch 1929 is supplied through a double inverter 1932 to serve as one of the inputs 1928. The other input to this OR circuit is derived from a switch 1933 which receives a signal representing $2Xm(4)$ and a signal representing either $Vm(4)$ or $Vm(5)$ from an OR circuit 1934. The output of this switch is supplied through a double inverter to serve as a second input to the OR circuit 1928. The third input required by switch 1926 is a signal representing $Z \cdot \overline{V}(6)$, this signal being supplied from an inverter 1936. The output of the switch 1926 is supplied through a double inverter 1937 which supplies a second possible input to the OR circuit 1921. The output of this OR circuit is supplied through a double inverter 1938 to serve as the fourth input to the switch 1916.

The fifth input required by this switch is a signal representing either $Z \cdot Vs(1)$, $X \cdot \overline{V}(1)$, or $X \cdot Vs(1)$, these signals being supplied by way of OR circuit 1939. Another condition which must not exist in scanning the character "T" is the indication of three crossovers. Thus, there is provided a trigger 1940, the left side of which is normally positive if the trigger remains OFF and will supply a relatively positive input to the switch 1916. However, if three crossovers occur in scanning the character, trigger 1940 will be turned ON and will inhibit switch 1916. Other signals which should not occur in scanning the character "T" are $D-s$ and $D-l$. Thus, there is a trigger 1941 provided with the left side thereof connected to the switch 1916. If signals representing either $D-s$ or $D-l$ are supplied from an OR circuit 1942 to turn the trigger 1941 ON, switch 1960 will be inhibited. The final input required by switch 1916 is $\overline{Vl}(8)$, which is provided by way of inverter 1943.

If all of the inputs to switch 1916 are relatively positive in coincidence, an output signal representing the character "T" will be produced.

Figure 49:
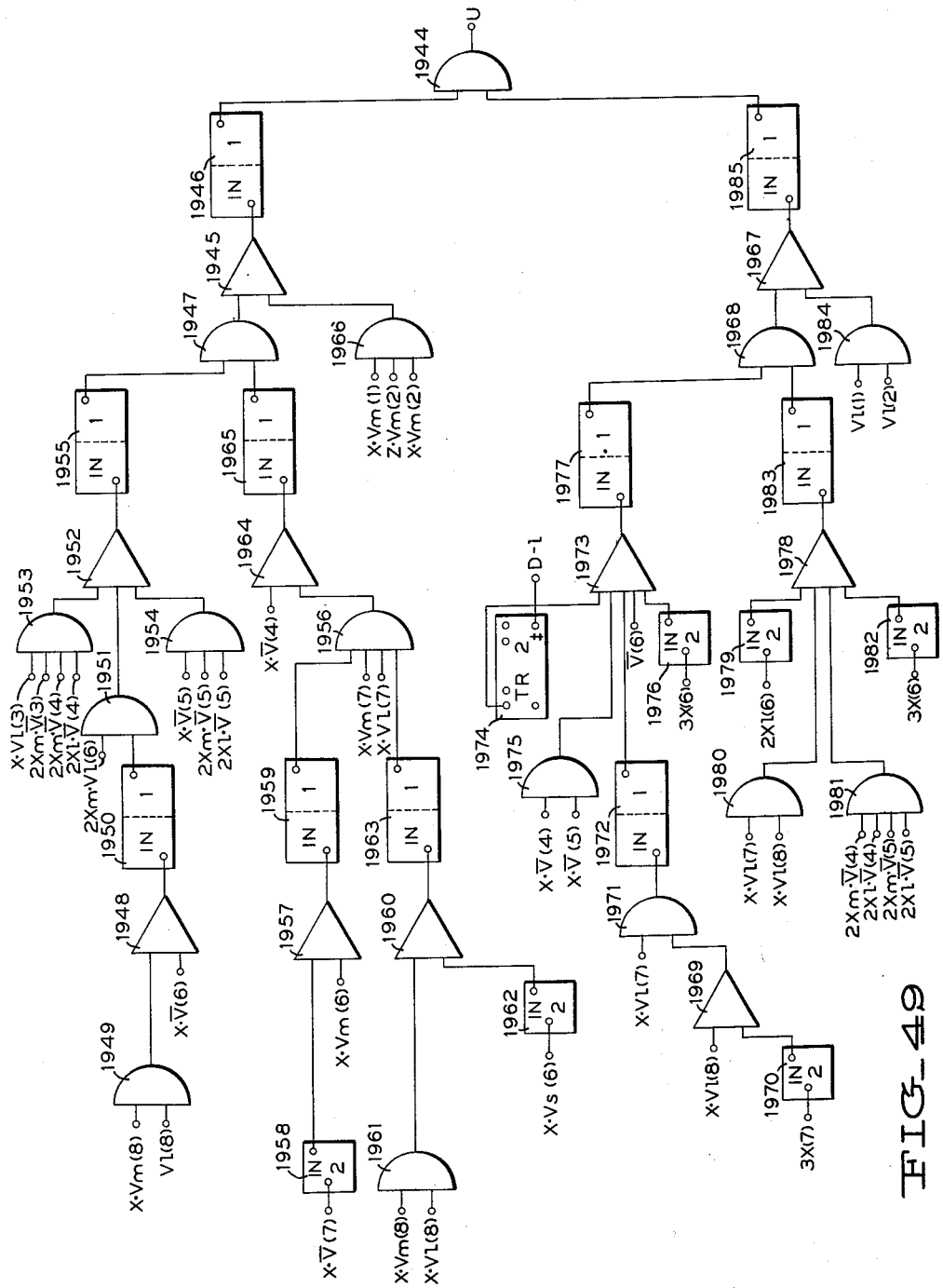

Reference is now made to FIG. 49 which discloses the logical circuitry for generating an output signal representing the character "U." There is an OR circuit 1944 which may receive either of two possible inputs to produce the identification signal. The first of these inputs is derived from the switch 1945 which will supply an output through the double inverter 1946 to the OR circuit 1944. This switch must receive two inputs the first of which is derived from an OR circuit 1947 which can receive two inputs. The first of the two inputs to OR circuit 1947 is derived in part through a switch 1948 which must receive inputs representing $X \cdot Vm(8)$ or $Vl(8)$ from an OR circuit 1949, and a signal representing $X \cdot \overline{V}(6)$. The output of this switch is supplied through a double inverter 1950 to an OR circuit 1951, which also receives a signal representing $2Xm \cdot Vl(6)$. The output of the OR circuit is supplied to a switch 1952 which also receives signals representing either $X \cdot Vl(3)$, $2Xm \cdot \overline{V}(3)$, $2Xm \cdot \overline{V}(4)$, or $2Xl \cdot \overline{V}(4)$ from an OR circuit 1953, and signals representing $X \cdot \overline{V}(5)$, $2Xm \cdot \overline{V}(5)$, or $2Xl \cdot \overline{V}(5)$ from an OR circuit 1954. The output of the switch 1952 is supplied through a double inverter 1955 and serves as one of the two inputs to the OR circuit 1947. The other possible input to the OR circuit 1947 is derived from an OR circuit 1956. This circuit may receive four possible inputs. The first of which is derived from a switch 1957 which is connected to receive a signal representing $\overline{X \cdot \overline{V}(7)}$ from an inverter 1958 and a signal representing $X \cdot Vm(6)$. The output of the switch is supplied through a double inverter 1959 to the OR circuit 1956. Other possible inputs to this OR circuit are $X \cdot Vm(7)$, $X \cdot Vl(7)$, and a signal derived from a switch 1960 which is supplied to the OR circuit through a double inverter 1963. The switch 1960 is adapted to receive a signal representing either $X \cdot Vm(8)$ or $X \cdot Vl(8)$ from an OR circuit 1961, and a signal representing $\overline{X \cdot Vs}(6)$ from an inverter 1962.

The output of the OR circuit 1956 is supplied to a switch 1964 which also receives a signal representing $X \cdot \overline{V}(4)$. The output of switch 1964 is supplied to a double inverter 1965 to serve as the second possible input to the OR circuit 1947. The output of the OR circuit 1947 serves as one input to the switch 1945, the other input being a signal supplied from the OR circuit 1966 representing either $X \cdot Vm(1)$, $Z \cdot Vm(2)$, or $X \cdot Vm(2)$. The output of the switch 1945 is supplied through a double inverter 1946 and the OR circuit 1944 to produce an output signal representing the character "U."

The other input to the OR circuit 1944 is derived from a switch 1967. This switch must receive two inputs, the first of which is derived from an OR circuit 1968 which also may receive two inputs. The first of the inputs to the OR circuit 1968 may be derived from a switch 1969 which is adapted to receive a signal representing $X \cdot Vl(8)$ and a signal representing $\overline{3X}(7)$, the last-mentioned signal being supplied from an inverter 1970. The output of the switch is supplied to an OR circuit 1971 which also receives a signal representing $X \cdot Vl(7)$. The output of the OR circuit is supplied through a double inverter 1972 to serve as one input to a switch 1973. In identifying the character "U" by means of the first input to OR circuit 1968, it is required that a signal $D-l$ not be produced. Thus, there is provided a trigger 1974 which will be turned ON by a signal $D-l$ to inhibit the switch 1973. Another input required by the switch 1973 is a signal representing either $X \cdot \overline{V}(4)$ or $X \cdot \overline{V}(5)$ from an OR circuit 1975. Another input to the switch 1973 is a signal representing $\overline{V}(6)$. The remaining input to this switch is a signal representing $\overline{3X}(6)$ which is supplied from inverter 1976. The output of the switch 1973 is supplied through a double inverter 1977 to serve as one input to the OR circuit 1968. The other input to this OR circuit is adapted to be provided from a switch 1978, which in order to produce this second input to the OR circuit 1968 must receive a signal representing $\overline{2Xl}(6)$ from an inverter 1979, a signal representing either $X \cdot Vl(7)$ or $X \cdot Vl(8)$ from an OR circuit 1980, a signal representing either $2Xm \cdot \overline{V}(4)$, $2Xl \cdot \overline{V}(4)$, $2Xm \cdot \overline{V}(5)$, or $2Xl \cdot \overline{V}(5)$ from an OR circuit 1981, and a signal representing $\overline{3X}(6)$ from inverter 1982. The output of switch 1978 is supplied through a double inverter 1983 to serve as the second possible input to the OR circuit 1968. The output of the OR circuit 1968 is supplied to serve as one input to the switch 1967. The other input to this switch must be a signal representing either $Vl(1)$ or $Vl(2)$. The output of switch 1967 is supplied through a double inverter 1985 and an OR circuit 1944 to produce an output signal representing the character "U."

Reference is now made to FIG. 50 which discloses the logical circuitry utilized to identify the character "V." There is provided an OR circuit 1986 which is adapted to receive an input from one of two alternate sources. Referring to a trigger 1987, it is seen that this trigger can be turned on from a switch 1988, providing the switch 1988 receives a signal representing either $X \cdot Vs(10)$ or $X \cdot \overline{V}(10)$ from an OR circuit 1989, and a signal representing either $X \cdot \overline{V}(9)$ or $X \cdot Vs(9)$ from an OR circuit 1990. If the trigger 1987 is turned ON, the right side thereof will become relatively positive and supply an input to switches 1991 and 1999. If, after this occurs, a signal $S-$ is supplied to the switch 1991, a trigger 1992 will be turned ON. The output from the right side of this trigger is supplied to serve as inputs to OR circuits 1993 and 2002. Similarly, if a $D-s$ signal is supplied to switch 1999 after trigger 1987 is turned ON, a trigger 2000 will be turned ON. The output from the right side of trigger 2000 serves as inputs to OR circuits 1993 and 2002 and switch 1995.

The output of OR circuit 1993 is supplied to serve as a first input of switch 2001. The other input of switch 2001 is a signal which represents $So$. Thus, if a signal $So$ occurs after trigger 1992 or trigger 2000 has been turned ON by an $S-$ or $D-s$ signal, respectively, a trigger 1994 will be turned ON by the output of switch 2001. When trigger 1994 is turned ON, its left side becomes relatively negative, thus inhibiting switches 1995 and 2004, which are connected to the left side of said trigger. Besides the outputs of triggers 1994 and 1992, switch 1995 is adapted to receive signals representing $S+$ at its input. Thus, if an $S+$ signal occurs after trigger 1992 is turned ON, but before trigger 1994 is turned ON, trigger 1996 will be turned ON by the output of switch 1995. Similarly, switch 2004 is adapted to receive signals representing $D+s$ besides the outputs of triggers 1992 or 2000, which are supplied through OR circuit 2002 and double inverter 2003, and the output of trigger 1994. Thus, if a $D+s$ signal occurs after either trigger 1992 or trigger 2000 is turned ON, but before trigger 1994 is turned ON, trigger 2005 will be turned ON by the output of switch 2004.

OR circuit 1997 is adapted to receive inputs from the right side of trigger 1996 and 2005. The output of OR circuit 1997 serves as one input to switch 1998a. The other input of switch 1998a is adapted to receive SCAN SYNC pulses. Thus, trigger 1998b, which is connected to the output of switch 1998a, will be turned ON by the trailing edge of a SCAN SYNC pulse following an output of OR circuit 1997. After it is turned ON, the right side of this trigger provides an output, which is relatively positive, as a first input to switch 2011.

However, it is desired to ascertain that the data which resulted in turning ON trigger 1998b is not followed, within a given number of scans, by one or more $S-$ or $D-s$ signals. Therefore, a circuit is provided which inhibits switch 2011 for a number of scans after trigger 1998b is turned ON. This circuit consists of a single-shot multivibrator 2007a and inverter 2007b. Before trigger 1998b is turned ON, the single-shot multivibrator is turned ON by the output of OR circuit 1997. The single-shot multivibrator is adapted to furnish a relatively positive output for about six scans after it is turned ON. Since its output is supplied to switch 2011 through inverter 2007b, switch 2011 will be inhibited as long as single-shot multivibrator 2007a is turned ON.

While switch 2011 is inhibited by single-shot multivibrator 2007a, the circuit now to be described is susceptible to $S-$ or $D-s$ signals. Such $S-$ or $D-s$ signals are usually found to follow the previously described conditions if the character under investigation is a "W," the left half of which looks like a "V." There is provided a switch 2009a with two inputs. One input is connected to the right side of trigger 1998b. The other input is adapted to receive $S-$ or $D-s$ signals through OR circuit 2008. Thus, if either an $S-$ or $D-s$ signal occurs after trigger 1998b is turned ON, the output of switch 2009a acts to turn trigger 2009b ON with the trailing edge of the $S-$ or $D-s$ signal. The left side of trigger 2009b is adapted to turn trigger 1998b OFF, thus inhibiting switch 2011.

The other inputs to this switch are supplied from the left side of triggers 2010, 2011, 2021, 2013 and 2014. These triggers are capable of being turned ON by signals representing $2Xs$, $2Xm$, $2Xl$, $3X$, and $Vl$, respectively. Thus, in order for switch 2011 to produce an output, trigger 1998b must be ON, single-shot multivibrator 2007a must be OFF, and none of the signals $2Xs$, $2Xm$, $2Xl$, $3X$ or $Vl$ can be produced during the scanning of the character "V." In the event an output is produced to the switch 2011, it is supplied through a double inverter 2015 to the OR circuit 1986 to produce an identification signal for the character "V."

The second way of obtaining an input signal to the OR circuit 1986 is by way of a switch 2016. This switch will receive one input from an OR circuit 2053, which has three possible inputs. The first of these inputs to OR circuit 2513 is derived from a circuit now to be described. There is a switch 2017 which is adapted to receive a signal representing $X \cdot Vm(3)$, a signal representing either $X \cdot \overline{V}(9)$ or $X \cdot V(10)$ from an OR circuit 2018, a signal representing $\overline{2Xs}(5)$ from an inverter 2019 and a signal representing $\overline{2Xs}(4)$ from inverter 2020. The output of the switch 2017 is supplied through a double inverter 2121 to an OR circuit 2022. The output of this OR circuit being supplied to a switch 2023. It is noted that OR circuit 2022 can receive an input by another path. This path includes a switch 2023 which is adapted to receive an input signal representing $\overline{Vs}(7)$ from an inverter 2024, and signals representing $2Xm(4)$ and $X(7)$. The output of switch 2023 is supplied to an OR circuit 2025. Another possible way of obtaining an input to the OR circuit 2025 is by way of a switch 2026 which is connected to receive signals representing $X(4)$, $2Xs(7)$, and a signal representing $\overline{Vs}(4)$, the last-mentioned signal being supplied from an inverter 2027. The output of the OR circuit 2025 is supplied through a double inverter 2028 to serve as one input to a switch 2029. Other inputs to this switch are signals representing either $X \cdot \overline{V}(5)$ or $X \cdot Vs(5)$ from an OR circuit 2030 and a signal representing either $X \cdot \overline{V}(9)$ or $X \cdot Vs(9)$ supplied from an OR circuit 2031. The output to the switch 2029 is supplied through a double inverter 2032 to an OR circuit 2922. The output of this OR circuit, as previously mentioned, is supplied to the switch 2023. The other input required by switch 2023 is a signal representing either $X \cdot \overline{V}(2)$ or $X \cdot Vs(2)$ from the OR circuit 2033. The output of the switch 2023 is supplied through a double inverter 2034 to provide the afore-mentioned first input to the OR circuit 2053.

Another possible way of getting an input to the OR circuit 2053 is from a switch 2035. One of the inputs to this switch must be a signal representing $X \cdot Vm(3)$ or $X \cdot Vl(3)$, which is supplied from an OR circuit 2036. An OR circuit 2037 will supply a signal representing either $2Xs \cdot Vm(6)$ or $2Xm \cdot Vs(6)$. The inverter 2038 is arranged to supply a signal to the switch 2035 representing $\overline{Vl}(4)$. The remaining signals required by switch 2035 are $2Xs(4)$ and $X(7)$. The output of the switch 2035 is supplied to a double inverter 2039 to serve as a second possible input to the OR circuit 2053. The third possible input to the OR circuit 2153 is from a switch 2040. This switch is arranged to receive a signal representing $X \cdot Vs(4)$, a signal representing either $X \cdot Vm(5)$, $2Xs \cdot Vs(5)$ or $Z \cdot Vs(5)$ from an OR circuit 2041, and a signal representing either $X \cdot Vs(6)$ or $X \cdot Vm(6)$ from an OR circuit 2042. The output of switch 2040 is supplied through a double inverter 2043 to serve as a third possible input to the OR circuit 2053. The output of this OR circuit is supplied to the switch 2016, serving as the first input thereto. Another input required by the switch 2016 is a signal representing either $X \cdot \overline{V}(1)$ or $X \cdot Vs(1)$, these signals being supplied from the OR circuit 2044. The output of the switch 2016 is supplied through a double inverter 2045 to the OR circuit 1986 to produce the output signal indicating a character "V."

Reference is now made to FIG. 51 which discloses the logical circuitry required to generate a signal representing the character "W".

The first part of the circuit to be described to identify the character "W" will supply an input to an OR circuit 2046, it being seen that there are two possible paths by which this OR circuit may receive an input. In the first path the circuit looks during the scanning of the character to first see $D-l$ or $D-s$ and thereafter to see $D+s$ or $D+$ and thereafter to see $D-s$ or $S-$ and thereafter to see $D+l$ or $D+s$. Once this is done there are certain other conditions which must be indicated. Thus, referring to the OR circuit 2047, it is seen that it will supply an output providing either of the triggers 2048 or 2049 are turned ON by the signals $D-l$ or $D-s$, respectively. The output of OR circuit 2047 is supplied to serve as one input to each of the switches 2050 and 2053. In the event of a $D+s$ pulse to switch 2050, an output is supplied to a trigger 2051 to turn the trigger ON. In the event of an $S+$ pulse to the switch 2053, an output is supplied therefrom to turn a trigger 2054 ON. The output of each of the triggers 2051 and 2054 will be relatively positive if they are turned ON and will supply a relatively positive input to an OR circuit 2052, the output of the OR circuit being supplied to switches 2055 and 2056. If the $D-s$ is supplied to switch 2055 after it has received an input from the OR circuit 2052, an output will be supplied therefrom to turn a trigger 2057 ON. However, if instead an $S-$ pulse is supplied to a switch 2056 after it has received an input from the OR circuit 2052, an output will be supplied from the switch 2056 to turn a trigger 2059 ON. The right side of both of the triggers will supply a relatively positive voltage to the OR circuit 2058 if they have been turned ON, the output of the OR circuit being supplied to each of the switches 2060 and 2061. If thereafter a $D+l$ signal is supplied to the switch 2060, a trigger 2062 will be turned ON. If instead, a $D+s$ signal is supplied to the switch 2061, a trigger 2064 will be turned ON. The output of both the triggers 2062 and 2064 is supplied through an OR circuit 2063 to serve as one input to a switch 2065. Other inputs required by this switch are the absence of a signal $3X$ and the absence of a signal $2Xl$. Thus, a signal $3X$ is supplied to a trigger 2066 and a signal $2Xl$ is supplied to 2067. If signals representing $3X$ as well as $2Xl$ are not produced during the scanning of a character, triggers 2066 and 2067 will be OFF and will supply relatively positive voltages from the left side thereof to the switch 2065. This switch must also receive a signal representing either $Z(1)$ or $X(1)$ from the OR circuit 2068. Another condition which must not exist is an included white area $2Xm$. Thus, a trigger 2069 will remain OFF and supply a relatively positive voltage to the switch 2065 unless a $2Xm$ signal is supplied thereto to turn it ON. Another signal required by the switch 2065 is $\overline{Vl}(1)$ which is supplied from the inverter 2070. In the event all of the inputs to the switch 2065 are relatively positive in coincidence, an output is supplied therefrom through the double inverter 2071 and through the OR circuit 2046 to provide an output signal indicating the recognition of a character "W".

As previously described, there is an alternative way of producing this character identity signal. There is provided a trigger 2072 which normally will provide a relatively positive output from the left side thereof to a switch 2074. However, if a signal representing $S+$, $S-$ or $D+s$ is supplied to OR circuit 2073, the trigger 2072 will be turned ON thereby inhibiting the switch 2074. However, let it be assumed that this switch receives a relatively positive input from the trigger and also receives a signal representing $D-s$. The output of the switch supplies an input to a trigger 2076, thereby turning the trigger ON. The output of the right side of the trigger supplies a relatively positive input to the switch 2075 which receives in addition a signal representing $D+s$. The output of this switch is used to turn a trigger 2077 ON which will supply a relatively positive input to a switch 2082. If, however, a signal $S+$ or $D-s$ is supplied to an OR circuit 2080, a trigger 2079 will be turned ON. The left side of this trigger is connected to the trigger 2077. Thus, trigger 2077 will be turned OFF when trigger 2079 is turned ON.

Switch 2082 must also receive an indication that signals $2Xl$ and $3X$ have not been produced. Thus, triggers 2083 and 2084 may be turned ON by signals representing $2Xl$ and $3X$, respectively. However, if the triggers are not turned ON, relatively positive voltages will be supplied from the right side thereof to the switch. Another signal required by the switch is $\overline{Vl}(1)$ supplied from inverter 2085. Another input to the switch 2082 is a signal representing $X(1)$. The final input to this switch is supplied from an OR circuit 2086 which may receive an input from one of two possible sources. The first source includes a switch 2087, which in order to supply an input to the OR circuit must receive a signal representing $2Xs(2)$, and signals representing $\overline{Vl}(2)$ and $\overline{2Xs}(4)$ from inverters 2088 and 2089. The second possible way of getting an input to OR circuit 2086 is by way of a switch 2090 which must receive input signals representing $2Xs(3)$, $\overline{Vl}(3)$ and $\overline{2Xs}(5)$, the last two signals being supplied by way of inverters 2091 and 2092. The output of the OR circuit 2086 is supplied through a double inverter 2093 to serve as a final input to the switch 2082. If all of the inputs to this switch occur in coincidence, an output signal is supplied therefrom through the OR circuit 2046 to produce a signal representing the character "W."

Reference is made to FIG. 52 which discloses the logical circuitry utilized to identify the character "X." There is provided a switch 2094 which is adapted to receive three inputs. The first of these inputs may be a signal supplied from OR circuit 2095 representing either $X \cdot Vs(3)$, $Z \cdot Vs(4)$, $X \cdot Vs(4)$, $X \cdot \overline{V}(5)$, $X \cdot Vs(5)$, or $X \cdot Vs(6)$. The second input to the switch 2094 must be from an OR circuit 2096, this signal being representative of either $2Xm \cdot \overline{V}(5)$, $2Xm \cdot \overline{V}(6)$, $2Xl \cdot \overline{V}(6)$, $2Xm \cdot \overline{V}(7)$, $$2Xl \cdot \overline{V}(7), 2Xm \cdot \overline{V}(8), 2XlV(8), 2Xm \cdot \overline{V}(9)$$

or $2Xm \cdot Vs(9)$. The third input to the switch 2094 must be by way of an OR circuit 2097 and must be a signal representing either $2Xs \cdot \overline{V}(1)$, $2Xm \cdot \overline{V}(1)$, $2Xm \cdot Vs(1)$, $2Xl \cdot \overline{V}(1)$, or $2Xm \cdot \overline{V}(2)$. Thus, if the three inputs to switch 2094 are relatively positive in coincidence, an output signal representing character "X" is produced.

Reference is made to FIG. 53 which discloses the logical circuitry utilized to identify the character "Y." There is provided a switch 2098 which is adapted to receive two inputs. The first of these inputs is derived from an OR circuit 2099 which will supply the first input to the switch 2098 through a double inverter 2100. OR circuit 2099 may receive inputs from one of three possible sources. The first of these sources comprises a switch 2101 which must receive signals representing $\overline{X \cdot Vm}(6)$, $\overline{X \cdot Vl}(6)$, these two signals being supplied from inverters 2102 and 2103. Another input required by switch 2101 is a signal representing $2Xm \cdot Vs(3)$. Another input required by this switch is a signal representing either $X \cdot \overline{V}(2)$ or $X \cdot Vs(2)$, which is supplied from the OR circuit 2104. The remaining inputs to the switch 2101 is a signal representing $\overline{Z \cdot V}(8)$, this signal being supplied from the inverter 2105. The output of switch 2101 is supplied through a double inverter 2106 to serve as a first input to the OR circuit 2099.

The second input to this OR circuit 2099 is derived from a switch 2107 which receives a signal representing $Vs(8)$ and a signal representing $\overline{2Xs \cdot Vs}(8)$, the last-mentioned signal being supplied from the inverter 2108. The output of switch 2107 is one input and a signal representing $2Xm(7)$ the other input to the OR circuit 2109. The output of OR circuit 2109 is supplied through a double inverter 2110 to a switch 2111. The other input to this switch is a signal representing $Vm(5)$. The output of the switch is supplied as a second input to the OR circuit 2099.

The remaining input to the OR circuit 2099 is supplied from a switch 2112. The inputs required by this switch are signals representing $X(3)$, $X \cdot \overline{V}(6)$, and either $Vm(4)$ or $X \cdot Vs(4)$, the last two signals being supplied from OR circuit 2113. The remaining inputs required by the switch 2112 are signals representing $\overline{X \cdot Vl}(3)$, $\overline{2Xs \cdot Vm}(4)$, and $\overline{X \cdot Vs}(5)$, these signals being supplied from inverter 2114, 2115, and 2116, respectively. The output of the switch 2112 is supplied from a double inverter 2117 to serve as a third input to the OR circuit 2099. The output of the OR circuit is supplied through the double inverter 2100 to serve as a first input to a switch 2098. The second input supplied to this switch is a signal representing either $X \cdot \overline{V}(1)$ or $X \cdot Vs(1)$, this signal being supplied from the OR circuit 2118.

In the event the two inputs to switch 2098 are relatively positive in coincidence, an output signal representing the character "Y" is produced.

Figure 54:
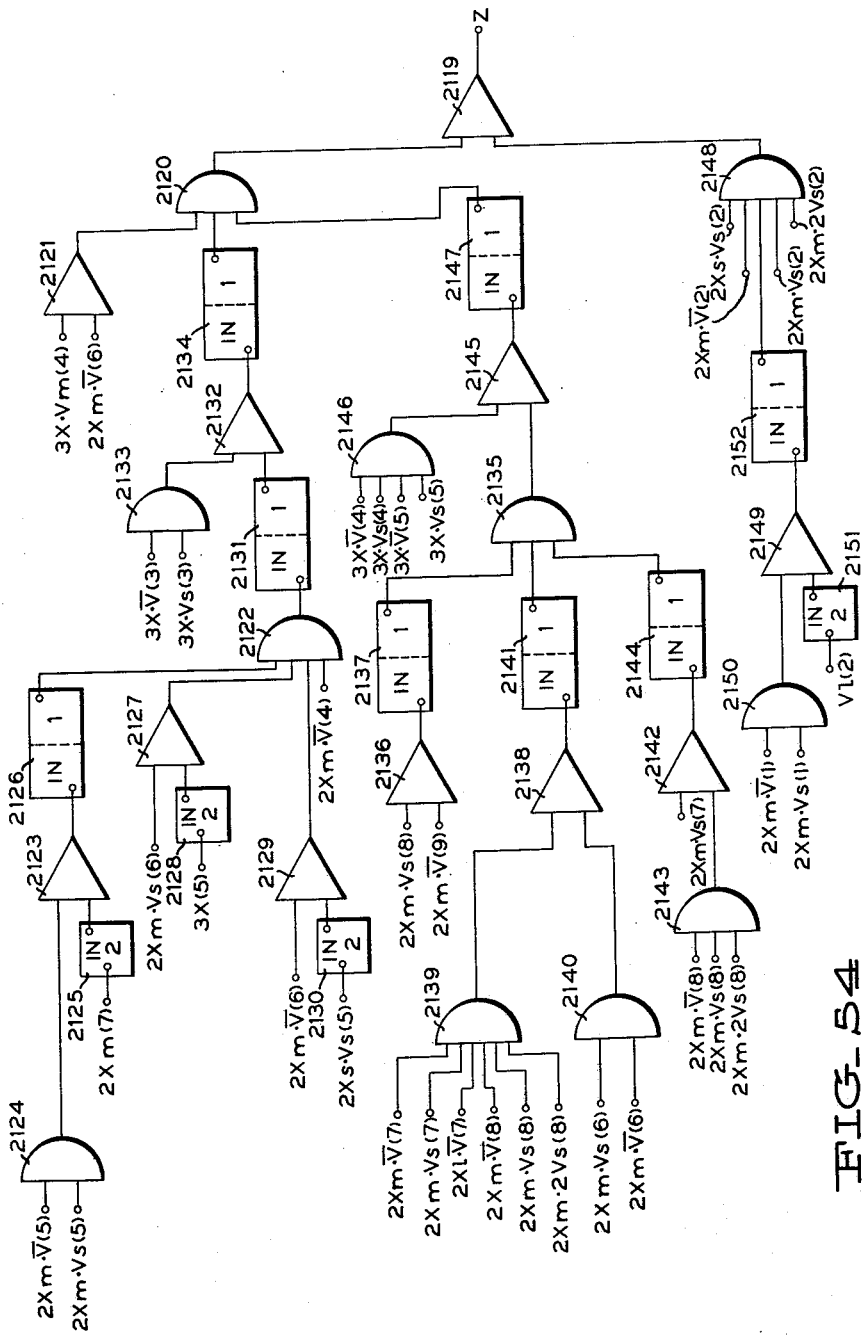

Reference is now made to FIG. 54 which discloses the logical circuitry utilized to identify the character "Z." There is provided a switch 2119 which is adapted to receive an input from two sources. The first of these inputs is derived from an OR circuit 2120 which is connected to receive three possible inputs. The first of these inputs is supplied from a switch 2121 which receives signals representing $3X \cdot Vm(4)$ and $2Xm \cdot \overline{V}(6)$.

The circuit for the second of the inputs to the OR circuit 2120 comprises a switch 2123 which is adapted to receive a signal from the OR circuit 2124, representative of either $2Xm \cdot \overline{V}(5)$ or $2Xm \cdot Vs(5)$, and a signal representing $\overline{2Xm}(7)$ from an inverter 2125. The output of switch 2123 is supplied through a double inverter 2126 to serve as a first input to an OR circuit 2122. The second possible input to this OR circuit is supplied through a switch 2127, which receives signals representative of $2Xm \cdot Vs(6)$ and $\overline{3X}(5)$, the last-mentioned signal being supplied from an inverter 2128. The third possible input to the OR circuit 2122 is derived from a switch 2129 which receives signals representing $2Xm \cdot \overline{V}(6)$, and a signal representing $\overline{2Xs} \cdot Vs(5)$, the last-mentioned signal being supplied from the inverter 2130. The fourth possible input to the OR circuit 2122 is a signal representing $2Xm \cdot \overline{V}(4)$. The output of the OR circuit 2122 is supplied through a double inverter 2131 to a switch 2132. This switch is adapted to receive, in addition, a signal from the OR circuit 2133 representative of either $3X \cdot \overline{V}(3)$ or $3X \cdot Vs(3)$. The output of the switch 2132 is supplied through a double inverter 2134 to serve as a second input to OR circuit 2120.

The third source of input for the OR circuit 2120 is derived from an OR circuit 2135, this circuit being adapted to receive an input from three possible paths. The first of these paths comprises a switch 2136, which is adapted to receive a signal representing $2Xm \cdot Vs(8)$ and $2Xm \cdot \overline{V}(9)$. The output of this switch is supplied through a double inverter 2137 to serve as the first input to the OR circuit. The second input to the OR circuit is supplied from a switch 2138 which is adapted to receive from an OR circuit 2139 a signal representing either $2Xm \cdot \overline{V}(7)$, $2Xm \cdot Vs(7)$, $2Xl \cdot \overline{V}(7)$, $2Xm \cdot \overline{V}(8)$, $2Xm \cdot Vs(8)$, or $2Xm \cdot 2Vs(8)$. Another input to the switch 2138 is supplied from an OR circuit 2140 and is a signal representing either $2Xm \cdot Vs(6)$ or $2Xm \cdot \overline{V}(6)$. The output of the switch 2138 is supplied through a double inverter 2141 to the OR circuit 2135. The third possible way of obtaining an input to this OR circuit is by way of a switch 2142 which is connected to receive a signal representing $2Xm \cdot Vs(7)$ and a signal representing either $2Xm \cdot \overline{V}(8)$, $2Xm \cdot Vs(8)$, or $2Xm \cdot 2Vs(8)$ from an OR circuit 2143. The output of switch 2142 is supplied through a double inverter 2144 to the OR circuit 2135. The output of this OR circuit is supplied to a switch 2145 which is adapted to receive a signal from OR circuit 2146 representative of either $3X \cdot \overline{V}(4)$, $3X \cdot Vs(4)$, $3X \cdot \overline{V}(5)$, or $3X \cdot Vs(5)$. The output of switch 2145 is supplied through the double inverter 2147 to the OR circuit 2120. Thus, if any of the three inputs to OR circuit 2120 are relatively positive, a relatively positive voltage will be supplied to serve as one of the inputs to the switch 2119.

The second input required by the switch 2119 is derived from an OR circuit 2148. This OR circuit is adapted to receive signals representing $2Xs \cdot Vs(2)$ and $2Xm \cdot \overline{V}(2)$. Another input to this circuit is derived from the switch 2149, which is connected to receive from an OR circuit 2150 a signal representing either $2Xm \cdot \overline{V}(1)$ or $2Xm \cdot Vs(1)$, and a signal representing $\overline{Vl}(2)$ from an inverter 2151. The output of the switch 2149 is supplied through a double inverter 2152 to serve as an input to the OR circuit 2148. Other inputs supplied to this OR circuit are signals representing $2Xm \cdot Vs(2)$ and $2Xm \cdot 2Vs(2)$. The output of the OR circuit is supplied as a second input to the switch 2119. Thus, if the two inputs to the switch 2119 are relatively positive in coincidence, an output is supplied therefrom to produce an identifying signal for the character "Z."

To this point there has been described the apparatus for identifying a complete set of alphanumeric characters. A character identity signal is produced during the scanning operation just as soon as sufficient information occurs during the scanning operation to satisfy the logical sequence for the character being scanned.

Once a character identity signal is produced, it is desirable to block any additional identity signal from the same circuit until there is reasonable assurance that a new character is being scanned. To accomplish this operation, there is provided a circuit shown in FIG. 71 which comprises a plurality of switches which are adapted to receive the output signals from the sequence circuits shown in FIGS. 21 through 54. A separate switch is provided to receive the character identity signal from each of the sequence circuits. There is illustrated switches 2201 through 2206 which are adapted to receive the character identity signals representing the characters "1 or I," "2," "3," "4," "5" and "6," respectively. The switches for the characters "7" through "9," "0," "A" through "N," and "P" through "V" are not illustrated in the drawings, but it will be appreciated that in the actual circuit a switch is provided to receive each of the character identity signals for these characters. Switches 2207 through 2210 are utilized to receive the character identity signals for the characters "W" through "Z," respectively.

The second input to each of the switches described above is a gating signal which is obtained in a manner which will be explained at a later point in the description. For the moment, let it be assumed that the gating signal is relatively positive. Thus, if one of the switches receives a character identity signal, an output will be supplied from the switch.

The output signals from switches 2201 through 2206 are supplied through the double inverters 2211 through 2216, respectively, to an OR circuit 2221. It will be appreciated that a similar arrangement is provided for the switches not shown. The output signals from switches 2207 through 2210 are supplied through double inverters 2217 through 2220, respectively, to the OR circuit 2222.

The outputs from OR circuits 2221 and 2222, as well as the outputs from the OR circuits not shown, but indicated by the dotted lines, are fed to an OR circuit 2223. It will be seen that an output signal will be supplied from OR circuit 2223 any time there is an output from any of the switches 2201 through 2210, as well as from the switches understood to be provided but not shown in the drawings.

The output from OR circuit 2223 is supplied through a double inverter 2224 to the single-shot multivibrator 2225. The output from single-shot multivibrator 2225 is a relatively positive voltage of approximately twenty microseconds duration. This positive voltage is inverted in inverter 2226 to produce a pulse of twenty microseconds duration which has a negative going leading edge. The output from inverter 2226 is utilized as the END OF CHARACTER RESET for the triggers shown in the sequence circuits having the double dagger symbol associated therewith.

The output pulse from the single-shot multivibrator 2225 is supplied through an inverter 2227 to a single-shot multivibrator 2228. The trailing edge of the positive pulse from the single-shot multivibrator 2225 will result in a positive going voltage from inverter 2227 and will initiate a relatively positive output voltage from the single-shot multivibrator 2228 which will last for approximately ten scans. This signal is inverted in inverter 2229 and used to inhibit the switches 2201 through 2210 for the duration thereof. Thus, once a character identity signal causes a signal to be supplied from one of the switches 2201 through 2210, the triggers in the sequence circuits are reset and the switches are inhibited for ten scans. It will be noted that character identity signals which may be used in any desired manner, may be obtained from the double inverters 2211 through 2220. These signals may be used, for example, to punch cards for later use in suitable card processing machines.

To detect the occurrence of a blank space there is provided a switch 2249 which is adapted to receive signals representing $\overline{V}(3)$, $\overline{V}(4)$, $Z(3)$ and $Z(4)$. If all of these inputs are relatively positive in coincidence, an output signal is supplied through the double inverter 2250 to produce a BLANK signal. This signal is supplied through OR circuit 2222 to OR circuit 2223 and will cause the same sequence of events as any of the other signals fed to OR circuit 2223.

To detect the circumstances where a degraded character has been scanned with the result that insufficient information is produced to satisfy one of the sequence circuits shown in FIGS. 21 through 54, there is provided a single-shot multivibrator 2230 which receives the output of inverter 2227. Thus, a positive going voltage is fed to single-shot multivibrator 2230 twenty microseconds following the identification of a character or a blank space as defined. The single-shot multivibrator 2230 supplies a relatively positive voltage for twenty scans following the positive going voltage supplied thereto, this relatively positive output voltage being supplied to a switch 2261 and to an OR circuit 2260. The output of OR circuit 2260 will be relatively positive and is supplied to an inverter 2231 which produces a relatively negative voltage. This voltage is used to inhibit switch 2232.

It will be seen that switch 2261 will receive a relatively positive input from the double inverter 2224 only when a signal is supplied to OR circuit 2223. Thus, if within fourteen scans, by way of example, another character is identified to supply an input to OR circuit 2223, switch 2261 will supply a positive going input to the single-shot multivibrator 2262 which supplies a relatively positive input to OR circuit 2260 which lasts for twenty scans. This means that switch 2232 will continue to be inhibited for this period of time.

If twenty scans pass during which an input signal is not supplied to OR circuit 2223, the output of inverter 2231 to switch 2232 will become relatively positive. This allows switch 2232 to look for an indicator as to whether certain minimum character requirements are found following this twenty scan period. If minimum character requirements are detected, a signal will be supplied from each of the OR circuits 2233, 2234 and 2235 to the switch 2232.

OR circuit 2233 may receive an input from either of the OR circuits having the reference numerals 2236 and 2239 applied thereto. The OR circuit 2236 is connected to receive the outputs of inverters 2237 and 2238 which respectively receive signals representing $\overline{V}(1)$ and $Z(1)$, while OR circuit 2239 is connected to receive the outputs of inverters 2240 and 2241 which respectively receive signals representing $V(2)$ and $Z(2)$.

OR circuit 2234 may receive an input from either of the OR circuits having the reference numerals 2239 and 2242 applied thereto. OR circuit 2242 is connected to receive the output voltages from inverters 2243 and 2244 which respectively receive signals representing $\overline{V}(3)$ and $Z(3)$.

OR circuit 2235 is arranged to receive an input from the OR circuits having reference numerals 2242 and 2245 applied thereto. OR circuit 2245 is connected to receive the output voltages of inverters 2246 and 2247 which respectively receive signals representing $\overline{V}(4)$ and $Z(4)$.

If all of the inputs to switch 2232 are relatively positive in coincidence, an output is supplied from the switch through an inverter 2248 to produce a signal representing a MISS. That is, more than twenty scans have elapsed since the last character signal or BLANK signal, but a character has been scanned which should have been identified.

The output from the double inverter 2248 is supplied through OR circuits 2222 and 2223, and the double inverter 2224 to initiate an output from the single-shot multivibrator 2225. This output from the single-shot multivibrator will initiate a sequence of events in the manner previously described.

From the above-detailed description, it will be apparent that there has been described a new and improved character sensing system. This system of character sensing includes a form of data reduction which retains enough information to cope with a large variety of degradations, imperfections, and style variations, and still makes a sizable reduction in the quantity of data that must be handled by the final analysis circuits.

The form in which the reduced or encoded data may be used in the final analysis circuits is unrestricted. That is, emphasis can be placed on specific areas of a given character to cope with specific problems. Also, the reduced data is analyzed as it occurs with no dependence on the location or nature of the preceding characters, thereby allowing merged characters to be identified as well as those spaced abnormal distances about it. In the process of data reduction, some of the signature components are defined in proportional parts. This simplifies the sensing of characters in a wide range of quality. For example, what may be a medium size included white area and a short vertical line in a particular location of a lightly printed character can be expected to change into a small size included white area and a medium length vertical line in the same location of the same character if more ink happened to flow during the ink process. By using signature components in proportional parts, the design of the output or final analysis circuits for different sizes of the same or a similar type font of character is simplified.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims:

What is claimed is:

1. In apparatus for identifying character manifestations, scanning means for scanning a character manifestation in a plurality of scans to produce signals during the intervals that portions of the character manifestation are sensed, and circuit means connected to said scanning means and responsive to said signals for producing a selected one of more than two size signals each of which size signal represents a selected plurality of ranges of sizes of the portions of the character sensed.

2. In apparatus for identifying character manifestations, scanning means for scanning a character manifestation in a plurality of scans to produce signals during the intervals that portions of the character manifestation are sensed, and circuit means connected to said scanning means and responsive to the time duration between successive ones of said signals during a scan for producing time duration signals representing different ranges of time duration, each of said time duration signals corresponding to an associated one of said ranges of time duration.

3. In apparatus for identifying characters, scanning means for scanning a character in a plurality of vertical scans which progress one after the other across the character to produce the signals during the intervals portions of the character are sensed, encoding circuit means connected to said scanning means to receive said signals and to produce therefrom signature signals, said encoding circuit means including at least a first, second and third circuit means, said first circuit means comprising a circuit which is responsive to the first-mentioned signals for detecting which of a plurality of ranges of size the portions of the character sensed during a scan fall within and producing signature signals representing which of the ranges of size the portions fall within, said second circuit means producing signature signals representing which of a plurality of ranges of spacing exists between portions of a character on two adjacent scans, said third circuit means producing signature signals representing the number of crossovers during a scan where the same number of crossovers existed on the immediate previous scan, a plurality of multi-position storage means, each of said storage means being connected to said encoding circuit means to receive the signature signals representing a particular condition, and means for advancing the signature signals in each of the storage means from one position to another at predetermined intervals.

4. Apparatus for identifying characters comprising scanning means for progressively scanning each character, encoding means connected to said scanning means for producing a first group of signals representing different sizes of vertical line signature components, a second group of signals representing different sizes of included white signature components, a third group of signals representing the number of crossover signature components and a fourth group of signals representing different sizes of relative altitude signature components, storage means connected to said encoding means to receive each signal of said first, second and third groups of signals and to store said signals in sequence so that they are available in the order in which they are produced, and output circuit means connected to receive the signals from said storage means and said encoding means for producing an output signal representing the identity of the character scanned.

5. Apparatus for identifying characters in which the vertical line components are approximately proportional to the length of the included white areas, comprising means for progressively scanning each character and producing a first group of signals representing different sizes of vertical line signature components, a second group of signals representing different sizes of included white signature components, a third group of signals representing single and triple crossover signature components and a fourth group of signals representing different sizes of relative altitude signature components, a separate multi-position storage device for each of said groups of signals and connected to said first named means to receive signals in the associated group of signals and to advance the signal from one position to another during the scanning operation, and output circuit means connected to receive said groups of signals and the output signals from various positions of each of said storage devices for producing an output signal representing the identity of the character scanned.

6. Apparatus for identifying characters comprising; scanning means for progressively scanning a character in a plurality of scans, encoding means connected to said scanning means for receiving scanning information therefrom and producing from said scanning information a first group of signals which represent various sizes of a character portion scanned, a second group of signals which represent various sizes of spaces between said character portions, a third group of signals which represent prescribed numbers of character portions sensed on two adjacent scans, and a fourth group of signals representing the relative altitude of the upper contour of the character from one scan to another; a separate multi-position storage device for each of said groups of signals connected to said encoding means to receive signals in the associated group of signals and to advance the signals from one position to another during the scanning operation, and output circuit means connected to said encoding means and said storage devices receive said groups of signals from said encoding means and output signals from selected positions of each of said storage devices for producing an output signal representing the identity of the character scanned.

7. Apparatus for identifying characters comprising scanning means for scanning a character in a plurality of scans which move across the character in the direction in which the character stands, the scans progressing across the character from one side to the other, video amplifier means responsive to the scanning of portions of the character for producing output signals, sampling circuit means connected to said video amplifier means to receive said output signals and to sample them on a periodic basis so as to produce a number of pulses from a signal which is a function of the length of the portion of the character which caused said signal to be produced, encoding means comprising measuring means connected to said sampling circuit means for detecting which of a plurality of size categories the portions sensed fall within and producing a first group of signals representative of these various size categories, said measuring means also detecting which of a plurality of size categories the space between said character portions fall within and producing a second group of signals representative of these various size categories, storage means connected to said encoding means for receiving said first and second groups of signals and storing representations thereof, and output circuit means connected to said storage means and responsive to a combination of representations stored in said storage means for identifying the character scanned.

8. In apparatus for identifying character manifestations, scanning means for scanning a character manifestation in a plurality of scans to produce signals during the intervals that portions of the character manifestation are sensed, and circuit means connected to said scanning means and responsive to the signals produced by the upper contour of the character manifestation on different scans for producing a signal representing one of a plurality of ranges of change in altitude of said upper contour.

9. In apparatus for identifying character manifestations, scanning means for scanning a character manifestation in a plurality of scans to produce signals during the intervals that portions of the character manifestation are sensed, sampling means connected to said scanning means to receive each of said signals and to produce therefrom a number of pulses indicative of the length of the portion of the character manifestation which was sensed to produce each signal, and pulse responsive means connected to said sampling means for detecting whether or not the number of pulses is included in any one of more than two ranges, each range comprising a maximum and a minimum number of pulses indicative of a predetermined maximum and minimum length of the portion of the character manifestation which was sensed.

10. A character recognition system for recognizing characters of the type in which different characteristics of the characters remain in the same proportions for different total sizes of the characters, comprising, in combination, scanning means for scanning the characters to be recognized with a plurality of successive and adjacent scans and producing scanning signals during the intervals in which portions of the character are scanned, sampling means connected to said scanning means to receive said scanning signals and to sample said scanning signals on a periodic basis so as to produce a plurality of sampled video signal pulses during the time that a portion of a character is being scanned, video consolidation circuit means connected to said sampling means and responsive to said sampled video pulses for producing consolidated video pulses representing the presence or absence of sampled video pulses during a present scanning interval and the next previous scanning interval, singature component means for determining the length of lines in the direction of scanning of said characters including counting means connected to said video consolidation circuit means and responsive to the consolidated video pulses supplied therefrom to provide one of a plurailty of line length signature component signals at the end of each scan, different ones of said line length signature component signals indicating different ranges of length of said lines, a multi-position storage device connected to said signature component means and effective to store the length signature component signals in sequence for a plurality of scans, and logic circuit means connected to said storage device and responsive to different combinations of the stored signature component signals for partially determining output signals representing the scanned characters.

11. A character recognition system for recognizing characters of the type in which different characteristics of the characters remain in the same proportions for different total sizes of the characters, comprising, in combination, scanning means for scanning the characters to be recognized with a plurality of successive and adjacent scans and producing scanning signals during the intervals in which portions of the character are scanned, sampling means connected to said scanning means to receive said scanning signals and to sample said scanning signals on a periodic basis so as to produce a plurality of sampled video signal pulses during the time that a portion of a character is being scanned, video consolidation circuit means connected to said sampling means and responsive to said sampled video pulses for producing consolidated video pulses representing the presence or absence of sampled video pulses during a present scanning interval and the next previous scanning interval, signature component means for determining the length of included white areas between crossover portions of the scanned characters including counting means connected to said video consolidation circuit means for counting the intervals between crossover signals supplied from said video consolidation circuit means to provide a signal at the end of each scan indicative of one of a plurality of ranges of included white areas, a multi-position storage device connected to said signature component means and effective to store the signature component signals in sequence for a plurality of scans, and logic circuit means connected to said storage device and responsive to different combinations of the stored signature component signals for partially determining output signals representing the scanned characters.

12. A character recognition system for recognizing characters of the type in which different characteristics of the character remain in the same proportions for different total sizes of the characters, comprising, in combination, scanning means for scanning the characters to be recognized with a plurality of successive and adjacent scans and producing scanning signals during the intervals in which portions of the character are scanned, sampling means connected to said scanning means to receive said scanning signals and to sample said scanning signals on a periodic basis so as to produce a plurality of sampled video signal pulses during the time that a portion of a character is being scanned, video consolidation circuit means connected to said sampling means and responsive to said sampled video pulses for producing consolidated video pulses representing the presence or absence of sampled video pulses during a present scanning interval and the next previous scanning interval, signature component means for determining the presence of one or a plurality of crossovers in the scanned character, including counting means connected to said video consolidation circuit means and responsive to a predetermined number of consolidated video signal pulses indicating the presence of a crossover or a plurality of crossovers in the character scanned to provide an output signal indicative of the presence of none, one or of a plurality of crossovers in the character scanned, a multi-position storage device connected to said signature component means and effective to store the signature component signals in sequence for a plurality of scans, and logic circuit means connected to said storage device and responsive to different combinations of the stored signature component signals for partially determining output signals representing the scanned characters.

13. A character recognition system for recognizing characters of the type in which different characteristics of the characters remain in the same proportions for different total sizes of the characters, comprising, in combination, scanning means for scanning the characters to be recognized with a plurality of successive and adjacent scans and producing scanning signals during the intervals in which portions of the character are scanned, sampling means connected to said scanning means to receive said scanning signals and to sample said scanning signals on a periodic basis so as to produce a plurality of sampled video signal pulses during the time that a portion of a character is being scanned, video consolidation circuit means connected to said sampling means and responsive to said sampled video pulses for producing consolidated video pulses representing the presence or absence of sampled video pulses during a present scanning interval and the next previous scanning interval, signature component means for determining the relative altitude of the upper contour of characters scanned, including counting means for counting the intervals between the initiation of a scan and the detection of the upper contour of a scanned character, and including means associated with said counting means for determining the difference in said intervals counted for adjacent scans and providing relative altitude signature component signals indicative of the degree and direction of slope of the upper contour of the scanned character, and logic circuit means connected to said signature component means and responsive to different values of said relative altitude signature component signals for partially determining output signals representing the scanned characters.

References Cited in the file of this patent
UNITED STATES PATENTS

| | | |
|---|---|---|
| 2,616,983 | Zworykin | Nov. 4, 1952 |
| 2,738,499 | Sprick | Mar. 13, 1956 |
| 2,894,247 | Relis | July 7, 1959 |
| 2,932,006 | Glauberman | Apr. 5, 1960 |